US012634998B2

(12) United States Patent
Khoshkholgh Dashtaki et al.

(10) Patent No.: US 12,634,998 B2
(45) Date of Patent: May 19, 2026

(54) RANDOM ACCESS MESSAGE REPETITIONS

(71) Applicant: Comcast Cable Communications, LLC, Philadelphia, PA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hua Zhou, Vienna, VA (US); Gautham Prasad, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 236 days.

(21) Appl. No.: 18/365,530

(22) Filed: Aug. 4, 2023

(65) Prior Publication Data

US 2024/0049297 A1     Feb. 8, 2024

Related U.S. Application Data

(60) Provisional application No. 63/395,456, filed on Aug. 5, 2022.

(51) Int. Cl.
| | |
|---|---|
| *H04W 74/0833* | (2024.01) |
| *H04B 7/185* | (2006.01) |
| *H04B 17/318* | (2015.01) |

(52) U.S. Cl.
CPC .... *H04W 74/0833* (2013.01); *H04B 7/18513* (2013.01); *H04B 17/328* (2023.05)

(58) Field of Classification Search
CPC ........... H04W 74/0833; H04W 74/006; H04W 56/0045; H04B 7/18513; H04B 17/328;

H04L 1/0025; H04L 1/0028; H04L 1/0026; H04L 1/1671; H04L 1/1874; H04L 1/189; H04L 1/08
See application file for complete search history.

(56) References Cited

U.S. PATENT DOCUMENTS

| | | | |
|---|---|---|---|
| 9,451,639 B2 * | 9/2016 | Li | H04L 5/14 |
| 11,343,857 B2 | 5/2022 | Taherzadeh Boroujeni et al. | |
| 12,256,410 B2 * | 3/2025 | Tsai | H04W 76/30 |
| 2016/0234856 A1 * | 8/2016 | Xu | H04B 17/336 |
| 2019/0028923 A1 * | 1/2019 | Futaki | H04L 1/08 |

(Continued)

FOREIGN PATENT DOCUMENTS

| | | |
|---|---|---|
| EP | 3496499 A1 | 6/2019 |
| WO | 2022006772 A1 | 1/2022 |

(Continued)

OTHER PUBLICATIONS

Dec. 19, 2023—European Search Report—EP App. No. 23189807.3.

(Continued)

*Primary Examiner* — Christopher M Brandt
(74) *Attorney, Agent, or Firm* — Banner & Witcoff, Ltd.

(57) ABSTRACT

Wireless devices may be configured to communicate with one or more base stations. One or more wireless devices may be configured with a plurality of reference signal received power (RSRP) thresholds that correspond to different repetition numbers for random access (RA) message repetitions. One of the RSRP thresholds may be used to determine a repetition number, and RA message repetitions may be transmitted based on the determined repetition number.

20 Claims, 34 Drawing Sheets

(56) References Cited

U.S. PATENT DOCUMENTS

| | | |
|---|---|---|
| 2021/0385879 A1 | 12/2021 | Mahalingam et al. |
| 2022/0007431 A1 | 1/2022 | Qiu et al. |
| 2023/0180223 A1* | 6/2023 | Tseng .................. H04W 56/001 |
| | | 370/329 |
| 2024/0015802 A1* | 1/2024 | Fan .................... H04W 74/0833 |

FOREIGN PATENT DOCUMENTS

| | | |
|---|---|---|
| WO | 2022/082532 A1 | 4/2022 |
| WO | 2022152276 A1 | 7/2022 |
| WO | 2022/186614 A1 | 9/2022 |
| WO | 2023/010584 A1 | 2/2023 |
| WO | 2023028941 A1 | 3/2023 |

OTHER PUBLICATIONS

3GPP TS 38.211 V17.2.0 (Jun. 2022), 3rd Generation Partnership Project; Technical Specification Group Radio Access Network; NR; Physical channels and modulation (Release 17).

3GPP TS 38.212 V17.2.0 (Jun. 2022), 3rd Generation Partnership Project; Technical Specification Group Radio Access Network; NR; Multiplexing and channel coding (Release 17).

3GPP TS 38.213 V17.2.0 (Jun. 2022) 3rd Generation Partnership Project; Technical Specification Group Radio Access Network; NR; Physical layer procedures for control (Release 17).

3GPP TS 38.214 V17.2.0 (Jun. 2022) 3rd Generation Partnership Project; Technical Specification Group Radio Access Network; NR; Physical layer procedures for data (Release 17).

3GPP TS 38.300 V17.0.0 (Mar. 2022), 3rd Generation Partnership Project; Technical Specification Group Radio Access Network;NR; NR and NG-RAN Overall Description;Stage 2 (Release 17).

3GPP TS 38.304 V17.0.0 (Mar. 2022), 3rd Generation Partnership Project; Technical Specification Group Radio Access Network; NR; User Equipment (UE) procedures in Idle mode and RRC Inactive state (Release 17).

3GPP TS 38.305 V17.0.0 (Mar. 2022), 3rd Generation Partnership Project; Technical Specification Group Radio Access Network; NG Radio Access Network (NG-RAN); Stage 2 functional specification of User Equipment (UE) positioning in NG-RAN (Release 17).

3GPP TS 38.321 V17.1.0 (Jun. 2022), 3rd Generation Partnership Project; Technical Specification Group Radio Access Network; NR; Medium Access Control (MAC) protocol specification (Release 17).

3GPP TS 38.331 V17.0.0 (Mar. 2022) 3rd Generation Partnership Project; Technical Specification Group Radio Access Network; NR; Radio Resource Control (RRC) protocol specification (Release 17).

* cited by examiner

Figure 3:
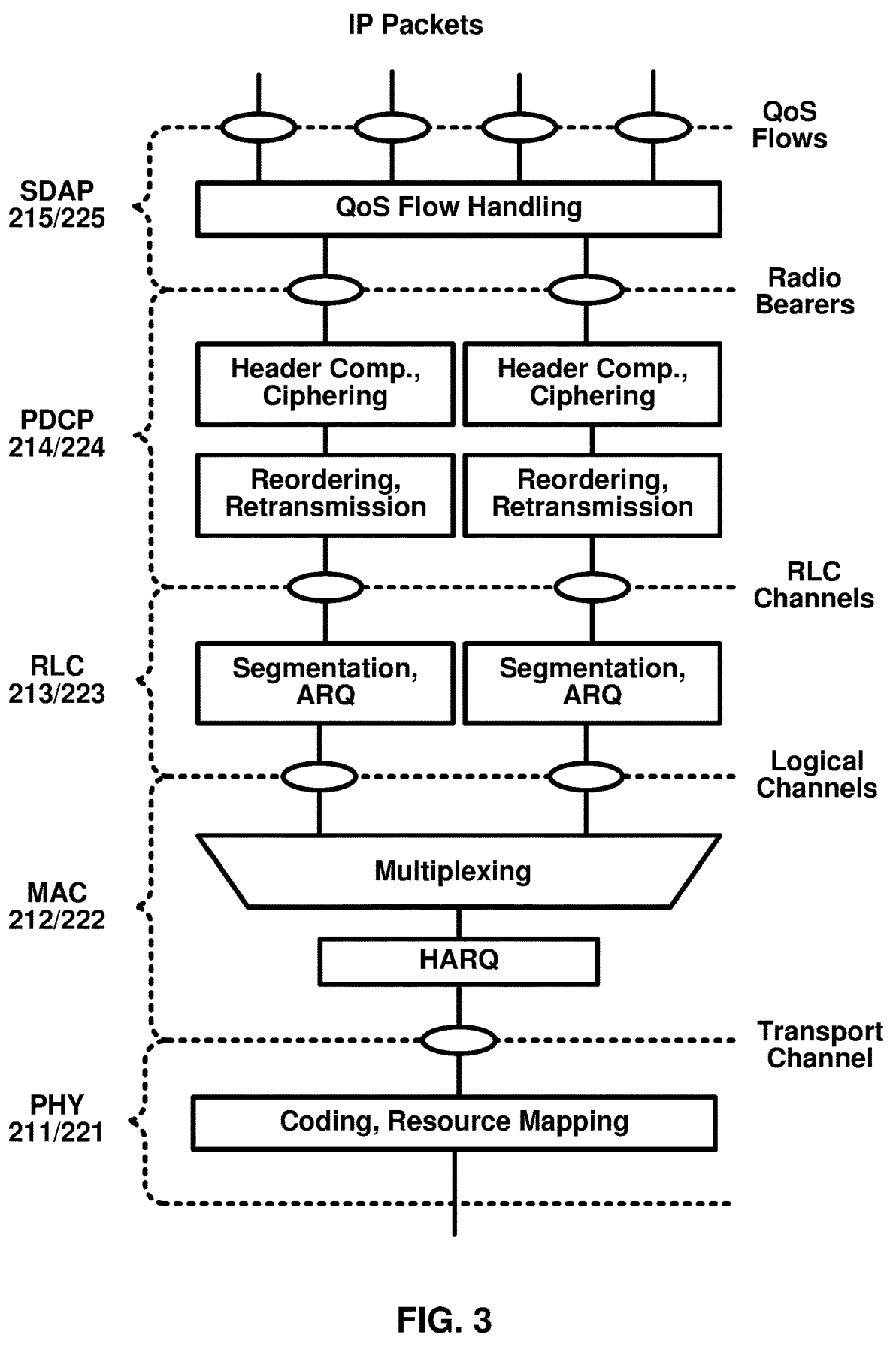

IP Packets

| | |
|---|---|
| SDAP 215/225 | QoS Flow Handling — QoS Flows |
| | Radio Bearers |
| PDCP 214/224 | Header Comp., Ciphering / Header Comp., Ciphering |
| | Reordering, Retransmission / Reordering, Retransmission |
| | RLC Channels |
| RLC 213/223 | Segmentation, ARQ / Segmentation, ARQ |
| | Logical Channels |
| MAC 212/222 | Multiplexing |
| | HARQ |
| | Transport Channel |
| PHY 211/221 | Coding, Resource Mapping |

Uplink

Downlink

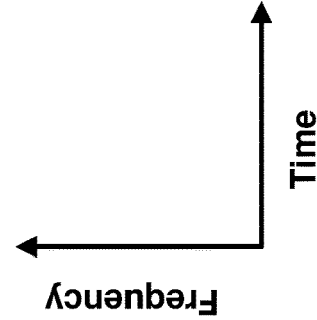
FIG. 8

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

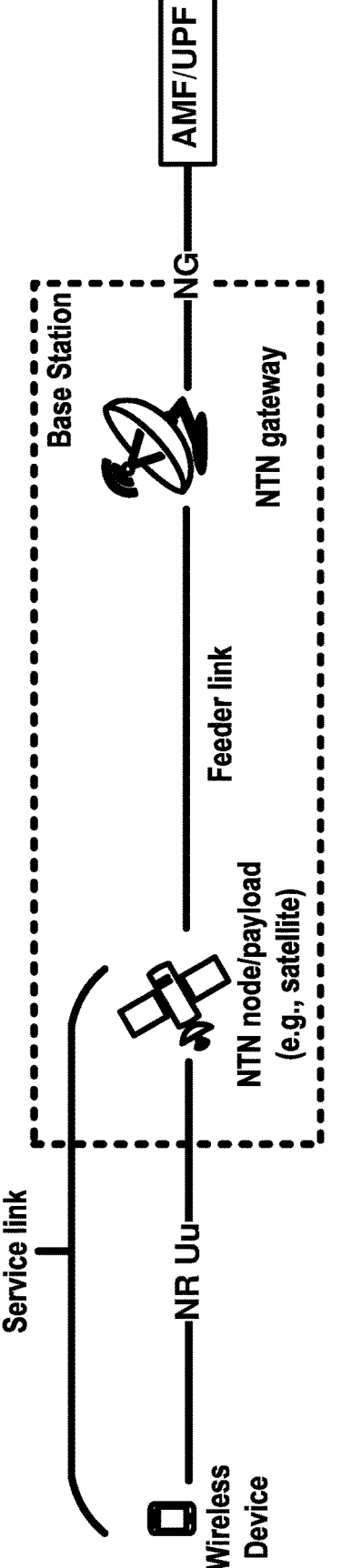

FIG. 18A

Types of NTN platforms/nodes/payloads

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000km | Elliptical around the earth | 200 – 3500 km |

FIG. 18B

| Class of Orbit | Elevation angle (degrees) | | |
|---|---|---|---|
| Altitude (km) | 0 | 10 | 90 |
| LEO satellite | Propagation delay − satellite to UE (ms) | | |
| 800 | 11.0 | 7.9 | 2.7 |
| 1400 | 14.8 | 11.6 | 4.7 |
| MEO satellite | Propagation delay − satellite to UE (ms) | | |
| 8000 | 43.0 | 39.4 | 26.7 |
| GEO satellite | Propagation delay − satellite to UE (ms) | | |
| 35,786 | 138.9 | 135.3 | 119.3 |

RANDOM ACCESS MESSAGE REPETITIONS

CROSS-REFERENCE TO RELATED APPLICATIONS

This application claims the benefit of U.S. Provisional Application No. 63/395,456, filed on Aug. 5, 2022. The above referenced application is hereby incorporated by reference in its entirety.

BACKGROUND

In a wireless communication system, one or more wireless devices communicate with a base station. A message is transmitted multiple times as a repetition to enhance reliability and quality of communication.

SUMMARY

The following summary presents a simplified summary of certain features. The summary is not an extensive overview and is not intended to identify key or critical elements.

One or more wireless devices may communicate with a base station in a non-terrestrial (NTN) network. A message between the one or more wireless devices and the base station may be repeated, for example, to increase a likelihood of a successful reception. Repetition may be used in a random access procedure, for example, for a data transmission (e.g., Message 3 of a 4-step random access procedure). One or more characteristics of a communication link between a wireless device and the base station, such as distance/length, propagation delay, and/or elevation angle, may be used to determine whether to initiate repetition. Secondary considerations such as multiple reference signal received power (RSRP) thresholds may also be considered in the determination of whether to initiate repetition. Different random access resources for sending random access preamble (e.g., in a first step of a random access procedure) may be used, based on a determination of whether to initiate repetition, which may improve coordination/alignment between the base station and a wireless device. For example, first resources may be associated with an indication to initiate repetition, and second resources may be associated an indication not to initiate repetition, such that a receiving device (e.g., base station) may be informed whether a transmitting device (e.g., wireless device) is initiating repetition based on the resources used for a transmission. Use of different resources may additionally or alternatively be used for indicating whether to initiate other communications/procedures, such as a small data transmission (SDT) procedure.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3 shows example of protocol layers.

FIG. 5A shows an example mapping for downlink channels.

FIG. 5B shows an example mapping for uplink channels.

FIG. 7 shows an example configuration of a frame.

FIG. 8 shows an example resource configuration of one or more carriers.

FIG. 17 shows examples of various downlink control information (DCI) formats.

FIG. 18A shows an example of a non-terrestrial network.

FIG. 18B shows an example of different types of NTN platforms.

DETAILED DESCRIPTION

Figures 1A, 1B:
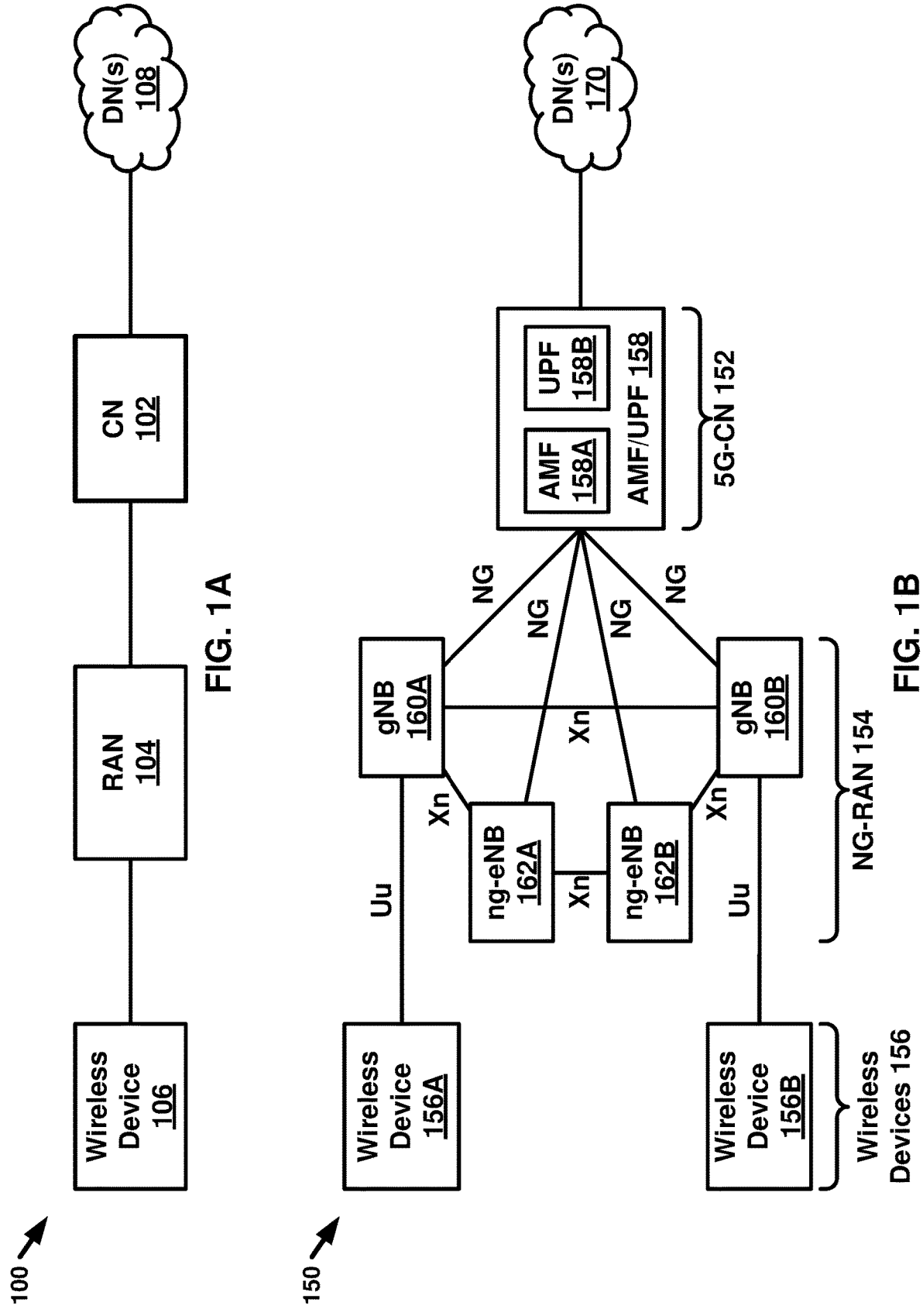
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/ configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG.

1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/ UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
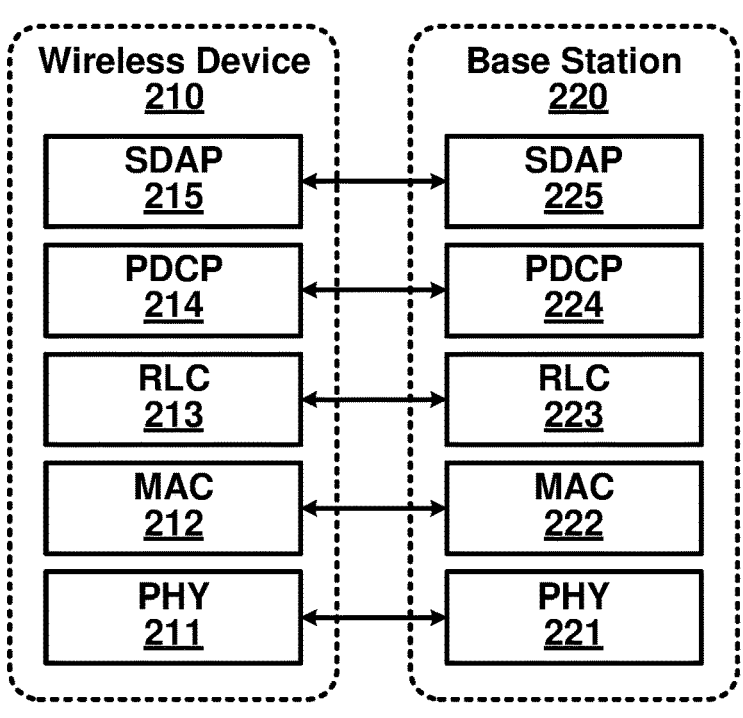
FIG. 2A shows an example user plane.
Figure 2B:
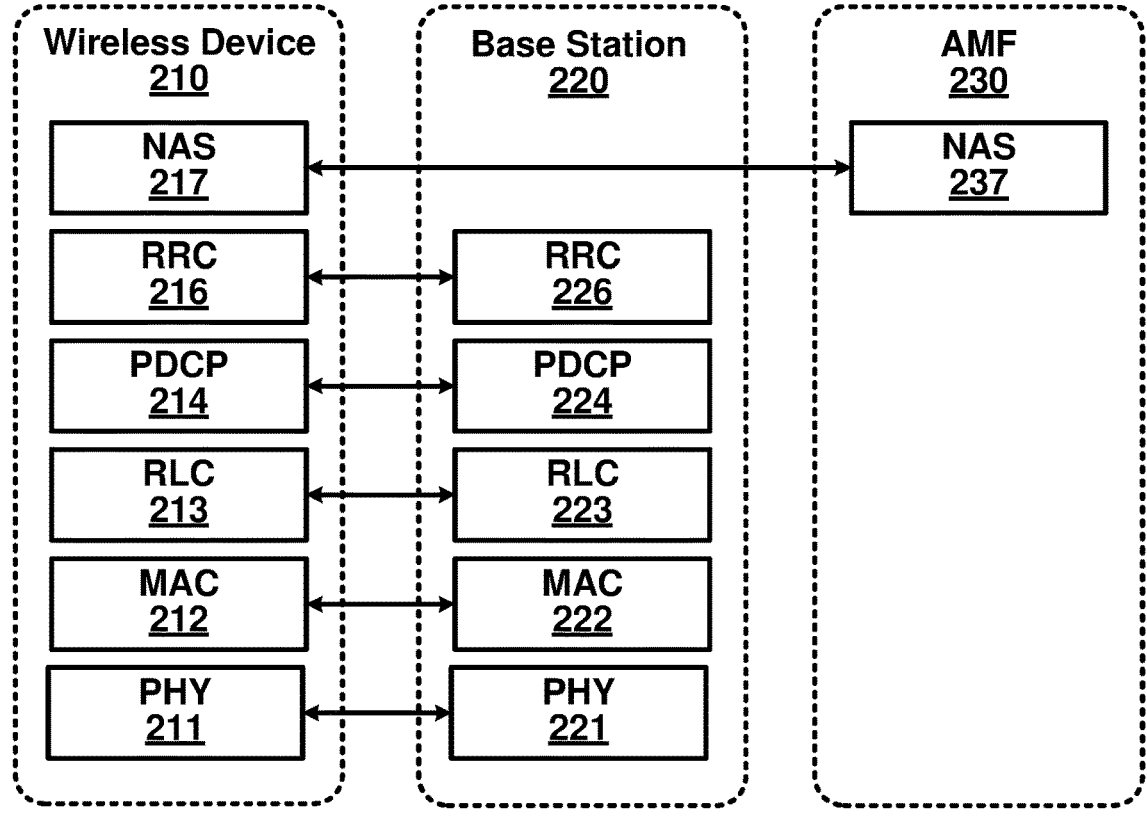
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/ detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/ deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity example/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/ configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TB s) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
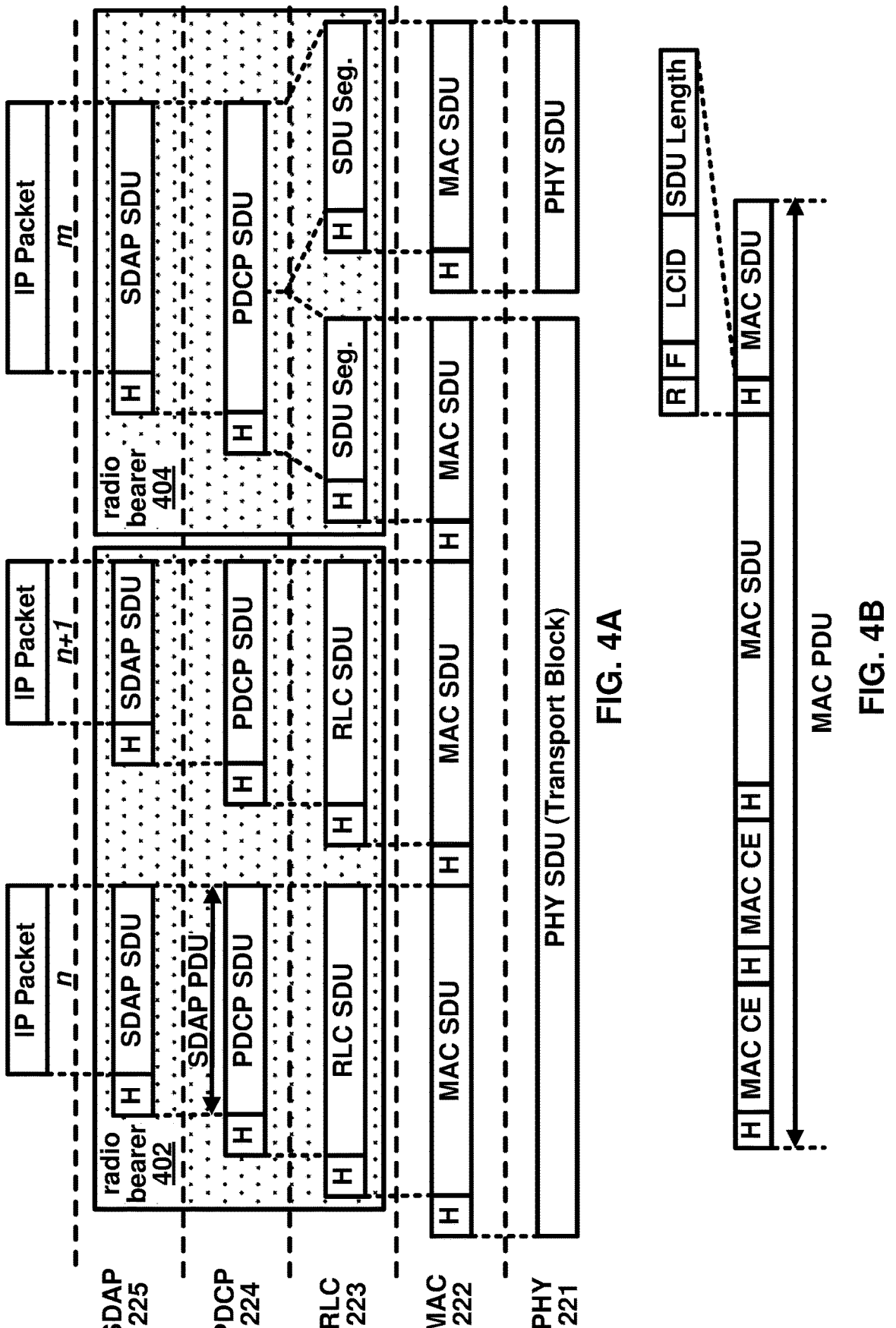
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
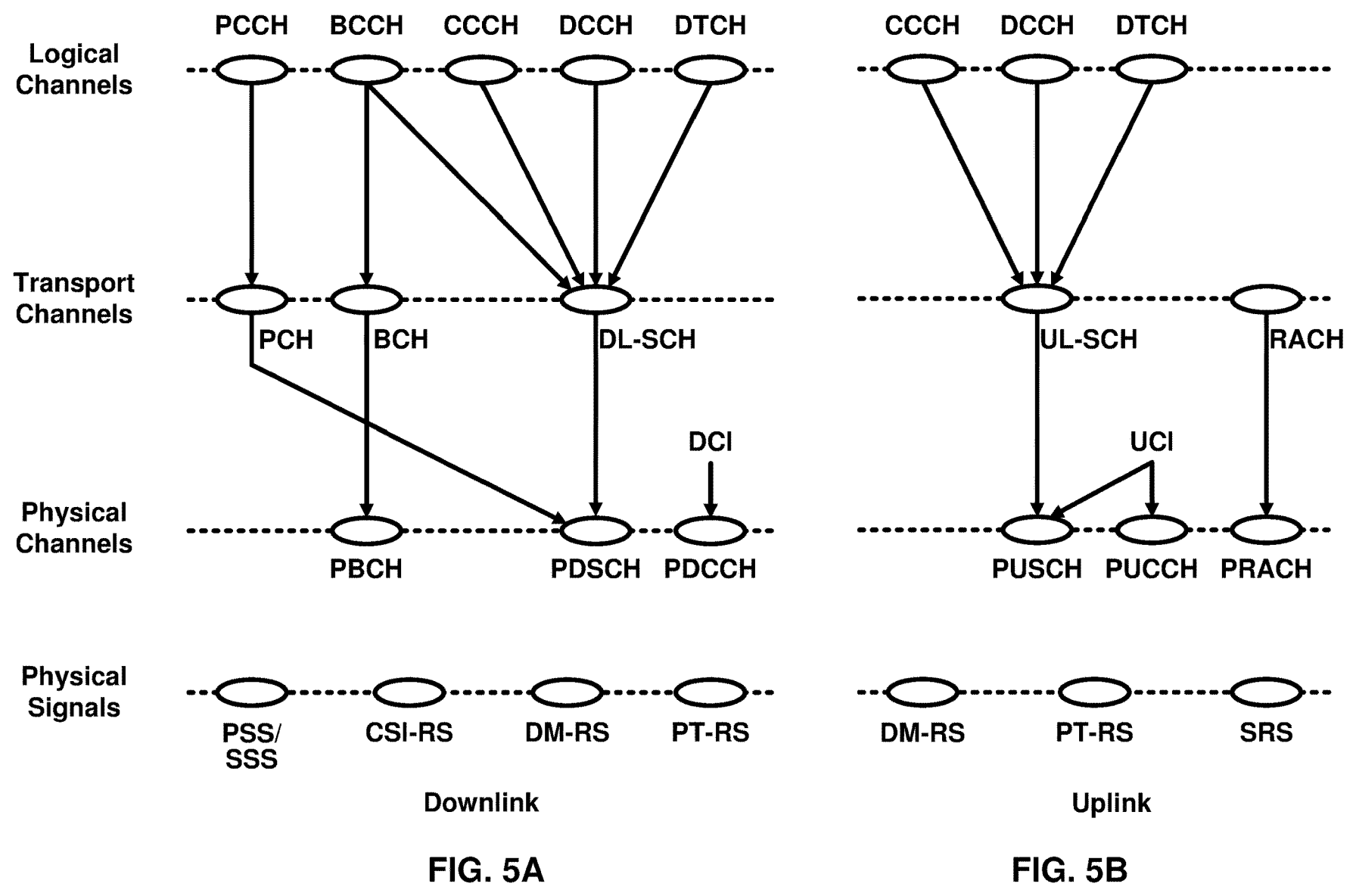

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIB s from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack) Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
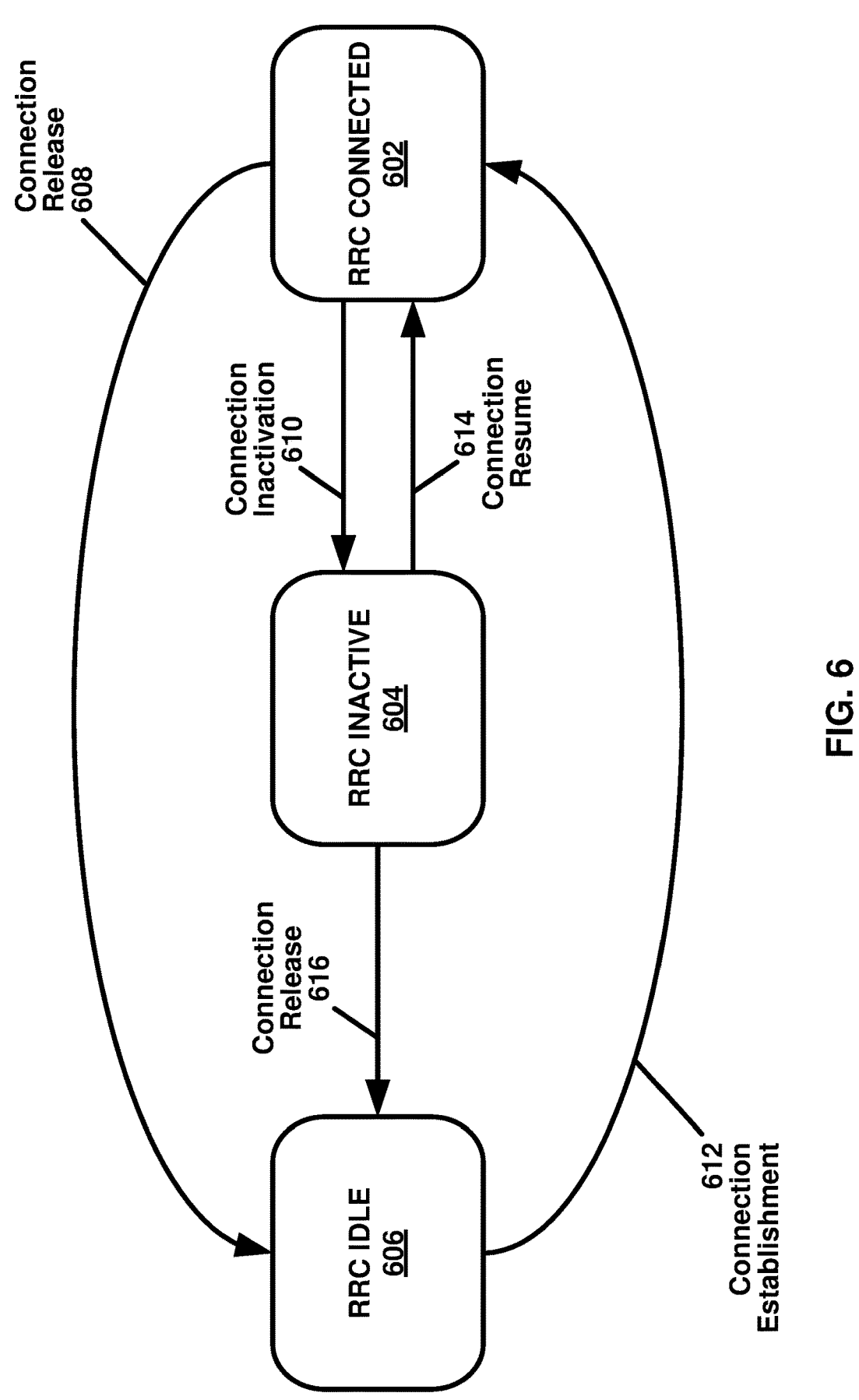
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNB s 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/ allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/ controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/ configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/ provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNB s 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/ output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
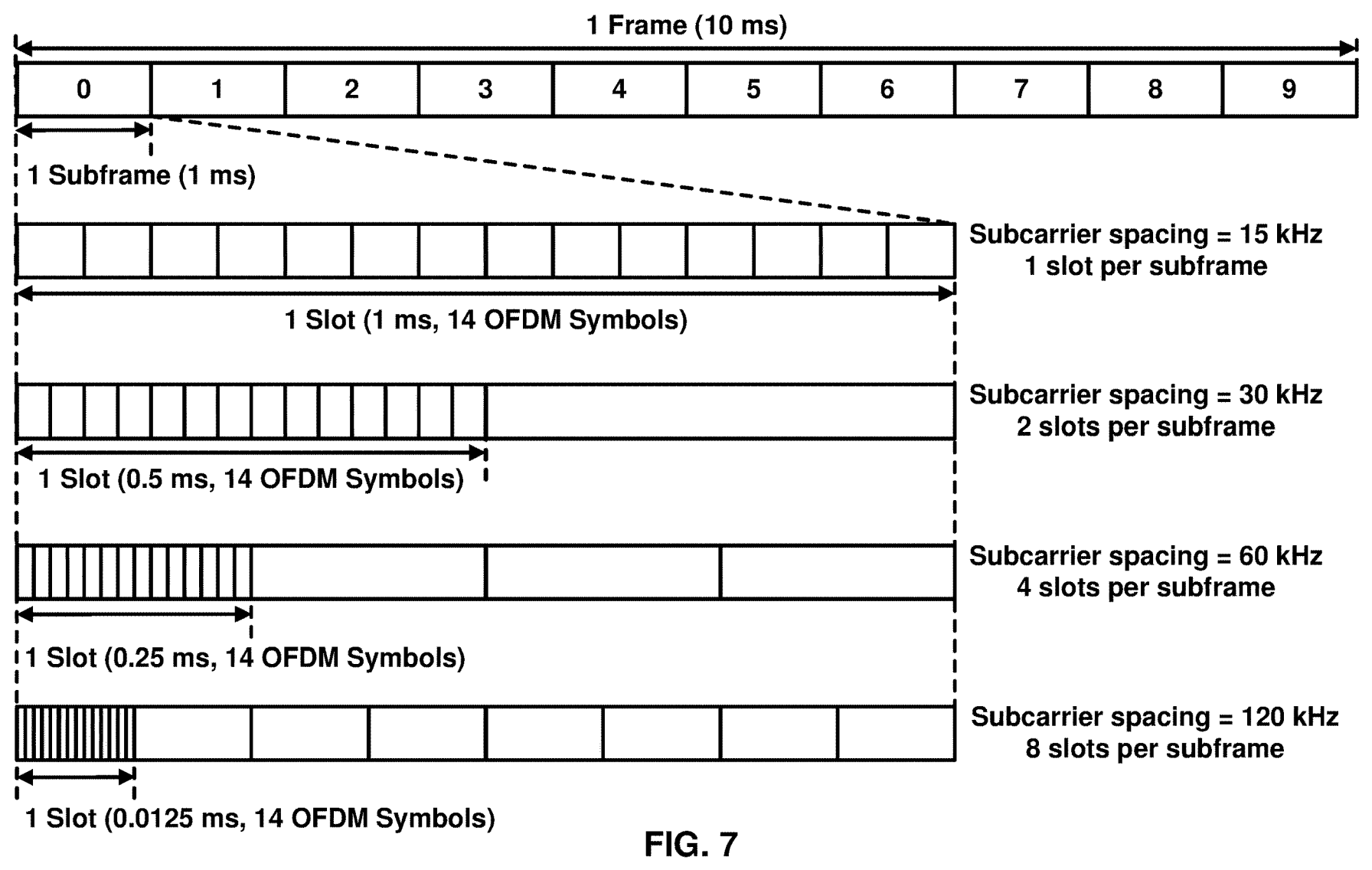

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/ cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275χ12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
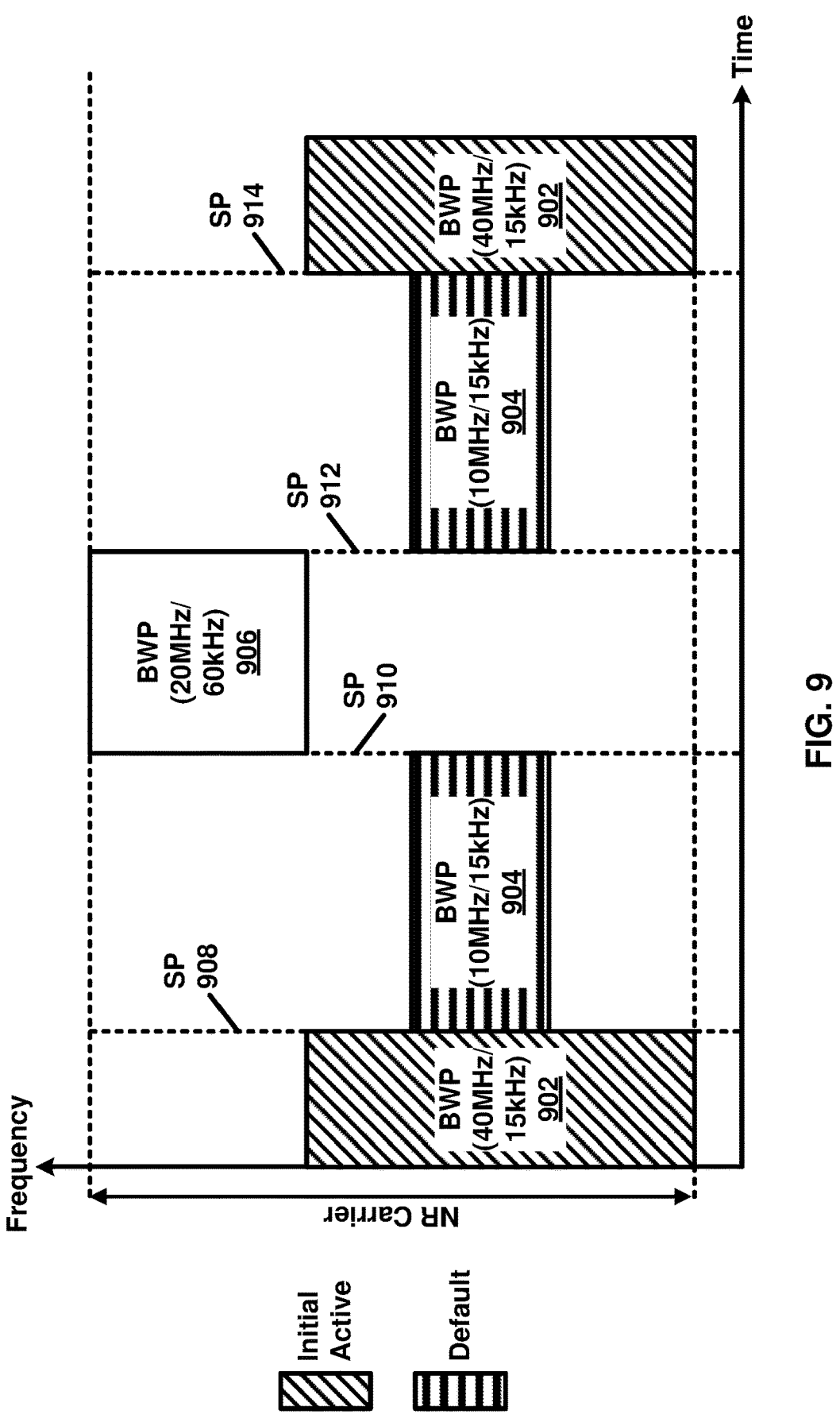
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
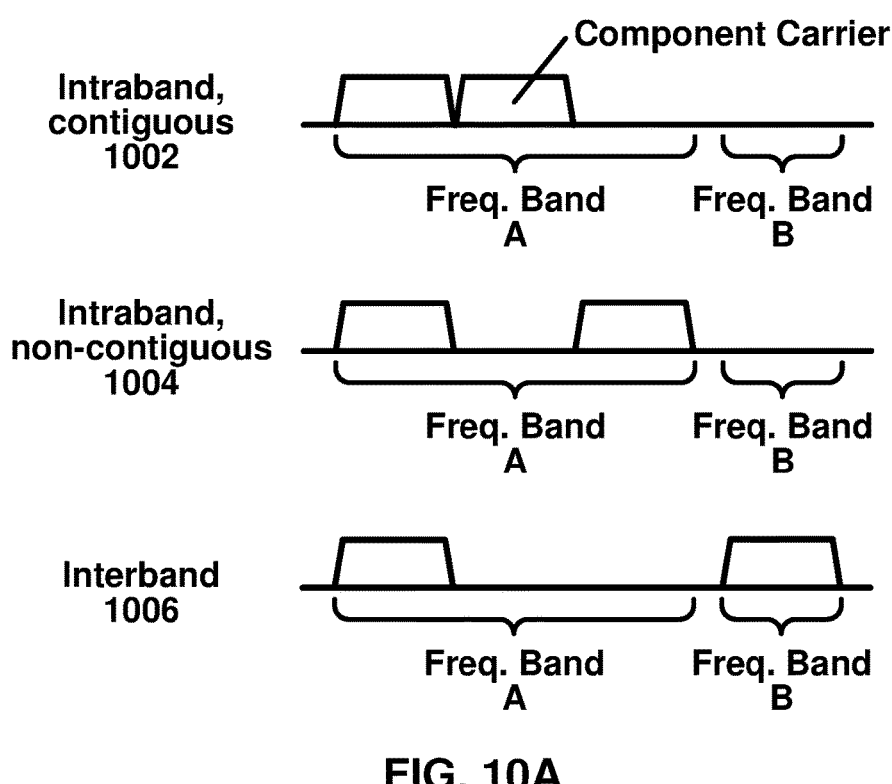
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling.

Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
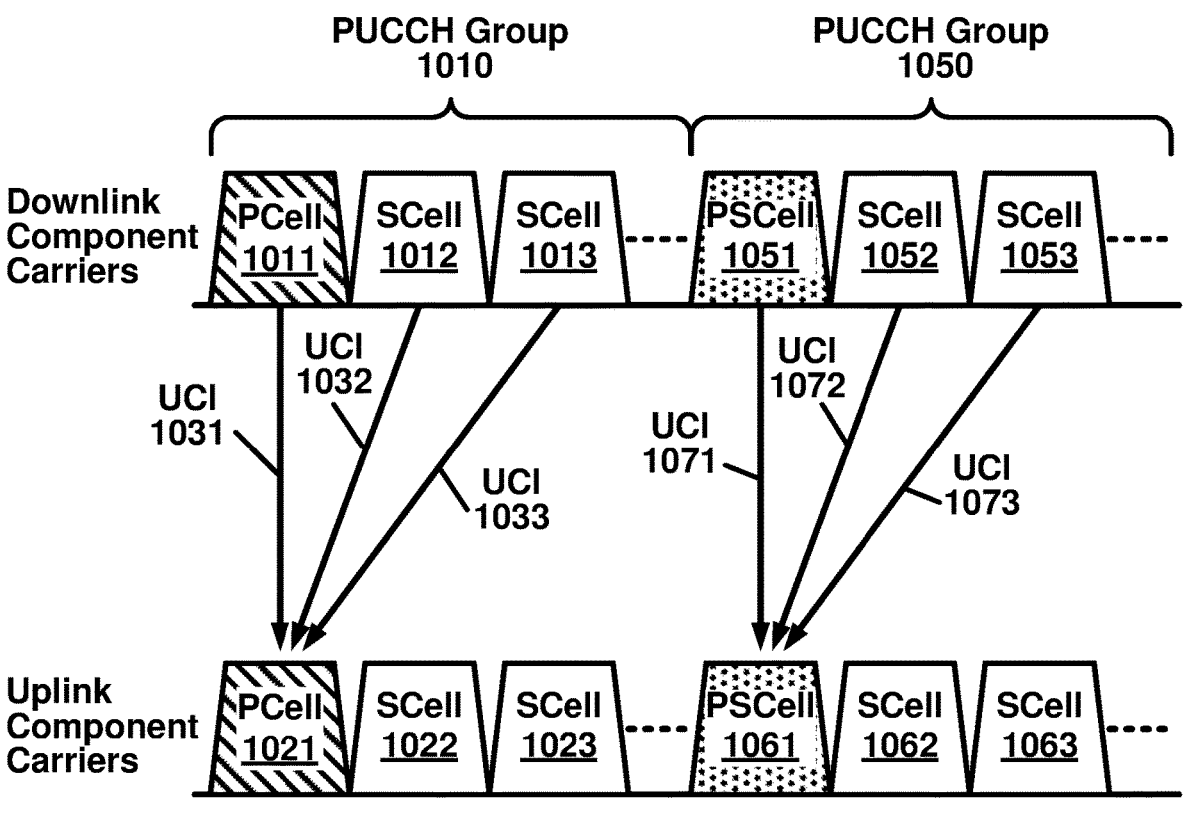
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
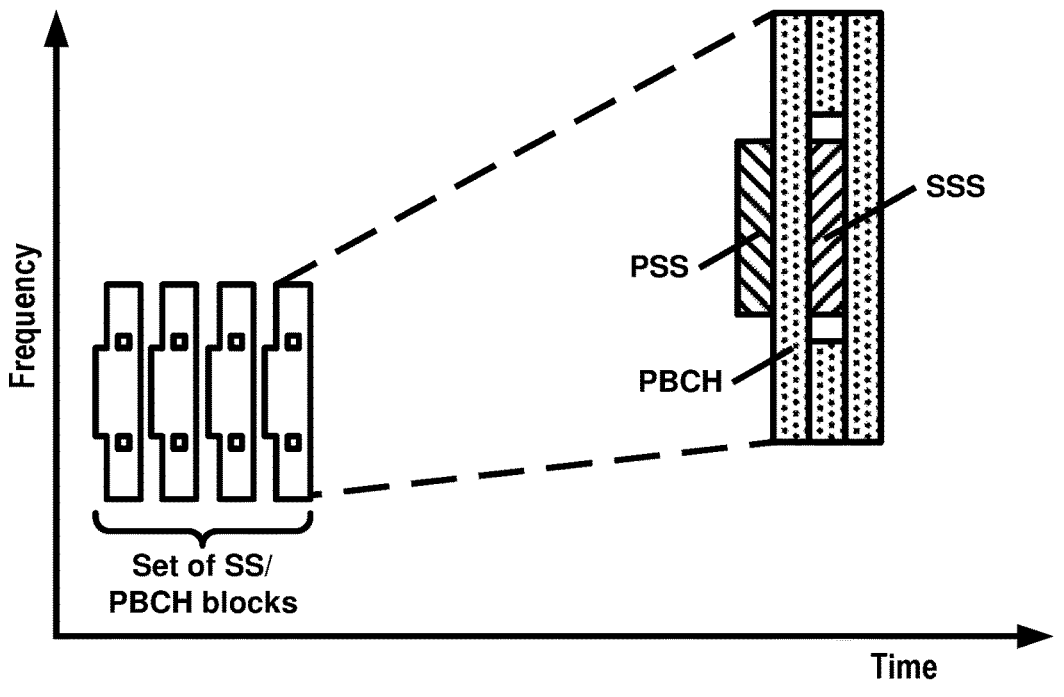
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RS s for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RS s may be sent/transmitted by a base station and received/used by a wireless device for a channel estimation. The downlink DM-RS s may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RS s for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RS s may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RS s (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in an SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
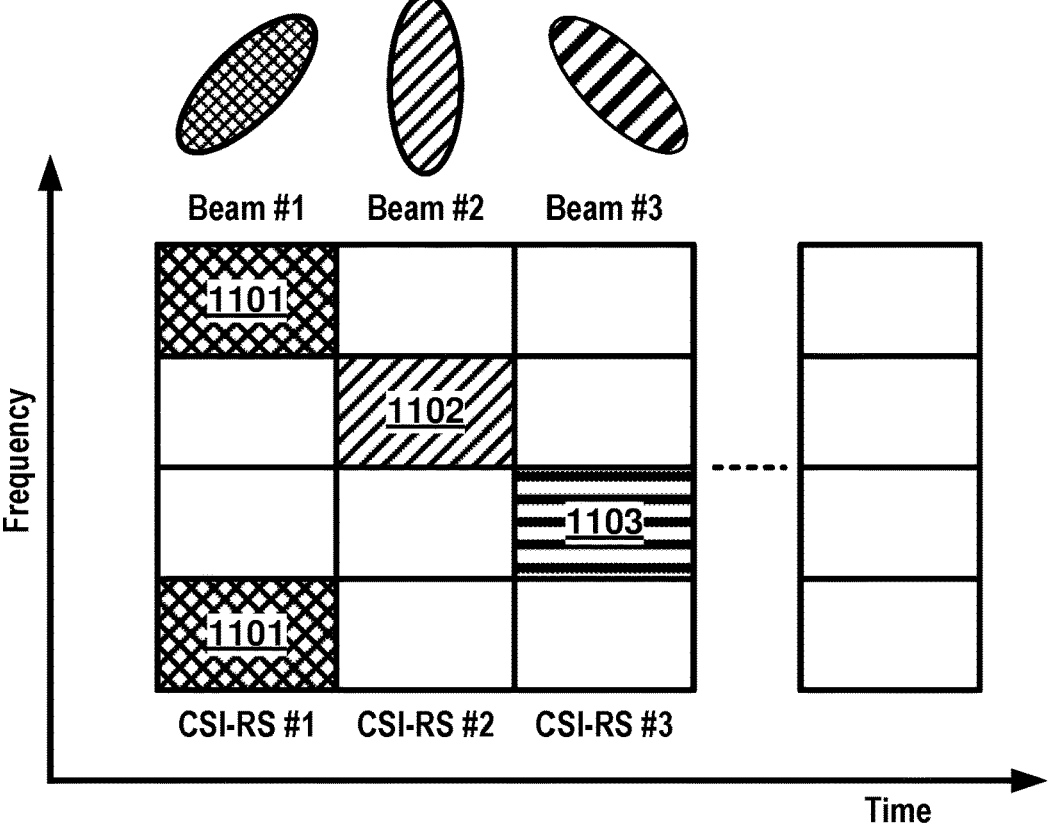
FIG. 11B shows an example mapping of one or more channel state information reference signals (CSI-RSs).

FIG. 11B shows an example mapping of one or more CSI-RSs. The CSI-RS s may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RS s. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi colocation (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RS s 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
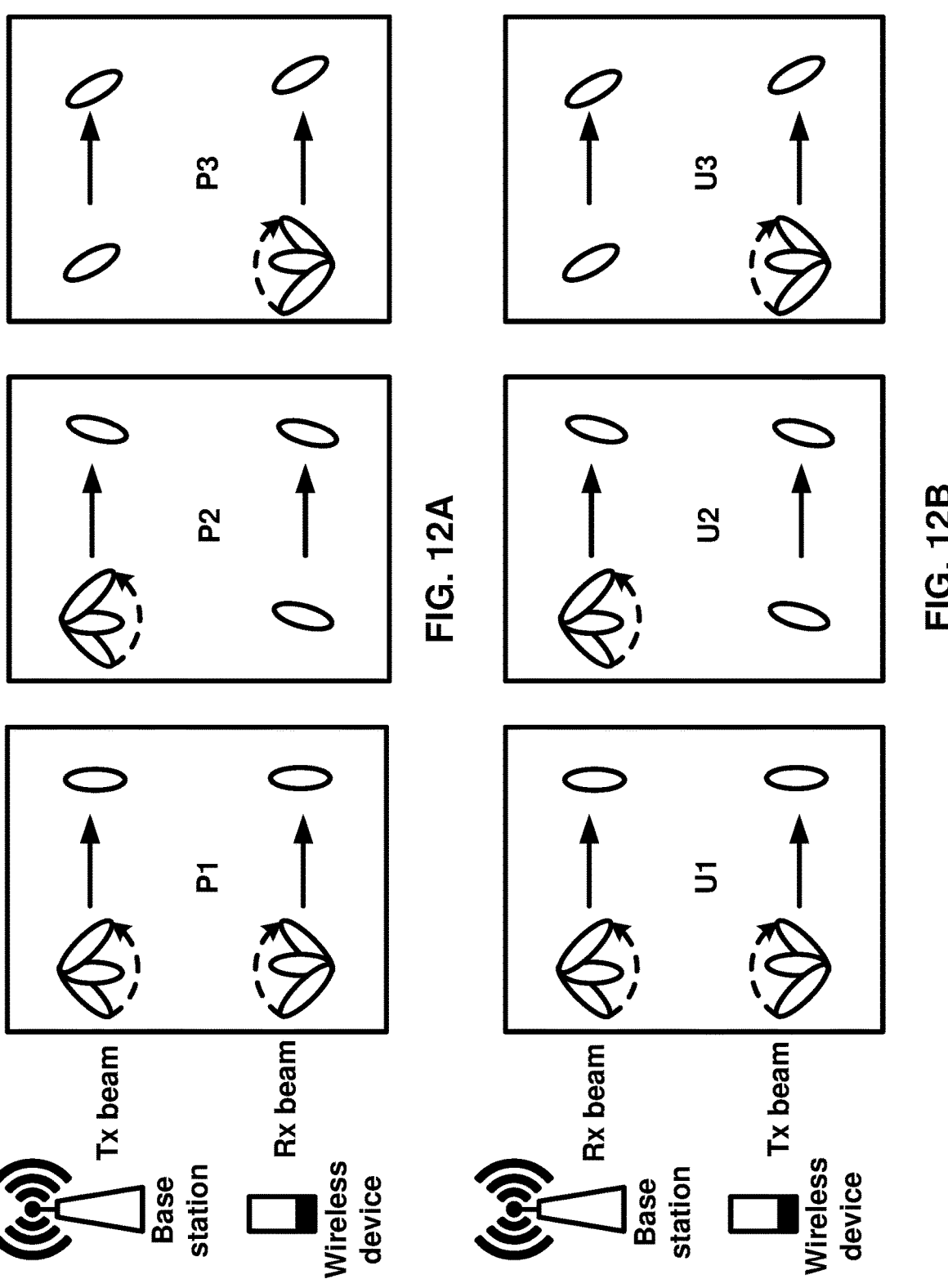
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RS s of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
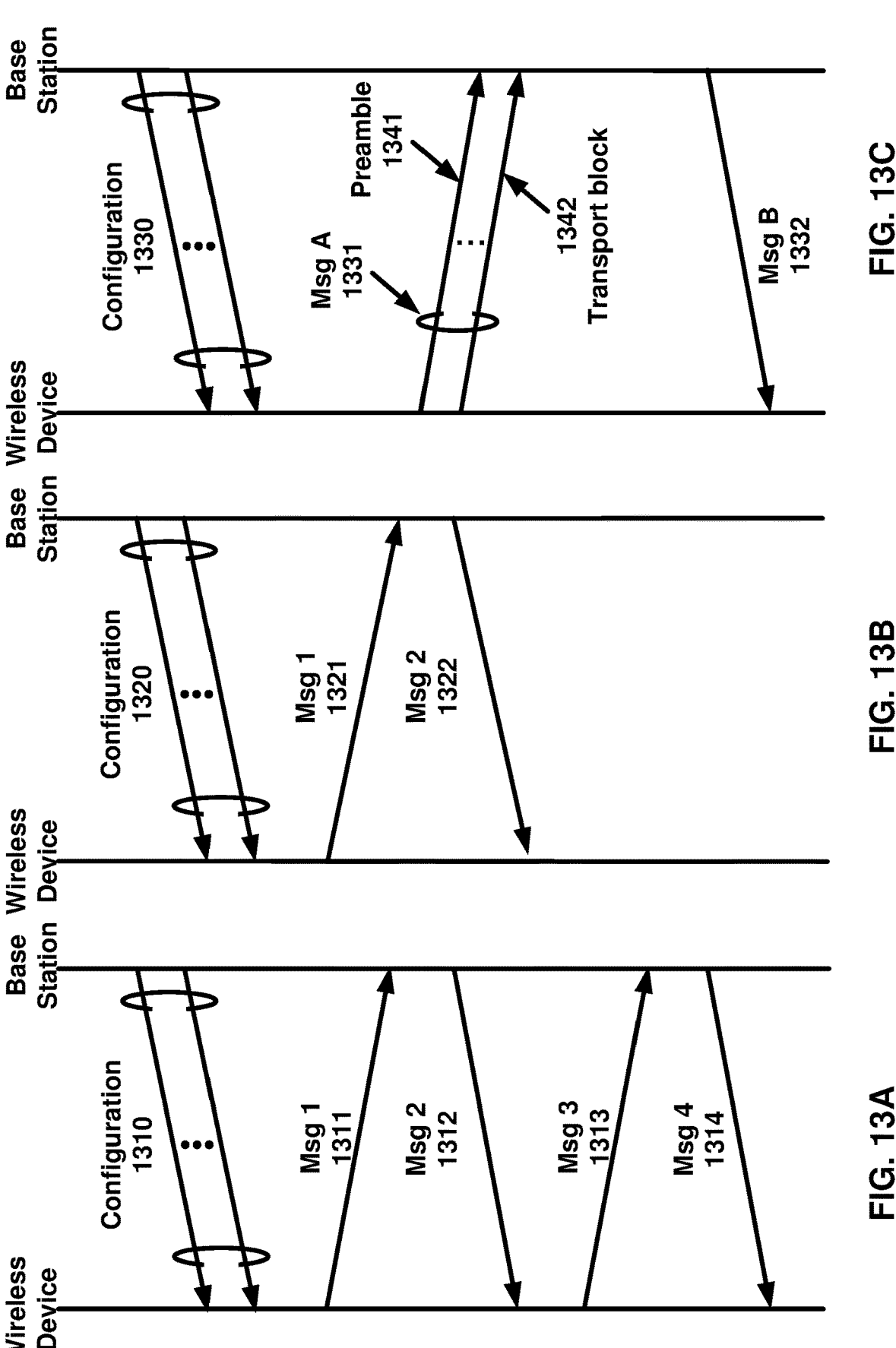
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-ConfigDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RS s) for selection of the preamble and for determining of the PRACH occasion. One or more RACH parameters (e.g., ra-ssb-OccasionMskIndex and/or ra-Occa-sionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/sending (e.g., transmitting) of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/sending (e.g., transmitting) the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-RNTI}=1+s\_id+14 \times t\_id+14 \times 80 \times f\_id+14 \times 80 \times 8 \times$$
$$ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), fid may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/sending (e.g., transmitting) of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending (e.g., transmitting) the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending (e.g., transmitting) a beam failure recovery request (e.g., the window may start any quantity of symbols and/or slots after sending (e.g., transmitting) the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending (e.g., transmitting) first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1331 may be sent/transmitted in an uplink transmission by the wireless device. Msg A 1331 may comprise one or more transmissions of a preamble 1341 and/or one or more transmissions of a transport block 1342. The transport block 1342 may comprise contents that are similar and/or equivalent to the contents of the third message (e.g., Msg 3

1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending (e.g., transmitting) the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
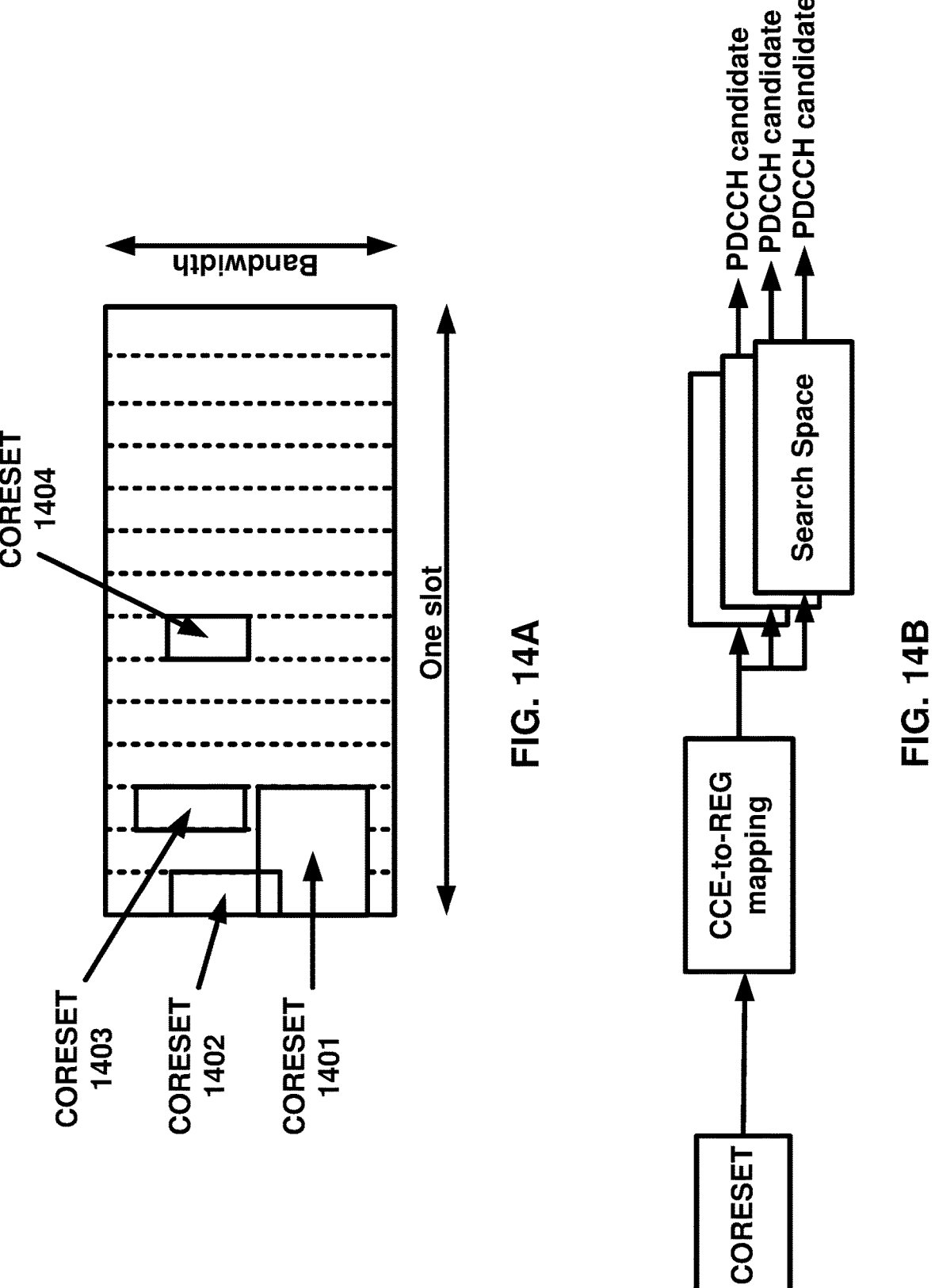
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
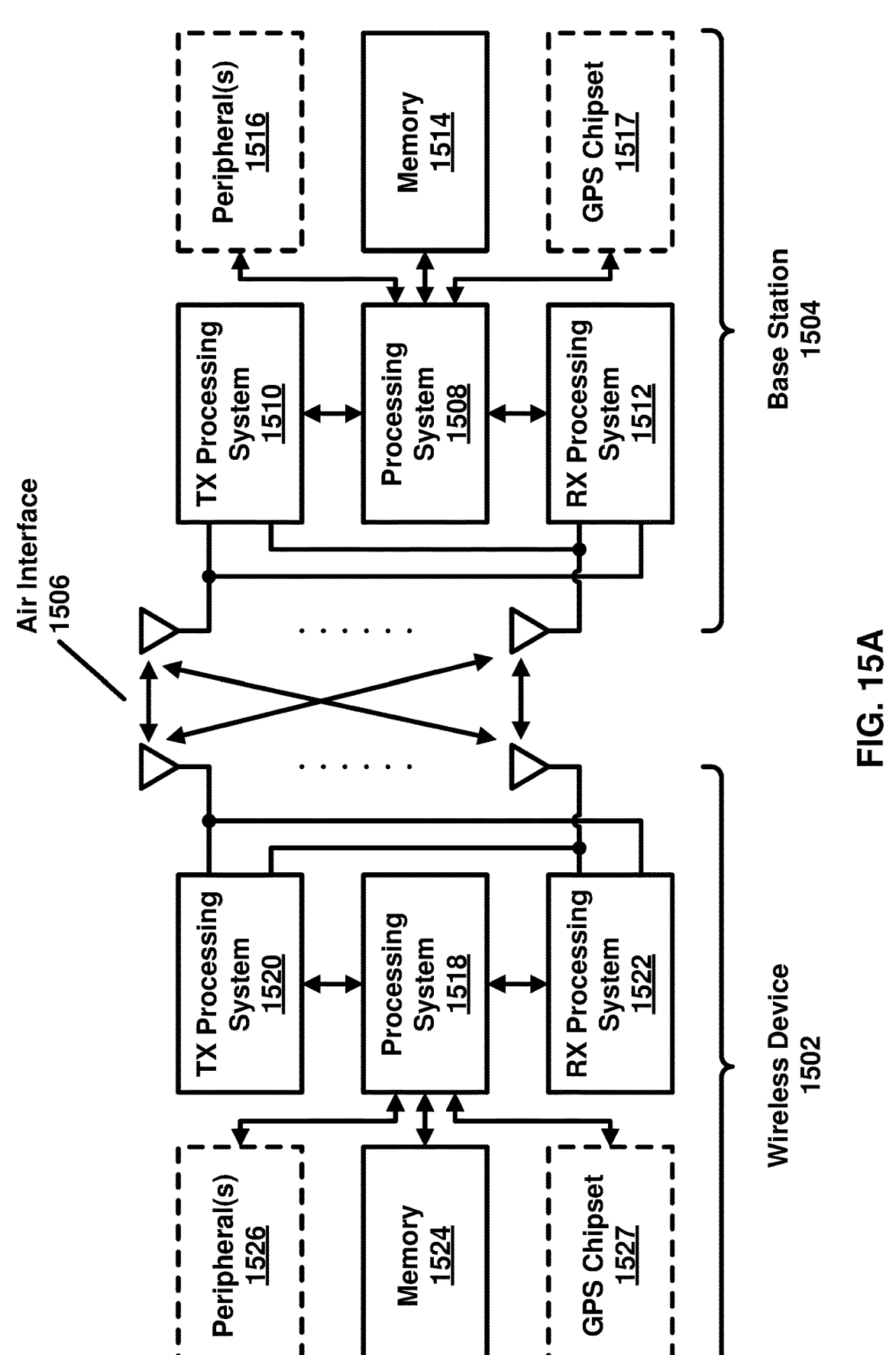
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
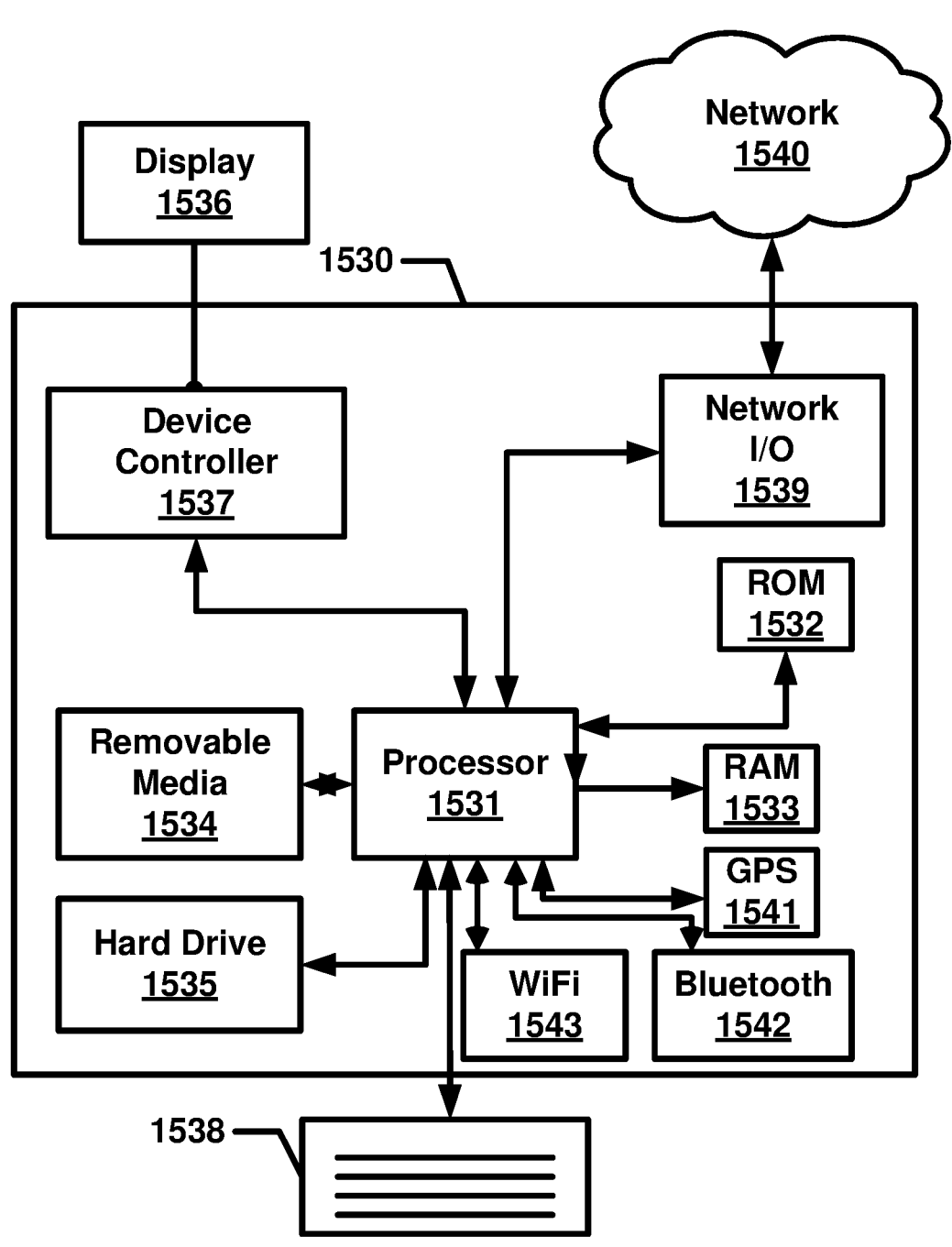
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
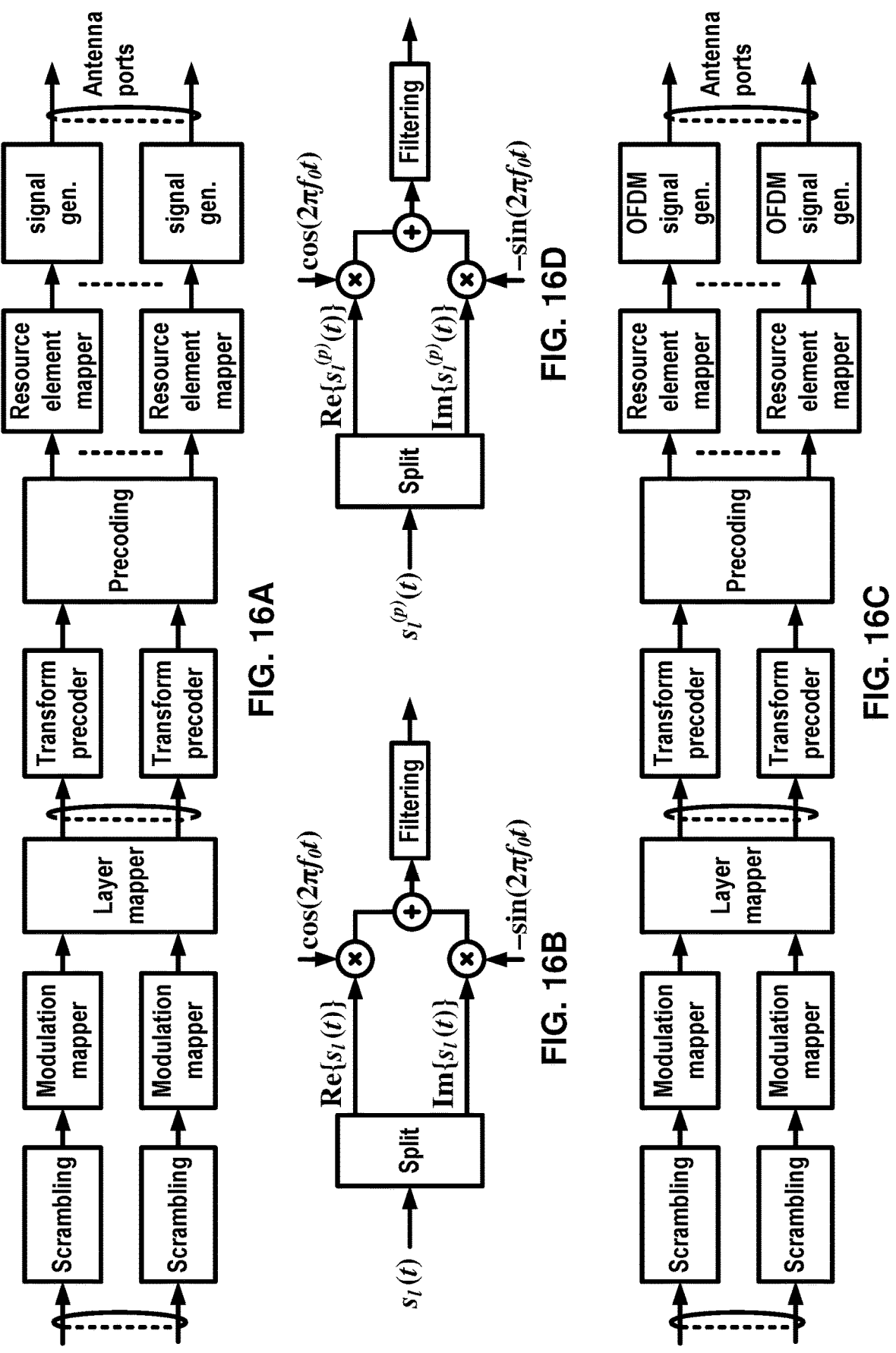
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may transmit one or more MAC PDUs to a wireless device. A MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. The bit order of a parameter field within a MAC PDU is represented with the first and most significant bit in the leftmost bit and the last and least significant bit in the rightmost bit. A MAC SDU may be a bit string that is byte aligned (e.g., aligned to a multiple of eight bits) in length. A MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A MAC entity may ignore a value of reserved bits in a DL MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

When a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L

FIELD

A MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. A MAC CE, such as a MAC CE transmitted by a MAC entity of the base station to a MAC entity of the wireless device, may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a long DRX command MAC CE.

The MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. A MAC CE may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells). When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. The serving cell may be a PCell. In an example, the base station may transmit, to the wireless device, one or more messages (e.g., one or more downlink signals). The one or more messages may comprise one or more RRC messages, for example, one or more RRC configuration/reconfiguration messages. For example, the one or more RRC messages may comprise one or more configuration parameters (e.g., one or more RRC configuration parameters).

The one or more configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate an SCell, for example, based on (e.g., in response to) receiving the SCell Activation/Deactivation MAC CE.

For example, the base station may configure (e.g., via the one or more RRC messages/parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch a DL BWP and an UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP, for example, based on (e.g., in response to) the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or the one DL/UL pair) may improve the wireless device battery consumption. One or more BWPs other than the active UL BWP and the active DL BWP which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: sending (e.g., transmitting) on UL-SCH; sending (e.g., transmitting) on RACH; monitoring a PDCCH; sending (e.g., transmitting) PUCCH; receiving DL-SCH; and/or (re-)initializing any suspended configured uplink grants of configured grant Type 1 according to a stored configuration, if any. On the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

A DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. The PDCCH may not carry the DCI.

A set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-Config Common for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by paging-SearchSpace in PDCCH-Config Common for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured)

PDCCH location(s), possible (or configured) PDCCH format(s) (e.g., number of CCEs, number of PDCCH candidates in CSS set(s), and/or number of PDCCH candidates in the USS(s), and/or possible (or configured) DCI format(s).

The wireless device may receive the C-RNTI (e.g., via one or more previous transmissions) from the base station. For example, the one or more previous transmissions may comprise a Msg2 1312, Msg4 1314, or a MsgB 1332. The wireless device may monitor the one or more PDCCH candidates for DCI format 0_0 and DCI format 1_0 with CRC scrambled by the C-RNTI in the Type1-PDCCH CSS set, for example, if the wireless device is not provided the Type3-PDCCH CSS set or the USS set and if provided the Type1-PDCCH CSS set.

The one or more search space sets may correspond to one or more search parameters. For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows examples of various DCI formats. The various DCI formats may be used, for example, by a base station to send (e.g., transmit) control information (e.g., downlink control information) to, for example, the wireless device. The DCI formats may be used for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH transmission in one cell. DCI format 0_1 may be used to schedule one or multiple PUSCH transmissions in one cell and/or to indicate configured grant-downlink feedback information (CG-DFI) for configured grant PUSCH transmission, etc.

The wireless device may support a baseline processing time/capability. For example, the wireless device may support additional aggressive/faster processing time/capability. The wireless device may report to the base station a processing capability (e.g., per sub-carrier spacing). The wireless device may determine, for example, based on PDSCH processing time, a first uplink symbol of a PUCCH (e.g., determined based on a HARQ-ACK timing $K_1$, one or more PUCCH resources to be used, and/or the effect of the TA) comprising the HARQ-ACK information of the PDSCH (e.g., scheduled by DCI). The first uplink symbol of the PUCCH may start at or later than a time gap (e.g., $T_{proc,1}$) after a last symbol of the PDSCH reception associated with the HARQ-ACK information. The first uplink symbol of the PUCCH which carries the HARQ-ACK information may start at or later than symbol $L_1$ start, where $L_1$ is defined as the next uplink symbol with its Cyclic Prefix (CP) starting after the time gap after the end of the last symbol of the PDSCH.

A PUSCH preparation/processing time may be considered for determining the transmission time of an UL data. The wireless device may perform sending (e.g., transmitting) the PUSCH, for example, if the first uplink symbol in the PUSCH allocation for a transport block (including DM-RS) is no earlier than at symbol L2. The symbol L2 may be determined, by a wireless device, at least based on a slot offset (e.g., K2), SLIV of the PUSCH allocation indicated by time domain resource assignment of a scheduling DCI. The symbol L2 may be specified as the next uplink symbol with its CP starting after a time gap with length $T_{proc,2}$ after the end of the reception of the last symbol of the PDCCH carrying the DCI scheduling the PUSCH.

The one or more configuration parameters may comprise one or more DRX configuration parameters (e.g., DRX-Config). The one or more DRX configuration parameters may configure the wireless device with DRX operation. The one or more DRX configuration parameters may indicate monitoring the PDCCH for the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

The wireless device may use the DRX operation while communicating with the base station in the serving cell, for example, based on the DRX operation being configured. For example, a MAC entity (or the MAC layer) of the wireless device may control the PDCCH monitoring activity of the MAC entity, for example, based on the DRX operation being configured. The wireless device may monitor the PDCCH for at least one RNTI, for example, if the DRX operation is configured. The at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

The one or more DRX configuration parameters may comprise: DRX on duration timer/period/window (e.g., drx-onDurationTimer) indicating a duration at the beginning of a DRX cycle, drx-SlotOffset indicating a delay before starting the DRX on duration timer, DRX inactivity timer/period/window (e.g., drx-InactivityTimer) indicating a duration after a PDCCH occasion in which the PDCCH indicates a new UL or DL transmission for the MAC entity, DRX retransmission timer of DL (e.g., drx-RetransmissionTimerDL), per DL HARQ process except for the broadcast process, indicating a maximum duration until a DL retransmission is received, DRX retransmission timer of UL (e.g., drx-RetransmissionTimerUL), per UL HARQ process, indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycleTimer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before an UL HARQ retransmission grant is expected by the MAC entity.

The Serving Cells (e.g., the serving cell) of a MAC entity may be configured the one or more DRX configuration parameters in two DRX groups with separate DRX parameters. There may be only one DRX group (e.g., a DRX group) and the Serving Cells (e.g., the serving cell) may belong to the DRX group, for example, if a secondary DRX group is not configured. Each Serving Cell (e.g., the serving cell) is uniquely assigned (or belong) to either of the DRX group or the second DRX group, for example, if the two DRX groups are configured (e.g., the DRX group and a second DRX group). The DRX configuration parameters that are separately configured for each DRX group are: the DRX on duration timer (e.g., the drx-onDurationTimer) and/or the DRX inactivity timer (e.g., the drx-InactivityTimer). The one or more DRX configuration parameters that are common to the two DRX groups are: drx-SlotOffset, drx-Retransmission TimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

The wireless device may be in an on duration of the DRX operation (e.g., a DRX on duration) or an off duration of the DRX operation (e.g., a DRX off duration), for example, if the DRX operation is configured. For example, the DRX on duration may start based on starting the DRX on duration timer/period. The wireless device may be in the DRX off duration, for example, if the wireless device is not in the DRX on duration. For example, the DRX off duration may stop based on starting the DRX on duration timer. For example, the wireless device may switch/transit from the DRX on duration to the DRX off duration based on stopping the DRX on duration timer. For example, the wireless device may switch/transit from the DRX off duration to the DRX on duration based on starting the DRX on duration.

The wireless device may determine whether the wireless device is in an active time (or a DRX active state or Active Time) for the serving cell (or the Serving Cells) in the DRX group, for example, if the DRX operation is configured. For example, the wireless device may determine that the active time for the serving cell in the DRX group comprises the DRX on duration.

The wireless device may determine that the active time for the serving cell in the DRX group comprises the time while: the DRX on duration timer (e.g., drx-onDurationTimer) or the DRX inactivity timer (e.g., drx-InactivityTimer) configured for the DRX group is running, or the DRX retransmission timer of DL (e.g., drx-Ret ransmissionTimerDL) or the DRX retransmission timer of the UL (e.g., drx-RetransmissionTimerUL) is running on any of the Serving Cells (e.g., the serving cell) in the DRX group, or a contention resolution timer (e.g., ra-ContentionResolutionTimer) or a message B (MsgB) response window (e.g., msgB-Response Window) is running, or a scheduling request (SR) is sent/transmitted on PUCCH and is pending, or a PDCCH indicating a new transmission addressed to the C-RNTI not being received after successful reception of a random access response (RAR) for a Random Access Preamble (or a preamble 1311/1321/1341) that is not selected by the MAC entity among the contention-based Random Access Preamble(s).

The wireless device may be in a DRX inactive state (or a DRX non-active time or a DRX non-active state), for example, if the wireless device is outside the active time for the serving cell in the DRX group. The wireless device may be in a DRX active state, for example, if the wireless device is in the active time for the serving cell in the DRX group.

The wireless device may evaluate one or more DRX active time conditions (or one or more DRX Active Time conditions) to determine whether the wireless device is in the active time (for the serving cell in the DRX group) or not. The wireless device may, for example, based on evaluating the one or more DRX active time conditions, determine that the wireless device is in active time based on the one or more DRX active time conditions being satisfied.

The one or more DRX active time conditions may be satisfied based on the DRX on duration timer (e.g., drx-onDurationTimer) configured for the DRX group is running, or the DRX inactivity timer (e.g., drx-InactivityTimer) configured for the DRX group is running, or the DRX retransmission timer for DL (e.g., drx-RetransmissionTimerDL), on any of the Serving Cells (including the serving cell) in the DRX group, is running, or the DRX retransmission timer for UL (e.g., drx-RetransmissionTimerUL), on any of the Serving Cells (including the serving cell) in the DRX group, is running, or the contention resolution timer (e.g., ra-ContentionResolutionTimer) is running, or the MsgB response window (e.g., msgB-Response Window) is running, or the PDCCH indicating the new transmission addressed to the C-RNTI (after successful reception of RAR for preamble that is not selected by the MAC entity among the contention-based preamble(s)) has been received, or the SR is sent/transmitted on PUCCH and is pending.

FIG. 18A shows an example of a non-terrestrial network. The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to embark a transmission equipment relay node (e.g., radio remote unit or a transparent payload) or a base station (or a regenerative payload). A terrestrial network is a network located on the surface of the earth. An NTN may be a network which uses an NTN node (e.g., a satellite) as an access network, a backhaul interface network, or both. An NTN may comprise one or more NTN nodes (or payloads and/or space-borne vehicles), each of which may provide connectivity functions, between the service link and the feeder link.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. As shown in FIG. 18A, the base station (e.g., a gNB) may further comprise the transparent NTN node, the feeder link, and/or a gateway (e.g., an NTN gateway). The gateway may be an earth station that is located at the surface of the earth, providing connectivity to the NTN payload using a feeder link. The NTN node with the regenerative payload (e.g., the base station of the NTN or the NTN base station) may comprise functionalities of a base station, for example, the on-board processing used to demodulate and decode the received signal and/or regenerate the signal before sending/transmitting it back to the earth. As shown in FIG. 18A, the base station (e.g., the gNB) may further comprise the regenerative NTN node, the feeder link, and/or the gateway (e.g., the NTN gateway).

The NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), for example, an airborne vehicle embarking the NTN payload placed at an altitude between 8 and 50 km, or a pseudo satellite station. FIG. 18B is an example figure of different types of NTN platforms. A satellite may be placed into a low-earth orbit (LEO) at an altitude between 250 km to 1500 km, with orbital periods ranging from 90-130 minutes. From the perspective of a given point on the surface of the earth, the position of the LEO satellite may change. A satellite may be placed into a medium-earth orbit (MEO) at an altitude between 5000 to 20000 km, with orbital periods ranging from 2 hours to 14 hours. A satellite may be placed into a geostationary satellite earth orbit (GEO) at 35,786 km altitude, and directly above the equator. From the perspective of a given point on the surface of the earth, the position of the GEO satellite may not change.

Figures 19A, 19B:
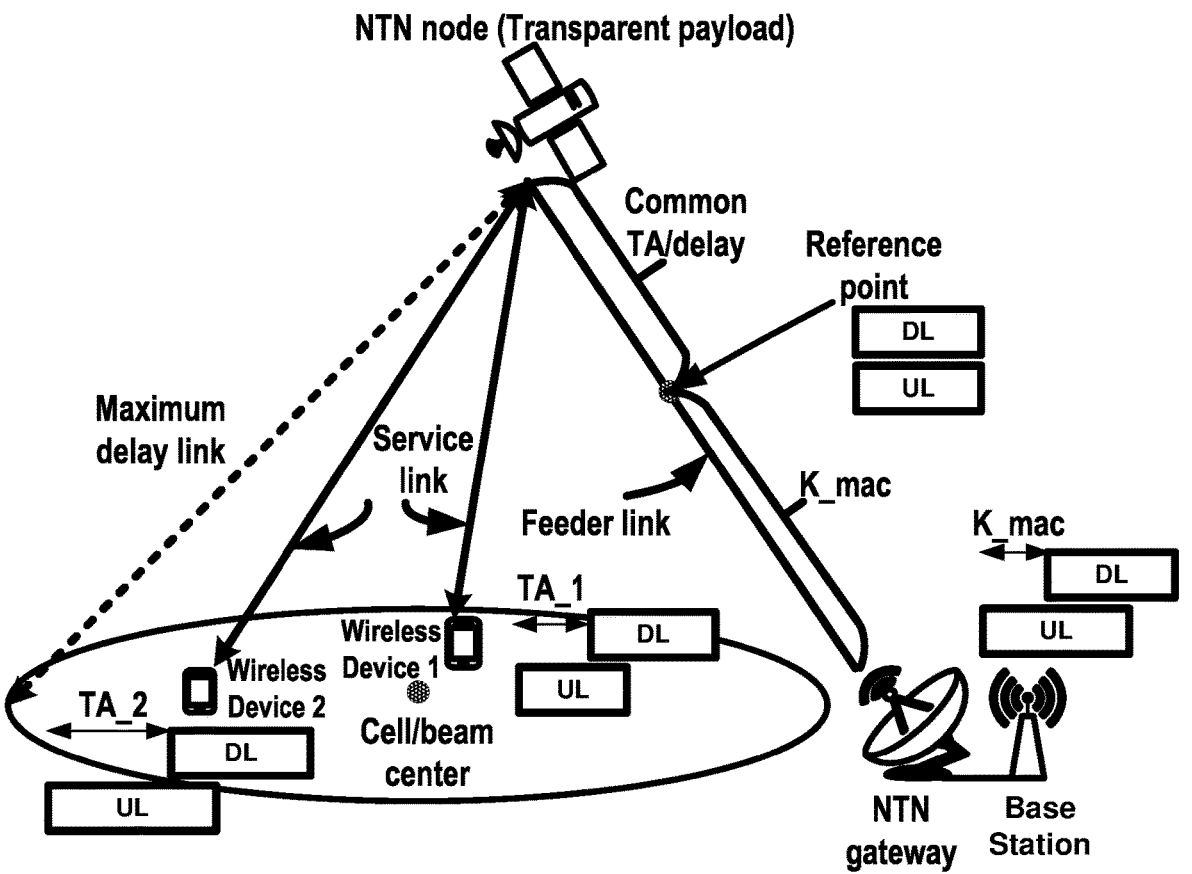
FIG. 19A shows an example of an NTN with a transparent NTN platform.
FIG. 19B shows examples of propagation delay corresponding to NTNs of different altitudes.

FIG. 19A shows an example of an NTN with a transparent NTN platform. As shown in FIG. 19A, the NTN node (e.g., the satellite) may forward a received signal from the NTN gateway on the ground back to the earth over the feeder link. The gateway and the base station may not be collocated. The NTN node may forward a received signal to the wireless device or the base station from another NTN node, for example, over inter-link satellite communication links.

The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). As shown in FIG. 18B, the size of a spotbeam may range from tens of kilometers to a few thousand kilometers. For example, the size of the spotbeam may depend on the system design.

A propagation delay may be an amount of time it takes for the head of the signal to travel from a sender (e.g., the base station or the NTN node) to a receiver (e.g., the wireless device) or vice versa. For uplink, the sender may be the wireless device and the receiver may be the base station/ access network. For downlink, the sender may be the base station/access network and the receiver may be the wireless device. The propagation delay may vary depending on a change in distance between the sender and the receiver, for example, due to movement of the NTN node, movement of the wireless device, a change of an inter-satellite link, and/or feeder link switching.

FIG. 19B shows examples of propagation delay corresponding to NTNs of different altitudes. The propagation delay in the figure may be one-way latency/delay. One-way latency/delay may be an amount of time used to propagate through a telecommunication system from the sender (e.g., the base station) to the receiver (e.g., the wireless device). In an example shown in FIG. 19B, for the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. From FIG. 19B, in case of a GEO satellite with the transparent payload, the RTD may be four times of 138.9 milliseconds (approximately 556 milliseconds). The RTD of a terrestrial network (e.g., NR, E-UTRA, LTE) may be negligible compared to the RTD of an NTN example (e.g., the RTD of a terrestrial network may be less than 1 millisecond). A maximum RTD of a LEO satellite with the transparent payload and altitude of 600 km is approximately 25.77 milliseconds and with altitude of 1200 km is approximately 41.77 milliseconds.

A differential delay within a beam/cell of a NTN node may depend on, for example, the maximum diameter of the beam/cell footprint at nadir. For example, the differential delay within the beam/cell may depend on the maximum delay link in FIG. 19A. The differential delay may imply the maximum difference between communication latency that two wireless devices, for example, a first wireless device (UE1) that is located close to the center of the cell/beam and a second wireless device (UE2) that is located close to the edge of the cell/beam in FIG. 19B, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. The differential delay may imply a difference between the maximum delay of the cell/beam and a minimum delay of the cell/beam. The service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

The wireless device (e.g., the first wireless device and/or the second wireless device in FIG. 19B) may receive the one or more configuration parameters, for example, the one or more RRC configuration parameters from the base station. For example, the one or more configuration parameters may comprise one or more NTN configuration parameters. The wireless device may indicate a capability for NR NTN access (e.g., nonTerrestrialNetwork-r17), for example, to receive the one or more NTN configuration parameters (e.g., via one or more NTN-specific SIBs). For example, the one or more NTN configuration parameters may be received, by the wireless device, from a broadcast system information (e.g., SIB1 and/or the one or more NTN-specific SIBs). The one or more NTN configuration parameters may facilitate/ manage the calculation/determination/measurement of the propagation delay (e.g., the UE-gNB RTT) and/or a timing advance (TA) at one or more wireless devices (e.g., the wireless device) camping in the cell/beam. The one or more NTN configuration parameters may comprise at least one or more ephemeris parameters (e.g., satellite ephemeris parameters or NTN ephemeris parameters), one or more common delay/TA parameters, a validity duration/timer/window (e.g., ntn-UlSyncValiclityDuration) for UL synchronization, an epoch time, and/or one or more timing offset parameters. For example, the one or more NTN configuration parameters may enable a TA reporting.

The wireless device may maintain/calculate a cell-specific timing offset, one or more beam-specific timing offsets, and/or a UE-specific timing offset (e.g., UE-specific K_Offset) based on the one or more timing offset parameters and/or one or more MAC CE commands and/or one or more RRC signaling. For example, the one or more timing offset parameters may comprise a first timing offset (e.g., Koffset in ServingCellConfigCommon). The first timing offset may account for the maximum RTD of the cell/beam. For example, the wireless device may track/update/maintain the cell/beam-specific timing offset based on receiving an update of the first timing offset from the base station. For example, the wireless device may receive a second timing offset (e.g., a Differential UE-Specific K_Offset MAC CE).

The wireless device may update/track/maintain the UE-specific timing offset based on the second timing offset and/or the cell-specific timing offset.

The one or more timing offset parameters may configure/indicate a third timing offset. The wireless device (or the base station) may set a MAC-specific timing offset (or a MAC layer timing offset), denoted by K-Mac, based on the third timing offset. For example, K-Mac may be 0, for example, if the third timing offset is not indicated/configured. For example, in an NTN example with the transparent NTN node, the third timing offset may be absent from the one or more NTN configuration parameters or may be 0, for example, if the UL frame and the DL frame is aligned at the base station. As shown in FIG. 19B, the MAC-specific timing offset may indicate a portion of the propagation delay (e.g., the UE-gNB RTT) that the base station may pre-compensate (e.g., when the UL frame and the DL frame are not aligned at the base station), for example, the third timing offset may indicate the difference between the UL frame/configuration timing and the DL frame/configuration timing at the base station. As shown in FIG. 19B, the UL frame and DL frame may be aligned at a reference point on the feeder link. For example, the reference point may be the NTN node, for example, the third timing offset is equal to the feeder link delay.

To maintain uplink orthogonality, transmissions from different wireless devices in a cell/beam (e.g., the first wireless device and the second wireless device in FIG. 19B) may be time-aligned at the base station and/or the NTN node (e.g., satellite). Time alignment/synchronization may be achieved by using different timing advance (TA) values at different wireless devices to compensate for their different propagation delays (or RTDs). As shown in FIG. 19B, the first wireless device may use the first TA value (e.g., TA_1) and the second wireless device may use the second TA value (TA_2).

The wireless device may calculate/measure/maintain a current TA (value) of the wireless device (e.g., $N_{TA}$), for example, based on at least a combination of a closed-loop TA procedure/control and/or an open-loop TA procedure/control. The current TA value of the first wireless device may be TA_1 and the current TA value of the second wireless device may be TA_2.

The closed-loop TA procedure/control may be based on receiving at least one TA command (TAC) MAC CE from the base station. For example, the at least one TAC CE may comprise a TA (or an absolute TA) command field of a Msg2 1312 (or a MsgB 1332).

The open-loop TA procedure/control may use a GNSS-acquired position (or location information) of the wireless device and/or receiving the one or more NTN configuration parameters, for example, the one or more ephemeris parameters (e.g., the satellite ephemeris data), and/or the one or more common delay/TA parameters (e.g., the common TA value). The wireless device may, for example, based on an implemented orbital predictor/propagator model, use the one or more ephemeris parameters (and/or the GNSS-acquired position) to measure/calculate/maintain movement pattern of the satellite, estimate/measure the service link delay, and/or to adjust the current TA value (e.g., the TA of the wireless device) via the open-loop TA procedure/control. A combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control).

The wireless device may calculate/measure/estimate the UE-gNB RTT (or the RTD) based on the current TA value and the third timing offset (e.g., K-Mac). For example, the UE-gNB RTT may be the summation of the current TA value and K-Mac. The wireless device may determine/measure the UE-gNB RTT based on the current TA value, for example, the UE-gNB RTT is equal to the current TA value, for example, if the third timing offset is not indicated or when the K-Mac is 0. The wireless device may maintain/calculate/update the open-loop TA value (or the UE-gNB RTT) over the validity duration. For example, the validity duration may indicate the validity period of the (satellite) ephemeris data/information and/or the one or more common TA parameters. The validity duration may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not read/update/acquire the satellite ephemeris data and/or to acquire the one or more NTN-specific SIBs. The wireless device may, for example, based on (e.g., upon or in response to) acquiring the new (satellite) ephemeris data (or parameters) and/or the one or more NTN-specific SIB s, start/restart the validity duration based on the epoch time indicated by the one or more NTN configuration parameters. The wireless device may acquire the one or more NTN-specific SIBs to receive an updated (satellite) ephemeris data/information and/or an update of the one or more common TA parameters, for example, based on (e.g., in response to) determining that the validity duration being expired. The wireless device may, for example, based on (e.g., upon) the expiry of the validity duration and if the wireless device is not able to acquire the one or more NTN-specific SIBs, become unsynchronized with the base station, for example, for UL communication with the base station.

The wireless device may calculate/measure/update the current TA value via the open-loop TA procedure/control, for example, based on (e.g., in response to) receiving the one or more NTN configuration parameters (e.g., via acquiring the one or more NTN-specific SIBs) and/or acquiring an updated GNSS-acquired position. The wireless device may update the current TA value based on the closed-loop TA procedure/control, for example, based on receiving the one or more TAC MAC CEs. The wireless device may adjust (recalculate) the UE-gNB RTT, for example, based on the current TA value being updated. The wireless device may set K-Mac and adjust (recalculate) the UE-gNB RTT, for example, based on receiving a new third timing offset. The wireless device may periodically calculate/measure/update the current TA value. For example, the wireless device may, prior to performing an uplink transmission, calculate/measure/update the current TA value.

The wireless device may set the common TA/delay by zero, for example, based on (e.g., in response to) determining that the one or more common TA/delay parameters are absent from the one or more NTN configuration message. The common TA/delay may be zero, for example, if the reference point is located at the NTN node (e.g., the third timing offset is equal to the feeder link delay). For an NTN with the transparent payload, the wireless device may not pre-compensate the common TA, for example, if the UL timing synchronization is held at the NTN node (e.g., the UL and DL frames are aligned at the base station).

The wireless device with GNSS capability may estimate the propagation delay (or the service link delay) based on one or more measurements. For example, the one or more measurements may indicate the GNSS-acquired location information (position) of the wireless device. The one or more measurements may allow the wireless device to calculate/estimate the propagation delay (or the open-loop TA value) using the GNSS-acquired position and the (satellite) ephemeris data/information. The one or more measurements may allow the wireless devices to estimate/calculate the propagation delay via one or more timestamps (e.g., the timestamp of a configured broadcast signal) and/or the epoch time. The one or more measurements may allow the wireless device to estimate/measure a variation rate by which the common TA and/or the service link delay changes over a period.

A wireless device may communicate with a base station via an NTN (e.g., the base station and the wireless device may operate in the NTN and/or the base station may be an NTN base station). The communication of the wireless device and the base station may be subject to a long propagation delay (e.g., 20-40 ms in LEO satellite or approximately 600 ms in GEO satellite), for example, due to a high altitude of the NTN payload/node (e.g., 400-1200 km in LEO satellite and up to 35786 km in GEO satellite) and/or a large cell/beam size (e.g., cell/beam radius of 200-3500 km). Compared to a terrestrial network (TN) example (e.g., with a cell/beam radius of 500 m to 40 km), the large cell/beam size in an NTN example may result in the wireless device having (relatively) a less reliable (e.g., error-prone) UL/DL transmissions (e.g., due to low signal-to-noise ratio).

In at least some wireless communications, for improving reliability of UL/DL transmissions, the base station and/or the wireless device may perform UL/DL transmissions using coverage enhancement (CovEnh) technique(s)/feature(s), for example, sending (e.g., transmitting) an UL/DL signal (e.g., PDSCH/CSI-RS/PUSCH/PUCCH/SRS/preamble) across different transmission/reception occasions/slots/sub-frames, and/or a transport block (TB) processing over multi-slot PUSCH occasions, a join channel estimation procedure (e.g., DM-RS bundling), inter/intra-slot frequency hopping, and the like. For example, the base station may configure (e.g., via the one or more configuration parameters) the wireless device with a Msg3 repetition (e.g., a CovEnh feature). The wireless device may, for example, if configured with the Msg3 repetition, repeat sending (e.g., transmitting) data of Msg3 buffer several times (e.g., 4 times or 8 times) across different transmission occasions/slots (e.g., with DM-RS bundling and/or the TB processing over multi-slot PUSCH). In at least some wireless communications, the wireless device may, for example, before selecting RA resource(s) (e.g., a preamble occasion and/or a preamble index) for performing the RA procedure, determine whether the Msg3 repetition is applicable for the RA procedure (e.g., whether the wireless device is eligible for the Msg3 repetition or not). For example, the wireless device may determine the Msg3 repetition being applicable for the RA procedure based on an RSRP of the downlink pathloss (DL-PL) reference being less than an RSRP threshold (e.g., rsrp-ThresholdMsg3). The base station may, by configuring the RSRP threshold, distinguish between a first wireless device, for example, located around the cell edge and/or with a poor communication link/condition, and a second wireless device, for example, located around the cell center and/or with a robust/reliable communication link/condition. The base station may schedule the first wireless device with the Msg3 repetition (e.g., via a first random access response), for example, based on receiving a Msg3 repetition request from a first wireless device (e.g., by sending (e.g., transmitting) a first preamble when the first wireless device is eligible for the Msg3 repetition). The base station may schedule the second wireless device without the Msg3 repetition (e.g., via a second random access response) as the second wireless device may not request the Msg3 repetition (e.g., wen the second wireless device not being eligible for the Msg3 repetition). In at least some wireless communications, the base station may determine the RSRP threshold to (properly) assign/allocate RA resources (e.g., preamble occasions and/or preambles) for the coverage enhancement (CovEnh) feature. For example, the base station may determine RSRP threshold to limit number of wireless devices that become eligible for Msg3 repetition (e.g., load of CovEnh).

RA procedure with the Msg3 repetition in an NTN example may have a deteriorated performance, compared to that in an TN example. For example, an NTN may have a large cell/beam size. There may be insignificant/unclear near-far effect of the RSRP of the DL-PL reference across/through the cell/beam in the NTN example. For example, a first wireless device (e.g., located around the edge of the cell/beam) and a second wireless device (e.g., located around the cell/beam center) may have RSRP that is similar and/or close to each other, and both the first wireless device and second wireless device may become eligible for the Msg3 repetition. As a result, large interference may occur on partitioned (or allocated/assigned) RA resources to the CovEnh feature. Further, due to a large distance (e.g., 600 kms-36000 kms) between the wireless device (e.g., the first/second wireless device) and an NTN payload (e.g., a LEO/MEO/GEO satellite), the wireless device may have difficulties measuring the RSRP of the DL-PL accurately. The first and second wireless devices may transmit a same preamble (e.g., assigned to the CovEnh feature), which may result in a possibility of unsuccessful detection of the preamble at the base station. For example, the first and second wireless devices may repeat sending (e.g., transmitting) the preamble several times before successfully gaining access to network, which may increase their consumed power for initial access and/or increase delay for access control.

An example solution to the deteriorated performance of RA procedure with the Msg3 repetition in an NTN example may be to increase the RA resources (e.g., the number of preambles and/or the number of preamble occasions) assigned to the CovEnh feature, which may result in lower available RA resources for at least some wireless devices. To improve the coverage of the RA procedure, improvements to the RA procedure with the Msg3 repetition may be made, for example, based on characteristic(s)/feature(s) of the NTN example.

Change and/or fluctuation of Msg3 repetition (e.g., load of CovEnh feature) may occur in at least some wireless communications. For example, in an NTN example with moving NTN payload and/or an Earth-fixed cell/beam, there may be a continuous (and/or substantial) change/fluctuation of the load of CovEnh feature (e.g., number of wireless devices that are eligible for the Msg3 repetition), for example, by movement of the NTN payload. For example, the moving NTN payload may be a LEO satellite or a pseudo satellite (e.g., a HAPS)). For example, by movement of the NTN payload, the number/quantity of wireless devices eligible for Msg3 repetition may change/fluctuate from 20 to 2 (e.g., if the NTN payload moves toward the cell/beam) and/or from 2 to 20 (e.g., if the NTN payload moves away from the cell/beam), or any other quantity/quantities. The continuous (and/or substantial) change/fluctuation of the load of the CovEnh feature may reduce the performance/ efficiency of the RA procedure with the Msg3 repetition, for example, due to excessive interference on the RA resources if the number of the wireless devices is large (e.g., 20 or any other quantity above a threshold). Further, effective coverage of the RA procedure may shrink/expand depending on the movement direction or the position of the NTN payload. Based on at least some wireless communications, in an NTN example with moving NTN payload, the base station may encounter difficulty in determining the RSRP threshold for a robust/consistent performance of the RA procedure with the Msg3 repetition. Improvements to RA procedure with the Msg3 repetition in an NTN example may improve robust/ consistent performance of the RA procedure.

As described herein, a wireless device may determine one or more RA resources for performing the RA procedure, for example, if a wireless device and a base station are operating in an NTN example and/or if the base station is an NTN base station. For example, the wireless device may determine the one or more RA resources for a triggered/initiated RA procedure. For example, the wireless device may determine the one or more RA resources (or parameters/variables, e.g., a preamble index or a preamble occasion), based on one or more characteristics of a communication link between the wireless device and the base station. For example, the wireless device may determine the one or more RA resources, based on a location information of an NTN payload/node. For example, the wireless device may communicate via the NTN payload to the base station (e.g., the NTN payload may be transparent to the wireless device). The NTN payload may comprise the base station (e.g., the NTN payload may be generative). The base station may transmit the one or more NTN configuration parameters via a broadcast system information (e.g., SIB1 and/or one or more NTN-specific SIB s, for example, SIB19) indicating the location information of the NTN payload (e.g., via/using a satellite ephemeris data/information). For example, the one or more configuration parameters may configure the wireless device with a first set of RA resources with an indication for a message 3 repetition (e.g., RA resources allocated (or available) for the CovEnh feature) and a second set of RA resources without the indication for a message 3 repetition. The wireless device may determine whether to select the one or more RA resources from the first set of RA resources or the second set of RA resources, for example, based on the location information of the NTN payload. For example, by performing the RA procedure, the wireless device may transmit a preamble (e.g., with the preamble index associated with/corresponding to the preamble occasion) via/ using/based on the one or more RA resources.

The wireless device may determine one or more attributes (or characteristics or qualities or features or properties or aspects or elements) of a service link between the wireless device and the NTN payload. The wireless device may determine one or more attributes of the service link, for example, using (or based on) the one or more NTN configuration parameters and/or the location information of the NTN payload. The one or more attributes of the service link may comprise at least one of a propagation delay of the service link, a length of the service link (e.g., distance between the wireless device and the NTN payload), and/or an elevation angle of the service link. The wireless device may, for performing the RA procedure, determine the one or more RA resources/parameters/variables based on the one or more attributes of the service link. The wireless device may determine whether to select the one or more RA resources from the first set of RA resources or the second set of RA resources, for example, based on the one or more attributes of the service link.

For determining the one or more RA resources (e.g., whether to select the one or more RA resources from the first set of RA resources or the second set of RA resources), the wireless device may determine whether to initiate the Msg3 repetition (e.g., whether the wireless device is eligible for the Msg3 repetition). The wireless device may determine whether to initiate the Msg3 repetition, for example, based on the one or more NTN configuration parameters (or the one or more attributes of the service link or the location information of the NTN payload). The wireless device may select the one or more RA resources (e.g., a preamble index or a preamble occasion) from/among/of the first set of RA resources, for example, based on (e.g., in response to) the Msg3 repetition being applicable. The wireless device may select the one or more RA resources (e.g., a preamble index or a preamble occasion) from/among/of the second set of RA resources, for example, based on (e.g., in response to) the Msg3 repetition not being applicable.

To determine whether to initiate repetition (e.g., Msg3 repetition), the wireless device may determine whether a first set of rules being satisfied or not. The wireless device may determine whether the first set of rules being satisfied or not, for example, based on the one or more attributes of the service link (and/or the location information of the NTN payload and/or the one or more NTN configuration parameters). For example, the wireless device may determine the first set of rules being satisfied based on the propagation delay of the service link being smaller than a first NTN-specific threshold of (or among/from) at least NTN-specific threshold (e.g., the wireless device is located around the cell/beam center). The wireless device may determine the first set of rules not being satisfied based on the propagation delay of the service link being smaller than the first NTN-specific threshold (e.g., the wireless device is located around the cell/beam edge). The one or more configuration parameters may configure the at least one NTN-specific threshold.

The wireless device may determine the first set of rules being satisfied based on the length of the service link being larger than a second NTN-specific threshold of the at least one NTN-specific threshold (e.g., the wireless device is located around the cell/beam edge). The wireless device may determine the first set of rules not being satisfied based on the length of the service link being smaller than the third NTN-specific threshold (e.g., the wireless device is located around the cell/beam center).

The wireless device may determine the first set of rules being satisfied based on the elevation angle of the service link being smaller than a third NTN-specific threshold of the at least one NTN-specific threshold (e.g., the wireless device is located around the cell/beam edge). The wireless device may determine the first set of rules not being satisfied based on the elevation angle of the service link being larger than the third NTN-specific threshold (e.g., the wireless device is located around the cell/beam center).

Examples described herein may improve the coverage performance of the RA procedure, for example, by reducing interference on the partitioned/assigned/allocation RA resources to the CovEnh feature (e.g., the first set of RA resources). Some examples described herein may allow the wireless device to determine whether the wireless device is eligible for the Msg3 repetition or not using/based on the one or more attributes of the service link (e.g., the propagation delay, the length, and/or the elevation angle), for example, if the wireless device and the base station are operating in an NTN. Some examples described herein may allow the wireless device to determine whether the wireless device is eligible for the Msg3 repetition or not when a variation of the RSRP of the DL-PL reference across the cell/beam is constrained (e.g., a limited clear near-far effect).

As described herein, a wireless device may, for the triggered/initiated RA procedure, determine whether the Msg3 repetition is applicable based on the one or more attributes of the service link (e.g., the first set of rules being satisfied) and a second set of rules being satisfied. The wireless device may determine the second set of rules being satisfied based on the RSRP of the DL-PL reference being smaller than the RSRP threshold (e.g., rsrp-Threshold-Msg3). The wireless device may determine the second set of rules not being satisfied, for example, based on the RSRP of the DL-PL reference not being smaller than the RSRP threshold. The wireless device may determine the Msg3 repetition being applicable based on the RSRP of the DL-PL reference being smaller than the RSRP threshold and the length of the service link being larger than the second NTN-specific threshold. The wireless device may determine the Msg3 repetition being applicable based on the RSRP of the DL-PL reference being smaller than the RSRP threshold and the elevation angle of the service link being smaller than the first NTN-specific threshold.

The wireless device may determine/calculate a second RSRP threshold based on the one or more NTN configuration parameters (and/or the one or more attributes of the service link and/or the location information of the NTN payload) and the RSRP threshold. For example, the wireless device may increase/decrease (e.g., based on whether the NTN payload is moving toward the cell/beam or not) the RSRP threshold by a value to determine/calculate the second RSRP threshold. The wireless device may accordingly increase the second RSRP threshold, for example, if the propagation delay/length of the service link is decreased or the elevation angle of the service link is increased. Alternatively, the wireless device may decrease the second RSRP threshold, for example, if the propagation delay/length of the service link is increased or the elevation angle of the service link is decreased. The wireless device may determine the second set of rules being satisfied based on the RSRP of the DL-PL reference being smaller than the second RSRP threshold. For example, based on the RSRP of the DL-PL reference not being smaller than the second RSRP threshold, the wireless device may determine the second set of rules not being satisfied.

The base station may, via the one or more configuration parameters, configure the wireless device with a plurality of RSRP thresholds (e.g., a plurality of rsrp-ThresholdMsg3). The wireless device may, for the triggered/initiated RA procedure, determine whether the Msg3 repetition is applicable based on the one or more NTN configuration parameters (and/or the one or more attributes of the service link and/or the location information of the NTN payload) and the plurality of RSRP thresholds. For example, the wireless device may select an RSRP threshold among/of/from plurality of RSRP thresholds based on the one or more attributes of the service link. The wireless device may determine the Msg3 repetition being applicable based on the RSRP of the DL-PL reference being smaller than the selected RSRP threshold among/of/from plurality of RSRP thresholds. The wireless device may select RSRP threshold among/of/from plurality of RSRP thresholds based on the propagation delay of the service link (and/or the length of the service link, and/or the elevation angle of the service link) being within a preconfigured range/interval.

The wireless device may, for the triggered/initiated RA procedure, determine whether the Msg3 repetition is applicable (e.g., whether the wireless device is eligible for the Msg3 repetition) based on a probabilistic/randomized procedure. The probabilistic/randomized procedure may comprise generating a random number by the wireless device. The wireless device may determine whether a third set of rules being satisfied or not, for example, based on the probabilistic/randomized procedure. The third set of rules being satisfied based on the RSRP of the DL-PL reference being smaller than the RSRP threshold (or the second RSRP threshold) and the generated random number being larger than a first threshold. For example, the first threshold may be a fourth NTN-specific threshold of/among/from the at least one NTN-specific threshold. The wireless device may determine the first threshold based on the RSRP threshold (or the second RSRP threshold) and the RSRP of the DL-PL reference (e.g., via a division of the RSRP of the DL-PL reference and the RSRP threshold). The wireless device may determine the third set of rules being satisfied based on the RSRP of the DL-PL reference being larger than the RSRP threshold (or the second RSRP threshold) and the generated random number being smaller than a second threshold. For example, the second threshold may be a fifth NTN-specific threshold of the at least one NTN-specific threshold. The wireless device may determine the second threshold based on the RSRP threshold (or the second RSRP threshold) and the RSRP of the DL-PL reference (e.g., via a division of the RSRP threshold and the RSRP of the DL-PL reference).

The wireless device may, for the triggered/initiated RA procedure, determine whether the Msg3 repetition is applicable (e.g., whether the wireless device is eligible for the Msg3 repetition) based on the first set of rules being satisfied and the third set of rules being satisfied. The wireless device may determine the Msg3 repetition being applicable for the RA procedure based on the propagation delay of the service link being larger than a first NTN-specific threshold and the generated random number being smaller than a first threshold. The wireless device may determine the first threshold based on the first NTN-specific threshold (e.g., via a division of the propagation delay of the service link and the first NTN-specific threshold). The wireless device may determine the Msg3 repetition being applicable for the RA procedure based on the propagation delay of the service link being smaller than the first NTN-specific threshold and the generated random number being larger than a second threshold. The wireless device may determine the second threshold based on the first NTN-specific threshold (e.g., via a division of the first NTN-specific threshold and the propagation delay of the service link).

The wireless device may determine the Msg3 repetition being applicable for the RA procedure based on the length of the service link being larger than the second NTN-specific threshold and the generated random number being smaller than a first threshold. The wireless device may determine the first threshold based on the second NTN-specific threshold (e.g., via a division of the length of the service link and the second NTN-specific threshold). The wireless device may determine the Msg3 repetition being applicable for the RA procedure based on the length of the service link being smaller than the second NTN-specific threshold and the generated random number being larger than a second threshold. The wireless device may determine the second threshold based on the second NTN-specific threshold (e.g., via a division of the second NTN-specific threshold and the length of the service link).

The wireless device may determine the Msg3 repetition being applicable for the RA procedure based on the elevation angle of the service link being smaller than the third NTN-specific threshold and the generated random number being smaller than a first threshold. The wireless device may determine the first threshold based on the third NTN-specific threshold (e.g., via a division of the elevation angle of the service link and the third NTN-specific threshold). The wireless device may determine the Msg3 repetition being applicable for the RA procedure based on the elevation angle of the service link being larger than the third NTN-specific threshold and the generated random number being larger than a second threshold. The wireless device may determine the second threshold based on the third NTN-specific threshold (e.g., via a division of the third NTN-specific threshold and the elevation angle of the service link).

Examples may allow a (nearly) robust/consistent performance/efficiency of the RA procedure despite the mobility of the NTN payload. For example, using the randomized procedure, the base station may increase a likelihood/possibility of the RA procedure with the Msg3 repetition for a first wireless device that is located around the cell/beam edge and/or reduce a likelihood/possibility of the RA procedure with the Msg3 repetition for a second wireless device that is located around the cell/beam center.

Figure 20:
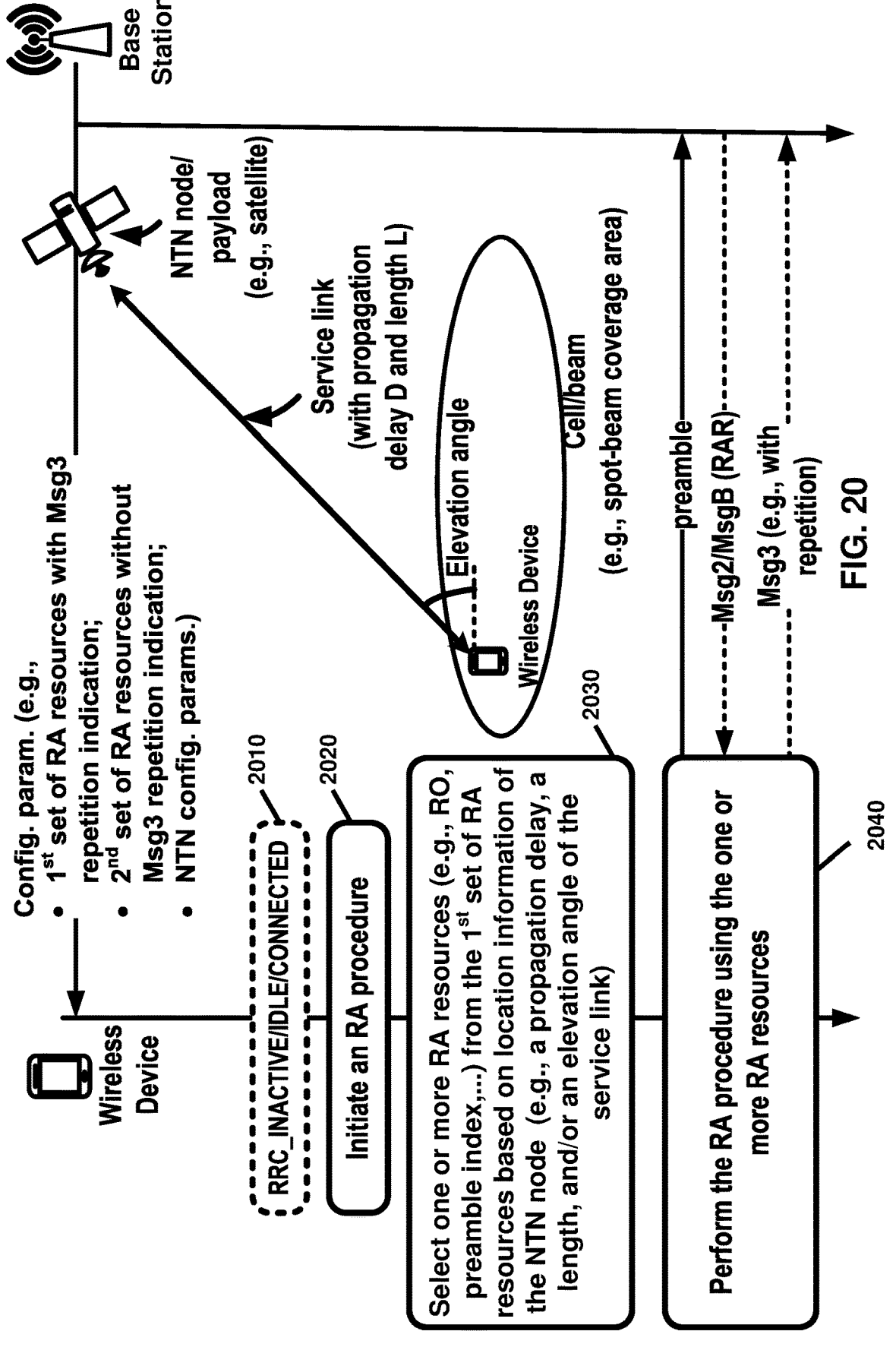
FIG. 20 shows an example of a random access (RA) procedure in wireless communications systems.

FIG. 20 shows an example of an RA procedure in wireless communications systems. FIG. 20 may, for example, show an implementation of a method (or a process) for the RA procedure at a base station and/or a wireless device. The base station may communicate with the wireless device via/using a cell (e.g., a serving cell). For example, as shown in step 2010, the wireless device may be in an RRC_IDLE (or an RRC idle) state/mode, an RRC_INACTIVE (or an RRC inactive) state/mode, or an RRC_CONNECTED (or an RRC connected) state/mode.

The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell. The wireless device may communicate with the base station via an NTN payload/node. For example, the NTN payload may be a transparent payload. The NTN payload/node may be a generate payload (e.g., the NTN payload comprises the base station).

As shown in FIG. 20, the wireless device may, from the base station, receive the one or more configuration parameters (e.g., the one or more RRC configuration parameters). The one or more configuration parameters may, for example, comprise one or more serving cell configuration parameters (e.g., ServingCellConfigCommon, ServingCellConfigCommonSIB, and/or ServingCellConfig). For example, the one or more configuration parameters comprise one or more RA configuration parameters (e.g., one or more RACH configuration parameters). The one or more RA configuration parameters may comprise a first RACH configuration parameters (e.g., RA-ConfigCommon IE), corresponding to a four-step RA type (e.g., the RA_TYPE is the 4-stepRA), for example, for performing a four-step RA procedure. The one or more RA configuration parameters may, for example, comprise a second RACH configuration parameters (e.g., RA-ConfigCommonTwoStepRA-r16 IE and/or Ms gA-PUSCH-Config IE), corresponding to a two-step RA type (e.g., the RA_TYPE is the 2-stepRA), for example, for performing the two-step RA procedure. For example, the one or more RACH configuration parameters may further comprise a dedicated RACH configuration message (e.g., RACH-ConfigDedicated). The dedicated RACH configuration message may comprise, among other parameters, one or more PRACH occasions (ROs) for a contention-free RA procedure, and one or more PRACH mask index for RA resource selection (e.g., ra-ssb-OccasionMaskIndex).

The one or more RA configuration parameters may comprise a first plurality (or a first set(s)) of RA resources and/or a second plurality (or a second set(s)) of RA resources. The first plurality of RA resources may, for example, comprise (or have or be associated with or correspond to) a Msg3 repetition indication (or an indication for the Msg3 repetition), for example, covEnh indication. For example, the wireless device may use the first plurality of RA resources for requesting a Msg3 repetition (e.g., by sending (e.g., transmitting) a preamble based on the first plurality of RA resources).

The first plurality of RA resources may, for example, comprise (or have or be associated with or correspond to) a PUSCH repetition. For example, the PUSCH repetition may be associated with a Msg3 transmission (e.g., for transmission of a transport block of the Msg3 HARQ buffer). The indication of the PUSCH repetition may be the indication of the Msg3 repetition.

The one or more configuration parameters may indicate/configure, for the first plurality of RA resources, the Msg3 repetition indication. The second plurality of RA resources may, for example, not comprise the Msg3 repetition indication. The one or more configuration parameters may not indicate/configure, for the second plurality of RA resources, the Msg3 repetition indication. For indicating/requesting a Msg3 repetition, for a triggered/initiated RA procedure, to the base station (or network), the wireless device may use the first plurality of RA resources to transmit a preamble.

As shown in FIG. 20, in step 2020, the wireless device may trigger/initiate an RA procedure. For example, the wireless device may trigger/initiate the RA procedure, for example, based on (e.g., in response to) (or for): an initial access procedure (e.g., to transit from the RRC_IDLE state/mode to the RRC_CONNECTED state/mode), a positioning procedure, an uplink coverage recovery procedure, initiating a beam failure recovery, receiving from the base station an RRC reconfiguration message, for example, during a handover procedure, receiving from the base station a PDCCH order, re-synchronizing when new data arrives and the wireless device status is out-of-sync for UL communication/transmission, new data arrives at the buffer of the wireless device when there is no scheduling request (SR) resources (e.g., PUCCH) for sending (e.g., transmitting) the SR are configured, pending data exists in the buffer of the wireless device and the wireless device has reached a maximum allowable times for (re)sending (e.g., (re)transmitting) an SR (e.g., a SR failure), and/or a PDCCH order. The wireless device may perform the RA procedure, for example, after performing the initial access, for example, for beam failure recovery, reporting a TA information (e.g., a UE-specific TA and/or a GNSS-acquired location information) of the wireless device, other SI request, and/or SCell addition.

The RA procedure may be a contention-based RA procedure, for example, triggered by higher layers of the wireless device (e.g., the RRC sublayer or the MAC layer indicates triggering/initiating the RA procedure). The wireless device may, for example, trigger/initiate the RA procedure based on the higher layers (e.g., RRC layer) indicating triggering/initiating the RA procedure. The RA procedure may be a contention-free RA procedure (e.g., according to above discussions of FIG. 13B). For example, the wireless device may initiate/trigger the RA procedure based on a PDCCH order received from the base station. The PDCCH order may comprise an indication for the preamble (e.g., ra-PreambleIndex) and/or a SS/PBCH index for determining a RACH occasion (RO) for transmission of a preamble. The RA procedure may, for example, be a four-step RA procedure (e.g., according to above discussions of FIG. 13A), for example, RA_TYPE is set to 4-stepRA, or a two-step RA procedure (e.g., according to above discussions of FIG. 13C), for example, RA_TYPE is set to 4-stepRA.

The wireless device may perform at least one of the following: flushing a Msg3 buffer and/or flushing a MsgA buffer; initializing one or more RA-specific parameters, for example, a preamble transmission counter (e.g., PRE-AMBLE_TRANSMISSION_COUNTER) and/or a preamble power ramping counter (e.g., PREAMBLE_POWER_RAMPING_COUNTER); selecting a carrier (e.g., SUL or NUL) for the RA procedure and setting PCMAX accordingly (e.g., setting PCMAX to $P_{CMAX,f,c}$ of the SUL carrier or the NUL carrier); and/or performing one or more BWP operations, for example, based on (e.g., in response to) the triggering/initiating the RA procedure.

For performing the one or more BWP operations, the wireless device may determine whether at least one PRACH occasion (RO) being configured (e.g., via the one or more configuration parameters, for example, the first RACH configuration parameters and/or the second RACH configuration parameters) for an active UL BWP. For example, the one or more BWP operations may comprise switching the active UL BWP and/or an active DL BWP (e.g., when a BWP ID/number/index of the active DL BWP is different than the BWP ID of the active UL BWP. The one or more BWP operations may comprise switching the active DL BWP to a DL BWP with a BWP ID of bwp-Id determined based on BWP ID of the active UL BWP. The one or more BWP operations may comprise stopping the ongoing RA procedure and initiating a (new) RA procedure, for example, after performing the BWP switching, for example, based on (e.g., in response to) receiving a RRC (re-) configuration for BWP switching while the RA procedure associated with the serving cell is ongoing in the MAC entity.

For a reduced capability (RedCap) wireless device (or if the base station configures the wireless device with a Red-Cap feature), the one or more BWP operations may comprise switching the active UL BWP to a BWP configured/indicated by initialUplinkBWP-RedCap (e.g., if the one or more configuration parameters configure/indicate the initialUplinkBWP-RedCap) and/or switching the active DL BWP to a BWP configured/indicated by initialDownlinkBWP-RedCap (e.g., if the one or more configuration parameters configure/indicate the initialDownlinkBWP-RedCap). For the RedCap wireless device, the one or more BWP operations may comprise switching the active UL BWP to a BWP configured/indicated by initialUplinkBWP (e.g., if the one or more configuration parameters do not configure/indicate the initialUplinkBWP-RedCap) and/or switching the active DL BWP to a BWP configured/indicated by initialDownlinkBWP (e.g., if the one or more configuration parameters do not configure/indicate the initialDownlinkBWP-RedCap).

The wireless device may perform the RA procedure on the active DL BWP (e.g., of SpCell) and active UL BWP (e.g., of the serving cell), for example, after performing the one or more BWP operations. A BWP selected for the RA procedure (e.g., the active UL BWP and/or the active DL BWP) may be configured (e.g., via the one or more configuration parameters) with both the first plurality of RA resources and the second plurality of RA resources.

The one or more configuration parameters may configure the BWP selected for the RA procedure with the first plurality of RA resources. For example, the one or more configuration parameters may not configure the BWP selected for the RA procedure with the second plurality of RA resources. The BWP selected for the RA procedure may be a dedicated BWP for the Msg3 repetition and/or a CovEnh feature (e.g., a 3GPP Release 17 CovEnh feature and/or an NTN-CovEnh feature).

In example of FIG. 20, the BWP selected for the RA procedure may be configured/indicated, by the one or more configuration parameters, with both the first plurality of RA resources and the second plurality of RA resources. For example, the BWP selected for the RA procedure may not be the dedicated BWP for the Msg3 repetition and/or the CovEnh feature. The base station may, for example via a RA resource partitioning, share/divide/partition the RA resources (e.g., preambles, preamble occasions, MsgA PUSCH occasions, and the like and/or one or more RA variables/parameters, for example, a Msg 3 delta preamble (msg3-DeltaPreamble) and/or a MsgA delta preamble (msgA-DeltaPreamble) and/or the like) among one or more features (e.g., the CovEnh feature, a small data transmission (SDT) feature, a reduced capacity (RedCap) feature, a slice group feature, and the like). For example, the base station may partition the RA resources among the one or more features and at least some wireless devices (e.g., the wireless devices without features comprising the CovEnh feature, a SDT feature, a RedCap feature, a slice group feature, and the like). The first plurality of the RA resources may comprise RA resources that are shared/divided/partitioned for the CovEnh feature. The first plurality of the RA resources may comprise RA resources that are associated with the Msg3 repetition indication (e.g., an indication for the Msg3 repetition).

The one or more configuration parameters (e.g., RACH-ConfigCommon and/or RACH-ConfigCommonTwoStepRA) may comprise one or more feature combination preambles (e.g., FeatureCombinationPreambles). Each feature combination preamble among/from the one or more feature combination preambles may associate a set of preambles with a feature combination (e.g., a combination of features comprising at least one of the CovEnh feature, the SDT feature, the RedCap feature, the Slice group feature, and the like). The first RACH configuration parameters (e.g., RACH-ConfigCommon IE) may comprise a first field (e.g., featureCombinationPreambles). The first field may have a first value/number indicating a number/quantity of (or a maximum number of) the feature combination preambles (e.g., a maxFeatureCombPreambles of the Feature CombinationPreambles). For example, the first field may indicate/specify/identify one or more first sets of preambles (or preamble partitions). Each set of preambles (or preamble partitions) of the one or more first sets of preambles may correspond (or be associated) with a combination of features indicated by a corresponding feature combination preamble (e.g., the FeatureCombinationPreambles IE) of/among/from the first value of the feature combination preambles (e.g., the one or more feature combination preambles). For example, the first plurality of the RA resources may comprise the one or more first sets of preambles.

The second RACH configuration parameters (e.g., RA-ConfigCommonTwoStepRA IE) may comprise a second field (e.g., featureCombinationPreambles). The second field may have a second value/number indicating a number of (or a maximum number of) the feature combination preambles (e.g., maxFeatureCombPreambles of FeatureCombination-Preambles IE). For example, the second field may indicate/specify/identify one or more second sets of preambles (or preamble partitions). Each set of preambles (or preamble partitions) of the one or more second sets of preambles may correspond (or be associated) with a combination of features indicated by a feature combination preamble (e.g., the FeatureCombinationPreambles IE) of the second value of the feature combination preambles (e.g., the one or more feature combination preambles). For example, the first plurality of the RA resources may comprise the one or more second sets of preambles.

The first plurality of the RA resources may comprise the first value/number of the feature combination preambles and/or the second value/number of the feature combination preambles. Each feature combination preamble (e.g., the IE Feature CombinationPreambles) of the first value/number of the feature combination preambles and/or the second value/number of the feature combination preambles may comprise at least one of the following RA resources (and/or parameters/variables): a feature combination (e.g., featureCombination) indicating a combination of features (e.g., the Cov-Enh feature, the SDT feature, the RedCap feature, the slice group feature, and the like) that one or more preambles indicated by the feature combination preamble (e.g., the FeatureCombinationPreambles IE) are associated with; and/or startPreambleForThisPartition indicating a first/starting/initial preamble associated with the combination of features (e.g., a feature combination, for example, feature Combination); and/or numberOfPreamblesForThisPartition indicating a number of (consecutive) preambles, starting from the starting preamble (e.g., indicated by the startPreambleFor-ThisPartition), for example, per SSB, associated with the combination of features (e.g., the feature combination or the featureCombination); and/or numberOfRA-Preambles-GroupA indicating how many consecutive preambles, starting from the starting preamble indicated by the startPre-ambleForThisPartition, are associated to a Group A (e.g., remaining preambles associated to the feature combination may be associated to a Group B); and/or ssb-SharedRO-MaskIndex indicating a subset of PRACH occasions (ROs) associated with the allocated/assigned/identified preamble(s) by the FeatureCombinationPreambles (e.g., that are allocated for the feature combination); separateMsgA-PUSCH-Config indicating a mapping of one or more 2-step RACH preamble(s) (e.g., identified/allocated/assigned by the Feature CombinationPreambles) to a PUSCH slot separate from the one defined in an MsgAConfigCommon IE; and/or a featureSpectficParameters; and/or the like.

A feature combination field (e.g., the Feature Combination IE) of a feature combination preamble (e.g., of the first value/number of the feature combination preambles and/or the second value/number of the feature combination preambles) may comprise one or more feature indications. Each of the one or more feature indications may correspond to a feature among the one or more features (e.g., the CovEnh feature, the SDT feature, the RedCap feature, the slice group feature, and the like). The feature combination filed of the feature combination preamble may comprise at least one of the following: a redCap indication indicating that the Red-Cap feature is part of the feature combination; and/or a smallData indication indicating that the SDT feature is part of the feature combination; and/or a covEnh indication indicating that the CovEnh feature (e.g., the Msg3 repetition) is part of the feature combination; and/or a sliceGroup indication indicating the slice groups that are part of the feature combination; and/or one or more (placeholder) indications for releases later than 3GPP Release 17 (e.g., laterThanRel17Features).

A field (e.g., the featureSpecificParameters field) of a feature combination preamble (e.g., of the first value/number of the feature combination preambles and/or the second value/number of the feature combination preambles) may indicate one or more RA-partition/feature resources/variables/parameters that may be specific to the feature combination preamble (e.g., indicating/configuring the one or more RA variables/parameters that are RA-partition/feature specific). For example, the one or more RA-partition/feature resources/variables/parameters may comprise at least one of the following: rsrp-ThresholdSSB indicating a L1-RSRP threshold (e.g., for determining whether a candidate beam may be used by the wireless device for a contention free random access, for example, to recover from beam failure), rsrp-ThresholdMsg3, ra-SizeGroupA, deltaPreamble indicating a power offset (e.g., between a Msg3 and a preamble transmission); and/or messagePowerOffsetGroupB.

The first plurality of RA resources may comprise the one or more first sets of RA resources (and/or parameters/variables). For example, the first plurality of RA resources (or the one or more first sets of RA resources) may comprise the first value/number of the feature combination preambles and/or the second value/number of the feature combination preambles. For example, the first plurality of RA resources (or the one or more first sets of RA resources) may comprise the one or more first sets of preambles (or preamble partitions) and/or the one or more second sets of preambles (or preamble partitions). Each set of RA resources of the one or more first sets of RA resources may correspond to (or associated with) one or more features (e.g., via a feature combination preamble).

The first plurality of the RA resources (e.g., the one or more first sets of RA resources) may have the Msg3 repetition (or a CovEnh feature or a CovEnh or a covEnh) indication (or correspond to a CovEnh feature). Each feature combination (e.g., the featureCombination) of each feature combination preamble (e.g., the Feature CombinationPreambles IE), of the first value/number of the feature combination preambles and/or the second value/number of the feature combination preambles, may have/comprise the Msg3 repetition indication (e.g., the covEnh indication).

A set of RA resources from/among/of the first plurality of the RA resources (e.g., the one or more first sets of RA resources) may be shared among the CovEnh feature and at least one other feature (e.g., the SDT feature and/or the slice group feature and/or the RedCap feature). For example, a feature combination (e.g., the featureCombination) of (or corresponding to) the set of RA resources may comprise a covEnh (feature) indication (e.g., the Msg3 repetition indication) and/or at least one of a redCap (feature)indication and/or a smallData (feature)indication and/or a slice Group (feature)indication. The feature combination may, for example, indicate/identify a combination of features (e.g., the CovEnh feature, the SDT feature, the RedCap feature, the Slice group feature, and the like) that are associated with an RA partition (e.g., the RA partition among the one or more RA-partition/feature resources/variables/parameters).

The first plurality of the RA resources may exclusively be applicable for a first feature (e.g., the CovEnh feature), for example, the first plurality of the RA resources may not be applicable/usable/accessible/available to other features different that the first feature (e.g., the RedCap feature and/or the slice group feature and/or the SDT feature, and the like).

As shown in FIG. 20, the one or more configuration parameters may comprise the one or more NTN configuration parameters. The one the one or more NTN configuration parameters may configure/indicate one or more NTN-specific parameters (or values), for example, the one or more ephemeris parameters (e.g., the satellite ephemeris data), and/or the one or more common delay/TA parameters (e.g., the common TA value). The wireless device may, based on the one or more NTN configuration parameters, determine/measure/maintain the one or more NTN-specific parameters/values. The one or more NTN-specific parameters/values may comprise a type of NTN payload (e.g., a GEO satellite, a MEO satellite, a LEO satellite, and/or a HAPS) and/or a type of the cell/beam (e.g., an Earth-fixed cell/beam). The wireless device may determine a location information of the NTN payload/node based on the one or more NTN-specific parameters/values. For example, the wireless device may use the satellite ephemeris to calculate/determine/maintain/update the location information of the NTN payload (e.g., satellite).

The one or more NTN-specific values may correspond to (or be associated with) the one or more attributes (or characteristics or qualities or features or properties or aspects or elements) of a communication link between the wireless device and the base station, for example, the service link (e.g., the communication link between the wireless device and the NTN payload). For example, the wireless device may determine the one or more attributes of the service link based on (or using) the location information of the NTN node. The wireless device may determine the one or more attributes of the service link based on (or using) the one or more NTN-specific values. The one or more aspects of the service link may comprise (or be) at least one of the following: a propagation delay of a service link, and/or a length of the service link (e.g., distance between the wireless device and the NTN payload or a relative location of the NTN node/payload to the location of the wireless device), and/or an elevation angle of the service link, and/or the like. For example, the one or more NTN-specific values/parameters may comprise a first value. The first value may be based on the length of the service link. For example, the one or more attributes of the service link may be based on (or depend on) an GNSS-acquired position (or a location information) of the wireless device. Determining the one or more aspects of the service link may be an example of the determining the location information of the NTN node.

The service link may comprise one or more intermediary nodes (e.g., airplanes and/or drones and/or HAPS nodes/payload and/or low-orbit satellites). For example, using the one or more NTN-specific parameters/values, the wireless device may determine the one or more attributes of the service link. The one or more attributes of the service link (or the one or more NTN-specific values/parameters) may be based on one or more timestamps (e.g., the timestamp of the one or more NTN configuration parameters and/or the timestamp of the NTN-specific SIB) and/or the epoch time of the NTN-specific SIB(s).

The determining the location information of the NTN node may be based on the one or more timestamps. For example, the wireless device may determine a relative location of the NTN node (e.g., with respect to the wireless device's location) based on the one or more timestamps.

The wireless device may further use the one or more NTN-specific parameters/values to determine/measure/calculate/maintain/update the open-loop TA value of the wireless device (e.g., corresponding to a TAG and/or the serving cell). The wireless device may further use the one or more NTN-specific parameters/values to determine/measure/calculate/maintain/update the UE-gNB RTT.

The wireless device may (re)calculate/(re)measure/update the one or more NTN-specific values (e.g., (re)calculating/(re)measuring/updating/maintaining the one or more attributes of the service link), for example, based on (e.g., in response to) receiving the one or more NTN configuration parameters (e.g., via acquiring the one or more NTN-specific SIB s or the SIB1) and/or acquiring an updated GNSS-acquired position of the wireless device and/or receiving, from the base station, a verification of the location information of the wireless device. The wireless device may, using the one or more NTN configuration parameters (e.g., the one or more common delay/TA parameters) periodically (e.g., each 10 ms or each 20 ms) (re)calculate/(re)measure/update the one or more NTN-specific values (e.g., (re)calculating/(re)measuring/updating/maintaining the one or more attributes of the service link). For example, the wireless device may (re)calculate/(re)measure/update the location information of the NTN node based on the one or more NTN configuration parameters (e.g., the one or more common delay/TA parameters) and/or the UE-gNB RTT.

As shown in FIG. 20, if the wireless device and the base station are operating in an NTN example (and/or if the base station is an NTN base station and/or if the cell is part of the NTN), the wireless device may, for the triggered/initiated RA procedure, determine one or more RA resources (or parameters/variables), for example, a preamble index and/or a preamble occasion and/or a preamble group, for performing the RA procedure based on the location information of an NTN payload/node. For example, in step 2030, for performing the initiated RA procedure, the wireless device may, based on the location information of the NTN payload, determine whether to select the one or more RA resources from the first plurality of RA resources and/or the second plurality of RA resources. As shown in FIG. 20, by performing the RA procedure (in step 2040), the wireless device may transmit a preamble (e.g., with the preamble index associated with/corresponding to the preamble occasion and/or the preamble group) via/using/based on the one or more RA resources.

The wireless device may, for performing the RA procedure, determine the one or more RA resources/parameters/variables based on the location information of the NTN node (e.g., the one or more attributes of the service link). For example, based on the location information of the NTN node (e.g., the one or more attributes of the service link), the wireless device may determine whether to select the one or more RA resources from the first set of RA resources or from the second set of RA resources.

For determining the one or more RA resources (e.g., whether to select the one or more RA resources from the first set of RA resources or the second set of RA resources), the wireless device may determine whether to initiate repetition (e.g., the Msg3 repetition). For example, the wireless device may determine whether the Msg3 repetition is applicable (e.g., whether the wireless device is eligible for the Msg3 repetition, for example, whether the wireless device is eligible for a PUSCH repetition of the Msg3). The wireless device may determine whether to initiate repetition (e.g., the Msg3 repetition) for the RA procedure, for example, based on the location information of the NTN payload. The wireless device may select the one or more RA resources (e.g., a preamble index and/or a preamble occasion and/or a preamble group) from/among/of the first set of RA resources, for example, based on (e.g., in response to) the Msg3 repetition being applicable. The wireless device may select the one or more RA resources (e.g., a preamble index or a preamble occasion and/or a preamble group) from/among/of the second set of RA resources, for example, based on (e.g., in response to) the Msg3 repetition not being applicable. For example, the preamble group may be a Random Access Preamble group A (e.g., a RAP group A) or a Random Access Preamble group B (e.g., a RAP group B).

The wireless device may determine whether to initiate repetition for the RA procedure, for example, based on the one or more NTN configuration parameters. For example, the wireless device may determine whether the Msg3 repetition is applicable/valid/allowable (e.g., whether the wireless device is eligible for the Msg3 repetition and/or whether the CovEnh feature is applicable) for the RA procedure, for example, based on the one or more NTN configuration parameters. The wireless device may determine whether to initiate the repetition (e.g., the Msg3 repetition), for example, based on the one or more NTN-specific parameters/values (e.g., the one or more attributes of the service link, for example, the length of the service link, the propagation of the service link, and/or the elevation angle of the service link).

The wireless device may determine whether to initiate repetition (e.g., Msg3 repetition), for example, based on whether an attribute of the service link of/among/from the one or more attributes of the service link being larger than at least one NTN-specific threshold. The wireless device may determine whether to initiate repetition (e.g., Msg3 repetition), for example, based on whether an attribute of the service link of/among/from the one or more attributes of the service link being smaller (e.g., less than or not greater than) than the at least one NTN-specific threshold. For example, the one or more NTN configuration parameters may indicate/configure the at least one NTN-specific threshold. The one or more RACH configuration parameters may indicate/configure the at least one NTN-specific threshold (e.g., via the Feature CombinationPraembles IE).

The wireless device may determine the Msg3 repetition not being applicable (e.g., the wireless device not being eligible for the Msg3 repetition) based on a first set of rules being satisfied. For example, the wireless device may determine the first set of rules being satisfied based on the propagation delay of the service link being larger (or greater or not smaller) than a first NTN-specific threshold of (or among/from) the at least NTN-specific threshold (e.g., the wireless device is located around the cell/beam center). The wireless device may, for example, determine first set of rules not being satisfied based on the propagation delay of the service link being smaller than the first NTN-specific threshold (e.g., the wireless device is located around the cell/beam edge).

The wireless device may determine the first set of rules being satisfied based on the length of the service link being larger than a second NTN-specific threshold of the at least one NTN-specific threshold (e.g., the wireless device is located around the cell/beam edge). The wireless device may determine the first set of rules not being satisfied based on the length of the service link being smaller than the second NTN-specific threshold (e.g., the wireless device is located around the cell/beam center).

The wireless device may determine the first set of rules being satisfied based on the elevation angle of the service link being smaller than a third NTN-specific threshold of the at least one NTN-specific threshold (e.g., the wireless device is located around the cell/beam edge). The wireless device may determine the first set of rules not being satisfied based on the elevation angle of the service link being larger than the third NTN-specific threshold (e.g., the wireless device is located around the cell/beam center).

The wireless device may, for performing the RA procedure, select a set of RA parameters/variables/resources (e.g., comprising the one or more RA parameters/variables/resources) from/among/of the first plurality of RA resources, for example, based on (e.g., in response to) the Msg3 repetition being applicable (e.g., based on the first set of rules being satisfied).

The first plurality of the RA resources may be applicable to one or more features (e.g., via the feature combination preambles), for example, comprising the CovEnh feature, the reduced capability (RedCap) feature and/or the slice group feature and/or the SDT feature. The wireless device may select the set of RA parameters/variables/resources, for example, via/based on a feature prioritization procedure. For the ongoing RA procedure, the feature prioritization procedure may be based on one or more priority orders indicated by the one or more configuration parameters (e.g., feature-Priorities) and/or upper layers (e.g., RRC sublayer) of the wireless device. For example, the feature priorities (e.g., featurePriorities) may indicate priorities of the one or more features.

The wireless device may perform the feature prioritization procedure, for example, based on determining that the set of RA resources (e.g., the one or more first sets of RA resources) being applicable for the one or more features. The feature prioritization procedure may comprise identifying a subset of RA resources among/from the first plurality of RA resources with a highest/largest priority (e.g., assigned in the featurePriorities among the one or more features applicable to the RA procedure). For selecting the set of RA resources, the wireless device may perform/conduct one or more rounds of the feature prioritization procedure, for example, before identifying the subset of RA resources among/from the first plurality of RA resources (e.g., the one or more first sets of RA resources). For example, the wireless device may, in each round of the one or more rounds of the feature prioritization procedure, eliminate a subset of RA resources from the first plurality of RA resources based on the feature priorities associated with the subset of RA resources.

For performing the RA procedure (e.g., sending (e.g., transmitting) a preamble and/or a Msg3), the wireless device may, for example, if RA-Type=4-stepRA, select the set of RA resources (e.g., the one or more RA resources) from/among/of the first plurality of RA resources and/or the first RACH configuration parameters (e.g., the RACHConfig-Common IE). The wireless device may use the corresponding field value from the first RACH configuration parameters (e.g., the RACHConfigCommon IE), for example, based on determining a field value of an RA variable/parameter/resource of the set of RA resources, for example, messagePowerOffsetGroupB, numberOfRA-Preambles-GroupA, and/or rsrp-ThresholdSSB, and the like, being absent from the first plurality of the RA resources. The wireless device may set/determine a filed value of an RA variable/parameter/resource of the set of RA resources (e.g., from the one or more RA-partition/feature resources), for example, msg3-DeltaPreamble, and/or ra-Msg3SizeGroupA, from the first plurality of the RA resources variable/parameter/resource (when the RA variable/parameter/resources is not absent from the first plurality of the RA resources), for example, setting the field value of the msg3-DeltaPreamble based on a field value of the deltaPreamble of the set of RA resources and/or setting the field value of the ra-Msg3SizeGroupA based on a field value of the ra-SizeGroupA of the set of RA resources. For example, the wireless device may determine the preamble group (e.g., the preamble group A or the preamble group B) based on the first value.

The wireless device may, for example, if RA-Type=2-stepRA, select the set of RA parameters/variables/resources (e.g., the one or more RA parameters/variables/resources) from/among/of the first plurality of RA resources and/or the second RACH configuration parameters (e.g., the MsgA-ConfigCommon IE). For example, for performing the RA procedure, based on determining a field value of an RA variable/parameter/resource of the set of RA resources, for example, messagePowerOffsetGroupB and/or numberOfRA-PreamblesGroupA, and the like, being absent from the first plurality of the RA resources, the wireless device may use the corresponding field value from the second RACH configuration parameters (e.g., the RACHConfigCommon IE). The wireless device may set/determine a filed value of an RA variable/parameter/resource of the set of RA resources (e.g., from the one or more RA-partition/feature resources), for example, msgA-SSB-SharedRO-MaskIndex, msgA-DeltaPreamble, msgA-RSRP-ThresholdSSB, and/or ra-MsgASizeGroupA, and the like from the first plurality of the RA resources (when the RA variable/parameter/resource is not absent from the first plurality of the RA resources), for example, setting the field value of the msgA-SSB-SharedRO-MaskIndex based on a field value of the ssb-SharedRO-MaskIndex of the set of RA resources and/or setting the field value of the ra-MsgASize-GroupA based on a field value of the ra-SizeGroupA of the set of RA resources, and/or setting the field value of the msgA-DeltaPreamble based on a field value of the deltaPreamble of the set of RA resources and/or setting the field value of the msgA-RSRP-ThresholdSSB based on a field value of the rsrp-ThresholdSSB of the set of RA resources.

The one or more RA resources may comprise a preamble with a preamble index (e.g., ra-PreambleIndex or PREAMBLE_INDEX), Random Access Preamble (RAP) group (e.g., preamble group A or preamble group B), a physical random access channel (PRACH) occasion (RO) comprising time, frequency, and/or code resources for sending (e.g., transmitting) the preamble, and/or transmission power of the preamble, and/or one or more MsgA PUSCH occasions (POs) for MsgA payload/transport block transmission, and the like. For example, the wireless device may determine the preamble index, preamble group (e.g., the Group A or the Group B) and/or the RO, based on one or more field values of the set of RA resources/parameters/variables (e.g., the one or more RA resources). The preamble index, a preamble group (e.g., the preamble group A or the preamble group B) and/or the RO may correspond to a feature combination preamble. For example, the wireless device may determine the preamble index, preamble group (e.g., the preamble group A or the preamble group B) and/or the RO, based on the feature combination preamble (e.g., associated with the set of RA resources) indicating at least one of the following: the startPreambleForThisPartition, the numberOfPreamblesForThisPartition, the numberOfRA-Preambles-GroupA, the ssb-SharedRO-MaskIndex, the ra-SizeGroupA, the separateMsgA-PUSCH-Config, the deltaPreamble, the rsrp-ThresholdSSB, and/or the like.

The wireless device may determine a valid RO (e.g., the next available RO) corresponding to a SSB or a CSI-RS, for example, randomly with equal probability amongst one or more ROs and/or based on a possible occurrence of measurement gaps. The wireless device may randomly select the preamble (from the preamble Group A or the preamble Group B), set PREAMBLE_INDEX based on the preamble (e.g., the index of the preamble), select the valid RO corresponding to the preamble, and/or calculate an RA-RNTI corresponding to the valid RO (if the type of the RA procedure is the 4-stepRA) or calculate a MSGB-RNTI corresponding to the valid RO (if the type of the RA procedure is the 2-stepRA).

For performing the two-step RA procedure, if the preamble is selected by the MAC entity, of the wireless device, among the contention-based Random Access Preamble(s), the wireless device may select the PUSCH occasion (PO) corresponding to the preamble and the valid RO. For example, the wireless device may determine an UL grant/resource for transmission of the MsgA payload according to the PUSCH configuration associated with the selected RAP group. The wireless device may identify HARQ information (e.g., New Data Indicator (NDI), Transport Block size (TBS), Redundancy Version (RV), and a HARQ process ID/number/index) associated (or corresponding to) the MsgA payload. The wireless device may deliver the UL grant and the associated HARQ information to the HARQ entity for transmission of the first message (e.g., MsgA), for example, based on the preamble and the valid RO being mapped to a valid PUSCH occasion (PO).

The wireless device may further select the one or more RA resources, for example, based on the PDCCH order. The wireless device may set/initialize parameter PREAMBLE_INDEX, for example, based on the preamble index indicated by the PDCCH order. For example, the preamble may not be selected by the higher layers (e.g., the MAC layer) of the wireless device among the contention-based (CB) Random Access Preambles (RAPs). The wireless device may determine the preamble Group based on the preamble index and the one or more RA-partition/feature resources. For example, the wireless device may identify a feature combination preamble based on the PDCCH order (e.g., using the indicated preamble index and/or the PDCCH may indicate an index indicating the feature combination preamble). For example, for performing the RA procedure (e.g., the two-step RA procedure or the four-step RA procedure), the wireless device may select an SSB indicated by the PDCCH order or may select the SSB based on a threshold (e.g., rsrp-ThresholdSSB). The wireless device may select the SSB randomly. The wireless device may determine the SSB based on the feature combination preamble (e.g., the one or more RA-partition/feature resources/variables/parameters).

The wireless device may, by sending (e.g., transmitting) the preamble (or the first message), request a transmission of the Msg3 with a number of repetitions (e.g., K repetitions). The wireless device may select the preamble corresponding to the number of repetitions, for example, based on the location information of the NTN node (e.g., the one or more attributes of the service link). The base station may configure a set of preambles of/among/from the one or more first sets of preambles (or preamble partitions) for a (particular) Msg3 repetition request (e.g., K=2 repetitions or K=4 repetitions or K=8 repetitions). A set of preambles of/among/from the one or more first sets of preambles may correspond to a range of repetitions (e.g., repetitions between 2 and 4 or repetitions between 4 and 8). For example, a first set of preambles (e.g., with preamble indexes of 1-8) of the one or more first sets of preambles may be associated with 1-4 repetitions of the Msg3. The second set of preambles (e.g., with preamble indexes of 9-16) of the one or more first sets of preambles may be associated with 5-8 repetitions of the Msg3.

The wireless device may select the preamble from the second set of preambles, for example, based on the propagation delay of the service link being larger than the first NTN-specific threshold (or the length of the service link being larger than a second NTN-specific threshold of the at least one NTN-specific threshold or the elevation angle of the service link being smaller than a third NTN-specific threshold of the at least one NTN-specific threshold). The wireless device may select the preamble from the first set of preambles, for example, based on the propagation delay of the service link not being larger than the first NTN-specific threshold (or the length of the service link being smaller than the second NTN-specific threshold of the at least one NTN-specific threshold or the elevation angle of the service link being larger than the third NTN-specific threshold of the at least one NTN-specific threshold).

A set of preambles of the one or more first sets of preambles (or the preamble partitions) may correspond to a range/interval value of an attribute (e.g., the propagation delay, the length, and/or the elevation angle) of the service link. For example, a first set of preambles (e.g., with preamble indexes of 1-8) of the one or more first sets of preambles may be associated with 20-30 ms of the propagation delay (or 400-600 km of the length or 80-90 degrees of the elevation angle) of the service link. The second set of preambles (e.g., with preamble indexes of 9-16) of the one or more first sets of preambles may be associated with 30-50 ms of the propagation delay (or 600-1200 km of the length or 70-degrees of the elevation angle) of the service link. The wireless device may determine/select a preamble (e.g., a preamble index) associated with the set of preambles of/among/from the one or more first sets of preambles (or preamble partitions), for example, based on the location information of the NTN node (e.g., the one or more attributes of the service link). The wireless device may select the preamble from the second set of preambles, for example, based on the propagation delay of the service link being 45 ms (or the length of the service link being 800 km of the length or the elevation angle of the service link being 77 degrees). The wireless device may select the preamble from the second set of preambles, for example, based on the propagation delay of the service link being 45 ms (or the length of the service link being 800 km of the length or the elevation angle of the service link being 77 degrees).

The wireless device may determine a repetition number (e.g., K), for example, based on the propagation delay of the service link being in a range/interval of propagation delay of the service link (or the length of the service link being a range/interval of the length of the service link or the elevation angle of the service link being in a range/interval of the elevation angle of the service link). The repetition number may correspond to the range/interval of propagation delay of the service link (or the range/interval of the length of the service link or the range/interval of the elevation angle of the service link).

As shown in FIG. 20, the wireless device may, using (or based on) the (selected) set of RA resources/variables/parameters (e.g., the one or more RA resources), transmit a first message (e.g., the preamble or the MsgA). For example, by sending (e.g., transmitting) the first message (e.g., the preamble), the wireless device may request (e.g., from the base station) the Msg3 repetition or K repetitions of Msg3 (e.g., request from the base station an UL grant for sending (e.g., transmitting) the Msg3 with repetition).

The wireless device may transmit the first message with a number of repetitions (e.g., N repetitions), for example, based on (e.g., in response to) the first set of rules being satisfied. The number of repetitions of the first message may be different than the number of repetitions of Msg3 (e.g., K). The number of repetitions of the first message may be equal to the number of repetitions of Msg3. The number of repetitions of Msg3 (e.g., K) may be based on the number of repetitions of the first message. For example, the wireless device may use the selected set of RA resources/variables/parameters for sending (e.g., transmitting) each repetition of the first message among/from the N repetitions of the first message. The wireless device may maintain one or more counters (e.g., a preamble transmission counter and/or a preamble power transmission counter) across the number of repetitions of the first message. For example, the wireless device may increment the preamble transmission counter and/or the preamble power transmission counter based on each transmission (among the number of N repetitions) of the first message.

The wireless device may start an RAR window (e.g., ra-Response Window or msgB-Response Window), for example, after a delaying offset from a transmission occasion (e.g., the RO occasion corresponding to the preamble or the MsgA PUSCH occasion corresponding to the preamble) of the first message (e.g., a last/final/ending/latest symbol of the transmission occasion of the first message), for example, based on (e.g., in response to) sending (e.g., transmitting) the first message (e.g., the preamble). For example, if the first message is sent (e.g., transmitted) with Nrepetitions, based on (e.g., in response to) sending (e.g., transmitting) the first message, the wireless device may start the RAR window (e.g., ra-ResponseWindow or msgB-ResponseWindow), for example, after the delaying offset from a transmission occasion (e.g., the RO occasion corresponding to the preamble or the MsgA PUSCH occasion corresponding to the preamble) of the first message (e.g., a last/final/ending/latest symbol of a last/final/ending/latest transmission occasion of the first message or a last/final/ending/latest symbol of a first/staring/initial transmission occasion of the first message). The delaying offset may be based on a propagation delay between the wireless device and the base station (e.g., the UE-gNB RTT or the RTD). The one or more configuration parameters (e.g., the one or more NTN configuration parameters) may indicate/configure the delaying offset (e.g., the delaying offset may be based on the cell/beam-specific timing offset).

The wireless device may start the RAR window (e.g., the ra-ResponseWindow or the msgB-ResponseWindow) at a first/earliest/starting downlink control channel occasion after the delaying offset from/after an end (e.g., a last/final/ending/latest symbol) of the transmission occasion of the first message. The wireless device may start the RAR window based on a first/initial/starting/earliest (DL) symbol of a control resource set (CORESET) for receiving PDCCH for the Type1-PDCCH CSS set. The wireless device may, for example, while the RAR window is running, monitor PDCCH (e.g., the one or more PDCCH candidates) for an RAR identified by the RA-RNTI (for the four-step RA procedure) or the MSGB-RNTI (for the two-step RA procedure) and/or a C-RNTI. The wireless device may monitor the one or more PDCCH candidates based on (or using or via) a Type 1-PDCCH common search space (CSS) set (e.g., indicated by ra-searchSpace in the one or more configuration parameters, for example, PDCCH-ConfigCommon), a Type3-PDCCH CSS set (e.g., indicated by SearchSpace in the one or more configuration parameters, for example, PDCCH-Config with searchSpaceType=common), and/or an USS set (e.g., indicated by SearchSpace in the one or more configuration parameters, for example, PDCCH-Config with searchSpaceType=ue-Specific). For example, the wireless device may monitor the one or more PDCCH candidates for the first PDCCH transmission on the search space indicated by recoverySearchSpaceId of the SpCell.

The wireless device may monitor the one or more PDCCH candidates for receiving a DCI (e.g., via a PDCCH portion of the Msg2/MsgB) indicating/scheduling a downlink assignment (e.g., a PDSCH portion of the Msg2/MsgB) for receiving a transport block (TB), for example, while/during the RAR window (e.g., ra-Response Window or msgB-Response Window) is running. TB may comprise a MAC PDU. The MAC PDU may comprise one or more MAC subPDUs (and/or optionally padding). A MAC sub-PDU, of the one or more MAC subPDUs, may comprise at least one of following: a MAC subheader with Backoff Indicator (BI) only; a MAC subheader with Random Access Preamble identifier (RAPID) only (e.g., acknowledgment for an SI request); a MAC subheader with the RAPID and a MAC RAR (e.g., an RAR or a fallback RAR). The MAC PDU may comprise one or more (MAC) RARs.

An RAR (of/from/among the one or more RARs) may be fixed size and may comprise at least one of the following fields: an R field that may indicate a Reserved bit, a Timing Advance Command (TAC) MAC CE field, an UL grant (or an UL grant field), and/or an RNTI field (e.g., the TC-RNTI and/or the C-RNTI) that may indicate an identity that is used/employed, for example, during the RA procedure. For the two-step RA procedure, the MAC PDU may comprise a MAC subheader for fallbackRAR (e.g., the MAC subPDU may be a fallbackRAR MAC subPDU).

The wireless device may receive the DCI scheduling the RAR. The wireless device may determine (or indicate or identify) a reception of the RAR (e.g., for or, for example, based on (e.g., in response to) the first message or the preamble) being successful. For example, the wireless device may consider the reception of the RAR successful based on the RAR comprising the MAC PDU with the RAPID corresponding (or matching) to the preamble with the preamble index PREAMBLE_INDEX. As shown in FIG. 20, the RAR may indicate the UL grant (RAR UL grant or a fallbackRAR UL grant) for transmission of the Msg3 (e.g., a PUSCH transmission corresponding to the Msg3). The wireless device may process the RAR UL grant (or the fallbackRAR UL grant) and indicate it to the lower layers (e.g., the physical layer) for transmission of the Msg3 using/based on the RAR UL grant (or the fallbackRAR UL grant). For determining the repetitions K (or $$N_{PUSCH}^{repeat})$$

of the Msg3 (e.g., a number of slots for the PUSCH transmission of a PUSCH repetition Type A scheduled by the RAR UL grant or the fallbackRAR UL grant), the wireless device may determine a codepoint, for example, based on the 2 MSBs of the MCS information field of the RAR UL grant (or the fallbackRAR UL grant). The first RACH configuration parameters (e.g., RACH-ConfigCommon) and/or the second RACH configuration parameters may indicate/configure (e.g., via numberOfMsg3Repetitions field) a set of numbers of repetitions for the PUSCH transmission of the Msg3 (e.g., with the PUSCH repetition Type A).

The one or more configuration parameters may indicate/configure numberOfMsg3Repetitions. The codepoint may indicate a value/number from the numberOfMsg3Repetitions (e.g., the codepoint '00' may indicate the first value of numberOfMsg3Repetitions for K, and the codepoint '01' may indicate a second value of numberOfMsg3Repetitions for K, the codepoint '10' may indicate a third value of numberOfMsg3Repetitions for K, and the codepoint '11' may indicate a fourth (or last) value of numberOfMsg3Repetitions for K).

The wireless device may determine the repetitions K (or $$N_{PUSCH}^{repeat})$$

of the Msg3 from a preconfigured set, for example, {1, 2, 3, 4}, for example, if the numberOfMsg3Repetitions is absent from the one or more configuration parameters (e.g., RACH-ConfigCommon IE). The one or more configuration parameters may not indicate numberOfMsg3Repetitions. The codepoint may indicate the repetitions K of the Msg3. For example, the codepoint '00' may indicate K=1, the codepoint '01' may indicate K=2, the codepoint '10' may indicate K=3, and the codepoint '11' may indicate K=4.

The wireless device may transmit the Msg3 based on the deltaPreamble (e.g., the power offset between the Msg3 and the preamble transmission) that is indicated by the set of the RA resources/parameters/variables (e.g., a feature combination preamble of the first plurality of RA resources/parameters or the one or more RA-partition/feature resources). For example, the wireless device may determine the transmission power of the Msg3 based on the deltaPreamble.

The wireless device may determine the transmission occasion (e.g., a slot) of a first/starting/initial repetition of the Msg3 (with respect to a reception time of the RAR in FIG. 20) based on the PUSCH time resource allocation field value m of the RAR UL grant or of the fallbackRAR UL grant. For example, the PUSCH time resource allocation field value m of the RAR UL grant or of the fallbackRAR UL grant may indicate a row index m+1 to a time domain resource allocation (TDRA) table. For example, the wireless device may, based on the TDRA table, determine a slot offset $K_2$, a start and length indicator SLIV (or directly a start symbol S in the slot and an allocation length L in number of symbols), a number of slots used for transport block size (TBS) determination (e.g., if numberOfSlotsTBoMS is present in the TDRA table). The transmission occasion of the first/starting/initial repetition of the Msg3 may further depend on one or more numerologies, the cell-specific timing offset (e.g., CellSpectfic_Koffset) that is provided/indicated by the one or more configuration parameters, and/or the TA of a TAG.

The wireless device may allocate a same symbol allocation across K>1 repetitions of the PUSCH transmission of the PUSCH repetition Type A (corresponding to the Msg3 transmission). The wireless device may, by using/applying the same symbol allocation in each slot of the K slots, repeat a transport block (TB) across the K slots determined for the PUSCH transmission of the Msg3.

As shown in FIG. 20, the wireless device may transmit the Msg3 with the repetitions K. For example, the wireless device may transmit the PUSCH of the Msg3 over K (or $$N_{PUSCH}^{repeat})$$

slots.

The wireless device may, for example, based on (e.g., in response to) the transmission of each repetition of the Msg3 from/among the K repetitions of the Msg3, start/restart a contention resolution timer (e.g., ra-ContentionResolution-Timer). For example, the wireless device may start/restart the contention resolution timer at a last/final/ending symbol of each repetition of the Msg3 (from/among the K repetitions of the Msg3) plus the UE-gNB RTT.

Some examples may allow the wireless device to determine whether the wireless device is eligible for the Msg3 repetition or not, for example, using the location information of the NTN node (e.g., the one or more attributes of the service link), if the wireless device and the base station are operating in an NTN. Some examples may allow the wireless device to determine whether the wireless device is eligible for the Msg3 repetition or not if a variation of the RSRP of the DL-PL reference across the cell/beam is constrained (e.g., there is no clear near-far effect). Some examples may allow the wireless device to determine the one or more RA resources (e.g., for performing the RA procedure) based on the location of the NTN node (e.g., the one or more attributes of the service link and/or the one or more NTN-specific values).

Figure 21:
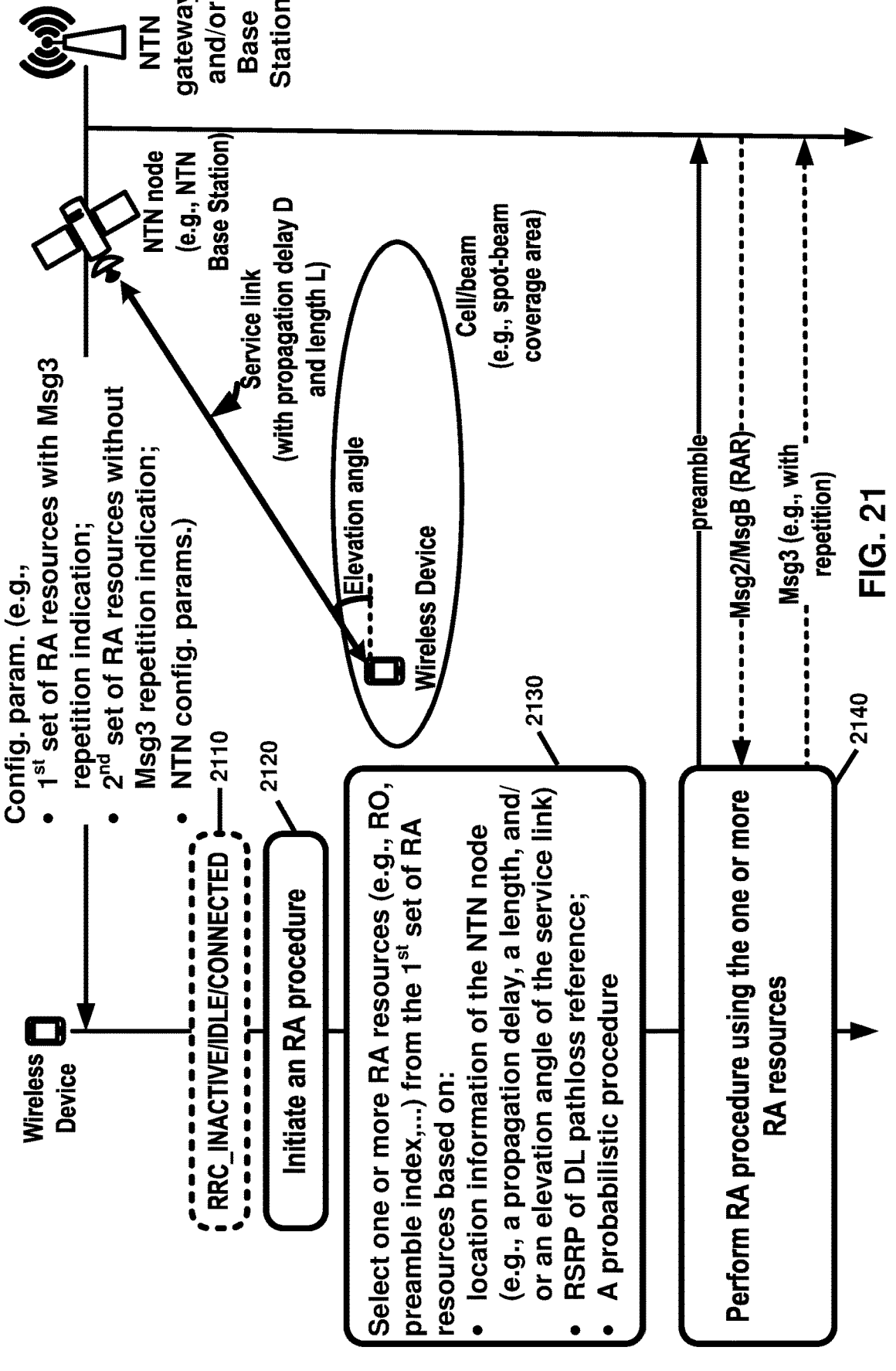
FIG. 21 shows an example of an RA procedure in wireless communications systems.

FIG. 21 shows an example of an RA procedure in wireless communications systems. FIG. 21 may, for example, show an implementation of a method (or a process) for the RA procedure at a base station and/or a wireless device. The base station may communicate with the wireless device via/using a cell (e.g., a serving cell). For example, as shown in step 2110, the wireless device may be in an RRC_IDLE (or an RRC idle) state/mode, an RRC_INACTIVE (or an RRC inactive) state/mode, or an RRC_CONNECTED (or an RRC connected) state/mode. The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

As shown in FIG. 21, the wireless device may receive the one or more configuration parameters (e.g., the one or more RA configuration parameters and/or the one or more NTN configuration parameters, for example, one or more NTN-specific configuration parameters) from the base station. As shown in FIG. 21, in step 2120, the wireless device may trigger/initiate an RA procedure.

The wireless device may, for example, based on the one or more NTN configuration parameters, determine/measure/maintain the location information of the NTN node/payload and/or the one or more NTN-specific parameters/values. The one or more NTN-specific values may correspond to the one or more attributes (or features or characteristics or measures or aspects) of a communication link between the wireless device and the base station, for example, the service link (e.g., the communication link between the wireless device and the NTN payload). For example, using the one or more NTN-specific parameters/values (or the location information of the NTN payload), the wireless device may determine the one or more attributes of the service link. The one or more attributes of the service link may comprise at least one of: the propagation delay of the service link, the length of the service link, and/or the elevation angle of the service link.

As shown in FIG. 21, in step 2130, the wireless device may, for the triggered/initiated RA procedure, determine/select the one or more RA resources for performing the RA procedure (e.g., sending (e.g., transmitting) the first message, for example, the preamble). For example, the wireless device may, to select/determine the one or more RA resources, determine whether the Msg3 repetition is applicable based on at least one of the following: the one or more NTN-specific configuration parameters (or the one or more NTN-specific parameters/values and/or the one or more attributed of the service link and/or the location of the NTN node); and/or a second set of rules being satisfied or not; and/or a probabilistic procedure. For example, the wireless devices may, based on the one or more NTN-specific configuration parameters (or the one or more NTN-specific parameters/values and/or the one or more attributes of the service link and/or the location of the NTN node) determine whether the first set of rules being satisfied or not. The second set of rules may be based on the RSRP of the DL-PL reference.

The wireless device may determine the Msg3 repetition being applicable for the RA procedure based on the RSRP of the DL-PL reference being smaller than the RSRP threshold (e.g., the second set of rules being satisfied) and the first set of rules being satisfied. The wireless device may determine the Msg3 repetition not being applicable for the RA procedure based on the RSRP of the DL-PL reference being smaller than the RSRP threshold and the first set of rules not being satisfied. The wireless device may determine the Msg3 repetition being applicable based on the RSRP of the DL-PL reference being larger than the RSRP threshold (e.g., the second set of rules not being satisfied) and first set of rules being satisfied. The wireless device may determine the Msg3 repetition being applicable based on the RSRP of the DL-PL reference being larger than the RSRP threshold and first set of rules not being satisfied. The wireless device may determine the Msg3 repetition being applicable based on at least one of the second set of rules being satisfied or the first set of rules being satisfied.

The wireless device may determine the Msg3 repetition being applicable for the RA procedure based on at least one of the following: the first set of rules being satisfied; and/or the second set of rules being satisfied; and/or a third set of rules being satisfied. For example, as shown in FIG. 21, the third set of rules may be based on a probabilistic (or a randomized) procedure/method/function. For example, the probabilistic (or a randomized) procedure may comprise generating one or more random numbers. For example, the wireless device may determine the third set of rules being satisfied based on a first/initial random number of the one or more random numbers being larger than a first threshold (e.g., a fourth NTN-specific threshold of/among/from the at least one NTN-specific threshold). The wireless device may determine the first threshold based on the RSRP threshold and the RSRP of the DL-PL reference (e.g., as a ratio of the RSRP of the DL-PL reference and the RSRP threshold). The wireless device may determine the first threshold based on an NTN-specific threshold (e.g., the first/second/third NTN-specific threshold) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like.

The wireless device may determine the third set of rules being satisfied based on a second random number of the one or more random numbers being smaller than a second threshold (e.g., a fifth NTN-specific threshold of/among/from the at least one NTN-specific threshold). The wireless device may determine the second threshold based on the RSRP threshold and the RSRP of the DL-PL reference (e.g., as a ratio of the RSRP threshold and the RSRP of the DL-PL reference, for example, the inverse value of the first threshold). The wireless device may determine the second threshold based on a NTN-specific threshold (e.g., the first/second/third NTN-specific threshold) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise a first configuration parameter. The first configuration parameter may, for example, indicate whether the wireless device use/adopt the one or more NTN-specific configuration parameters (e.g., the location of the NTN node) to determine the Msg3 repetition being applicable for the RA procedure. For example, based on (e.g., in response to) determining the first configuration parameter being indicated/configured (or being enabled or not being disabled or not being absent from the one or more configuration parameters) the wireless device may determine whether the Msg3 repetition is applicable for the RA procedure based on the one or more NTN-specific configuration parameters (e.g., the first set of rules being satisfied). For example, based on (e.g., in response to) determining the first configuration parameter not being indicated/configured (or being disabled or being absent from the one or more configuration parameters) the wireless device may determine whether the Msg3 repetition is applicable for the RA procedure based on the second set of rules being satisfied.

The wireless device may determine whether the Msg3 repetition is applicable for the RA procedure based on the one or more NTN-specific configuration parameters (e.g., the first set of rules being satisfied) and the second set of rules being satisfied, for example, based on (e.g., in response to) determining the first configuration parameter being indicated/configured (or being enabled or not being disabled or not being absent from the one or more configuration parameters). The wireless device may determine whether the Msg3 repetition is applicable for the RA procedure based on the second set of rules being satisfied, for example, based on (e.g., in response to) determining the first configuration parameter not being indicated/configured (or being disabled or being absent from the one or more configuration parameters).

The one or more configuration parameters may comprise a second configuration parameter. The second configuration parameter may, for example, indicate whether the wireless device use/adopt the probabilistic procedure (e.g., the third set of rules) to determine the Msg3 repetition being applicable for the RA procedure. The wireless device may determine whether the Msg3 repetition is applicable for the RA procedure based on the third set of rules being satisfied, for example, based on (e.g., in response to) determining the second configuration parameter being indicated/configured (or being enabled or not being disabled or not being absent from the one or more configuration parameters). The wireless device may determine whether the Msg3 repetition is applicable for the RA procedure based on the second set of rules being satisfied, for example, based on (e.g., in response to) determining the third configuration parameter not being indicated/configured (or being disabled or being absent from the one or more configuration parameters).

The wireless device may determine whether the Msg3 repetition is applicable for the RA procedure based on the third set of rules being satisfied and the second set of rules being satisfied, for example, based on (e.g., in response to) determining the second configuration parameter being indicated/configured (or being enabled or not being disabled or not being absent from the one or more configuration parameters). The wireless device may determine whether the Msg3 repetition is applicable for the RA procedure based on the second set of rules being satisfied, for example, based on (e.g., in response to) determining the second configuration parameter not being indicated/configured (or being disabled or being absent from the one or more configuration parameters).

As shown in FIG. 21, in step 2140, the wireless device may perform the RA procedure (e.g., with accordance to above discussion corresponding to FIG. 20) by performing the one or more BWP operation, initializing one or more RA variables/parameters, selecting the one or more RA resources/variables/parameters (e.g., the one or more RA-partition/feature resources), and/or sending (e.g., transmitting) the first message via/using the one or more RA resources/variables/parameters, and/or receiving the RAR, and/or sending (e.g., transmitting) the Msg3 via/using the repetition K, for example, based on (e.g., in response to) determining the Msg3 repetition being applicable. Some examples may allow robust performance of the RA procedure (e.g., by maintaining almost a robust RA load, for example, the number of wireless devices in the cell/beam that become eligible for the Msg3 repetition) irrespective of the movement of the NTN payload.

Figure 22:
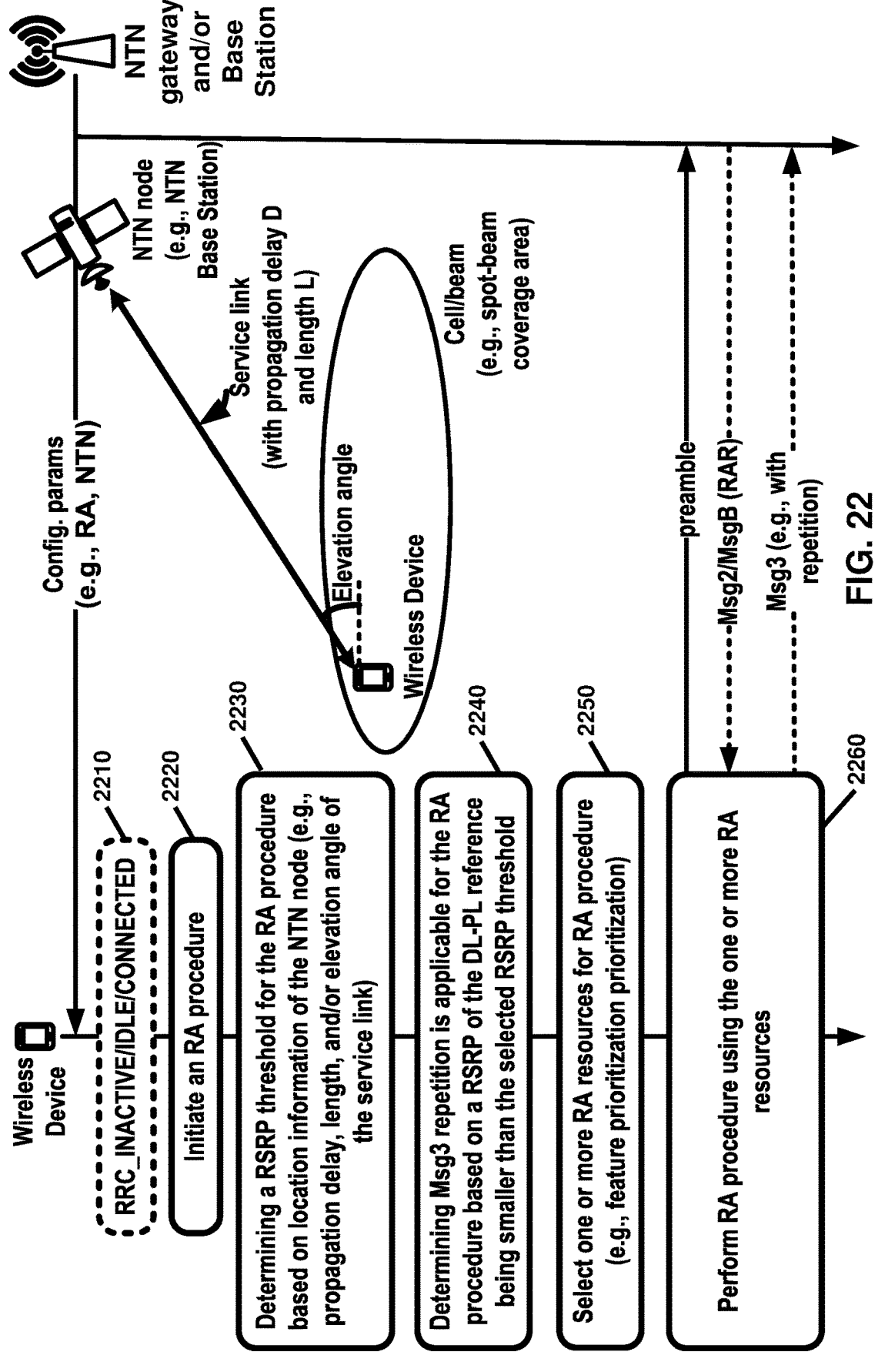
FIG. 22 shows an example of an RA procedure in wireless communications systems.

FIG. 22 shows an example of an RA procedure in wireless communications systems. FIG. 22 may, for example, show an implementation of a method (or a process) for the RA procedure at a base station and/or a wireless device. The base station may communicate with the wireless device via/using a cell (e.g., a serving cell). For example, as shown in step 2210, the wireless device may be in an RRC_IDLE (or an RRC idle) state/mode, an RRC_INACTIVE (or an RRC inactive) state/mode, or an RRC_CONNECTED (or an RRC connected) state/mode. The wireless device may, for example, communicate with the base station via a non-terrestrial network (NTN). For example, the wireless device and the base station may operate in the NTN and/or the base station may be an NTN base station and/or the cell may be part of the NTN. For example, the cell may be the serving cell. As shown in FIG. 22, the wireless device may receive the one or more configuration parameters (e.g., the one or more RA configuration parameters and/or the one or more NTN configuration parameters, for example, one or more NTN-specific configuration parameters) from the base station. For example, in step 2220, the wireless device may trigger/initiate an RA procedure.

The wireless device may, for example, based on the one or more NTN configuration parameters, determine/measure/maintain the one or more NTN-specific parameters/values. The one or more NTN-specific values may correspond to one or more attributes (or features or characteristics or measures or aspects) of a communication link between the wireless device and the base station, for example, the service link (e.g., the communication link between the wireless device and the NTN payload). For example, using the one or more NTN-specific parameters/values, the wireless device may determine the one or more attributes of the service link and/or the location of the NTN node. The one or more attributes of the service link may comprise at least one of: the propagation delay of the service link, the length of the service link, and/or the elevation angle of the service link.

As shown in FIG. 22, the base station may configure the wireless device with a plurality of RSRP thresholds, for example, via the one or more configuration parameters (e.g., a plurality of rsrp-ThresholdMsg3 values). The one or more configuration parameters messages may indicate that the plurality of RSRP thresholds are configured for a particular type of the NTN payload (a GEO satellite, a MEO satellite, a LEO satellite) and/or a particular type of the cell/beam (e.g., Earth-fixed beam/cell). For example, if the NTN payload is moving, each RSRP threshold among/of/from the plurality of RSRP thresholds may correspond to a relevant location of the NTN payload to the cell/beam (or the wireless device). Each RSRP threshold among/of/from the plurality of RSRP thresholds may correspond to a range/ interval of the elevation angle of the service link. Each RSRP threshold among/of/from the plurality of RSRP thresholds may correspond to a range of propagation delays of the service link. Each RSRP threshold among/of/from the plurality of RSRP thresholds may correspond to a range/ interval of lengths of the service link.

The plurality of RSRP thresholds may be associated with one or more feature combination preambles. One or more feature combination preambles may correspond to the Cov-Enh feature, for example, each feature combination pre-amble of the one or more feature combination preambles comprise the Msg3 repetition indication (e.g., a CovEnh feature indication).

A feature specific parameter (e.g., featureSpecificParam-eters) field of a feature combination preamble (e.g., of/among the one or more feature combination preambles) may comprise the plurality of rsrp-ThresholdMsg3 values. For example, the one or more configuration parameters may configure the feature combination preamble with the plural-ity of RSRP thresholds.

The one or more configuration parameters may configure the one or more (e.g., all or a subset) the feature combination preambles with the plurality of RSRP thresholds. Each feature combination preamble of the one or more feature combination preambles may comprise a feature specific parameter indicating the plurality of RSRP thresholds.

The plurality of RSRP thresholds may comprise one or more sets of plurality of RSRP thresholds. Each set of plurality of RSRP thresholds of the one or more sets of plurality of RSRP thresholds may correspond (or be asso-ciated with) a feature combination preamble via a feature specific parameter (e.g., featureSpecificParameters) field of the feature combination preamble (e.g., of/among the one or more feature combination preambles).

As shown in FIG. 22, in step 2230, the wireless device may select an RSRP threshold among/of/from the plurality of RSRP thresholds (e.g., the one or more sets of plurality of RSRP thresholds). For example, based on the one or more NTN-specific configuration parameters (e.g., the one or more NTN-specific parameters/values) and/or the location of the NTN payload and/or the one or more attributes of the service link, the wireless device may select the RSRP threshold among/of/from plurality of RSRP thresholds (e.g., the one or more sets of plurality of RSRP thresholds).

The wireless device may select the RSRP threshold (e.g., a first/initial or a last/final or an n-th RSRP threshold) among/of/from the plurality of RSRP thresholds (e.g., from the set of plurality of RSRP thresholds) based on the location information of the NTN node (e.g., the one or more attri-butes of the service link). For example, the one or more configuration parameters may configure one or more ranges/ intervals of an attribute of the service link (e.g., the propa-gation delay, the length, or the elevation angle) for deter-mining which value of the RSRP threshold among/of/from the set of RSRP thresholds is applicable for the RA proce-dure. The wireless device may select the n-th RSRP thresh-old among/of/from plurality of RSRP thresholds, for example, based on the attribute of the service link (e.g., the propagation delay, the length, or the elevation angle) being in the n-th (n=0, 1, . . . , N) range/interval of the one or more ranges/intervals of an attribute of the service link.

The one or more configuration parameters may comprise a RSRP threshold (e.g., rsrp-ThresholdMsg3). For example, the wireless device may, based on the one or more NTN-specific values/parameters (e.g., the one or more attributes of the service link and/or the location of the NTN node) and the RSRP threshold, determine/calculate a second RSRP thresh-old for determining whether the Msg3 repetition is appli-cable for the RA procedure or not (e.g., using/based on the second set of rules being satisfied or not and/or the proba-bilistic procedure). For example, the wireless device may increase/decrease the RSRP threshold by a factor to calcu-late the second RSRP threshold. The factor may be calcu-lated (e.g., by a predefined formula) based on the location information of the NTN node (e.g., the one or more attri-butes of the service link). For example, the factor my increase by increasing the length (or the propagation delay) of the service link and/or by decreasing the elevation angle of the service link, for example, by the movement of the NTN node and/or the wireless device (e.g., the factor may reflect a change in the attribute of the service link and/or the location of the NTN node).

The wireless device may, for the triggered/initiated RA procedure, determine whether the Msg3 repetition is appli-cable based on the one or more NTN-specific configuration parameters (e.g., whether the first set of rules being satisfied or not) and/or whether the second set of rules being satisfied or not and/or whether the third set of rules being satisfied or not. For example, as shown in step 2240, the wireless device may determine whether the second set of rules being satis-fied or not based on the RSRP of the DL-PL reference and the plurality of RSRP thresholds. The wireless device may determine the RSRP of the DL-PL reference is smaller than the (selected) RSRP threshold of/among/from the plurality of RSRP thresholds. The wireless device may determine the second set of rules being satisfied based on the RSRP of the DL-PL reference being smaller than the selected RSRP threshold among/of/from plurality of RSRP thresholds. The wireless device may determine the second set of rules not being satisfied based on the RSRP of the DL-PL reference being larger than the selected RSRP threshold among/of/ from plurality of RSRP thresholds.

The wireless device may perform the RA procedure (e.g., based on the above discussion corresponding to FIG. 20 and/or FIG. 21), as shown in step 2260. For example, the wireless device may transmit the first message (e.g., using the one or more RA resources, as selected in step 2250) and monitor the PDCCH for receiving the RAR, for example, based on (e.g., in response to) determining the Msg3 rep-etition being applicable. For example, the RAR may indicate the transmission of the Msg3, for example, with the repeti-tions K.

Examples may allow the wireless device to properly determine the RSRP threshold (e.g., for determining whether the Msg3 repetition is applicable for the RA procedure or not), for example, if the NTN payload is moving. Some examples may allow a robust performance of the Msg3 repetition despite the movement of the NTN payload.

Figure 23:
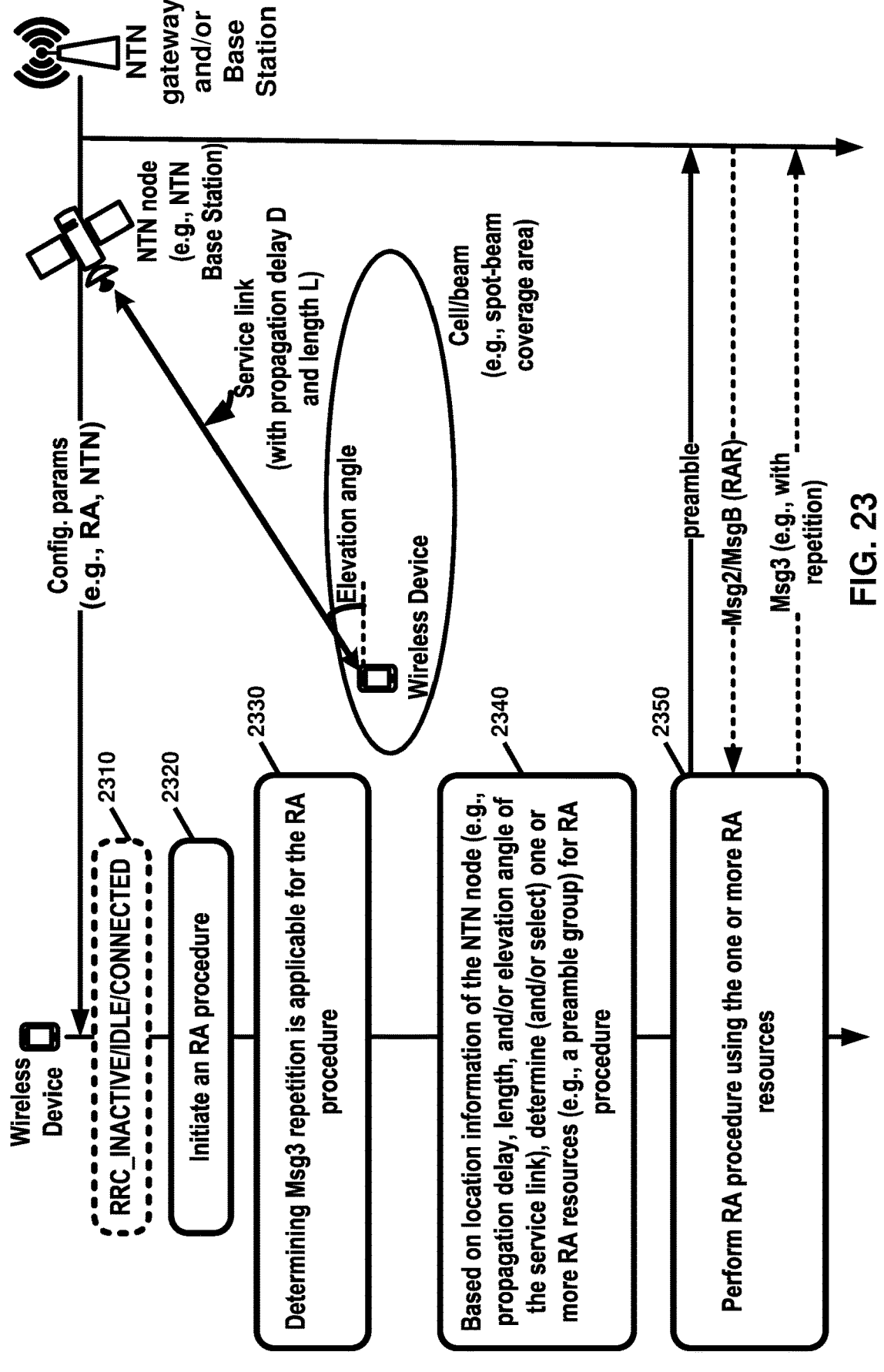
FIG. 23 shows an example of an RA procedure in wireless communications systems.

FIG. 23 shows an example of an RA procedure in wireless communications systems. FIG. 23 may, for example, show an implementation of a method (or a process) for the RA procedure at a base station and/or a wireless device. The base station may communicate with the wireless device via/using a cell (e.g., a serving cell). For example, as shown in step 2310, the wireless device may be in an RRC_IDLE (or an RRC idle) state/mode, an RRC_INACTIVE (or an RRC inactive) state/mode, or an RRC_CONNECTED (or an RRC connected) state/mode. The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell. As shown in FIG. 23, the wireless device may receive the one or more configuration parameters (e.g., the one or more RA configuration parameters and/or the one or more NTN configuration parameters, for example, one or more NTN-specific configuration parameters) from the base station. For example, in step 2320, the wireless device may trigger/initiate an RA procedure.

The wireless device may, for example, based on the one or more NTN configuration parameters, determine/measure/maintain the one or more NTN-specific parameters/values. The one or more NTN-specific values may correspond to one or more attributes (or features or characteristics or measures or aspects) of a communication link between the wireless device and the base station, for example, the service link (e.g., the communication link between the wireless device and the NTN payload). For example, using the one or more NTN-specific parameters/values, the wireless device may determine the one or more attributes of the service link. The one or more attributes of the service link may comprise at least one of: the propagation delay of the service link, the length of the service link, and/or the elevation angle of the service link.

As shown in FIG. 23, in step 2330, the wireless device may determine that the Msg3 repetition being applicable for the triggered/initiated RA procedure. For example, according to above discussions corresponding to FIGS. 20-22, the wireless device may determine the Msg3 repetition being applicable for the RA procedure based on at least one of the following being satisfied: the first set of rules being satisfied (e.g., the one or more NTN-specific values/parameters); and/or the second set of rules being satisfied; and/or the probabilistic procedure (e.g., the second set of rules being satisfied).

The wireless device may, based on the location information of the NTN node (and/or the at least one attributes of the service link), determine a preamble group, as shown in step 2340. For example, the wireless device may determine whether the preamble group is a preamble group A (e.g., Random Access Preambles group A) or a preamble group B (e.g., Random Access Preambles group B). For example, the wireless device may select the preamble from one or more preambles of the preamble group. The one or more preambles of the preamble group. may comprise contention-based preambles of the preamble group.

The one or more configuration parameters may comprise a ra-SizeGroupA value/threshold. For example, the ra-SizeGroupA value/threshold may indicate a Transport Blocks size (TBS) threshold (in bits). The wireless device may select the preamble from a contention-based preambles of Group A for performing the RA procedure (e.g., sending (e.g., transmitting) the preamble) based on a size of Msg3 (in bits) being smaller than the ra-SizeGroupA value/threshold. The wireless device may, based on the one or more NTN-specific values/parameters (e.g., the one or more attributes of the service link and/or the location of the NTN node) and the ra-SizeGroupA value/threshold, determine/calculate a second TBS (e.g., a second ra-SizeGroupA) in bits value for performing the RA procedure (e.g., with the Msg3 repetitions). For example, the wireless device may increase/decrease the ra-SizeGroupA threshold by a factor (or a delta value) to calculate the second TBS (e.g., a second ra-SizeGroupA) value. The factor may be calculated (e.g., by a formula) from the location information of the NTN node (e.g., the one or more attributes of the service link). For example, the delta value may be preconfigured (e.g., via the one or more configuration parameters). To determine the second TBS (e.g., a second ra-SizeGroupA) value, the wireless device may increase/decrease the ra-SizeGroupA threshold by the factor based of whether an attribute (e.g., the propagation delay/length/elevation angle) of the service link is increasing or decreasing by the movement of the NTN node and/or the wireless device (e.g., the factor may reflect a change in the attribute of the service link and/or the location of the NTN node).

The one or more configuration parameters may comprise a messagePowerOffsetGroupB value/threshold for preamble selection (e.g., the power offset for preamble selection included in groupBconfigured). The wireless device may, based on the one or more NTN-specific values/parameters (e.g., the one or more attributes of the service link) and the value/threshold, determine/calculate a second power offset (e.g., a second messagePowerOffsetGroupB) value for performing the RA procedure (e.g., with the repetition K). For example, the wireless device may increase/decrease the messagePowerOffsetGroupB threshold by a factor (or a delta value) to calculate the second power offset (e.g., a second messagePowerOffsetGroupB) value. The factor may be calculated (e.g., by a formula) from the location information of the NTN node (e.g., the one or more attributes of the service link). For example, the delta value may be preconfigured (e.g., via the one or more configuration parameters). To determine the second power offset (e.g., a second messagePowerOffsetGroupB) value, the wireless device may increase/decrease the messagePowerOffsetGroupB threshold by the factor based of whether an attribute (e.g., the propagation delay/length/elevation angle) of the service link is increasing or decreasing by the movement of the NTN node and/or the wireless device (e.g., the factor may reflect a change in the attribute of the service link and/or the location of the NTN node).

The one or more configuration parameters may comprise a deltaPreamble value/threshold. The wireless device may, based on the one or more NTN-specific values/parameters (e.g., the one or more attributes of the service link) and the value/threshold, determine/calculate a second delta preamble (e.g., a second deltaPreamble) value for performing the RA procedure (e.g., with the repetition K). For example, the wireless device may increase/decrease the deltaPreamble threshold by a factor (or a delta value) to calculate the second delta preamble (e.g., a second deltaPreamble) value. The factor may be calculated (e.g., by a formula) from the location information of the NTN node (e.g., the one or more attributes of the service link). For example, the delta value may be preconfigured (e.g., via the one or more configuration parameters). To determine the second delta preamble (e.g., a second deltaPreamble) value, the wireless device may increase/decrease the deltaPreamble threshold by the factor based of whether an attribute (e.g., the propagation delay/length/elevation angle) of the service link is increasing or decreasing by the movement of the NTN node and/or the wireless device (e.g., the factor may reflect a change in the attribute of the service link and/or the location of the NTN node).

In step 2350, the wireless device may perform the RA procedure, for example, using the one or more RA resources (e.g., the second delta preamble, for example, deltaPreamble, the second power offset, for example, messagePowerOffsetGroupB, and/or the second TBS, for example, ra-SizeGroupA) and based on the discussions associated with FIGS. 20-22. The wireless device may select the preamble group (e.g., Random Access Preambles group A or Random Access Preambles group B) based on at least one of the second delta preamble value, the second power offset value, and/or the second TBS size. For example, the wireless device may determine whether a potential Msg3 size (UL data available for transmission plus MAC subheader(s) and MAC CEs) is greater or smaller than the second TBS. The wireless device may determine whether a pathloss is less than or greater than a value. For example, the wireless device may determine the value based on the second power offset and/or the second delta preamble.

The wireless device may select the preamble from a contention-based RA preamble of Group A based on a size of the Msg3 (in bits) being smaller than the second TBS, for example, for sending (e.g., transmitting) the preamble (e.g., performing the RA procedure). The wireless device may select a preamble Group A (e.g., a Random Access Preambles group A) or a preamble Group B (e.g., a Random Access Preambles group B) for selecting the preamble, for example, based on the second power offset (e.g., the second messagePowerOffsetGroupB) value. For example, the wireless device may transmit the first message (e.g., the preamble or the MsgA) and monitor the PDCCH for receiving the RAR. The wireless device may transmit the Msg3 with the repetitions K, for example, based on (e.g., in response to) the RAR.

The base station may configure the wireless device with a plurality of ra-SizeGroupA values (and/or a plurality of deltaPreamble values and/or a plurality of messagePowerOffsetGroupB values), for example, via the one or more configuration parameters. For example, the plurality of ra-SizeGroupA values (and/or the plurality of deltaPreamble values and/or the plurality of messagePowerOffsetGroupB values) may be associated with one or more feature combination preambles. One or more feature combination preambles may correspond to the CovEnh feature.

The one or more configuration parameters messages may indicate that the plurality of ra-SizeGroupA values (and/or a plurality of deltaPreamble values and/or a plurality of messagePowerOffsetGroupB values) are configured for a particular type of the NTN payload (a GEO satellite, a MEO satellite, a LEO satellite) and/or a particular type of the cell/beam (e.g., Earth-fixed beam/cell). For example, if the NTN payload is moving, each ra-SizeGroupA value among/of/from the plurality of ra-SizeGroupA values (and/or each deltaPreamble value among/of/from the plurality of deltaPreamble values and/or each messagePowerOffsetGroupB value among/of/from the plurality of messagePowerOffsetGroupB values) may correspond to a relevant location of the NTN payload to the cell/beam (or the wireless device). Each ra-SizeGroupA value among/of/from the plurality of ra-SizeGroupA values (and/or each deltaPreamble value among/of/from the plurality of deltaPreamble values and/or each messagePowerOffsetGroupB value among/of/from the plurality of messagePowerOffsetGroupB values) may correspond to a range of elevation angle of the service link. Each ra-SizeGroupA value among/of/from the plurality of ra-SizeGroupA values (and/or each deltaPreamble value among/of/from the plurality of deltaPreamble values and/or each messagePowerOffsetGroupB value among/of/from the plurality of messagePowerOffsetGroupB values) may correspond to a range of propagation delay of the service link.

Each ra-SizeGroupA value among/of/from the plurality of ra-SizeGroupA values (and/or each deltaPreamble value among/of/from the plurality of deltaPreamble values and/or each messagePowerOffsetGroupB value among/of/from the plurality of messagePowerOffsetGroupB values) may correspond to a range of length of the service link.

A feature specific parameter (e.g., featureSpecificParameters) field of a feature combination preamble (e.g., of/among the one or more feature combination preambles) may comprise the plurality of ra-SizeGroupA values (and/or the plurality of deltaPreamble values and/or the plurality of messagePowerOffsetGroupB values). For example, the one or more configuration parameters may configure the feature combination preamble with the plurality of ra-SizeGroupA values (and/or the plurality of deltaPreamble values and/or the plurality of messagePowerOffsetGroupB values).

The one or more configuration parameters may configure the one or more (e.g., all or a subset) the feature combination preambles with the plurality of ra-SizeGroupA values (and/or the plurality of deltaPreamble values and/or the plurality of messagePowerOffsetGroupB values). Each feature combination preamble of the one or more feature combination preambles may comprise a feature specific parameter indicating the plurality of ra-SizeGroupA values (and/or the plurality of deltaPreamble values and/or the plurality of messagePowerOffsetGroupB values).

The plurality of ra-SizeGroupA values may comprise one or more sets of ra-SizeGroupA values. Each set of plurality of ra-SizeGroupA values of the one or more sets of plurality of ra-SizeGroupA values may correspond (or be associated with) a feature combination preamble via a feature specific parameter (e.g., featureSpectficParameters) field of the feature combination preamble (e.g., of/among the one or more feature combination preambles).

The plurality of deltaPreamble values may comprise one or more sets of deltaPreamble values. Each set of plurality of deltaPreamble values of the one or more sets of plurality of deltaPreamble values may correspond (or be associated with) a feature combination preamble via a feature specific parameter (e.g., featureSpecificParameters) field of the feature combination preamble (e.g., of/among the one or more feature combination preambles).

The plurality of messagePowerOffsetGroupB values may comprise one or more sets of messagePowerOffsetGroupB values. Each set of plurality of messagePowerOffsetGroupB values of the one or more sets of plurality of messagePowerOffsetGroupB values may correspond (or be associated with) a feature combination preamble via a feature specific parameter (e.g., featureSpectficParameters) field of the feature combination preamble (e.g., of/among the one or more feature combination preambles).

As shown in FIG. 23, the wireless device may select one or more RA resources/parameters/values for performing the RA procedure based on the one or more NTN-specific configuration parameters (e.g., the one or more NTN-specific parameters/values). For example, by performing the feature prioritization procedure the wireless device may select the one or more RA resources/parameters/values (e.g., if the one or more RA resources/parameters/values are associated with more than one feature). The wireless device may perform the feature prioritization procedure.

The one or more RA resources/parameters/values may comprise at least one of: a first plurality of ra-SizeGroupA values, and/or a first plurality of deltaPreamble values, and/or a first plurality of messagePowerOffsetGroupB values. For example, the first plurality of ra-SizeGroupA values of the plurality of ra-SizeGroupA values may be associated to (or correspond to) a feature combination preamble corresponding to the one or more RA resources/parameters/values. The first plurality of messagePowerOffsetGroupB values of the plurality of messagePowerOffsetGroupB values may be associated to (or correspond to) the feature combination preamble corresponding to the one or more RA resources/parameters/values. The first plurality of deltaPreamble values of the plurality of deltaPreamble values may, for example, be associated to (or correspond to) the feature combination preamble corresponding to the one or more RA resources/parameters/values.

The wireless device may, for example, based on the one or more NTN-specific parameters/values (e.g., the one or more attributes of the service link delay (e.g., the propagation delay of the service link, the length of the service link, and/or the elevation angle of the service link), select at least one of the following: a ra-SizeGroupA value among/from/of the first plurality of ra-SizeGroupA values; and/or a messagePowerOffsetGroupB value among/from/of the first plurality of messagePowerOffsetGroupB values; and/or a deltaPreamble value among/from/of the first plurality of deltaPreamble values. For example, the one or more configuration parameters may configure one or more ranges/intervals of an attribute of the service link (e.g., the propagation delay, the length, or the elevation angle) for selecting/determining the ra-SizeGroupA value and/or the messagePowerOffsetGroupB value and/or the deltaPreamble value.

The wireless device may select the n-th the ra-SizeGroupA value among/of/from first plurality of ra-SizeGroupA values, for example, based on the attribute of the service link (e.g., the propagation delay, the length, or the elevation angle) being in the n-th (n=0, 1, . . . , N) range/interval of the one or more ranges/intervals of an attribute of the service link. The wireless device may select the n-th the messagePowerOffsetGroupB value among/of/from first plurality of messagePowerOffsetGroupB values, for example, based on the attribute of the service link (e.g., the propagation delay, the length, or the elevation angle) being in the n-th (n=0, . . . , N) range/interval of the one or more ranges/intervals of an attribute of the service link. The wireless device may select the n-th the deltaPreamble value among/of/from first plurality of deltaPreamble values, for example, based on the attribute of the service link (e.g., the propagation delay, the length, or the elevation angle) being in the n-th (n=0, . . . , N) range/interval of the one or more ranges/intervals of an attribute of the service link.

As shown in FIG. 23, the wireless device may, for example, using the one or more RA resources (e.g., the deltaPreamble, the messagePowerOffsetGroupB, and/or the ra-SizeGroupA) and based on the discussions associated with FIGS. 20-22, perform the RA procedure. For example, the wireless device may transmit the first message (e.g., the preamble or the MsgA) and monitor the PDCCH for receiving the RAR. The wireless device may transmit the Msg3 with the repetitions K, for example, based on (e.g., in response to) the RAR.

Examples may allow the wireless device to properly determine the one or more RA resources for performing the RA procedure, for example, if the NTN payload is moving. Some examples may allow a robust performance of the Msg3 repetition despite the movement of the NTN payload.

Figure 24:
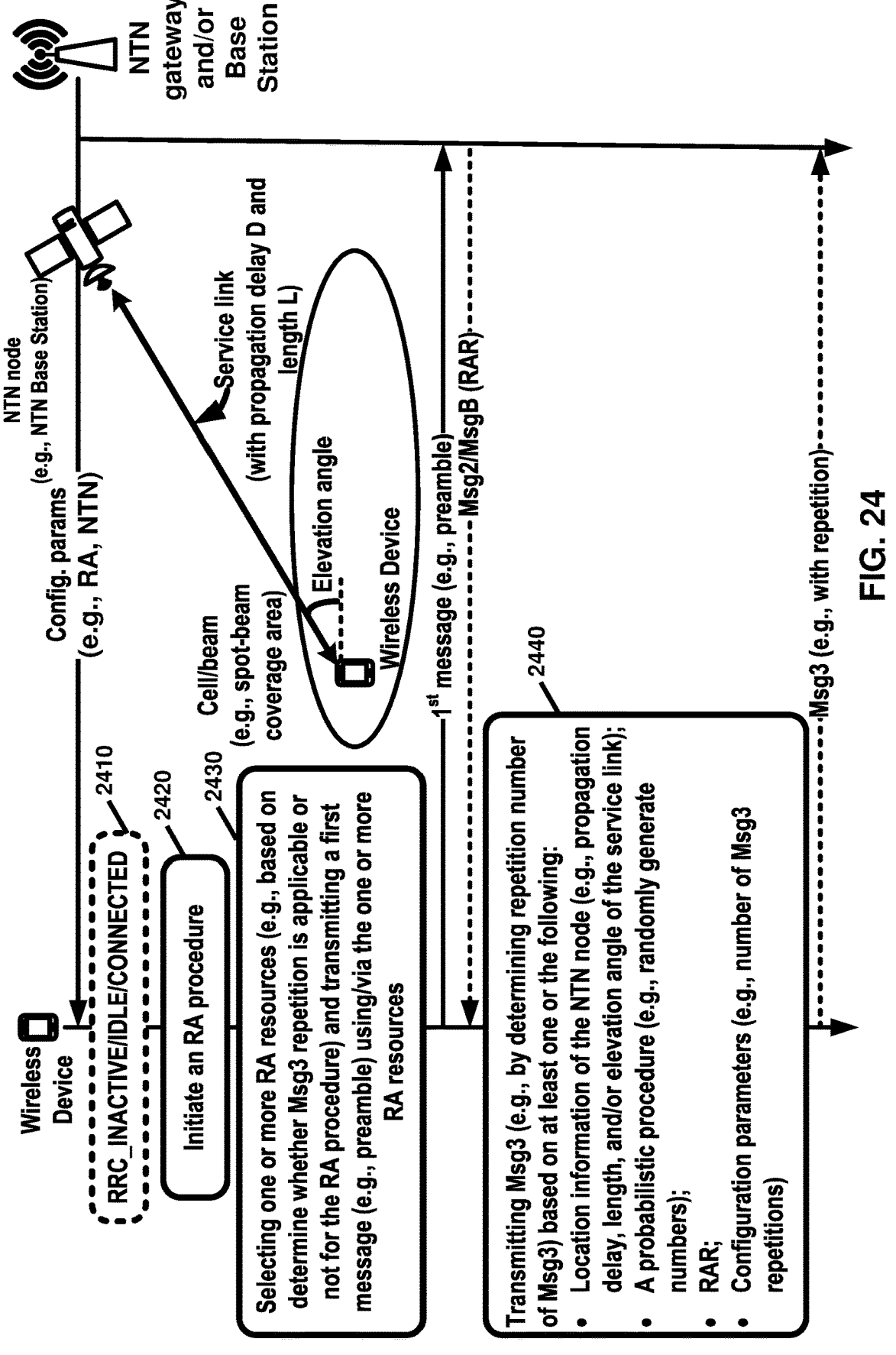
FIG. 24 shows an example of an RA procedure in wireless communications systems.

FIG. 24 shows an example of an RA procedure in wireless communications systems. FIG. 24 may, for example, show an implementation of a method (or a process) for the RA procedure at a base station and/or a wireless device. The base station may communicate with the wireless device via/using a cell (e.g., a serving cell). For example, as shown in step 2410, the wireless device may be in an RRC_IDLE (or an RRC idle) state/mode, an RRC_INACTIVE (or an RRC inactive) state/mode, or an RRC_CONNECTED (or an RRC connected) state/mode. The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell. As shown in FIG. 24, the wireless device may receive the one or more configuration parameters (e.g., the one or more RA configuration parameters and/or the one or more NTN configuration parameters) from the base station. For example, in step 2420, the wireless device may trigger/initiate an RA procedure.

The wireless device may, for example, based on the one or more NTN configuration parameters, determine/measure/maintain the one or more NTN-specific parameters/values. The one or more NTN-specific values may correspond to one or more attributes (or features or characteristics or measures or aspects) of a communication link between the wireless device and the base station, for example, the service link (e.g., the communication link between the wireless device and the NTN payload). For example, using the one or more NTN-specific parameters/values, the wireless device may determine the one or more attributes of the service link. The one or more attributes of the service link may comprise at least based on of the propagation delay of the service link, the length of the service link, and/or the elevation angle of the service link.

Following the above discussion associated with FIGS. 20-23, as shown in FIG. 24, in step 2430, the wireless device may, for the triggered/initiated RA procedure, determine the Msg3 repetition being applicable for the RA procedure. For example, the wireless device may determine the Msg3 repetition being applicable for the RA procedure based on at least one of the following being satisfied: the first set of rules being satisfied (e.g., the one or more NTN-specific values/parameters); and/or the second set of rules being satisfied; and/or the probabilistic procedure (e.g., the second set of rules being satisfied). For example, the wireless device may, for sending (e.g., transmitting) a first message (e.g., the preamble or the MsgA), select/determine the one or more RA resources. For example, the wireless device may select the one or more RA resources based on the discussion of FIG. 20 and/or FIG. 23. For example, by sending (e.g., transmitting) the first message (e.g., the preamble), the wireless device may request (e.g., from the base station) the Msg3 repetition (e.g., request from the base station an UL grant for sending (e.g., transmitting) the Msg3 with repetition).

As shown in FIG. 24, the wireless device may, for example, based on (e.g., in response to) sending (e.g., transmitting) the first message, receive a DCI scheduling an RAR. The wireless device may determine (or indicate or identify) a reception of the RAR (e.g., for or, for example, based on (e.g., in response to) the first message or the preamble) being successful. The RAR may indicate the UL grant (RAR UL grant or a fallbackRAR UL grant) for transmission of the Msg3 (e.g., a PUSCH transmission corresponding to the Msg3). The wireless device may process the RAR UL grant (or the fallbackRAR UL grant) and indicate it to the lower layers (e.g., the physical layer) for transmission of the Msg3 using/based on the UL grant.

As shown in FIG. 24, the wireless device may determine the repetitions K (or $$N_{PUSCH}^{repeat})$$

of the Msg3 (e.g., a number of slots for the PUSCH transmission of a PUSCH repetition Type A scheduled by the UL grant) based on the one or more NTN-specific values/parameters (e.g., the one or more attributes of the service link and/or the location information of the NTN node); and/or the RAR; and/or the one or more configuration parameters (e.g., a plurality of the numberOfMsg3Repetitions). For example, the wireless device may determine the Msg3 repetition being applicable for the RA procedure based on the one or more NTN-specific parameters/values (e.g., the one or more attributes of the service link). For example, the wireless device may determine that the first set of rules being satisfied. For example, the wireless device may determine that the second set of rules being satisfied. For example, the wireless device may determine that the third set of rules being satisfied.

The one or more configuration parameters may configure the plurality of numberOfMsg3Repetitions. For example, the wireless device may, based on the one or more NTN-specific parameters/values, select a numberOfMsg3Repetitions from the plurality of numberOfMsg3Repetitions. For determining the repetition K for the transmission of the Msg3, the wireless device may select a numberOfMsg3Repetitions from the plurality of numberOfMsg3Repetitions based on one or more ranges/intervals of an attribute of the service link (e.g., the propagation delay, the length, or the elevation angle). For example, based on the attribute of the service link (e.g., the propagation delay, the length, or the elevation angle) being in the n-th (n=0, 1, . . . , N) range/interval of the one or more ranges/intervals, the wireless device may select the n-th numberOfMsg3Repetitions from the plurality of numberOfMsg3Repetitions. For example, the wireless device may determine the repetition K based on the selected numberOfMsg3Repetitions from the plurality of the numberOfMsg3Repetitions (e.g., the n-th numberOfMsg3Repetitions from the plurality of the numberOfMsg3Repetitions) and the RAR (e.g., based on the 2 MSBs of the MCS information field of the UL grant).

The one or more configuration parameters may configure the plurality of RSRP thresholds. The base station may configure (e.g., the one or more configuration parameters) a mapping between the plurality of RSRP thresholds and the plurality of numberOfMsg3Repetitions. The mapping may be hardcoded for the wireless device. The wireless device may determine the RSRP threshold among/from the plurality of RSRP thresholds, for example, based on the discussion of FIG. 22. The wireless device may select the numberOfMsg3Repetitions from the plurality of numberOfMsg3Repetitions, for example, based on the selected RSRP threshold.

The wireless device may select the numberOfMsg3Repetitions from the plurality of numberOfMsg3Repetitions based on the preamble and or the RO (e.g., the one or more RA resources/variables). The base station may configure (e.g., the one or more configuration parameters) a mapping between the preambles/ROs and the plurality of numberOfMsg3Repetitions. The mapping may be hardcoded for the wireless device. The wireless device may select the numberOfMsg3Repetitions from the plurality of numberOfMsg3Repetitions, for example, based on the selected preamble and/or the RO.

The wireless device may, for example, based on the selected numberOfMsg3Repetitions from/of/among the plurality of numberOfMsg3Repetitions, determine a codepoint, for example, using/via the 2 MSBs of the MCS information field of the RAR UL grant (or the fallbackRAR UL grant). The codepoint may indicate a value/number from the numberOfMsg3Repetitions from/of/among the plurality of numberOfMsg3Repetitions (e.g., the codepoint '00' may indicate the first value of the selected numberOfMsg3Repetitions for K, and the codepoint '01' may indicate a second value of the selected numberOfMsg3Repetitions for K, the codepoint '10' may indicate a third value of the selected numberOfMsg3Repetitions for K, and the codepoint '11' may indicate a fourth (or last) value of the selected numberOfMsg3Repetitions for K).

The one or more configuration parameters may increase the number of repetitions (compared to the terrestrial network), for example, if the wireless device is operating in the NTN (e.g., the cell is part of the NTN). For example, a numberOfMsg3Repetitions (e.g., each numberOfMsg3Repetitions of the plurality of numberOfMsg3Repetitions or the numberOfMsg3Repetitions if the cardinality of the plurality of numberOfMsg3Repetitions is one) may indicate/configure $L_1 > 4$ values for repetition of the Msg3. The wireless device may determine a codepoint, for determining the repetition number K, based on the location information of the NTN node (e.g., the one or more attributes of the service link) and the RAR.

The one or more configuration parameters may increase the number of repetitions (compared to the terrestrial network), for example, if the wireless device is operating in the NTN (e.g., the cell is part of the NTN). For example, a numberOfMsg3Repetitions (e.g., each numberOfMsg3Repetitions of the plurality of numberOfMsg3Repetitions or the numberOfMsg3Repetitions if the cardinality of the plurality of numberOfMsg3Repetitions is one) may indicate/configure $L_1 > 4$ values for repetition of the Msg3. For example, the wireless device may determine the codepoint, for determining the repetition number K, based on one or more information field of the UL grant, for example, $L_1$ MSBs of the MCS information field of the RAR UL grant (or the fallbackRAR UL grant). Wireless device may determine the repetition number K based on the 2 MSBs of the MCS information field of the RAR UL grant (or the fallbackRAR UL grant) and reinterpretation of one or more information fields of the RAR UL grant (or the fallbackRAR UL grant), for example, a frequency domain resource allocation field value and/or a PUSCH time resource allocation field value m. For example, the wireless device may determine log K bits using log(K-2) bits from the reinterpretation of one or more information fields of the RAR UL grant and the 2 MSBs of the MCS information field of the RAR UL grant (or the fallbackRAR UL grant).

The wireless device may, for example, based on the attribute of the service link (e.g., the propagation delay, the length, or the elevation angle) being in the n-th (n=0, 1, . . . , $L_1$) range/interval of the one or more ranges/intervals of an attribute of the service link, select a repetition K between mode($L_1$,n) and mode($L_1$,n+1) (or between mode($L_1$,n−1) and mode($L_1$,n)) based on one or more information fields of the UL grant, for example, the 2 MSBs of the MCS information field of the RAR UL grant (or the fallbackRAR UL grant). The wireless device may determine a codepoint, for example, using/based on the 2 MSBs of the MCS information field of the RAR UL grant (or the fallbackRAR UL grant). The wireless device may determine the repetition K based on a number r determined by the codepoint and $mode(L_1,n)$ or $mode(L_1,n-1)$ (e.g., $mode(L_1,n)+r$ or mode $(L_1,n-1)+r$). For example, the codepoint '00' may indicate r=0, the codepoint '01' may indicate r=1, the codepoint '10' may indicate r=2, and the codepoint '11' may indicate r=3.

The wireless device may determine the repetitions K from the numberOfMsg3Repetitions, for example, based on the location information of the NTN node (e.g., the one or more attributes of the service link) and the 2 MSBs of the MCS information field of the RAR UL grant (or the fallbackRAR UL grant). For example, the wireless device may concatenate a bit b with the 2 MSBs of the MCS information field of the RAR UL grant (or the fallbackRAR UL grant) (e.g., $a_1a_2$ where $a_1$ and $a_2$ are corresponding bit of the 2 MSBs of the MCS information field of the RAR UL grant or the fallbackRAR UL grant) as $ba_1a_2$. For example, b=1, for example, based on (e.g., in response to) determining the first set of rules being satisfied; otherwise, b=0. Based on this technique, the base station may increase the repetitions number of a wireless device that is located around the cell edge. For example, for the wireless device that is located around the cell edge, K is greater than 4. For the wireless device that is located around the cell edge, K is smaller than 4.

The one or more configuration parameters may not configure the numberOfMsg3Repetitions (e.g., the numberOfMsg3Repetitions is absent from the one or more configuration parameters e.g., RACH-ConfigCommon IE). For example, the wireless device may determine the repetitions K (or $$N_{PUSCH}^{repeat})$$

of the Msg3 from a preconfigured set, for example, {1, 2, 3, 4, . . . ,N}. For example, if the cell is part of the NTN, N>4 and/or mod(N,4)=0. The preconfigure set may be, for example, {1, 2, 3, 4}, for example, if the cell is not part of the NTN.

The wireless device may determine the repetition K based on the preconfigured set and the attribute of the service link (e.g., the propagation delay, the length, or the elevation angle), for example, if the cell is part of the NTN. The wireless device may, for example, based on the attribute of the service link (e.g., the propagation delay, the length, or the elevation angle) being in the n-th (n=0, 1, . . . , N) range/interval of the one or more ranges/intervals of an attribute of the service link, select a repetition K between mode(N,n) and mode(N,n+1) (or between mode(N,n−1) and mode(N,n)) based on one or more information fields of the UL grant, for example, the 2 MSBs of the MCS information field of the RAR UL grant (or the fallbackRAR UL grant). The wireless device may determine a codepoint, for example, using/based on the 2 MSBs of the MCS information field of the RAR UL grant (or the fallbackRAR UL grant). The wireless device may determine the repetition K based on a number r determined by the codepoint and mode(N,n) or mode(N,n−1) (e.g., mode(N,n)+r or mode(N, n−1)+r). For example, the codepoint '00' may indicate r=0, the codepoint '01' may indicate r=1, the codepoint '10' may indicate r=2, and the codepoint '11' may indicate r=3.

The preconfigured set may comprise more than 4 values (e.g., $L_2$>4 values), for example, {1, 2, 3, 4, $m_1$, $m_2$, $m_3$, $m_4$} where $m_4$>$m_3$>$m_2$>$m_1$>4. The wireless device may determine the codepoint, for determining the repetition number K, based on one or more information field of the RAR UL grant (or the fallbackRAR UL grant), for example, $L_2$ MSBs of the MCS information field of the RAR UL grant (or the fallbackRAR UL grant). Wireless device may determine the repetition number K based on the 2 MSBs of the MCS information field of the RAR UL grant (or the fallbackRAR UL grant) and the reinterpretation of one or more information fields of the RAR UL grant (or the fallbackRAR UL grant), for example, the frequency domain resource allocation field value and/or the PUSCH time resource allocation field value m. For example, the wireless device may determine log K bits using log(K−2) bits from the reinterpretation of one or more information fields of the RAR UL grant and the 2 MSBs of the MCS information field of the RAR UL grant (or the fallbackRAR UL grant).

The wireless device may determine an MCS (or the transport block size) for each PUSCH transmission (of/among/from the K repetitions) of the Msg3 based on the one or more NTN-specific parameters/values and the RAR. The wireless device may determine the MCS by a number of LSBs (e.g., 2 LSBs or 3 LSBs or the $L_2$ LSBs or the $L_1$ LSBs) of a MCS field in the RAR UL grant (or the fallbackRAR UL grant). For example, based on the one or more NTN-specific parameters/values and the RAR the wireless device may determine a redundancy version and resources blocks (RBs) for each PUSCH transmission (of/among/from the K repetitions) of the Msg3.

The wireless device may perform the RA procedure (e.g., based on the above discussion corresponding to FIG. 20 and/or FIG. 21), for example, based on (e.g., in response to) determining the Msg3 repetition being applicable. As shown in FIG. 24, in step 2440, the wireless device may transmit the Msg3 (e.g., with repetitions K).

Examples may allow the wireless device to properly determine one or more resources (e.g., the number of repetitions of the Msg3) for transmission of the Msg3. The wireless device may, for example, based on the location of the wireless device in the cell and/or the mobility of the satellite, adaptively/automatically determine the one or more resources. Some examples may improve robustness of the Msg3 repetition in the NTN.

In at least some wireless communications, the base station may configure the wireless device (e.g., via the one or more configuration parameters) with one or more BWPs, for example, if a wireless device is communication with a base station via an NTN (e.g., the base station is an NTN base station and/o the cell (e.g., the serving cell) is part of the NTN). For example, a first BWP of/among/from the one or more BWPs may be the dedicated BWP to the CovEnh feature. The first BWP may be configured with the first plurality of the RA resources (e.g., the one or more first sets of RA resources/parameters/variables with the Msg3 repetition indication). For example, a second BWP of/among/from the one or more BWPs may not be the dedicated BWP to the CovEnh feature. The second BWP may be configured with both the first plurality of the RA resources and the second plurality of the RA resources (e.g., the one or more second sets of RA resources/parameters/variables without the Msg3 repetition indication). The second BWP may not be configured with the first plurality of the RA resources.

In at least some wireless communications, for a triggered/initiated a RA procedure, the wireless device may, after performing the one or more BWP operations, select the first BWP for performing the RA procedure. The wireless device may select the first BWP, for example, before initiating/triggering the RA procedure. The wireless device may (automatically) become eligible for the Msg3 repetition if performing the RA procedure, for example, based on (e.g., in response to) the first BWP selected for the RA procedure being the dedicated BWP to the CovEnh feature (e.g., for the Msg3 repetition). Based on at least some wireless communications, in an NTN example with the large cell/beam size with moving NTN payload (e.g., a LEO satellite a pseudo satellite or HAPS) and/or an Earth-fixed cell/beam, performance of the RA procedure with the Msg3 repetition may deteriorate, for example, due to a large interference on the first plurality of RA resources (e.g., large cell/beam) and/or movement of the NTN payload. The large interference on the first plurality of RA resources, may result in possibility of unsuccessful detection of preambles and/or Msg3s (sent (e.g., transmitted) by wireless devices residing in the cell/beam) at the base station. For example, the wireless devices may repeat sending (e.g., transmitting) the preambles several times before successfully gaining access to network, which may increase their consumed power for initial access and/or increase delay for access control. Further, due to movement of the NTN payload, the performance/efficiency of RA procedure with Msg3 repetition may fluctuate/change (e.g., not a robust/consistent performance/efficiency).

The wireless device may determine whether to switch from the first BWP or not, for example, based on (e.g., in response to) the first BWP selected for the RA procedure being the dedicated BWP to the CovEnh feature (e.g., for the Msg3 repetition). For example, the wireless device may determine whether the Msg3 repetition is applicable for the RA procedure, for example, based on determining whether at least one or the following: the first set of rules being satisfied; and/or the second set of rules being satisfied; and/or the third set of rules being satisfied. The wireless device may switch from the first BWP to a second BWP based on the Msg3 repetition not being applicable for the RA procedure. For example, the wireless device may stop the ongoing RA procedure and initiate a new RA procedure, for example, after performing the BWP switching (e.g., if the second BWP is not configured with the first plurality of the RA resources). The wireless device may continue performing the ongoing RA procedure, for example, after the switching to the second BWP (e.g., if the second BWP is configured with the first plurality of the RA resources and the second plurality of the RA resources).

The base station may configure/indicate the wireless device (e.g., via the one or more configuration parameters) with a first parameter indicating switching the BWP, for example, based on (e.g., in response to) determining the Msg3 repetition not being applicable for the RA procedure in the dedicated BWP for the Msg3 repetition. The wireless device may switch from the first BWP to the second BWP based on the Msg3 repetition not being applicable for the RA procedure and the first parameter being indicated/configured (or being enabled).

The wireless device may not determine whether the Msg3 repetition being applicable for the RA procedure or not, for example, based on the first parameter not being indicated/configured (or being disabled). For example, the wireless device may not switch the first BWP for performing the RA procedure.

Examples may improve the performance of the RA procedure and BWP operation in an NTN example with the large cell/beam size with moving NTN payload (e.g., a LEO satellite a pseudo satellite or HAPS) and/or an Earth-fixed cell/beam, for example, by reducing the interference on the first plurality of the RA resources of the dedicated BWP to the Msg3 repetition.

Figure 25:
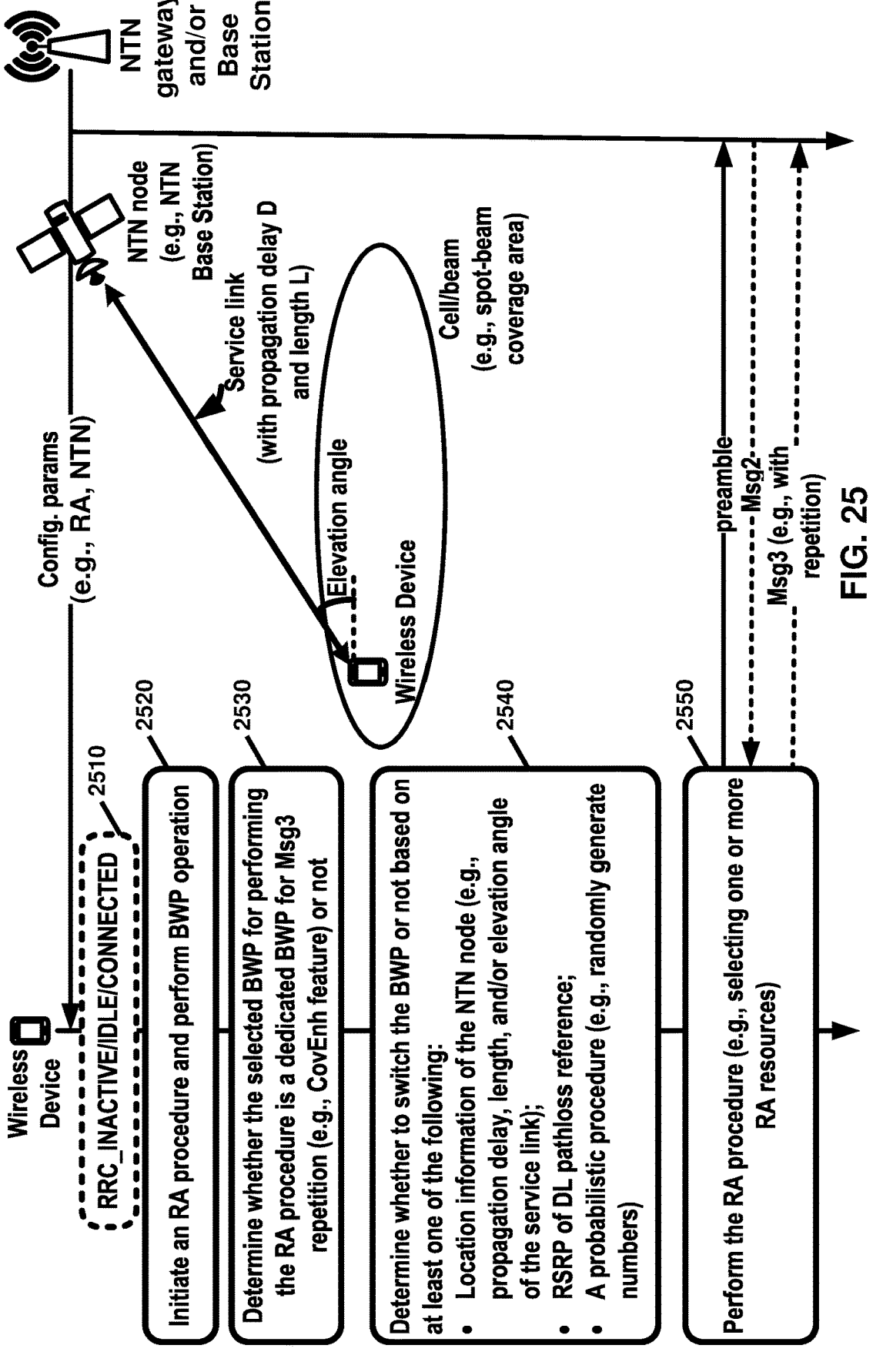
FIG. 25 shows an example of an RA procedure in wireless communications systems.

FIG. 25 shows an example of an RA procedure in wireless communications systems. FIG. 25 may, for example, show an implementation of a method (or a process) for the RA procedure at a base station and/or a wireless device. The base station may communicate with the wireless device via/using a cell (e.g., a serving cell). For example, as shown in step 2510, the wireless device may be in an RRC_IDLE (or an RRC idle) state/mode, an RRC_INACTIVE (or an RRC inactive) state/mode, or an RRC_CONNECTED (or an RRC connected) state/mode. The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell. As shown in FIG. 25, the wireless device may receive the one or more configuration parameters (e.g., the one or more RA configuration parameters and/or the one or more NTN configuration parameters) from the base station.

As shown in FIG. 25, in step 2520, the wireless device may trigger/initiate an RA procedure, for example, based on (e.g., in response to) (or for) an initial access procedure (e.g., to transit from the RRC_IDLE state/mode to the RRC_CONNECTED state/mode), initiating a beam failure recovery, and/or the like. The RA procedure may be the contention-based RA procedure. The RA procedure may be the contention-free RA procedure (e.g., according to above discussions of FIG. 13B). The RA procedure may, for example, be a four-step RA procedure (e.g., according to above discussions of FIG. 13A), for example, RA_TYPE is set to 4-stepRA, or a two-step RA procedure (e.g., according to above discussions of FIG. 13C), for example, RA_TYPE is set to 4-stepRA.

The wireless device may perform at least one of the following: flushing a Msg3 buffer and/or flushing a MsgA buffer; initializing one or more RA-specific parameters, for example, a preamble transmission counter (e.g., PRE-AMBLE_TRANSMISSION_COUNTER) and/or a pre-amble power ramping counter (e.g., PREAMBLE_POWER_RAMPING_COUNTER); selecting a carrier (e.g., SUL or NUL) for the RA procedure and setting PCMAX accordingly (e.g., setting PCMAX to $P_{CMAX,f,c}$ of the SUL carrier or the NUL carrier); and/or performing the one or more BWP operations, for example, based on (e.g., in response to) the triggering/initiating the RA procedure. The wireless device may select a first BWP for the RA procedure, for example, based on (e.g., in response to) performing the one or more BWP operations.

The first BWP may be configured for the one or more features. For example, the first plurality of the RA resources may be partitioned/shared among the one or more features (e.g., a combination of features comprising at least one of the CovEnh feature, the SDT feature, the RedCap feature, the Slice group feature, and the like).

The first BWP selected for the RA procedure may be the dedicated BWP for the Msg3 repetition and/or the CovEnh feature. For example, the first BWP selected for the RA procedure (e.g., the active UL BWP and/or the active DL BWP) may be configured (e.g., via the one or more configuration parameters) only with the first plurality of RA resources (e.g., the one or more first sets of RA resources/parameters/variables with the Msg3 repetition indication). As shown in FIG. 23, in step 2530, the wireless device may, for the triggered/initiated RA procedure and, for example, based on (e.g., in response to) the first BWP selected for the RA procedure being the dedicated BWP for the Msg3 repetition and/or the CovEnh feature, determine whether the Msg3 repetition is applicable or not (e.g., as discussed above with accordance to FIG. 20-FIG. 23). For example, the wireless device may determine the Msg3 repetition not being applicable for the RA procedure, for example, based on the first set of rules not being satisfied. The wireless device may determine the Msg3 repetition not being applicable for the RA procedure, for example, based on the second set of rules not being satisfied. The wireless device may determine the Msg3 repetition not being applicable for the RA procedure, for example, based on the third set of rules not being satisfied (e.g., the probabilistic procedure).

As shown in FIG. 25, in step 2540, for the RA procedure, the wireless device may determine whether to switch the BWP selected for the RA procedure or not. The wireless device may switch the BWP from the first BWP to a second BWP, for example, based on the first BWP selected for the RA procedure being the dedicated BWP for the Msg3 repetition (and/or the CovEnh feature) and the Msg3 repetition for the RA procedure not being applicable. For example, the second BWP may be a default BWP (e.g., a default UL BWP or a default DL BWP) and/or an initial BWP (e.g., an initial UL BWP and/or an initial DL BWP).

The base station may configure/indicate the wireless device (e.g., via the one or more configuration parameters) with a first parameter. For example, the first parameter may indicate/configure/enable performing a BWP operation (e.g., switching the first BWP to the second BWP), for example, based on (e.g., in response to) determining the Msg3 repetition not being applicable for the RA procedure in the dedicated BWP for the Msg3 repetition.

The wireless device may switch from the first BWP to the second BWP based on the Msg3 repetition not being applicable for the RA procedure and the first parameter being indicated/configured (or being enabled). The wireless device may not switch from the first BWP to the second BWP based on the Msg3 repetition not being applicable for the RA procedure and the first parameter not being indicated/configured (or being disabled). For example, for performing the RA procedure the wireless device may follow one or more methods discussed with accordance with FIGS. 20-24, for example, by performing at least one or more of the following: initializing one or more RA variables/parameters, selecting the one or more RA resources/variables/parameters (e.g., the one or more RA-partition/feature resources), and/or sending (e.g., transmitting) the first message via/using the one or more RA resources/variables/parameters, and/or receiving an RAR, for example, based on (e.g., in response to) the first message, and/or sending (e.g., transmitting) a Msg3 via/using a repetition K.

The second BWP may comprise the first plurality of RA resources with the Msg3 repetition indication and the second plurality of RA resources without the Msg3 repetition indication. The wireless device may, for example, based on (e.g., in response to) switching the BWP from the first BWP to a second BWP, stop the RA procedure and initiate/trigger a second RA procedure (e.g., a new RA procedure). For example, as shown in FIG. 23, for performing the second RA procedure the wireless device may follow one or more methods discussed with accordance with FIGS. 20-24, for example, by performing at least one or more of the following: initializing one or more RA variables/parameters, selecting the one or more RA resources/variables/parameters (e.g., the one or more RA-partition/feature resources), and/or sending (e.g., transmitting) the first message via/using the one or more RA resources/variables/parameters, and/or receiving an RAR, for example, based on (e.g., in response to) the first message, and/or sending (e.g., transmitting) a Msg3 via/using a repetition K.

The wireless device may continue the RA procedure (e.g., by not stopping the RA procedure) by performing the RA procedure (e.g., in step 2550), for example, based on (e.g., in response to) switching the BWP from the first BWP to a second BWP. For example, as shown in FIG. 25, corresponding to the RA procedure, the wireless device may perform at least one or more of the following: initializing one or more RA variables/parameters, selecting the one or more RA resources/variables/parameters (e.g., the one or more RA-partition/feature resources), and/or sending (e.g., transmitting) the first message via/using the one or more RA resources/variables/parameters, and/or receiving an RAR, for example, based on (e.g., in response to) the first message, and/or sending (e.g., transmitting) a Msg3 via/using a repetition K.

The second BWP may comprise the second plurality of RA resources without the Msg3 repetition indication (e.g., there is no RA resources for the CovEnh feature). The wireless device may stop the RA procedure and initiate/trigger a third RA procedure (e.g., a new RA procedure), for example, based on (e.g., in response to) switching the BWP from the first BWP to the second BWP. For example, as shown in FIG. 23, for performing the third RA procedure the wireless device may follow one or more methods discussed with accordance with FIGS. 20-24, for example, by performing at least one or more of the following: initializing one or more RA variables/parameters, selecting the one or more RA resources/variables/parameters (e.g., the one or more RA-partition/feature resources), and/or sending (e.g., transmitting) the first message via/using the one or more RA resources/variables/parameters, and/or receiving the RAR, for example, based on (e.g., in response to) the first message, and/or sending (e.g., transmitting) a Msg3 (e.g., without repetition).

The wireless device may perform the one or more BWP operations, for example, based on (e.g., in response to) the triggering/initiating the RA procedure. For example, the one or more BWP operations may comprise selecting the dedicated BWP for the Msg3 repetition based on determining a selected BWP for the RA procedure not being a dedicated BWP for the Msg3 repetition.

The wireless device may not determine whether the Msg3 repetition being applicable for the RA procedure or not, for example, based on the first parameter not being indicated/configured (or being disabled). For example, the wireless device may not switch the first BWP for performing the RA procedure.

Examples may improve the performance of the RA procedure and BWP operation in an NTN example with the large cell/beam size with moving NTN payload (e.g., a LEO satellite a pseudo satellite or HAPS) and/or an Earth-fixed cell/beam, for example, by reducing the interference on the first plurality of the RA resources of the dedicated BWP to the Msg3 repetition.

In at least some wireless communications, a base station may configure a wireless device (e.g., via the one or more configuration parameters) with SDT configuration parameters, for example, for performing a SDT procedure. For example, the SDT procedure may be used by the wireless device for transmission of data and/or signaling over one or more allowed radio bearers in an RRC_INACTIVE state (i.e., without the wireless device transitioning/switching to an RRC_CONNECTED state). For example, the one or more configuration parameters may comprise one or more SDT configuration parameters, configuring the wireless device with the SDT procedure. The SDT procedure may be initiated by higher layers (e.g., the RRC layer) of the wireless device, for example, if the wireless device is in the RRC_INACTIVE state and has UL data, associated with one or more logical channels, for transmission. The wireless device may perform the SDT procedure by a configured grant (i.e., CG-SDT or a CG-based SDT) or by a RA procedure (i.e., RA-SDT procedure or RA-based SDT procedure). For example, the CG-SDT may be a configured grant Type 1. The RA procedure may be a two-step RA procedure (e.g., if the RA_TYPE of the RA procedure is set to 2-stepRA) or a four-step RA procedure (e.g., if the RA_TYPE of the RA procedure is set to 4-stepRA).

The base station may configure the wireless device with one or more SDT-RSRP thresholds, for example, an SDT-RSRP threshold (e.g., sdt-RSRP-Threshold) and/or a CG-SDT-RSRP threshold (e.g., cg-SDT-RSRP-ThresholdSSB) and/or rsrp-ThresholdSSB-SUL. In at least some wireless communications, the wireless device may, suing the one or more SDT-RSRP thresholds, determine at least one of the following: whether to initiate the SDT procedure (e.g., whether condition(s) for initiation of the SDT procedure being satisfied); and/or whether to perform the SDT procedure (e.g., for the initiated SDT procedure) based on the CG-SDT or the RA-SDT; and/or whether to perform the SDT procedure suing a NUL carrier or a SUL carrier.

In at least some wireless communications, the wireless device may use the one or more SDT-RSRP thresholds to determine at least one of the following: whether to initiate the SDT procedure (e.g., whether condition(s) for initiation of the SDT procedure being satisfied); and/or whether to perform the SDT procedure (e.g., for the initiated SDT procedure) based on the CG-SDT or the RA-SDT; and/or whether to perform the SDT procedure suing a NUL carrier or a SUL carrier. For example, based on (e.g., in response to) determining one or more conditions for initiating SDT procedure being fulfilled/satisfied (e.g., a RSRP of the DL-PL reference being higher than the SDT-RSRP threshold (e.g., sdt-RSRP-Threshold)) and there is no SSB configured for CG-SDT with SS-RSRP above the CG-SDT-RSRP threshold (cg-SDT-RSRP-ThresholdSSB) being available, the wireless device may initiate/trigger the RA-SDT procedure.

Based on at least some wireless communications, such as in an NTN example with the large cell/beam size and/or moving NTN payload, performance of the SDT (e.g., CG-SDT or RA-SDT) procedure may deteriorate, for example, due to a large interference on SDT resources. The large interference may be a result of insignificant/unclear near-far effect of the RSRP of the DL-PL reference across/through the cell/beam in the NTN example. This may result in failure in successfully sending (e.g., transmitting) data and/or sending (e.g., transmitting) to the RRC connected state, which may, in turn, increase the consumed power (or delay) of the wireless device for establishing connection to the network (e.g., by switching/transiting from the RRC inactive/idle state/mode to the RRC connected state/mode).

In at least some wireless communications, such as in an NTN example with moving NTN payload (e.g., a LEO satellite a pseudo satellite or HAPS) and/or an Earth-fixed cell/beam, by movement of the NTN payload there may be a continuous (and/or substantial) change/fluctuation in a number of wireless devices that trigger the RA-SDT (e.g., for switching/transiting from the RRC inactive/idle state/mode to the RRC connected state/mode) and/or use the SUL carrier. For example, by movement of the NTN payload the number of wireless devices triggering the RA-SDT (or select the SUL carrier) may change/fluctuate from 200 to 20 (e.g., if the NTN payload moves toward the cell/beam) and/or from 20 to 200 (e.g., if the NTN payload moves away from the cell/beam). The continuous (and/or substantial) change/fluctuation in the number of wireless devices triggering the RA-SDT (or the SUL carrier) may reduce the performance/efficiency of the SDT procedure, for example, due to excessive interference if the number of the wireless devices is large (e.g., 200) and/or delay in switching/transiting from the RRC inactive/idle state/mode to the RRC connected state/mode. Based on at least some wireless communications, in NTN example with moving NTN payload, the base station may encounter difficulty for determining the one or more SDT-RSRP thresholds (e.g., the SDT-RSRP threshold) for a robust/consistent performance of the SDT procedure. For example, some wireless devices may unnecessarily trigger/initiate the RA-SDT and/or select the SUL carrier, increasing the consumed power for sending (e.g., transmitting) small amount of data and/or increasing signaling overhead (e.g., for establishing connection, for example, switching/transiting from the RRC inactive/idle state/mode to the RRC connected state/mode). In some other cases, a small number of wireless devices may select the SUL carrier, resulting in wastage of resources of the SUL carrier and/or high interference in resources of the NUL carrier.

The SDT procedure in an NTN example may improve robust/consistent performance of the SDT procedure and/or reduce a number of wireless devices that may switch/transit from the RRC inactive/idle state/mode to the RRC connected state/mode (e.g., due to triggering/initiating the RA-SDT procedure). Improvements to the SDT procedure in an NTN example may reduce interference on the RA-SDT resources and/or the SUL/NUL resources, for example, reducing the delay for switching/transiting from the RRC inactive/idle state/mode to the RRC connected state/mode.

As described herein, a wireless device may use one or more NTN-specific values/parameters to determine whether to initiate an SDT procedure. For example, the one or more NTN-specific values/parameters may be one or more attributes of the service link or the location of the NTN node. Also or alternatively, for an initiated SDT procedure from the higher layers (e.g., the RRC layer) of the wireless device, the wireless device may use the one or more NTN-specific values/parameters to determine whether to indicate, to the higher layers (e.g., the RRC layer) of the wireless device from the lower layers (e.g., the MAC layer) of the wireless device, that the SDT procedure is initiated at the lower layers or failed at the lower layers (e.g., conditions for the initiated SDT procedure not being satisfied at the lower layers). Also or alternatively, the wireless device may use the one or more NTN-specific values/parameters to determine whether to trigger/initiate the RA-SDT procedure to transmit a pending UL data. Also or alternatively, the wireless device may use the one or more NTN-specific values/parameters to determine whether to perform the SDT (e.g., CG-SDT and/or the RA-SDT) procedure on SUL carrier or NUL carrier.

Some examples described herein may allow a wireless device to use the one or more attributes/characteristics (e.g., the propagation delay, the length, and/or the elevation angle) of the wireless device to perform the SDT procedure. Examples described herein may allow to properly manage load of the SDT procedure (e.g., number of wireless devices that initiate the SDT procedure) in the cell/beam; and/or manage load of the RA-SDT (e.g., number of wireless devices that initiate the RA-SDT procedure) in the cell/beam; and/or balance the load between the NUL and the SUL. Examples may allow to reduce signaling overhead of the cell and/or the consumed power of the wireless device (e.g., by reducing possibility of triggering the RA-SDT for performing the SDT procedure).

As described herein, a wireless device may adopt/use a probabilistic (randomized) procedure to determine whether to initiate an SDT procedure. Also or alternatively, for an initiated SDT procedure from the higher layers (e.g., the RRC layer) of the wireless device, the wireless device may adopt/use a probabilistic (randomized) procedure to determine whether to indicate, to the higher layers (e.g., the RRC layer) of the wireless device from the lower layers (e.g., the MAC layer) of the wireless device, that the SDT procedure is initiated at the lower layers or failed at the lower layers (e.g., conditions for the initiated SDT procedure not being satisfied at the lower layers). Also or alternatively, the wireless device may adopt/use a probabilistic (randomized) procedure to determine whether to trigger/initiate the RA-SDT procedure to transmit a pending UL data. Also or alternatively, the wireless device may adopt/use a probabilistic (randomized) procedure to determine whether to perform the SDT (e.g., CG-SDT and/or the RA-SDT) procedure on SUL carrier or NUL carrier. Some examples described herein may allow a wireless device and/or a base station to maintain a robust performance of an SDT procedure, for example, despite movement of a base station, such as a satellite.

Figure 26:
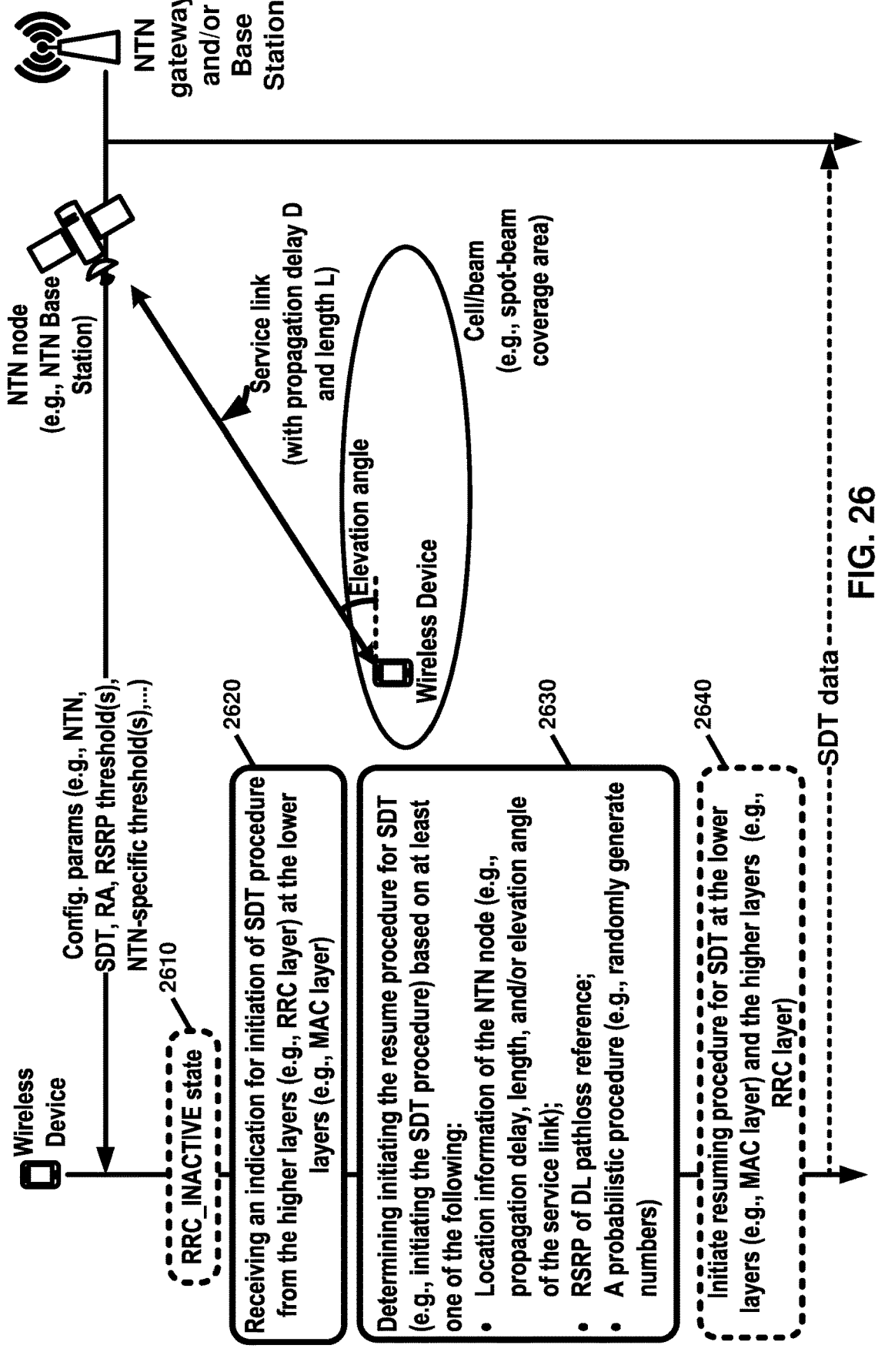
FIG. 26 shows an example of a small data transmission (SDT) procedure in wireless communications systems.

FIG. 26 shows an example of a small data transmission in wireless communications systems. For example, FIG. 26 may show an example of a CG-SDT procedure or a RA-SDT procedure for an SDT procedure. FIG. 26 may show an implementation of a method (or a process) for the SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state) as shown in step 2610. FIG. 26 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode). The wireless device may, for example, communicate with the base station via a non-terrestrial network (NTN). For example, the wireless device and the base station may operate in the NTN and/or the base station may be an NTN base station and/or the cell may be part of the NTN. For example, the cell may be the serving cell.

The wireless device may have, for example, during a Non-RRC_CONNECTED state, data (e.g., due to uplink data arrival) to transmit. The wireless device may be in the cell that is part of the NTN. The wireless device may select the cell using a cell (re-)selection procedure. The wireless device may camp on the cell, for example, to receive one or more service from a network, for example, during the Non-RRC_CONNECTED state.

As shown in FIG. 26, the wireless device may receive the one or more configuration parameters (e.g., the one or more RA configuration parameters and/or the one or more NTN configuration parameters) from the base station. For example, the wireless device may determine the location information of the NTN node and/or the or more attributes of the service link based on (or using) the one or more NTN configuration parameters. For example, using/based on the one or more NTN-specific parameters/values, the wireless device may determine the one or more attributes of the service link. The one or more attributes of the service link may comprise the propagation delay of the service link, and/or the length of the service link, and/or the elevation angle of the service link, and/or the like.

The one or more configuration parameters may comprise one or more SDT configuration parameters of an SDT in an RRC non-connected state (e.g., Non-RRC_CONNECTED state). As shown in step 2620, the wireless device may receive a message(s) (e.g., RRC message, RRC release message, and/or SIB), for example, in an RRC_CONNECTED state, comprising the one or more SDT configuration parameters. For example, one or more SDT configuration parameters may configure the wireless device (e.g., the higher layer (e.g., RRC layer) of the wireless device) for SDT procedure for transmission in the Non-RRC_CONNECTED state.

Uplink transmission in a Non-RRC_CONNECTED state may be based on pre-configured PUSCH resource(s). For example, the one or more SDT configuration parameters may configure the wireless device with resource configuration parameters indicating UL grant(s) and/or the (pre-) configured uplink resource(s) of the UL grant(s). For example, the UL grant(s) and/or the (pre-)configured uplink resource(s) are configured for uplink data transmission via PUSCH in the Non-RRC_CONNECTED state. The wireless device may transmit uplink data (e.g., associated with DTCH) using the UL grant(s) and/or via the (pre-) configured uplink resource(s) of the UL grant(s) in the Non-RRC_CONNECTED state.

Uplink data transmission(s) in a Non-RRC_CONNECTED state may be referred to as small data transmission (SDT), early data transmission (EDT), and/or data transmission via (pre-)configured uplink resource(s) (PURs). For example, an SDT and/or an EDT may be interchangeable with uplink data transmission(s) in a Non-RRC_CONNECTED state. For example, radio resource(s) used for an SDT in a Non-RRC_CONNECTED state may be referred to as PUR(s). For example, uplink data transmission(s) based on a RA procedure in a Non-RRC_CONNECTED state (e.g., RA-SDT procedure) may be referred to as an RA-based SDT, an RA-based EDT, an EDT, and/or the like. For example, an uplink data transmission based on (pre-) configured grant(s) in a Non-RRC_CONNECTED state may be referred to as (pre-) configured grant based SDT (CG-based SDT). One or more radio resources of the (pre)configured grant(s) may be referred to as (pre)configured uplink resources (PURs), SDT resources, resources of SDT, and/or the like.

The wireless device may receive the one or more SDT configuration parameters via a broadcast message, for example, SIB message (e.g., SIB1). The one or more SDT configuration parameters may be UE-specific, for example, an RRC message, MAC CE, and/or a DCI dedicated to the wireless device. For example, the one or more SDT configuration parameters may comprise configuration parameters of an RRC release message. The one or more SDT configuration parameters may indicate uplink grant(s) and/or radio resource(s) available, scheduled, and/or configured for SDT(s) during the Non-RRC_CONNECTED state. The wireless device may keep the RRC state as the Non-RRC_CONNECTED state, for example, after or while performing the SDT(s). The wireless device may determine to transition an RRC state of the wireless device to a Non- RRC_CONNECTED state from an RRC_CONNECTED state. The wireless device may determine to transition an RRC state to the Non-RRC_CONNECTED state, for example, after or based on (e.g., in response to) receiving the one or more SDT configuration parameters. The wireless device may perform an RRC release procedure, for example, based on (e.g., in response to) receiving the RRC release message. The RRC release procedure may comprise a release and/or a suspension of an established radio bearers and/or configured radio resources. The RRC release procedure may comprise a suspension of the RRC connection (e.g., if a signaling radio bearer (SRB) (e.g., SRB2) and/or at least one dedicated radio bearer (DRB) is setup) and/or a suspension of the established radio bearer(s). The wireless device may, after and/or, for example, based on (e.g., in response to) receiving the RRC release message (or performing the RRC release procedure), determine to transition an RRC state of the wireless devices to a Non-RRC_CONNECTED state from an RRC_CONNECTED state.

For example, the one or more SDT configuration parameters may comprise sdt-ConfigCommon IE (e.g., indicated/configured by SIB1). The one or more SDT configuration parameters may comprise sdt-Config 1E (e.g., via RRCRelease IE). The one or more configuration parameters may comprise CG-SDT-ConfigurationParameters (e.g., configuring CG-SDT).

The one or more SDT configuration parameters may indicate uplink grant(s) configured for the SDT and/or one or more uplink radio resource(s) of the uplink grant(s) configured for the SDT. For example, the one or more SDT configuration parameters may configure the wireless device with the SDT (e.g., RA-based SDT and/or CG-based SDT). For example, the wireless device may perform a CG-based SDT via the one or more uplink radio resources. The one or more uplink radio resources in the Non-RRC_CONNECTED state may be one time use resource, for example, for a single transmission. The one or more uplink radio resources in the Non-RRC_CONNECTED state may be periodic resources, for example, for one or more uplink transmission(s). The one or more uplink radio resources in the Non-RRC_CONNECTED state may be referred to as a variety of names in different systems and/or implementations. The one or more uplink radio resources in the Non-RRC_CONNECTED state may be referred to as preconfigured uplink resources (PURs). Uplink grants indicating the one or more uplink radio resources in the Non-RRC_CONNECTED state may be referred to as (pre-) configured grant(s). The (pre-)configured grant(s) may comprise a plurality of types. For example, the (pre-)configured grant(s) may comprise a (pre-)configured grant Type 1 and/or a (pre-)configured grant Type 2.

The one or more uplink radio resources determined (and/or indicated) by the (pre-) configured grant Type 1 may not use an indication of (re-)initiating (and/or (re-) activating) the one or more uplink radio resources. For example, the one or more uplink radio resources determined (and/or indicated) by the (pre-)configured grant Type 1 may not use an indication of (re-)initiating (and/or (re-)activating) the one or more uplink radio resources, for example, after or based on (e.g., in response to) receiving the RRC message (e.g., RRC release message) indicating the one or more uplink radio resources in the Non-RRC_CONNECTED state.

The wireless device may (re-)initiate (and/or (re-)activate) (pre-)configured grant Type 1/Type 2 and/or one or more uplink radio resources indicated by the (pre-)configured grant Type 1/Type 2, for example, after or based on (e.g., in response to) receiving the RRC message (e.g., RRC release message) comprising the (pre-)configured grant Type 1/Type 2. The wireless device may, for example, if a wireless device receives configuration parameters of the (pre)configured grant Type 1 for a Non-RRC_CONNECTED state, (re-)initiate (and/or (re-)activate) (pre-)configured grant Type 1/Type 2 and/or one or more uplink radio resources indicated by the (pre-) configured grant Type 1/Type 2, for example, after or based on (e.g., in response to) receiving the RRC message (e.g., RRC release message) comprising the (pre-) configured grant Type 1/Type 2 and/or after or based on (e.g., in response to) transiting an RRC state of the wireless device to the Non-RRC_CONNECTED state.

A higher layer (e.g., RRC layer) of the wireless device may initiate the SDT, for example, during a Non-RRC_CONNECTED state. For example, the one or more SDT configuration parameters may comprise at least one of: sdt-DataVolumeThreshold (e.g., indicating a data volume threshold for the wireless device to determine whether to perform SDT procedure); and/or SDT-RSRP threshold (e.g., sdt-RSRP-Threshold) indicating an RSRP threshold for the wireless device to determine whether to perform SDT procedure); and/or sdt-RSRP-ThresholdSSB-SUL (e.g., indicating RSRP threshold for the selection between the NUL carrier and SUL carrier for SDT); and/or CG-SDT-RSRP threshold (e.g., cg-SDT-RSRP-ThresholdSSB) indicating an RSRP threshold configured for SSB selection for CG-SDT); and/or cg-SDT-TimeAlignmentTimer for controlling how long the MAC entity considers the uplink transmission for CG-SDT to be uplink time aligned.

For example, the wireless device may determine that SIB1 comprises sdt-ConfigCommon and/or sdt-Config is configured (e.g., via the RRCRelease IE). The wireless device may have data (e.g., from DTCH and/or DCCH or pending UL data across one or more radio bearers (RBs)) available, for example, during a Non-RRC_CONNECTED state. The data may be new data arriving during the SDT procedure in a Non-RRC_CONNECTED state. The wireless device may calculate/determine volume of the data (e.g., data volume), for example, based on (e.g., in response to) arrival of the data. For example, the wireless device may determine a size of transport block (e.g., a size of message comprising the data and/or data volume size of the message comprising the data). The transport block may comprise the data (e.g., associated with DTCH) that the wireless device sends (e.g., transmits) via the SDT. The transport block may comprise (e.g., further comprise) one or more MAC headers, for example, if used, and/or one or more MAC CEs, for example, if triggered. For example, the transport block that the wireless device sends (e.g., transmits) via the RA-based the SDT may be an MAC PDU that comprises the uplink data, the one or more MAC headers, and/or the one or more MAC CEs.

The wireless device may further consider one or more suspended radio bearers (RBs) configured with the SDT (e.g., via sdt-DRB-List and/or sdt-SRB2-Indication and/or CG-SDT-Config-LCH-restriction) for data volume calculation, for example, for the SDT procedure. It may be up to an implementation of the wireless device how the wireless device calculates the data volume for the one or more suspended RBs. The wireless device may not consider size of a CCCH message for data volume calculation. The data may be mapped to the radio bearers configured for SDT (e.g., via sdt-DRB-List and/or sdt-SRB2-Indication and/or CG-SDT-Config-LCH-restriction).

Upper layers (e.g., the RRC layer) of the wireless device may, for example, due to pending UL data, determine whether to initiate the SDT procedure (e.g., initiates a resume procedure for SDT if the wireless device is in the RRC_INACTIVE state/mode), as shown in step 2630. For example, the wireless device may determine that a request resumption of RRC connection being received (e.g., from upper layers (e.g., AS) of the wireless device). The data volume of the data (e.g., the pending UL data across the one or more RBs configured for SDT) being less than or equal to the sdt-DataVolumeThreshold (or a std-TBS size).

The wireless device may determine not to perform (or initiate) the data transmission via the SDT, for example, if the data volume of the data (or the transport block) is larger than the sdt-DataVolumeThreshold. In this case, the wireless device may initiate the RA procedure (e.g., based on FIGS. 20-25) to make the connection to the network or the base station. The wireless device may transmit the data, for example, after or based on (e.g., in response to) determining that the RA procedure is successfully completed. The wireless device may transition its RRC state from a Non-RRC_CONNECTED state to an RRC_CONNECTED state, for example, after or based on (e.g., in response to) determining that the RA procedure is successfully completed. For example, the wireless device may transmit the uplink data in the RRC_CONNECTED state.

As shown in FIG. 26, in step 2640, the wireless device may determine to initiate the resume procedure for the SDT based on the location information of the NTN node (e.g., the one or more attributes of the service link). For example, the higher layers of the wireless device may determine at least one SDT-initiation condition (e.g., at least one condition for initiating the SDT procedure) being met/fulfilled/satisfied to initiate the resume procedure for SDT (e.g., initiating the SDT procedure). For example, the wireless device may determine that a request resumption of RRC connection being received (e.g., from upper layers (e.g., AS) of the wireless device) and/or the data volume of the data (e.g., the pending UL data across the one or more RBs configured for SDT) being less than or equal to the sdt-DataVolumeThreshold.

The wireless device may (re-)initiate transmission via the one or more uplink radio resources in the Non-RRC_CONNECTED state based on the one or more NTN-specific values/parameters (e.g., the at least one SDT-initiation condition being satisfied). For example, the transmission may be a CG-based SDT. For example, the wireless device may determine if the cell/beam, where the one or more uplink radio resources in the Non-RRC_CONNECTED state are configured, supports transmission(s) via the one or more uplink radio resources. For example, the one or more configuration parameters may indicate whether the cell supports transmission(s) via the one or more uplink radio resources. The one or more configuration parameters may indicate which type of transmission is supported (or available) via the one or more uplink radio resources. For example, the type may comprise control plane (CP) transmission and/or user-plane (UP) transmission. The one or more configuration parameters may indicate which type of network, the cell is connected, supports the transmission via the one or more uplink radio resources. Depending on the type of network that the cell is connected, the wireless device may determine whether the transmission via the one or more uplink radio resources is supported in the cell. For example, the type of network may comprise one or more generations in a network system (e.g., 5G core, Evolved Packet Core (EPC), and/or the like) and/or one or more wireless technologies (e.g., WiFi, 5G, Bluetooth, and/or the like). For example, the type of network may comprise non-terrestrial network (NTN) and/or the type of the cell (e.g., Earth-fixed cell/beam) and/or the type of the NTN payload (e.g., GEO/MEO/LEO satellite). The cell may be part of the NTN.

The one or more configuration parameters may indicate which type of spectrum (and/or frequency band) supports the transmission via the one or more uplink radio resources. For example, the type of spectrum may comprise licensed spectrum and/or unlicensed spectrum and/or a spectrum configured for operating in an NTN example (e.g., S band and/or Ka band). For example, the type of spectrum may comprise a CBRS (Citizens Broadband Radio Service) band (e.g., a wideband in 3.5 GHz band). For example, the type of spectrum may comprise a millimeter wave band (e.g., over 30 GHz band).

The one or more configuration parameters may indicate a combination of the type of network, the type of spectrum, and/or the type of transmission. For example, parameter(s), cp-PUR-5GC (e.g., the parameter value may be 'true'/'false' or 'enabled'/'disabled'), in the one or more configuration parameters indicate whether CP transmission using CG-based SDT is supported in the cell if connected to 5G core network via an NTN (e.g., the wireless device is connected to 5G core via an NTN and/or the cell is part of the NTN). For example, parameter(s), cp-PUR-EPC (e.g., the parameter value may be 'true'/'false' or 'enabled'/'disabled'), in the one or more configuration parameters indicate whether CP transmission using CG-based SDT is supported in the cell if connected to EPC and the cell is part of the NTN. The wireless device may, for example, if the one or more configuration parameters received from a cell indicates cp-PUR-EPC='true' (or 'enabled'), determine that the CG-based SDT is supported in the cell if connected to EPC and the cell is part of the NTN.

The wireless device in the RRC_INACTIVE state may initiate the resume procedure for SDT, for example, based on (e.g., in response to) at least one SDT-initiation condition (e.g., at least one condition for initiating the SDT procedure) being met/fulfilled/satisfied. For example, the higher layers of the wireless device may consider the resume procedure being initiated for SDT and/or start timer T319a. As shown in FIG. 26, the wireless device may transmit the data via/using the UL grant(s) (or configured PUSCH resource(s) or preconfigured UL grants), for example, via CG-SDT procedure or the RA-SDT procedure.

A wireless device may perform (and/or initiate) a CG-based SDT for uplink transmission of data in the Non-RRC_CONNECTED state. The wireless device may monitor, based on the CG-based SDT, a PDCCH in the Non-RRC CONNECTED state.

The wireless device may perform a CG-based SDT via the one or more uplink radio resources of the (pre-)configured grant(s). The wireless device may activate and/or initiate the one or more uplink radio resources (and/or (pre-)configured grant(s) indicating the one or more uplink radio resources) in an RRC_INACTIVE state. For example, the wireless device may (re-)initiate (or activate) the (pre-)configured grant to start in (and/or from) a time reference. For example, the time reference may be a symbol, a slot, a subframe, an SFN, and/or a hyper-SFN (H-SFN). For example, the H-SFN comprise one or more SFNs (e.g., 1024 SFNs). For example, the time reference may be a combination of one or more of: a symbol, a slot, a subframe, an SFN, and/or a hyper-SFN (H-SFN). For example, the time reference may be a symbol of a slot of an SFN of a H-SFN indicated by the configuration parameters (e.g., a time domain offset (e.g., indicating the H-SFN, the SFN and/or the slot) and a symbol number S (e.g., indicating the symbol). For example, the wireless device may determine that the (pre-)configured grant (re-)occurs with a periodicity indicated by the configuration parameters.

The wireless device may, for performing the CG-based SDT, monitor PDCCH, for example, to receive a response to the uplink transmission and/or to receive uplink grant(s) and/or downlink assignment(s). For example, during a time window, the wireless device may monitor the PDCCH, for example, based on (e.g., in response to) sending (e.g., transmitting) the data via the CG-based SDT. The wireless device may monitor the PDCCH during a period of time (e.g., during a time window, during a time interval, and/or while a timer is running) that is predefined and/or configured by a base station to the wireless device. The wireless device may receive, via the PDCCH during the period of time, downlink control message(s) (e.g., DCI) comprising a downlink assignment (e.g., that schedules a downlink transmission).

The wireless device may (re-)start the time window, for example, after or based on (e.g., in response to) sending (e.g., transmitting) the data. The wireless device may receive a DCI via the PDCCH during the time window. The DCI may be a response (e.g., ACK or NACK HARQ feedback) to the sending (e.g., transmitting) the data. The DCI may comprise an uplink grant (e.g., a dynamic grant) that schedules a first subsequent transmission (e.g., downlink or uplink transmission) of the one or more subsequent transmissions. For example, the first subsequent transmission is a new uplink transmission. For example, the first subsequent transmission is a new downlink transmission. For example, the DCI may schedule a new transmission (e.g., the first subsequent transmission) subsequent to the SDT. For example, a transport block of the new transmission may comprise first data (e.g., first MAC SDU) that may be different from second data (e.g., second MAC SDU) sent (e.g., transmitted), by the wireless device, via a transport block of the SDT. For example, the first subsequent transmission may be a retransmission of the uplink data.

The wireless device may monitor, for example, using one or more RNTIs and during the time window, the PDCCH for the response to the transmission of the uplink data. The one or more RNTIs may comprise a C-RNTI of the wireless device. The one or more RNTIs may comprise an RNTI (e.g., CS-RNTI, PUR-RNTI, PUR C-RNTI, SDT-RNTI, and/or the like) assigned for the SDT. The RNTI assigned for the SDT may be referred to as an SDT-RNTI.

The wireless device may receive (and/or detect), via the PDCCH, the DCI (e.g., that schedules one or more subsequent transmissions of the SDT) during the time window. The DCI may comprise CRC parity bits scrambled with the C-RNTI. The DCI comprising CRC parity bits scrambled with the C-RNTI may comprise a dynamic grant, for example, dynamic uplink grant scheduling PUSCH and/or dynamic downlink assignment scheduling PDSCH. The DCI whose CRC parity bits scrambled with the C-RNTI may comprise an uplink grant that schedules a new UL transmission, for example, in the Non-RRC_CONNECTED state. The DCI whose CRC parity bits scrambled with the C-RNTI may comprise a downlink assignment that schedules a new DL transmission, for example, in the Non-RRC_CONNECTED state.

The wireless device may receive (and/or detect), via the PDCCH, the DCI (e.g., that schedules one or more subsequent transmissions of the SDT) during the time window. The DCI may comprise CRC parity bits scrambled with the SDT-RNTI. The DCI whose CRC parity bits scrambled with the SDT-RNTI may comprise an uplink grant that schedules a retransmission of the uplink data (and/or SDT), for example, in the Non-RRC_CONNECTED state.

The wireless device may stop monitoring the PDCCH, for example, based on (e.g., in response to) an expiry of the time window and/or the (re-)started time window. The wireless device may stop the one or more subsequent transmissions in the Non-RRC_CONNECTED state, for example, if the wireless device does not receive DCI during the time window and/or the (re-)started time window. The one or more subsequent transmissions associated with an SDT may be one or more transmissions performed, for example, after or based on (e.g., in response to) the SDT (e.g., the first initial transmission) and before an expiry of the time window (re-)started after or based on (e.g., in response to) the SDT. The wireless device may stop monitoring, using one or more RNTIs, the PDCCH, for example, based on (e.g., in response to) an expiry of the time window and/or the (re-)started time window. The one or more RNTIs may comprise a C-RNTI of the wireless device and/or RNTI(s) (e.g., CS-RNTI, PUR-RNTI, PUR C-RNTI, SDT-RNTI, and/or the like) assigned for the SDT.

The wireless device may receive, for example, based on the downlink assignment, a message (e.g., RRC setup and/or RRC resume) comprising an indication of transitioning to the RRC_CONNECTED state. The wireless device may transition to the RRC_CONNECTED state, for example, after or based on (e.g., in response to) receiving the message. In this case, the wireless device may make an RRC connection to a network (or a base station) via the CG-based SDT. For example, the wireless device may make an RRC connection to a network (or a base station) without an RA procedure. For example, the wireless device may transmit a first message via one or more uplink rando resources in a Non-RRC_CONNECTED state during the CG-based SDT. The first message may comprise an RRC connection setup request (e.g., for the RRC connection setup procedure) and/or an RRC connection resume request (e.g., for the RRC connection resume procedure). The first message may comprise an SDT (EDT) request message. The wireless device may receive, from the base station, a second message indicating a transition to an RRC_CONNECTED state. The second message may be a response to the first message. For example, the wireless device may receive an RRC connection setup message. For example, the wireless device may receive an RRC connection resume message. The wireless device may transition to the RRC_CONNECTED state, for example, after or based on (e.g., in response to) receiving the second message. The wireless device may deactivate and/or suspend (or clear), in an RRC_CONNECTED state, the one or more uplink radio resources (and/or (pre-)configured grant(s)) that were used in the Non-RRC_CONNECTED state. For example, the one or more uplink radio resources (and/or (pre-)configured grant(s)) may be deactivated and/or suspended (cleared, and/or invalid), for example, after or based on (e.g., in response to) making the connection to the base station.

The wireless device may initiate a random access (RA) procedure (e.g., RA-based SDT and/or EDT) on a cell to transmit, via the cell, the data in an Non-RRC_CONNECTED state. For example, the data may be associated with a particular logical channel. For example, the data may comprise a service data unit (SDU) from a particular logical channel (e.g., DTCH). The wireless device may keep its RRC state as the Non-RRC_CONNECTED state, for example, while performing the RA procedure and/or while sending (e.g., transmitting) the data during the RA procedure. The wireless device may keep the Non-RRC_CON- NECTED state, for example, based on (e.g., in response to) or after completing the RA procedure and/or completing the transmission of the data.

The wireless device in the RRC_INACTIVE state may not initiate the resume procedure for SDT, for example, based on (e.g., in response to) at least one SDT-initiation condition (e.g., at least one condition for initiating the SDT procedure) not being met/fulfilled/satisfied. For example, the higher layers of the wireless device may instruct the lower layers of the wireless device to consider a cg-SDT-TimeAlignmentTimer as expired (if it is running) and/or start timer T319. For example, the MAC layer of the wireless device may clear (any) configured uplink grants and/or flush one or more (all) HARQ buffers. The wireless device may consider the ongoing CG-SDT procedure as terminated.

The wireless device may determine the at least one SDT-initiation conditions being satisfied based on the one or more NTN-specific values/parameters (e.g., the one or more attributed of the service link or the location information of the NTN node) and a second set of NTN-specific thresholds of/among/from the one or more sets of NTN-specific thresholds. For example, the second set of NTN-specific thresholds may be different than the first set of NTN-specific thresholds. The second set of NTN-specific thresholds may be the first set of NTN-specific thresholds.

The at least one SDT-initiation conditions may be satisfied, for example, based on at least one of the following: a first set of SDT-initiation rules being satisfied; and/or a second set of SDT-initiation rules being satisfied; and/or a third set of SDT-initiation rules being satisfied. For example, the wireless device may determine the first set of SDT-initiation rules being satisfied based on the propagation delay of the service link being smaller than a first NTN-specific threshold of (or among/from) the second set of NTN-specific thresholds (e.g., the wireless device is located around the cell/beam center). The wireless device may, for example, determine first set of SDT-initiation rules not being satisfied based on the propagation delay of the service link being larger than the first NTN-specific threshold of (or among/from) the second set of NTN-specific thresholds (e.g., the wireless device is located around the cell/beam edge).

The wireless device may determine the first set of SDT-initiation rules being satisfied based on the length of the service link being smaller than a second NTN-specific threshold of (or among/from) the second set of NTN-specific thresholds (e.g., the wireless device is located around the cell/beam edge). The wireless device may determine the first set of SDT-initiation rules not being satisfied based on the length of the service link being larger than the second NTN-specific threshold of (or among/from) the second set of NTN-specific thresholds (e.g., the wireless device is located around the cell/beam center).

The wireless device may determine the first set of SDT-initiation rules being satisfied based on the elevation angle of the service link being larger than a third NTN-specific threshold of (or among/from) the second set of NTN-specific thresholds (e.g., the wireless device is located around the cell/beam edge). The wireless device may determine the first set of SDT-initiation rules not being satisfied based on the elevation angle of the service link being smaller than the third NTN-specific threshold of (or among/from) the second set of NTN-specific thresholds (e.g., the wireless device is located around the cell/beam center).

The wireless device may determine the second set of SDT-initiation rules being satisfied based on the RSRP of the DL-PL reference being smaller than the SDT-RSRP threshold. The wireless device may determine the second set of SDT-initiation rules not being satisfied based on the RSRP of the DL-PL reference being larger than the SDT-RSRP threshold.

The third set of SDT-initiation rules may be based on a probabilistic (or a randomized) procedure/method/function. For example, the probabilistic (or a randomized) procedure may comprise generating one or more random numbers. For example, the wireless device may determine the third set of SDT-initiation rules being satisfied based on a first/initial random number of the one or more random numbers being smaller than a first threshold (e.g., a fourth NTN-specific threshold of (or among/from) the second set of NTN-specific thresholds). The wireless device may determine the first threshold based on an SDT-RSRP threshold (e.g., or the RSRP threshold) and the RSRP of the DL-PL reference (e.g., as a ratio of the RSRP of the DL-PL reference and the SDT-RSRP threshold).

The wireless device may determine the third set of SDT-initiation rules being satisfied based on a second random number of the one or more random numbers being larger than a second threshold (e.g., a fifth NTN-specific threshold of (or among/from) the second set of NTN-specific thresholds). The wireless device may determine the second threshold based on the SDT-RSRP threshold (e.g., the RSRP threshold) and the RSRP of the DL-PL reference (e.g., as a ratio of the SDT-RSRP threshold and the RSRP of the DL-PL reference, for example, the inverse value of the first threshold).

The wireless device may determine the first threshold based on an NTN-specific threshold (e.g., the first/second/third NTN-specific threshold of the second set of NTN-specific thresholds) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like. The wireless device may determine the second threshold based on a NTN-specific threshold (e.g., the first/second/third NTN-specific threshold of the second set of NTN-specific thresholds) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise the SDT-RSRP threshold. For example, the wireless device may, based on the one or more NTN-specific values/parameters (e.g., the one or more attributes of the service link) and the SDT-RSRP threshold, determine/calculate an SDT-RSRP threshold for determining whether the at least one SDT-initiation conditions being satisfied (e.g., using/based on second set of SDT-initiation rules or not and/or the third set of SDT-initiation rules being satisfied or not). For example, the wireless device may reduce/increase the SDT-RSRP threshold by a factor to calculate the SDT-RSRP threshold. The factor may be calculated (e.g., by a formula) from the one or more attributes of the service link.

The base station may configure the wireless device with a plurality of sdt-RSRP-Threshold values, for example, via the one or more configuration parameters. The one or more configuration parameters messages may indicate that the plurality of sdt-RSRP-Threshold values are configured for a particular type of the NTN payload (a GEO satellite, a MEO satellite, a LEO satellite) and/or a particular type of the cell/beam (e.g., Earth-fixed beam/cell). Each sdt-RSRP-Threshold value among/of/from the plurality of sdt-RSRP-Threshold values may correspond to a relevant location of the NTN payload to the cell/beam (or the wireless device), for example, if the NTN payload is moving. Each sdt-RSRP-Threshold value among/of/from the plurality of sdt-RSRP-Threshold values may correspond to a range of elevation angle of the service link. Each sdt-RSRP-Threshold value among/of/from the plurality of sdt-RSRP-Threshold values may correspond to a range of propagation delay of the service link. Each sdt-RSRP-Threshold value among/of/from the plurality of sdt-RSRP-Threshold values may correspond to a range of length of the service link.

For determining whether initiation condition(s) of the SDT procedure being satisfied or not, the wireless device may select a sdt-RSRP-Threshold value among/of/from plurality of sdt-RSRP-Threshold values. The wireless device may select the sdt-RSRP-Threshold value among/of/from plurality of sdt-RSRP-Threshold values, for example, based on the one or more NTN-specific configuration parameters (e.g., the one or more NTN-specific parameters/values). The wireless device may use the (selected) sdt-RSRP-Threshold value for determining whether the first set of SDT-initiation rules being satisfied or not. The wireless device may use the (selected) sdt-RSRP-Threshold value for determining whether the third set of SDT-initiation rules being satisfied or not.

The wireless device may select the sdt-RSRP-Threshold value (e.g., a first/initial or a last/final or an n-th sdt-RSRP-Threshold value) among/of/from the plurality of sdt-RSRP-Threshold values based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the sdt-RSRP-Threshold value among/of/from the set of sdt-RSRP-Threshold values is applicable for the RA procedure. The wireless device may select the n-th sdt-RSRP-Threshold value among/of/from plurality of sdt-RSRP-Threshold values, for example, based on the attribute of the service link (e.g., the propagation delay, the length, or the elevation angle) being in the n-th (n=0, N) range/interval of the one or more ranges/intervals of an attribute of the service link.

The one or more configuration parameters may comprise a third configuration parameter. The third configuration parameter may, for example, indicate whether the wireless device use/adopt the one or more NTN-specific configuration parameters to determine the at least one SDT-initiation condition being satisfied or not. The wireless device may, for example, based on (e.g., in response to) determining the first configuration parameter being indicated/configured (or being enabled or not being disabled or not being absent from the one or more configuration parameters), determine whether the at least one SDT-initiation condition being satisfied or not based on the one or more NTN-specific configuration parameters (e.g., determining SDT initiation conditions being satisfied is based on the first set of SDT-initiation rules). The wireless device may, for example, based on (e.g., in response to) determining the third configuration parameter not being indicated/configured (or being disabled or being absent from the one or more configuration parameters), determine whether the at least one SDT-initiation condition being satisfied based on whether the second set of SDT-initiation rules being satisfied being satisfied (e.g., determining SDT initiation conditions being satisfied is based on the second set of SDT-initiation rules).

The wireless device may determine whether the at least one SDT-initiation condition being satisfied based on the one or more NTN-specific configuration parameters (e.g., the first set of SDT-initiation rules being satisfied) and the second set of SDT-initiation rules being satisfied being satisfied (e.g., determining SDT initiation conditions being satisfied is based on the second set of SDT-initiation rules and the second set of SDT-initiation rules), for example, based on (e.g., in response to) determining the third configuration parameter being indicated/configured (or being enabled or not being disabled or not being absent from the one or more configuration parameters). The wireless device may determine whether the at least one SDT-initiation condition being satisfied based on whether the second set of SDT-initiation rules being satisfied being satisfied (e.g., determining SDT initiation conditions being satisfied is based on the second set of SDT-initiation rules), for example, based on (e.g., in response to) determining the third configuration parameter not being indicated/configured (or being disabled or being absent from the one or more configuration parameters).

The one or more configuration parameters may comprise a fourth configuration parameter. The fourth configuration parameter may, for example, indicate whether the wireless device use/adopt the probabilistic procedure (e.g., the third set of SDT-initiation rules being satisfied) to determine the at least one SDT-initiation condition being satisfied or not. The wireless device may, for example, based on (e.g., in response to) determining the fourth configuration parameter being indicated/configured (or being enabled or not being disabled or not being absent from the one or more configuration parameters), determine whether the at least one SDT-initiation condition being satisfied based on the third set of SDT-initiation rules being satisfied (e.g., determining SDT initiation conditions being satisfied is based on the third set of SDT-initiation rules). The wireless device may, for example, based on (e.g., in response to) determining the fourth configuration parameter not being indicated/configured (or being disabled or being absent from the one or more configuration parameters), determine whether the at least one SDT-initiation condition being satisfied based on the second set of SDT-initiation rules being satisfied (e.g., determining SDT initiation conditions being satisfied is based on the second set of SDT-initiation rules).

The wireless device may, for example, based on (e.g., in response to) determining the fourth configuration parameter being indicated/configured (or being enabled or not being disabled or not being absent from the one or more configuration parameters), determine whether the at least one SDT-initiation condition being satisfied based on the third set of SDT-initiation rules being satisfied and the second set of SDT-initiation rules being satisfied (e.g., determining SDT initiation conditions being satisfied is based on the second set of SDT-initiation rules and the third set of SDT-initiation rules). The wireless device may, for example, based on (e.g., in response to) determining the fourth configuration parameter not being indicated/configured (or being disabled or being absent from the one or more configuration parameters), determine whether the at least one SDT-initiation condition being satisfied based on the second set of SDT-initiation rules being satisfied (e.g., determining SDT initiation conditions being satisfied is based on the second set of SDT-initiation rules).

Some examples may allow the higher layers (e.g., RRC layer) of the wireless device determine whether to initiate the SDT procedure (e.g., initiate the resume procedure for the SDT) based on the location information of the NTN node (e.g., the one or more attributes of the service link), for example, if the wireless device is operating in an NTN. Some examples may strike a balance between signaling load of the cell/beam and delay constraint of SDT transmission. Some examples may provide a robust performance of the SDT procedure despite the movement of the satellite.

Figure 27:
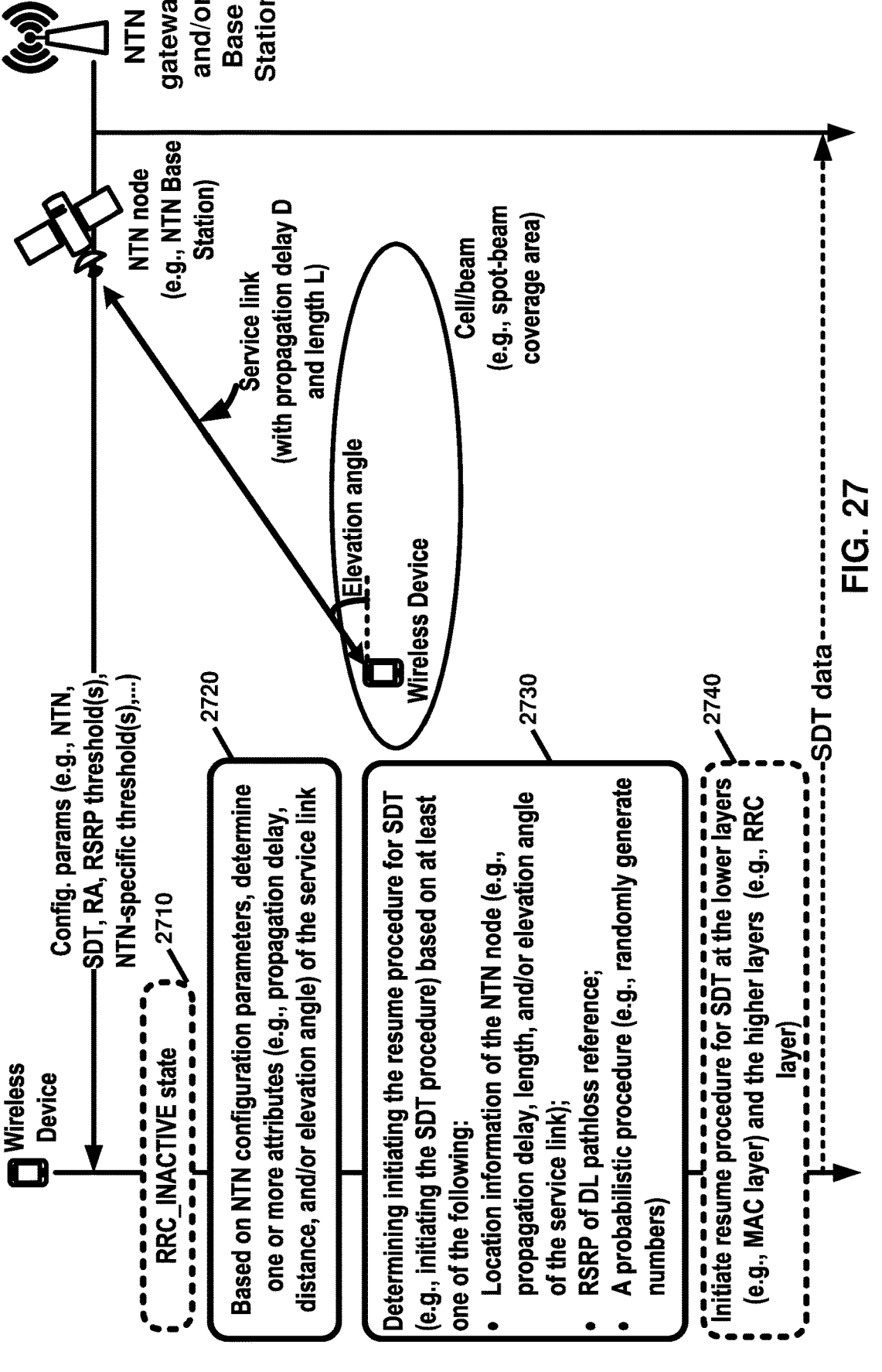
FIG. 27 shows an example of an SDT procedure in wireless communications systems.

FIG. 27 shows an example of a small data transmission in wireless communications systems. For example, FIG. 27 may show an example of a CG-SDT procedure or a RA-SDT procedure for an SDT procedure. FIG. 27 may show an implementation of a method (or a process) for the SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state) as shown in step 2710. FIG. 27 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode). The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

As shown in FIG. 27, the wireless device may receive the one or more configuration parameters (e.g., the one or more RA configuration parameters and/or the one or more NTN configuration parameters) from the base station. For example, in step 2720, using/based on the one or more NTN-specific parameters/values, the wireless device may determine the one or more attributes of the service link. The one or more attributes of the service link may comprise the propagation delay of the service link, and/or the length of the service link, and/or the elevation angle of the service link, and/or the like.

A higher layer (e.g., RRC layer) of the wireless device may initiate the SDT, for example, during a Non-RRC_CONNECTED state. For example, the wireless device may determine that SIB1 comprises sdt-ConfigCommon and/or sdt-Config is configured (e.g., via the RRCRelease IE). The wireless device may have data (e.g., from DTCH and/or DCCH or pending UL data across one or more radio bearers (RBs)) available during a Non-RRC_CONNECTED state. The data may be new data arriving during the SDT procedure in a Non-RRC_CONNECTED state. The wireless device may calculate/determine volume of the data (e.g., data volume), for example, based on (e.g., in response to) arrival of the data. For example, for the SDT procedure, the wireless device may further consider one or more suspended radio bearers (RBs) configured with the SDT (e.g., via sdt-DRB-List and/or sdt-SRB2-Indication and/or CG-SDT-Config-LCH-restriction) for data volume calculation. It may be up to an implementation of the wireless device how the wireless device calculates the data volume for the one or more suspended RBs. The wireless device may not consider size of a CCCH message for data volume calculation. The data may be mapped to the radio bearers configured for SDT (e.g., via sdt-DRB-List and/or sdt-SRB2-Indication and/or CG-SDT-Config-LCH-restriction).

As shown in step 2730, the upper layers (e.g., the RRC layer) of the wireless device may determine to initiate the SDT procedure (e.g., initiates a resume procedure for SDT if the wireless device is in the RRC_INACTIVE state/ mode), for example, due to pending UL data and/or arrival of new data. For example, the wireless device may determine that a request resumption of RRC connection being received (e.g., from upper layers of the wireless device) and/or the data volume of the data (e.g., the pending UL data across the one or more RBs configured for SDT) being less than or equal to the sdt-DataVolumeThreshold. For example, the higher layers (e.g., the RRC layer) of the wireless device send an indication to the lower layer (e.g., the MAC layer) of the wireless device for indicating an initiation of SDT. For example, the MAC layer may, based on the indication, determine that the upper layers are initiated the SDT procedure.

The higher layers of the wireless device may determine at least one SDT-initiation condition (e.g., at least one condition for initiating the SDT procedure) being met/fulfilled/ satisfied to send an initiation of SDT procedure to the lower layers of the wireless device for initiating the SDT procedure. The lower layers of the wireless device may determine at least one SDT-initiation-fulfilment condition (e.g., at least one fulfilment condition for initiating the SDT procedure) being met/fulfilled/satisfied to perform the initiated SDT procedure (e.g., sending (e.g., transmitting) the data via the CG-SDT procedure).

The lower layer (e.g., the MAC layer) of the wireless device may send an indication to the higher layers (e.g., the RRC layer) of the wireless device for indicating a fulfilment of condition(s) of the initiated SDT procedure by the higher layers, for example, based on (e.g., in response to) determining the at least one SDT-initiation-fulfilment condition being satisfied. For example, in step 2740, the wireless device in the RRC_INACTIVE state may initiate the resume procedure for SDT based on the indication of the fulfilment of condition(s) of the initiated SDT procedure being received from the lower layers. For example, the higher layers of the wireless device may consider the resume procedure being initiated for SDT and/or start timer T319a. As shown in FIG. 27, the wireless device may transmit the data via/using the CG-SDT procedure or the RA-SDT procedure.

The lower layer (e.g., the MAC layer) of the wireless device may send an indication to the higher layers (e.g., the RRC layer) of the wireless device for indicating a failure of fulfilment of condition(s) of the initiated SDT procedure by the higher layers, for example, based on (e.g., in response to) determining the at least one SDT-initiation-fulfilment condition not being satisfied. For example, the wireless device in the RRC_INACTIVE state may not initiate the resume procedure for SDT based on the indication of the failure of fulfilment of condition(s) of the initiated SDT procedure being received from the lower layers. For example, the higher layers of the wireless device may instruct the lower layers of the wireless device to consider a cg-SDT-Time-AlignmentTimer as expired (if it is running) and/or start timer T319. For example, the MAC layer of the wireless device may clear (any) configured uplink grants and/or flush one or more (all) HARQ buffers. The wireless device may consider the ongoing CG-SDT procedure as terminated.

The wireless device may determine the at least one SDT-initiation-fulfilment condition being satisfied based on the one or more NTN-specific values/parameters (e.g., the one or more attributed of the service link) and a third set of NTN-specific thresholds of/among/from the one or more sets of NTN-specific thresholds. For example, the third set of NTN-specific thresholds may be different than the second set of NTN-specific thresholds. The third set of NTN-specific thresholds may be the second set of NTN-specific thresholds.

The at least one SDT-initiation-fulfilment condition being satisfied based on at least one of the following: a first set of SDT-initiation-fulfilment rules being satisfied; and/or a second set of SDT-initiation-fulfilment rules being satisfied; and/or a third set of SDT-initiation-fulfilment rules being satisfied. For example, the wireless device may determine the first set of SDT-initiation-fulfilment rules being satisfied based on the propagation delay of the service link being smaller than a first NTN-specific threshold of (or among/from) the third set of NTN-specific thresholds (e.g., the wireless device is located around the cell/beam center). The wireless device may, for example, determine first set of SDT-initiation-fulfilment rules not being satisfied based on the propagation delay of the service link being larger than the first NTN-specific threshold of (or among/from) the third set of NTN-specific thresholds (e.g., the wireless device is located around the cell/beam edge).

The wireless device may determine the first set of SDT-initiation-fulfilment rules being satisfied based on the length of the service link being smaller than a second NTN-specific threshold of (or among/from) the third set of NTN-specific thresholds (e.g., the wireless device is located around the cell/beam center). The wireless device may determine the first set of SDT-initiation-fulfilment rules not being satisfied based on the length of the service link being larger than the second NTN-specific threshold of (or among/from) the third set of NTN-specific thresholds (e.g., the wireless device is located around the cell/beam edge).

The wireless device may determine the first set of SDT-initiation-fulfilment rules being satisfied based on the elevation angle of the service link being larger than a third NTN-specific threshold of (or among/from) the third set of NTN-specific thresholds (e.g., the wireless device is located around the cell/beam center). The wireless device may determine the first set of SDT-initiation-fulfilment rules not being satisfied based on the elevation angle of the service link being smaller than the third NTN-specific threshold of (or among/from) the third set of NTN-specific thresholds (e.g., the wireless device is located around the cell/beam edge).

The wireless device may determine the second set of SDT-initiation-fulfilment rules being satisfied based on the RSRP of the DL-PL reference being smaller than the SDT-RSRP threshold (e.g., sdt-RSRP-Threshold). The wireless device may determine the second set of SDT-initiation-fulfilment rules not being satisfied based on the RSRP of the DL-PL reference being larger than the SDT-RSRP threshold.

The third set of SDT-initiation-fulfilment rules may be based on a probabilistic (or a randomized) procedure/method/function. For example, the probabilistic (or a randomized) procedure may comprise generating one or more random numbers. For example, the wireless device may determine the third set of SDT-initiation-fulfilment rules being satisfied based on a first/initial random number of the one or more random numbers being smaller than a first threshold (e.g., a fourth NTN-specific threshold of (or among/from) the third set of NTN-specific thresholds). The wireless device may determine the first threshold based on an SDT-RSRP threshold (e.g., or the RSRP threshold) and the RSRP of the DL-PL reference (e.g., as a ratio of the RSRP of the DL-PL reference and the SDT-RSRP threshold).

The wireless device may determine the third set of SDT-initiation-fulfilment rules being satisfied based on a second random number of the one or more random numbers being larger than a second threshold (e.g., a fifth NTN-specific threshold of (or among/from) the third set of NTN-specific thresholds). The wireless device may determine the second threshold based on the SDT-RSRP threshold (e.g., the RSRP threshold) and the RSRP of the DL-PL reference (e.g., as a ratio of the SDT-RSRP threshold and the RSRP of the DL-PL reference, for example, the inverse value of the first threshold).

The wireless device may determine the first threshold based on an NTN-specific threshold (e.g., the first/second/third NTN-specific threshold of the third set of NTN-specific thresholds) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like. The wireless device may determine the second threshold based on a NTN-specific threshold (e.g., the first/second/third NTN-specific threshold of the third set of NTN-specific thresholds) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise the SDT-RSRP threshold. For example, the wireless device may, based on the one or more NTN-specific values/parameters (e.g., the one or more attributes of the service link) and the SDT-RSRP threshold, determine/calculate an SDT-RSRP threshold for determining whether the at least one SDT-initiation-fulfilment conditions being satisfied (e.g., using/based on second set of SDT-initiation-fulfilment rules or not and/or the third set of SDT-initiation-fulfilment rules being satisfied or not). For example, the wireless device may reduce/increase the SDT-RSRP threshold by a factor to calculate the SDT-RSRP threshold. The factor may be calculated (e.g., by a formula) based on the location information of the NTN node (e.g., the one or more attributes of the service link).

The base station may configure the wireless device with a plurality of sdt-RSRP-Threshold values, for example, via the one or more configuration parameters. The one or more configuration parameters messages may indicate that the plurality of sdt-RSRP-Threshold values are configured for a particular type of the NTN payload (a GEO satellite, a MEO satellite, a LEO satellite) and/or a particular type of the cell/beam (e.g., Earth-fixed beam/cell). Each sdt-RSRP-Threshold value among/of/from the plurality of sdt-RSRP-Threshold values may correspond to a relevant location of the NTN payload to the cell/beam (or the wireless device), for example, if the NTN payload is moving. Each sdt-RSRP-Threshold value among/of/from the plurality of sdt-RSRP-Threshold values may correspond to a range of elevation angle of the service link. Each sdt-RSRP-Threshold value among/of/from the plurality of sdt-RSRP-Threshold values may correspond to a range of propagation delay of the service link. Each sdt-RSRP-Threshold value among/of/ from the plurality of sdt-RSRP-Threshold values may correspond to a range of length of the service link.

For determining whether initiation condition(s) of the SDT procedure being satisfied or not, the wireless device may select a sdt-RSRP-Threshold value among/of/from the plurality of sdt-RSRP-Threshold values. The wireless device may select the sdt-RSRP-Threshold value among/of/from plurality of sdt-RSRP-Threshold values, for example, based on the one or more NTN-specific configuration parameters (e.g., the one or more NTN-specific parameters/values). The wireless device may use the (selected) sdt-RSRP-Threshold value for determining whether the first set of SDT-initiation-fulfilment rules being satisfied or not. The wireless device may use the (selected) sdt-RSRP-Threshold value for determining whether the third set of SDT-initiation-fulfilment rules being satisfied or not.

The wireless device may select the sdt-RSRP-Threshold value (e.g., a first/initial or a last/final or an n-th sdt-RSRP-Threshold value) among/of/from the plurality of sdt-RSRP-Threshold values based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the sdt-RSRP-Threshold value among/of/from the set of sdt-RSRP-Threshold values is applicable for the RA procedure. The wireless device may select the n-th sdt-RSRP-Threshold value among/of/from plurality of sdt-RSRP-Threshold values, for example, based on the attribute of the service link (e.g., the propagation delay, the length, or the elevation angle) being in the n-th (n=0, 1, N) range/interval of the one or more ranges/intervals of an attribute of the service link.

The one or more configuration parameters may comprise a third configuration parameter. The third configuration parameter may, for example, indicate whether the wireless device use/adopt the one or more NTN-specific configuration parameters to determine the at least one SDT-initiation-fulfilment condition being satisfied or not. For example, the wireless device may, based on (e.g., in response to) determining the first configuration parameter being indicated/configured (or being enabled or not being disabled or not being absent from the one or more configuration parameters), determine whether the at least one SDT-initiation-fulfilment condition being satisfied or not based on the one or more NTN-specific configuration parameters (e.g., determining SDT initiation conditions being satisfied is based on the first set of SDT-initiation-fulfilment rules). For example, the wireless device may, based on (e.g., in response to) determining the third configuration parameter not being indicated/configured (or being disabled or being absent from the one or more configuration parameters), determine whether the at least one SDT-initiation-fulfilment condition being satisfied based on whether the second set of SDT-initiation-fulfilment rules being satisfied being satisfied (e.g., determining SDT initiation conditions being satisfied is based on the second set of SDT-initiation-fulfilment rules).

The wireless device may, for example, based on (e.g., in response to) determining the third configuration parameter being indicated/configured (or being enabled or not being disabled or not being absent from the one or more configuration parameters), determine whether the at least one SDT-initiation-fulfilment condition being satisfied based on the one or more NTN-specific configuration parameters (e.g., the first set of SDT-initiation-fulfilment rules being satisfied)

and the second set of SDT-initiation-fulfilment rules being satisfied being satisfied (e.g., determining SDT initiation conditions being satisfied is based on the first set of SDT-initiation-fulfilment rules and the second set of SDT-initiation-fulfilment rules). The wireless device may, for example, based on (e.g., in response to) determining the third configuration parameter not being indicated/configured (or being disabled or being absent from the one or more configuration parameters), determine whether the at least one SDT-initiation-fulfilment condition being satisfied based on whether the second set of SDT-initiation-fulfilment rules being satisfied being satisfied (e.g., determining SDT initiation conditions being satisfied is based on the second set of SDT-initiation-fulfilment rules).

The one or more configuration parameters may comprise a fourth configuration parameter. The fourth configuration parameter may, for example, indicate whether the wireless device use/adopt the probabilistic procedure (e.g., the third set of SDT-initiation-fulfilment rules being satisfied) to determine the at least one SDT-initiation condition being satisfied or not. For example, based on (e.g., in response to) determining the fourth configuration parameter being indicated/configured (or being enabled or not being disabled or not being absent from the one or more configuration parameters) the wireless device may determine whether the at least one SDT-initiation-fulfilment condition being satisfied based on the third set of SDT-initiation-fulfilment rules being satisfied (e.g., determining SDT initiation conditions being satisfied is based on the first set of SDT-initiation-fulfilment rules). The wireless device may, for example, based on (e.g., in response to) determining the fourth configuration parameter not being indicated/configured (or being disabled or being absent from the one or more configuration parameters), determine whether the at least one SDT-initiation-fulfilment condition being satisfied based on the second set of SDT-initiation-fulfilment rules being satisfied (e.g., determining SDT initiation conditions being satisfied is based on the second set of SDT-initiation-fulfilment rules).

The wireless device may, for example, based on (e.g., in response to) determining the fourth configuration parameter being indicated/configured (or being enabled or not being disabled or not being absent from the one or more configuration parameters), determine whether the at least one SDT-initiation-fulfilment condition being satisfied based on the third set of SDT-initiation-fulfilment rules being satisfied and the second set of SDT-initiation-fulfilment rules being satisfied (e.g., determining SDT initiation conditions being satisfied is based on the second set of SDT-initiation-fulfilment rules and the third set of SDT-initiation-fulfilment rules). The wireless device may, for example, based on (e.g., in response to) determining the fourth configuration parameter not being indicated/configured (or being disabled or being absent from the one or more configuration parameters), determine whether the at least one SDT-initiation-fulfilment condition being satisfied based on the second set of SDT-initiation-fulfilment rules being satisfied (e.g., determining SDT initiation conditions being satisfied is based on the second set of SDT-initiation-fulfilment rules).

The one or more SDT configuration parameters may indicate uplink grant(s) and/or the one or more uplink radio resource(s) of the uplink grant(s) for the SDT. The wireless device may, for example, based on (e.g., in response to) determining the at least one SDT-initiation condition being satisfied (corresponding to FIG. 23) or the at least one SDT-initiation-fulfilment condition being satisfied, transmit the data via at least one of the one or more uplink radio resource(s). For example, the wireless device may skip a transmission via the at least one of the one or more uplink radio resource(s), for example, if there is no uplink data in a buffer of the wireless device.

The wireless device may perform one or more subsequent transmissions, for example, after or based on (e.g., in response to) determining the at least one SDT-initiation condition being satisfied or the at least one SDT-initiation-fulfilment condition being satisfied. The wireless device may stop/skip at least one of the one or more subsequent transmissions, for example, based on (e.g., in response to) determining at least one or more ephemeris parameters (e.g., satellite ephemeris parameters or NTN ephemeris parameters) not being valid (e.g., the validity duration being expired). For example, the wireless device may wait to acquire a new ephemeris data (e.g., updating the open-loop TA value of the wireless device associated with the TAG/cell) and resume the one or more subsequent transmissions.

For the SDT, the one or more configuration parameters may indicate/configure one or more DL reference signals (RSs) (e.g., a plurality of SSBs, CSI/RS, and/or the like), for example, using one or more beams (e.g., TX beams of the cell). For performing the SDT (after or based on (e.g., in response to) determining the at least one SDT-initiation condition being satisfied or the at least one SDT-initiation-fulfilment condition being satisfied), the wireless device may determine, for example, based on at least one of the one or more DL RSs, transmission parameters (e.g., TX antenna parameters) of a wireless device for PUSCH, PUCCH, and/or SRS. The wireless device may, for example, based on at least one of the one or more DL RSs, determine reception parameters (e.g., RX antenna parameters) of a wireless device for PDSCH, and/or PDCCH.

The one or more configuration parameters may indicate a DL RS (e.g., an SSBs, CSI/RS, and/or the like) to be used for PDCCH, PDSCH, PUSCH, PUCCH, and/or SRS. The one or more configuration parameters may indicate a first DL RS (e.g., an SSBs, CSI/RS, and/or the like) for an uplink transmission, for example, PUSCH, PUCCH, and/or SRS. The one or more configuration parameters may indicate a second DL RS (e.g., an SSBs, CSI/RS, and/or the like) for a downlink transmission, for example, PDCCH, and/or PDSCH. The one or more configuration parameters may indicate one or more DL RSs (e.g., an SSBs, CSI/RS, and/or the like), and each DL RS may be dedicated a particular channel of PDCCH, PDSCH, PUSCH, PUCCH, and/or SRS. A DL RS indicated by the message for a first channel (e.g., PDCCH, PDSCH, PUSCH, PUCCH, and/or SRS) may be the same to a DL RS indicated by the message for a second channel (e.g., PDCCH, PDSCH, PUSCH, PUCCH, and/or SRS). A DL RS indicated by the message for a first channel (e.g., PDCCH, PDSCH, PUSCH, PUCCH, and/or SRS) may be different from a DL RS indicated by the message for a second channel (e.g., PDCCH, PDSCH, PUSCH, PUCCH, and/or SRS).

The wireless device may select at least one of the one or more DL RSs. The wireless device may select the at least one of the one or more DL RSs to determine transmission parameters (e.g., TX antenna parameters) of a wireless device for PUSCH, PUCCH, and/or SRS. The wireless device may select at least one of the one or more DL RSs to determine reception parameters (e.g., RX antenna parameters) of a wireless device for PDSCH, and/or PDCCH for reception during the Non-RRC_CONNECTED state during an SDT and/or one or more subsequent transmission (and/or reception).

The one or more configuration parameters may indicate one or more DL RSs (e.g., one or more SSBs, CSI/RSs, and/or the like) to be used for PDCCH, PDSCH, PUSCH, PUCCH, and/or SRS. The wireless device may select at least one of the one or more DL RSs for the SDT. For example, the wireless device may initiate the SDT, for example, based on (e.g., in response to) an uplink data available in a buffer and/or based on (e.g., in response to) an uplink grant (or an uplink radio resource of the uplink grant) available for the SDT. The wireless device may determine or select the at least one of the one or more DL RSs for the PDCCH, PDSCH, PUSCH, PUCCH, and/or SRS of the SDT.

The determination and/or the selection of the at least one may be based on measurements (e.g., RSRP values) of the one or more DL RSs and/or the one or more NTN-specific parameters and/or the probabilistic procedure. The one or more SDT configuration parameters may comprise and/or indicate a power threshold value. The wireless device may measure RSRPs of the one or more DL RSs. For example, the wireless device may select the at least one based on an RSRP value of the at least one being larger than the power threshold value. For example, the wireless device may select the at least one based on an RSRP value of the at least one being the largest one among the RSRP values of the one or more DL RSs. The wireless device may determine the at least one SDT-initiation condition being satisfied or the at least one SDT-initiation-fulfilment condition being satisfied.

The wireless device may select at least one of the one or more DL RSs to be used for PUSCH of an SDT (and/or one or more subsequent transmissions of the SDT). The wireless device may, for example, based on the at least one of the one or more DL RSs, determine a configuration of the PUSCH of the SDT and/or uplink radio resource(s) of the PUSCH of the SDT.

Some examples may allow the higher layers (e.g., RRC layer) of the wireless device determine whether to initiate the SDT procedure (e.g., initiate the resume procedure for the SDT) based on the location information of the NTN node (e.g., the one or more attributes of the service link), for example, if the wireless device is operating in an NTN. Some examples may strike a balance between signaling load of the cell/beam and delay constraint of SDT transmission. Some examples may provide a robust performance of the SDT procedure despite the movement of the satellite.

Figure 28:
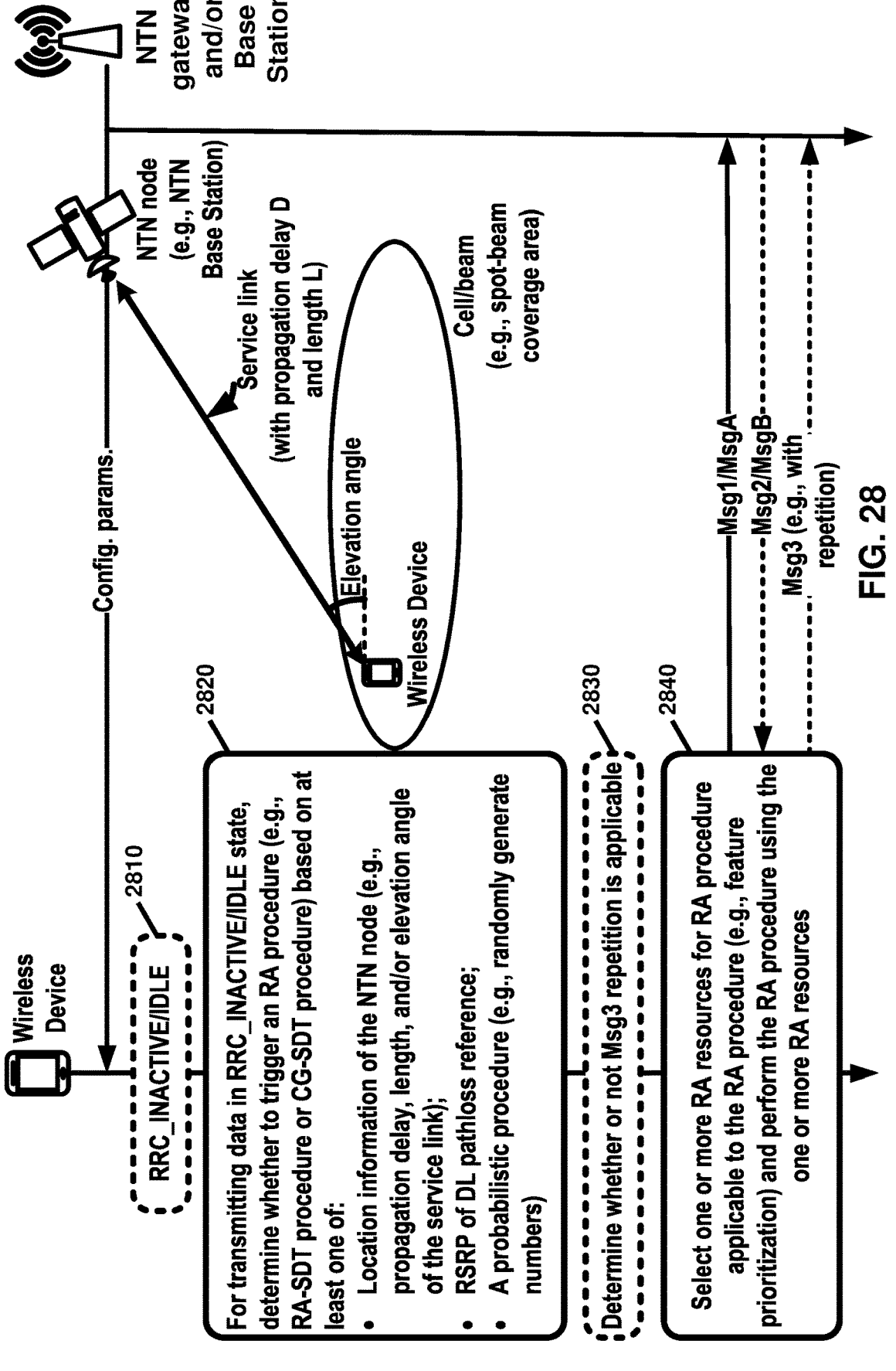
FIG. 28 shows an example of an SDT procedure in wireless communications systems.

FIG. 28 shows an example of SDT procedure in wireless communications systems. For example, FIG. 28 may show an example of a selection of a transmission type of an SDT procedure (e.g., selection between the CG-SDT procedure and the RA-SDT procedure). FIG. 28 may show an implementation of a method (or a process) for the SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state), as shown in step 2810. FIG. 28 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN). For example, the wireless device and the base station may operate in the NTN and/or the base station may be an NTN base station and/or the cell may be part of the NTN. For example, the cell may be the serving cell.

As shown in FIG. 28, the wireless device may receive the one or more configuration parameters (e.g., the one or more RA configuration parameters and/or the one or more NTN configuration parameters and/or the one or more SDT configuration parameters) from the base station. The wireless device may determine the one or more attributes of the service link, for example, using/based on the one or more NTN-specific parameters/values. The one or more attributes of the service link may comprise the propagation delay of the service link, and/or the length of the service link, and/or the elevation angle of the service link, and/or the like.

A higher layer (e.g., RRC layer) of the wireless device may initiate the SDT, for example, during a Non-RRC_CONNECTED state. For example, the wireless device may determine that SIB1 comprises sdt-ConfigCommon and/or sdt-Config is configured (e.g., via the RRCRelease IE). The wireless device may have data (e.g., from DTCH and/or DCCH or pending UL data across one or more radio bearers (RBs)) available during a Non-RRC_CONNECTED state. The data may be new data arriving during the SDT procedure in a Non-RRC_CONNECTED state. The wireless device may calculate/determine volume of the data (e.g., data volume), for example, based on (e.g., in response to) arrival of the data. For example, for the SDT procedure, the wireless device may further consider one or more suspended radio bearers (RBs) configured with the SDT (e.g., via sdt-DRB-List and/or sdt-SRB2-Indication and/or CG-SDT-Config-LCH-restriction) for data volume calculation. It may be up to an implementation of the wireless device how the wireless device calculates the data volume for the one or more suspended RBs. The wireless device may not consider size of a CCCH message for data volume calculation. The data may be mapped to the radio bearers configured for SDT (e.g., via sdt-DRB-List and/or sdt-SRB2-Indication and/or CG-SDT-Config-LCH-restriction). For example, the wireless device in the RRC_INACTIVE state may initiate the resume procedure for SDT. For example, as discussed above (e.g., with referent to FIG. 26 and/or FIG. 27), the wireless device may determine the at least one SDT-initiation condition being satisfied and/or the at least one SDT-initiation-fulfilment condition being satisfied. For example, the wireless device may determine the indication of the fulfilment of condition(s) of the initiated SDT procedure being received from the lower layers. For example, the higher layers of the wireless device may consider the resume procedure being initiated for SDT and/or start timer T319*a*.

The upper layers (e.g., the RRC layer) of the wireless device may determine to initiate the SDT procedure (e.g., initiates a resume procedure for SDT if the wireless device is in the RRC_INACTIVE state/mode). For example, the wireless device may determine that a request resumption of RRC connection being received (e.g., from upper layers of the wireless device) and/or the data volume of the data (e.g., the pending UL data across the one or more RBs configured for SDT) being less than or equal to the sdt-Data Volume-Threshold. For example, the higher layers (e.g., the RRC layer) of the wireless device send an indication to the lower layer (e.g., the MAC layer) of the wireless device for indicating an initiation of SDT (e.g., the MAC layer determines that the upper layers are initiated the SDT procedure).

The higher layers of the wireless device may determine at least one SDT-initiation condition (e.g., at least one condition for initiating the SDT procedure) being met/fulfilled/satisfied to send an initiation of SDT procedure to the lower layers of the wireless device for initiating the SDT procedure. The lower layers of the wireless device may determine at least one SDT-initiation-fulfilment condition (e.g., at least one fulfilment condition for initiating the SDT procedure) being met/fulfilled/satisfied to perform the initiated SDT procedure (e.g., sending (e.g., transmitting) the data via the CG-SDT procedure).

The lower layer (e.g., the MAC layer) of the wireless device may send an indication to the higher layers (e.g., the RRC layer) of the wireless device for indicating a fulfilment of condition(s) of the initiated SDT procedure by the higher layers, for example, based on (e.g., in response to) determining the at least one SDT-initiation-fulfilment condition being satisfied. For example, the wireless device in the RRC_INACTIVE state may initiate the resume procedure for SDT based on the indication of the fulfilment of condition(s) of the initiated SDT procedure being received from the lower layers. For example, the higher layers of the wireless device may consider the resume procedure being initiated for SDT and/or start timer T319*a*. The wireless device may transmit the data via/using the CG-SDT procedure or the RA-SDT procedure.

In step 2820, the wireless device may determine whether to transmit the data via/using the CG-SDT procedure or the RA-SDT procedure (e.g., SDT type selection or transmission type selection). The wireless device may perform the SDT type selection based on the one or more NTN-specific parameters/values. As shown in FIG. 28, the wireless device may determine, based on the one or more NTN-specific parameters/values, whether to trigger/initiate an RA procedure (e.g., the RA-SDT procedure).

For performing the SDT type selection, the wireless device may determine whether at least one SDT-RA condition being satisfied or not. For example, based on (e.g., in response to) at least one SDT-RA condition not being satisfied, the wireless device may perform the SDT procedure for sending (e.g., transmitting) the data via/using the CG-SDT procedure. The wireless device may, for example, perform the SDT procedure for sending (e.g., transmitting) the data via/using the RA-SDT procedure (e.g., after triggering/initiating the RA procedure), for example, based on (e.g., in response to) at least one SDT-RA condition being satisfied.

The wireless device may determine the at least one SDT-RA condition being satisfied based on the one or more NTN-specific values/parameters (e.g., the one or more attributed of the service link). For example, the wireless device may further determine the at least one SDT-RA condition being satisfied based on a fourth set of NTN-specific thresholds of/among/from the one or more sets of NTN-specific thresholds. For example, the fourth set of NTN-specific thresholds may be different than the third set of NTN-specific thresholds. The fourth set of NTN-specific thresholds may be the third set of NTN-specific thresholds.

The at least one SDT-RA condition being satisfied based on at least one of the following: a first set of SDT-RA rules being satisfied; and/or a second set of SDT-RA rules being satisfied; and/or a third set of SDT-RA rules being satisfied. For example, the wireless device may determine the first set of SDT-RA rules being satisfied based on the propagation delay of the service link being larger than a first NTN-specific threshold of (or among/from) the fourth set of NTN-specific thresholds (e.g., the wireless device is located around the cell/beam edge). The wireless device may, for example, determine first set of SDT-RA rules not being satisfied based on the propagation delay of the service link being smaller than the first NTN-specific threshold of (or among/from) the fourth set of NTN-specific thresholds (e.g., the wireless device is located around the cell/beam center).

The wireless device may determine the first set of SDT-RA rules being satisfied based on the length of the service link being larger than a second NTN-specific threshold of (or among/from) the fourth set of NTN-specific thresholds (e.g., the wireless device is located around the cell/beam edge). The wireless device may determine the first set of SDT-RA rules not being satisfied based on the length of the service link being smaller than the second NTN-specific threshold of (or among/from) the fourth set of NTN-specific thresholds (e.g., the wireless device is located around the cell/beam center).

The wireless device may determine the first set of SDT-RA rules being satisfied based on the elevation angle of the service link being smaller than a third NTN-specific threshold of (or among/from) the fourth set of NTN-specific thresholds (e.g., the wireless device is located around the cell/beam edge). The wireless device may determine the first set of SDT-RA rules not being satisfied based on the elevation angle of the service link being larger than the third NTN-specific threshold of (or among/from) the fourth set of NTN-specific thresholds (e.g., the wireless device is located around the cell/beam center).

The wireless device may determine the second set of SDT-RA rules being satisfied based on the RSRP of the DL-PL reference being smaller than the CG-SDT-RSRP threshold. The wireless device may determine the second set of SDT-RA rules being satisfied based on determining that there is no SSB configured for the CG-SDT with SS-RSRP above the cg-SDT-RSRP-ThresholdSSB is available. For example, based on (e.g., in response to) determining that there is at least one SSB configured for the CG-SDT with SS-RSRP above the cg-SDT-RSRP-ThresholdSSB is available, the wireless device may determine the second set of SDT-RA rules not being satisfied.

The third set of SDT-RA rules may be based on a probabilistic (or a randomized) procedure/method/function. For example, the probabilistic (or a randomized) procedure may comprise generating one or more random numbers. For example, the wireless device may determine the third set of SDT-RA rules being satisfied based on a first/initial random number of the one or more random numbers being larger than a first threshold (e.g., a fourth NTN-specific threshold of (or among/from) the fourth set of NTN-specific thresholds). The wireless device may determine the first threshold based on the cg-SDT-RSRP-ThresholdSSB value and the RSRP of the DL-PL reference (e.g., as a ratio of the RSRP of the DL-PL reference and the cg-SDT-RSRP-Threshold-SSB).

The wireless device may determine the third set of SDT-RA rules being satisfied based on a second random number of the one or more random numbers being smaller than a second threshold (e.g., a fifth NTN-specific threshold of (or among/from) the fourth set of NTN-specific thresholds). The wireless device may determine the second threshold based on the cg-SDT-RSRP-ThresholdSSB and the RSRP of the DL-PL reference (e.g., as a ratio of the cg-SDT-RSRP-ThresholdSSB and the RSRP of the DL-PL reference, for example, the inverse value of the first threshold).

The wireless device may determine the first threshold based on an NTN-specific threshold (e.g., the first/second/ third NTN-specific threshold of the fourth set of NTN-specific thresholds) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like. The wireless device may determine the second threshold based on a NTN-specific threshold (e.g., the first/second/third NTN-specific threshold of the fourth set of NTN-specific thresholds) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise a CG-SDT-RSRP threshold (e.g., cg-SDT-RSRP-Threshold-SSB). For example, the wireless device may, based on the one or more NTN-specific values/parameters (e.g., the one or more attributes of the service link) and the CG-SDT-RSRP threshold, determine/calculate an SDT-RSRP threshold for determining whether the at least one SDT-RA conditions being satisfied (e.g., using/based on second set of SDT-RA rules being satisfied or not and/or the third set of SDT-RA rules being satisfied or not). For example, the wireless device may reduce/increase the CG-SDT-RSRP threshold by a factor to calculate the CG-SDT-RSRP threshold. The factor may be calculated (e.g., by a formula) based on the location information of the NTN node (e.g., the one or more attributes of the service link).

The base station may configure the wireless device with a plurality of cg-SDT-RSRP-ThresholdSSB values, for example, via the one or more configuration parameters. The one or more configuration parameters messages may indicate that the plurality of cg-SDT-RSRP-ThresholdSSB values are configured for a particular type of the NTN payload (a GEO satellite, a MEO satellite, a LEO satellite) and/or a particular type of the cell/beam (e.g., Earth-fixed beam/cell). Each cg-SDT-RSRP-ThresholdSSB value among/of/from the plurality of cg-SDT-RSRP-ThresholdSSB values may correspond to a relevant location of the NTN payload to the cell/beam (or the wireless device), for example, if the NTN payload is moving. Each cg-SDT-RSRP-ThresholdSSB value among/of/from the plurality of cg-SDT-RSRP-ThresholdSSB values may correspond to a range of elevation angle of the service link. Each cg-SDT-RSRP-ThresholdSSB value among/of/from the plurality of cg-SDT-RSRP-ThresholdSSB values may correspond to a range of propagation delay of the service link. Each cg-SDT-RSRP-ThresholdSSB value among/of/from the plurality of cg-SDT-RSRP-ThresholdSSB values may correspond to a range of length of the service link.

For determining/selecting the transmission type of SDT (e.g., the CG-SDT procedure or the RA-SDT procedure), the wireless device may select a cg-SDT-RSRP-ThresholdSSB value among/of/from the plurality of cg-SDT-RSRP-ThresholdSSB values. The wireless device may select the cg-SDT-RSRP-ThresholdSSB value among/of/from plurality of cg-SDT-RSRP-ThresholdSSB values, for example, based on the one or more NTN-specific configuration parameters (e.g., the one or more NTN-specific parameters/values). The wireless device may use the (selected) cg-SDT-RSRP-ThresholdSSB value for determining whether the first set of SDT-RA rules being satisfied or not. The wireless device may use the (selected) cg-SDT-RSRP-ThresholdSSB value for determining whether the third set of SDT-RA rules being satisfied or not.

The wireless device may select the cg-SDT-RSRP-ThresholdSSB value (e.g., a first/initial or a last/final or an n-th cg-SDT-RSRP-ThresholdSSB value) among/of/from the plurality of cg-SDT-RSRP-ThresholdSSB values based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the cg-SDT-RSRP-Threshold-SSB value among/of/from the set of cg-SDT-RSRP-Thresh-oldSSB values is applicable for the RA procedure. The wireless device may select the n-th cg-SDT-RSRP-Thresh-oldSSB value among/of/from plurality of cg-SDT-RSRP-ThresholdSSB values, for example, based on the attribute of the service link (e.g., the propagation delay, the length, or the elevation angle) being in the n-th (n=0, 1, . . . , N) range/interval of the one or more ranges/intervals of an attribute of the service link.

The one or more configuration parameters may comprise a fifth configuration parameter. The fifth configuration parameter may, for example, indicate whether the wireless device use/adopt the one or more NTN-specific configuration parameters to determine the at least one SDT-RA condition being satisfied or not. The wireless device may, for example, based on (e.g., in response to) determining the fifth configuration parameter being indicated/configured (or being enabled or not being disabled or not being absent from the one or more configuration parameters), determine whether the at least one SDT-RA condition being satisfied or not based on the one or more NTN-specific configuration parameters (e.g., determining the transmission type is based on the first set of SDT-RA rules). The wireless device may, for example, based on (e.g., in response to) determining the fifth configuration parameter not being indicated/configured (or being disabled or being absent from the one or more configuration parameters), determine whether the at least one SDT-RA condition being satisfied based on whether the second set of SDT-RA rules being satisfied (e.g., determining the transmission type is based on the second set of SDT-RA rules).

The wireless device may, for example, based on (e.g., in response to) determining the fifth configuration parameter being indicated/configured (or being enabled or not being disabled or not being absent from the one or more configuration parameters), determine whether the at least one SDT-RA condition being satisfied based on the one or more NTN-specific configuration parameters (e.g., the first set of SDT-RA rules being satisfied) and the second set of SDT-RA rules being satisfied being satisfied). For example, determining the transmission type is based on the first set of SDT-RA rules and the second set of SDT-RA rules. The wireless device may, for example, based on (e.g., in response to) determining the fifth configuration parameter not being indicated/configured (or being disabled or being absent from the one or more configuration parameters), determine whether the at least one SDT-RA condition being satisfied based on whether the second set of SDT-RA rules being satisfied (e.g., determining the transmission type is based on the second set of SDT-RA rules).

The one or more configuration parameters may comprise a sixth configuration parameter. The sixth configuration parameter may, for example, indicate whether the wireless device use/adopt the probabilistic procedure (e.g., the third set of SDT-RA rules being satisfied) to determine the at least one SDT-RA condition being satisfied or not. The wireless device may determine whether the at least one SDT-RA condition being satisfied based on the third set of SDT-RA rules being satisfied (e.g., determining the transmission type is based on the third set of SDT-RA rules), for example, based on (e.g., in response to) determining the sixth configuration parameter being indicated/configured (or being enabled or not being disabled or not being absent from the one or more configuration parameters). The wireless device may determine whether the at least one SDT-RA condition being satisfied based on the second set of SDT-RA rules being satisfied (e.g., determining the transmission type is based on the second set of SDT-RA rules), for example, based on (e.g., in response to) determining the sixth configuration parameter not being indicated/configured (or being disabled or being absent from the one or more configuration parameters).

The wireless device may determine whether the at least one SDT-RA condition being satisfied based on the third set of SDT-RA rules being satisfied and the second set of SDT-RA rules being satisfied (e.g., determining the transmission type is based on the second set of SDT-RA rules and the third set of SDT-RA rules), for example, based on (e.g., in response to) determining the sixth configuration parameter being indicated/configured (or being enabled or not being disabled or not being absent from the one or more configuration parameters). The wireless device may determine whether the at least one SDT-RA condition being satisfied based on the second set of SDT-RA rules being satisfied (e.g., determining the transmission type is based on the second set of SDT-RA rules), for example, based on (e.g., in response to) determining the sixth configuration parameter not being indicated/configured (or being disabled or being absent from the one or more configuration parameters).

The transmission types may, for example, based on the at least one SDT-RA condition not being satisfied, comprise the CG-based SDT and/or one or more subsequent transmissions of the CG-based SDT. For example, the transmission types may, based on the at least one SDT-RA condition being satisfied, comprise the RA-based SDT and/or one or more subsequent transmissions of the RA-based SDT. The wireless device may transmit the data using the selected SDT procedure (or selected transmission type), for example, while keeping the RRC state as the Non-RRC_CON-NECTED state, for example, if the wireless device selects the transmission type as the CG-based SDT and/or the RA-based SDT.

The wireless device may, for example, before determining the transmission type and based on (e.g., in response to) the initiated SDT procedure, determine an uplink carrier of the cell, for example, if the cell comprise a NUL carrier and a SUL carrier. For example, the wireless device may skip the determination of the uplink carrier, for example, if the cell comprises a single uplink carrier (e.g., the SUL carrier or the NUL carrier). The wireless device may perform one or more BWP operations (e.g., the one or more BWP operation), for example, based on (e.g., in response to) the determine transmission type for the SDT procedure being the RA-SDT.

The wireless device may perform at least one of the following: flushing a Msg3 buffer and/or flushing a MsgA buffer; initializing one or more RA-specific parameters, for example, a preamble transmission counter (e.g., PRE-AMBLE_TRANSMISSION_COUNTER) and/or a pre-amble power ramping counter (e.g., PREAMBLE_POWER_RAMPING_COUNTER); and/or performing one or more BWP operations, for example, based on (e.g., in response to) the triggering/initiating the RA procedure (e.g., the RA-SDT procedure). For example, the wireless device may set/initialize the PCMAX accordingly (e.g., setting PCMAX to $P_{CMAX,f,c}$ of the SUL carrier or the NUL carrier).

The one or more configuration parameters may configure the BWP selected for the RA procedure with a plurality of RA resources. For example, the plurality of RA resources may comprise the first plurality of RA resources. For example, the plurality of RA resources may comprise the second plurality of RA resources. The plurality of RA resources may comprise one or more RA resources/parameters/variables with a SDT feature indication (or a SDT indication or SDT feature). The plurality of RA resources be shared between the SDT feature and/or other features (e.g., the CovEnh feature, a reduced capacity (RedCap) feature, and/or a slice group feature, and the like), for example, via the one or more feature combination preambles. For example, via/based on the one or more feature combination preambles, the plurality of RA resources may comprise the one or more RA-partition/feature resources/variables/parameters that is shared among the one or more features and/or at least some wireless devices (e.g., the wireless devices without any feature such as the CovEnh feature, the SDT feature, the RedCap feature, the slice group feature, and the like).

The selected BWP (e.g., based on the one or more BWP operation) for the RA procedure may be the dedicated BWP for the Msg3 repetition. The selected BWP for the RA procedure may be the dedicated BWP for the Msg3 repetition.

The plurality of RA resources (or one or more first sets of RA resources) may comprise the first value/number of the feature combination preambles and/or the second value/number of the feature combination preambles. For example, the plurality of RA resources (or the one or more first sets of RA resources) may comprise the one or more first sets of preambles (or preamble partitions) and/or the one or more second sets of preambles (or preamble partitions). Each feature combination preamble (e.g., the IE Feature CombinationPreambles) of the first value/number of the feature combination preambles and/or the second value/number of the feature combination preambles may comprise at least one of the following RA resources (and/or parameters/variables): a feature combination (e.g., feature Combination); and/or startPreambleForThisPartition; and/or numberOfPreamblesForThisPartition; and/or numberOfRAPreamblesGroupA; and/or; separateMsgA-PUSCH-Config; and/or a featureSpecificParameters; and/or the like. For example, a feature combination field (e.g., the FeatureCombination IE) of a feature combination preamble may comprise the one or more feature indications, for example, the CovEnh feature, the SDT feature, the RedCap feature, the slice group feature, and the like).

The first plurality of the RA resources (e.g., the one or more first sets of RA resources) may have the Msg3 repetition (or a CovEnh feature or a CovEnh or a covEnh) indication (or correspond to a CovEnh feature). Each feature combination (e.g., the featureCombination) of each feature combination preamble (e.g., the Feature CombinationPreambles IE), of the first value/number of the feature combination preambles and/or the second value/number of the feature combination preambles, may have/comprise the Msg3 repetition indication (e.g., the covEnh indication).

A set of RA resources from/among/of the plurality of the RA resources (e.g., the one or more first sets of RA resources) may be shared among the SDT feature and at least one other feature (e.g., the CovEnh feature and/or the slice group feature and/or the RedCap feature). For example, a feature combination (e.g., the featureCombination) of (or corresponding to) the set of RA resources may comprise a covEnh (feature) indication (e.g., the Msg3 repetition indication) and/or at least one of a redCap (feature)indication and/or a smallData (feature)indication and/or a sliceGroup (feature)indication. The feature combination may, for example, indicate/identify a combination of features (e.g., the CovEnh feature, the SDT feature, the RedCap feature, the Slice group feature, and the like) that are associated with an RA partition (e.g., the RA partition among the one or more RA-partition/feature resources/variables/parameters).

The plurality of the RA resources may exclusively be applicable for a first feature (e.g., the SDT feature). For example, the plurality of the RA resources may not be applicable to other features different that the first feature (e.g., the RedCap feature and/or the slice group feature and/or the CovEnh feature, and the like).

As shown in FIG. 28, in step 2830, the wireless device may, based on the one or more NTN configuration parameters (e.g., following the discussions of FIG. 20 and/or FIG. 21 and/or FIG. 22), determine whether the Msg3 repetition is applicable/valid/allowable (e.g., whether the wireless device is eligible for the Msg3 repetition and/or whether the CovEnh feature is applicable) for the RA procedure, for example, based on (e.g., in response to) determining the transmission type of the SDT being the RA-SDT procedure and for the initiated RA procedure.

The wireless device may determine the Msg3 repetition being applicable (e.g., the wireless device being eligible for the Msg3 repetition), for example, based on a first set of rules being satisfied and/or the second set of rules being satisfied and/or the third set of rules being satisfied. As shown in FIG. 28, in step 2840, the wireless device may, for performing the RA procedure, select a set of RA parameters/variables/resources (e.g., comprising one or more RA parameters/variables/resources) from/among/of the plurality of RA resources, for example, based on (e.g., in response to) the Msg3 repetition being applicable. For example, the wireless device may send (e.g., transmit) a first message (e.g., a preamble or a MsgA) via/using the one or more RA resources/variables/parameters, and/or receive an RAR, for example, based on (e.g., in response to) the first message, and/or send (e.g., transmit) a Msg3 via/using a repetition K based on an UL grant indicated by the RAR. The wireless device may select the set of RA parameters/variables/resources, for example, via/based on a feature prioritization procedure.

The wireless device may determine the Msg3 repetition not being applicable (e.g., the wireless device not being eligible for the Msg3 repetition) based on a first set of rules not being satisfied and/or the second set of rules not being satisfied and/or the third set of rules not being satisfied. As shown in FIG. 28, the wireless device may, for performing the RA procedure, select a set of RA parameters/variables/resources (e.g., comprising one or more RA parameters/variables/resources) from/among/of the plurality of RA resources, for example, based on (e.g., in response to) the Msg3 repetition not being applicable. For example, the wireless device may send (e.g., transmit) a first message (e.g., a preamble or a MsgA) via/using the one or more RA resources/variables/parameters, and/or receive an RAR, for example, based on (e.g., in response to) the first message, and/or send (e.g., transmit) a Msg3 based on an UL grant indicated by the RAR. The wireless device may select the set of RA parameters/variables/resources, for example, via/ based on a feature prioritization procedure.

For performing the RA procedure (e.g., sending (e.g., transmitting) a preamble and/or a Msg3) the wireless device may, for example, if RA-Type=4-stepRA, select the set of RA resources (e.g., comprising one or more RA resources) from/among/of the plurality of RA resources and/or the first RACH configuration parameters (e.g., the RACHConfig-Common IE). The wireless device may use the corresponding field value from the first RACH configuration parameters (e.g., the RACHConfigCommon IE), for example, based on determining a field value of an RA variable/parameter/resource of the set of RA resources, for example, messagePowerOffsetGroupB, numberOfRA-PreamblesGroupA, and/or rsrp-ThresholdSSB, and the like, being absent from the plurality of the RA resources. The wireless device may set/determine a filed value of an RA variable/parameter/resource the set of RA resources (e.g., from the one or more RA-partition/feature resources), for example, msg3-DeltaPreamble, and/or ra-Msg3SizeGroupA, from the plurality of the RA resources variable/parameter/resource (if the RA variable/parameter/resources is not absent from the first plurality of the RA resources), for example, setting the field value of the msg3-DeltaPreamble based on a field value of the deltaPreamble of the set of RA resources and/or setting the field value of the ra-Msg3SizeGroupA based on a field value of the ra-SizeGroupA of the set of RA resources.

The wireless device may, for example, if RA-Type=2-stepRA, select the set of RA parameters/variables/resources (e.g., comprising one or more RA parameters/variables/resources) from/among/of the plurality of RA resources and/or the second RACH configuration parameters (e.g., the MsgA-ConfigCommon IE). For example, for performing the RA procedure, based on determining a field value of an RA variable/parameter/resource of the set of RA resources, for example, messagePowerOffsetGroupB and/or numberOfRA-PreamblesGroupA, and the like, being absent from the plurality of the RA resources, the wireless device may use the corresponding field value from the second RACH configuration parameters (e.g., the RACHConfig-Common IE). The wireless device may set/determine a filed value of an RA variable/parameter/resource of the set of RA resources (e.g., from the one or more RA-partition/feature resources), for example, msgA-SSB-SharedRO-MaskIndex, msgA-DeltaPreamble, msgA-RSRP-ThresholdSSB, and/or ra-MsgASizeGroupA, and the like from the plurality of the RA resources (if the RA variable/parameter/resource is not absent from the first plurality of the RA resources), for example, setting the field value of the msgA-SSB-SharedRO-MaskIndex based on a field value of the ssb-SharedRO-MaskIndex of the set of RA resources and/or setting the field value of the ra-MsgASizeGroupA based on a field value of the ra-SizeGroupA of the set of RA resources, and/or setting the field value of the msgA-DeltaPreamble based on a field value of the deltaPreamble of the set of RA resources and/or setting the field value of the msgA-RSRP-ThresholdSSB based on a field value of the rsrp-Threshold-SSB of the set of RA resources.

The one or more RA resources may comprise a preamble with a preamble index (e.g., ra-PreambleIndex or PREAM-BLE_INDEX), Random Access Preamble (RAP) group (e.g., preamble Group A or preamble Group B), a physical random access channel (PRACH) occasion (RO) comprising time, frequency, and/or code resources for sending (e.g., transmitting) the preamble, and/or transmission power of the preamble, and/or one or more MsgA PUSCH occasions (POs) for MsgA payload/transport block transmission, and the like. For example, the wireless device may determine the preamble index, preamble group (e.g., the Group A or the Group B) and/or the RO, based on one or more field values of the (selected) set of RA resources/parameters/variables (e.g., corresponding to a feature combination preamble), for example, one or more field values of the feature combination preamble comprising at least one of the following: the startPreambleForThisPartition, the numberOfPreamblesForThisPartition, the numberOfRA-PreamblesGroupA, the ssb-SharedRO-MaskIndex, the ra-SizeGroupA, the separateMsgA-PUSCH-Config, the deltaPreamble, the rsrp-ThresholdSSB, and/or the like.

The wireless device may determine a valid RO (e.g., the next available RO) corresponding to a SSB or a CSI-RS, for example, randomly with equal probability amongst one or more ROs and/or based on a possible occurrence of measurement gaps. The wireless device may randomly select the preamble (from the preamble Group A or preamble Group B), set PREAMBLE_INDEX based on the preamble (e.g., the index of the preamble), select the valid RO corresponding to the preamble, and/or calculate an RA-RNTI corresponding to the valid RO (if the type of the RA procedure is the 4-stepRA) or calculate a MSGB-RNTI corresponding to the valid RO (if the type of the RA procedure is the 2-stepRA).

For performing the two-step RA procedure, the wireless device may select the PUSCH occasion (PO) corresponding to the preamble and the valid RO, for example, if the preamble is selected by the MAC entity, of the wireless device, among the contention-based Random Access Preamble(s). For example, the wireless device may determine an UL grant/resource for transmission of the MsgA payload according to the PUSCH configuration associated with the selected RAP group. The wireless device may identify HARQ information (e.g., New Data Indicator (NDI), Transport Block size (TBS), Redundancy Version (RV), and a HARQ process ID/number/index) associated (or corresponding to) the MsgA payload. The wireless device may deliver the UL grant and the associated HARQ information to the HARQ entity for transmission of the first message (e.g., MsgA), for example, based on the preamble and the valid RO being mapped to a valid PUSCH occasion (PO).

Examples may allow the wireless device to properly select/determine the transmission type of the SDT based on characteristics of the NTN. The wireless device may determine the transmission type of the SDT based on the location information of the NTN node (e.g., the one or more attributes of the service link), for example, based on the cell being part of the NTN. Some examples may reduce the signaling overhead and/or the consumed power of the wireless device, for example, if the NTN payload is moving.

Figure 29:
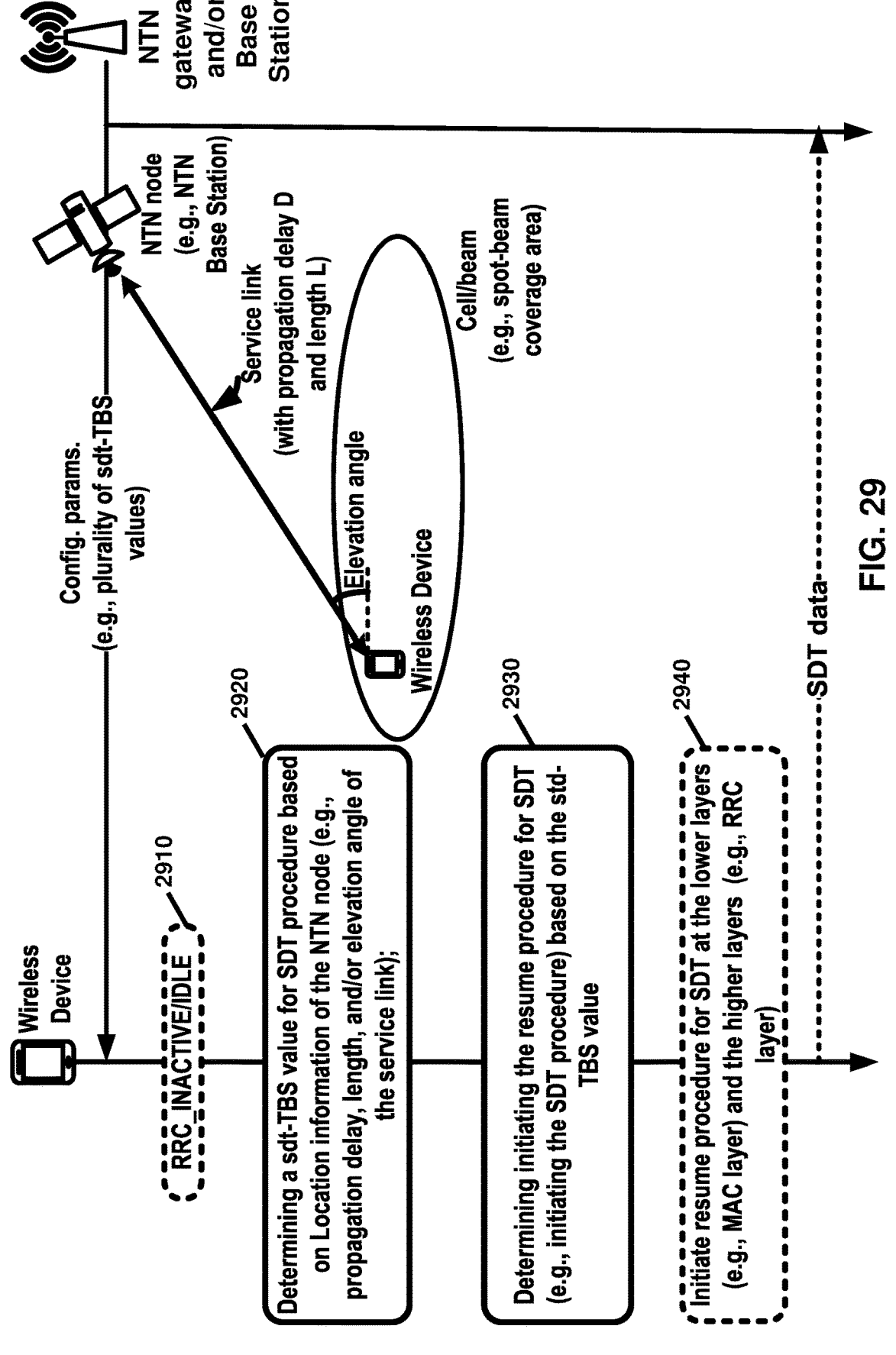
FIG. 29 shows an example of an SDT procedure in wireless communications systems.

FIG. 29 shows an example of SDT procedure in wireless communications systems. For example, FIG. 29 may show an example of a CG-SDT procedure or a RA-SDT procedure for an SDT procedure. FIG. 29 may show an implementation of a method (or a process) for the SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state), as shown in step 2910. FIG. 29 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

As shown in FIG. 29, the wireless device may receive the one or more configuration parameters (e.g., the one or more RA configuration parameters and/or the one or more NTN configuration parameters and/or the one or more SDT configuration parameters) from the base station. The wireless device may determine the one or more attributes of the service link, for example, using/based on the one or more NTN-specific parameters/values. The one or more attributes of the service link may comprise the propagation delay of the service link, and/or the length of the service link, and/or the elevation angle of the service link, and/or the like.

As shown in FIG. 29, the one or more SDT configuration parameters may comprise one or more sdt-TBS values (e.g., one or more sdt-DataVolumeThreshold values) of a cell. The one or more SDT configuration parameters messages may indicate that the one or more sdt-TBS values are configured for a particular type of the NTN payload (a GEO satellite, a MEO satellite, a LEO satellite) and/or a particular type of the cell/beam (e.g., Earth-fixed beam/cell). Each sdt-TBS value among/of/from the one or more sdt-TBS values may correspond to a relevant location of the NTN payload to the cell/beam (or the wireless device), for example, if the NTN payload is moving. Each sdt-TBS value among/of/from the one or more sdt-TBS values may correspond to a range of elevation angle of the service link. Each sdt-TBS value among/of/from the one or more sdt-TBS values may correspond to a range of propagation delay of the service link. Each sdt-TBS value among/of/from the one or more sdt-TBS values may correspond to a range of length of the service link.

As shown in step 2920, the wireless device may select a (particular) sdt-TBS value (e.g., the sdt-DataVolumeThreshold) among/of/from the one or more sdt-TBS values. For example, the wireless device may select the sdt-TBS value among the one or more sdt-TBS values based on the one or more NTN-specific parameters/values (e.g., the one or more attributes of the service link).

The wireless device may select sdt-TBS value (e.g., the sdt-DataVolumeThreshold) (e.g., a first/initial or a last/final or an n-th sdt-TBS value) among/of/from the one or more sdt-TBS values based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the sdt-TBS value among/of/from the one or more sdt-TBS values.

The wireless device may select the sdt-TBS value among/of/from the one or more sdt-TBS values, for example, based on the attribute of the service link (e.g., the propagation delay, the length, or the elevation angle) being in the n-th (n=0, 1, . . . , N) range/interval of the one or more ranges/intervals of an attribute of the service link.

A higher layer (e.g., RRC layer) of the wireless device may initiate the SDT, for example, during a Non-RRC_CO-NNECTED state. For example, the wireless device may determine that SIB1 comprises sdt-ConfigCommon and/or sdt-Config is configured (e.g., via the RRCRelease IE). The wireless device may have data (e.g., from DTCH and/or DCCH or pending UL data across one or more radio bearers (RBs)) available during a Non-RRC_CONNECTED state. The data may be new data arriving during the SDT procedure in a Non-RRC_CONNECTED state. The wireless device may calculate/determine volume of the data (e.g., data volume), for example, based on (e.g., in response to) arrival of the data. For example, for the SDT procedure, the wireless device may further consider one or more suspended radio bearers (RBs) configured with the SDT (e.g., via sdt-DRB-List and/or sdt-SRB2-Indication and/or CG-SDT-Config-LCH-restriction) for data volume calculation. It may be up to an implementation of the wireless device how the wireless device calculates the data volume for the one or more suspended RBs. The wireless device may not consider size of a CCCH message for data volume calculation. The data may be mapped to the radio bearers configured for SDT (e.g., via sdt-DRB-List and/or sdt-SRB2-Indication and/or CG-SDT-Config-LCH-restriction).

As shown in FIG. 29, in step 2940, the wireless device in the RRC_INACTIVE state may initiate the resume procedure for SDT. The wireless device may determine that a request resumption of RRC connection being received (e.g., from upper layers of the wireless device). The wireless device may determine that the data volume of the data (e.g., the pending UL data across the one or more RB s configured for SDT) being less than or equal to the selected sdt-DataVolumeThreshold. For example, the wireless device may consider the resume procedure being initiated for SDT.

For example, as discussed above (e.g., with referent to FIG. 26 and/or FIG. 27), the wireless device may determine the at least one SDT-initiation condition being satisfied or the at least one SDT-initiation-fulfilment condition being satisfied. For example, the wireless device may determine the indication of the fulfilment of condition(s) of the initiated SDT procedure being received from the lower layers. For example, the higher layers of the wireless device may consider the resume procedure being initiated for SDT and/or start timer T319a. As shown in FIG. 29, the wireless device may send (e.g., transmit) the SDT data (e.g., based on the discussions of FIGS. 26-28), for example, via the CG-SDT procedure or the RA-SDT procedure.

Some examples may allow the higher layers (e.g., RRC layer) of the wireless device determine whether to initiate the SDT procedure (e.g., initiate the resume procedure for the SDT) based on the location information of the NTN node (e.g., the one or more attributes of the service link), for example, if the wireless device is operating in an NTN, as shown in step 2930. For example, the base station may, by configuring the one or more sdt-TBS values, attempt to strike a balance between signaling load of the cell/beam and delay constraint of SDT transmission. Some examples may provide a robust performance of the SDT procedure despite the movement of the satellite.

Figure 30:
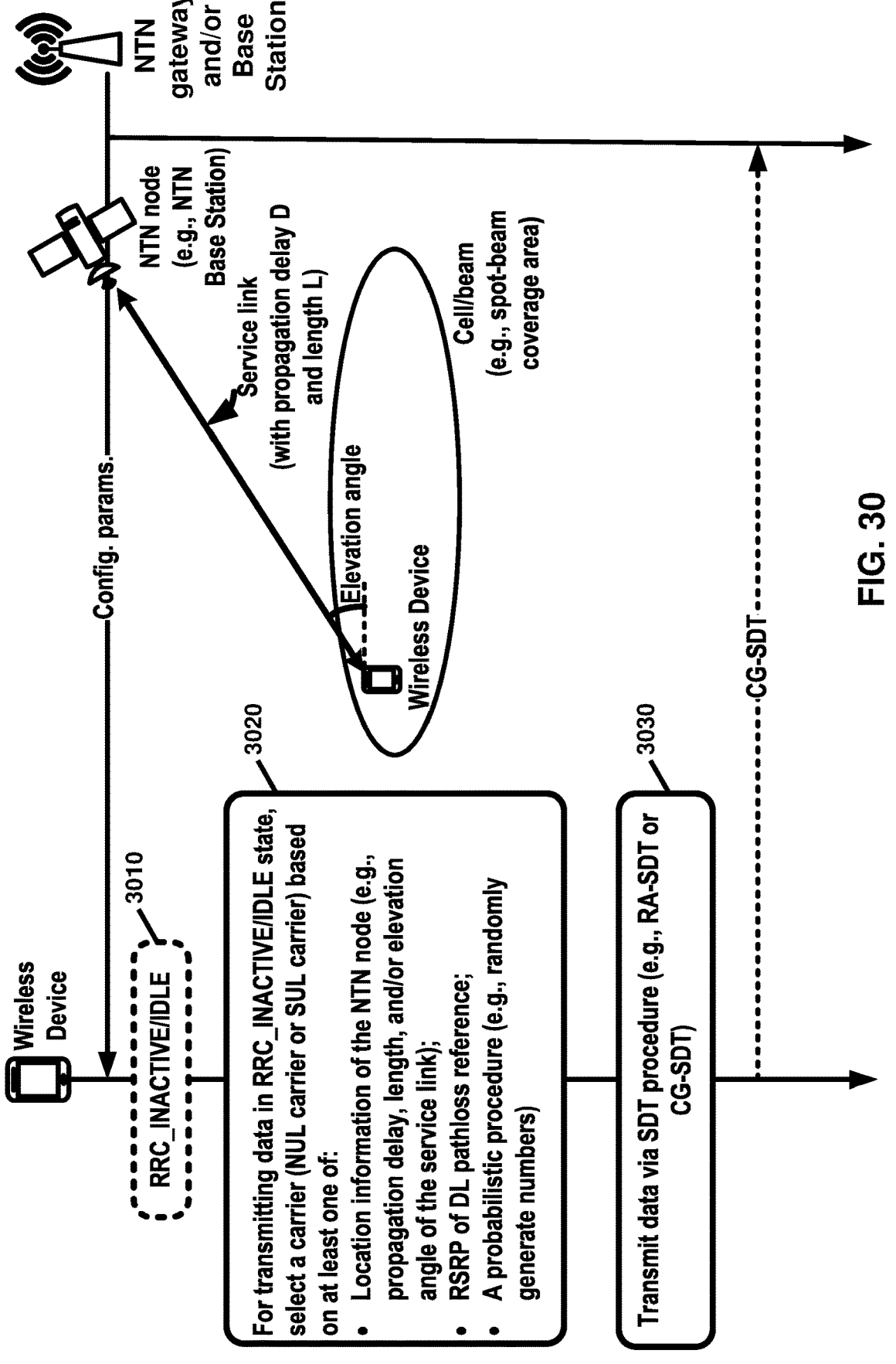
FIG. 30 shows an example of an SDT procedure in wireless communications systems.

FIG. 30 shows an example of SDT procedure in wireless communications systems. For example, FIG. 30 may show an example of a selection of a carrier for performing an SDT procedure (e.g., selection between the NUL carrier and the SUL carrier). FIG. 30 may show an implementation of a method (or a process) for the SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state), as shown in step 3010. FIG. 30 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

As shown in FIG. 30, the wireless device may receive the one or more configuration parameters (e.g., the one or more RA configuration parameters and/or the one or more NTN configuration parameters and/or the one or more SDT configuration parameters) from the base station. The wireless device may determine the one or more attributes of the service link, for example, using/based on the one or more NTN-specific parameters/values. The one or more attributes of the service link may comprise the propagation delay of the service link, and/or the length of the service link, and/or the elevation angle of the service link, and/or the like.

A higher layer (e.g., RRC layer) of the wireless device may initiate the SDT, for example, during a Non-RRC_CO-NNECTED state. For example, the wireless device may determine that SIB1 comprises sdt-ConfigCommon and/or sdt-Config is configured (e.g., via the RRCRelease IE). The wireless device may have data (e.g., from DTCH and/or DCCH or pending UL data across one or more radio bearers (RBs)) available during a Non-RRC_CONNECTED state. The data may be new data arriving during the SDT procedure in a Non-RRC_CONNECTED state. The wireless device may calculate/determine volume of the data (e.g., data volume), for example, based on (e.g., in response to) arrival of the data. For example, for the SDT procedure, the wireless device may further consider one or more suspended radio bearers (RBs) configured with the SDT (e.g., via sdt-DRB-List and/or sdt-SRB2-Indication and/or CG-SDT-Config-LCH-restriction) for data volume calculation. It may be up to an implementation of the wireless device how the wireless device calculates the data volume for the one or more suspended RBs. The wireless device may not consider size of a CCCH message for data volume calculation. The data may be mapped to the radio bearers configured for SDT (e.g., via sdt-DRB-List and/or sdt-SRB2-Indication and/or CG-SDT-Config-LCH-restriction). For example, the wireless device in the RRC_INACTIVE state may initiate the resume procedure for SDT. For example, as discussed above (e.g., with referent to FIG. 26 and/or FIG. 27), the wireless device may determine the at least one SDT-initiation condition being satisfied or the at least one SDT-initiation-fulfilment condition being satisfied. For example, the wireless device may determine the indication of the fulfilment of condition(s) of the initiated SDT procedure being received from the lower layers. For example, the higher layers of the wireless device may consider the resume procedure being initiated for SDT and/or start timer T319*a*.

The upper layers (e.g., the RRC layer) of the wireless device may determine to initiate the SDT procedure (e.g., initiates a resume procedure for SDT if the wireless device is in the RRC_INACTIVE state/mode). For example, the wireless device may determine that a request resumption of RRC connection being received (e.g., from upper layers of the wireless device) and/or the data volume of the data (e.g., the pending UL data across the one or more RBs configured for SDT) being less than or equal to the sdt-Data Volume-Threshold. For example, the higher layers (e.g., the RRC layer) of the wireless device send an indication to the lower layer (e.g., the MAC layer) of the wireless device for indicating an initiation of SDT (e.g., the MAC layer determines that the upper layers are initiated the SDT procedure).

The higher layers of the wireless device may determine at least one SDT-initiation condition (e.g., at least one condition for initiating the SDT procedure) being met/fulfilled/satisfied to send an initiation of SDT procedure to the lower layers of the wireless device for initiating the SDT procedure. The lower layers of the wireless device may determine at least one SDT-initiation-fulfilment condition (e.g., at least one fulfilment condition for initiating the SDT procedure) being met/fulfilled/satisfied to perform the initiated SDT procedure (e.g., sending (e.g., transmitting) the data via the CG-SDT procedure).

The lower layer (e.g., the MAC layer) of the wireless device may send an indication to the higher layers (e.g., the RRC layer) of the wireless device for indicating a fulfilment of condition(s) of the initiated SDT procedure by the higher layers, for example, based on (e.g., in response to) determining the at least one SDT-initiation-fulfilment condition being satisfied. For example, the wireless device in the RRC_INACTIVE state may initiate the resume procedure for SDT based on the indication of the fulfilment of condition(s) of the initiated SDT procedure being received from the lower layers. For example, the higher layers of the wireless device may consider the resume procedure being initiated for SDT and/or start timer T319*a*. The wireless device may send (e.g., transmit) the data via/using the CG-SDT procedure or the RA-SDT procedure, as shown in step 3030.

In step 3020, the wireless device may determine a carrier (e.g., the NUL carrier or the SUL carrier) for performing the SDT procedure (e.g., sending (e.g., transmitting) the data via a CG-SDT or a RA-SDT), for example, based on (e.g., in response to) initiation of the SDT procedure. For example, the one or more configuration parameters (e.g., the one or more SDT configuration parameters) may configure the wireless device with the NUL carrier and the SUL carrier for performing the SDT procedure in the cell.

For performing a carrier selection for performing the SDT procedure, the wireless device may determine whether at least one SUL condition being satisfied or not. For example, as shown in FIG. 30, the wireless device may perform the SDT procedure for sending (e.g., transmitting) the data via/using the NUL carrier, for example, based on (e.g., in response to) at least one SUL condition not being satisfied. For example, the wireless device may perform the transmission type selection (e.g., with accordance to the discussion of FIG. 28) to perform the SDT.

As shown in FIG. 30, the wireless device may, for example, perform the SDT procedure for sending (e.g., transmitting) the data via/using the SUL carrier, for example, based on (e.g., in response to) at least one SUL condition being satisfied. For example, the wireless device may perform the transmission type selection (e.g., with accordance to the discussion of FIG. 28) to perform the SDT.

The wireless device may determine the at least one SUL condition being satisfied based on the one or more NTN-specific values/parameters (e.g., the one or more attributed of the service link). For example, the wireless device may further determine the at least one SUL condition being satisfied based on a fifth set of NTN-specific thresholds of/among/from the one or more sets of NTN-specific thresholds. For example, the fifth set of NTN-specific thresholds may be different than the fourth set of NTN-specific thresholds. The fifth set of NTN-specific thresholds may be the fourth set of NTN-specific thresholds.

The at least one SUL condition being satisfied based on at least one of the following: a first set of SUL rules being satisfied; and/or a second set of SUL rules being satisfied; and/or a third set of SUL rules being satisfied. For example, the wireless device may determine the first set of SUL rules being satisfied based on the propagation delay of the service link being larger than a first NTN-specific threshold of (or among/from) the fifth set of NTN-specific thresholds (e.g., the wireless device is located around the cell/beam edge). The wireless device may, for example, determine the first set of SUL rules not being satisfied based on the propagation delay of the service link being smaller than the first NTN-specific threshold of (or among/from) the fifth set of NTN-specific thresholds (e.g., the wireless device is located around the cell/beam center).

The wireless device may determine the first set of SUL rules being satisfied based on the length of the service link being larger than a second NTN-specific threshold of (or among/from) the fifth set of NTN-specific thresholds (e.g., the wireless device is located around the cell/beam edge). The wireless device may determine the first set of SUL rules not being satisfied based on the length of the service link being smaller than the second NTN-specific threshold of (or among/from) the fifth set of NTN-specific thresholds (e.g., the wireless device is located around the cell/beam center).

The wireless device may determine the first set of SUL rules being satisfied based on the elevation angle of the service link being smaller than a third NTN-specific threshold of (or among/from) the fifth set of NTN-specific thresholds (e.g., the wireless device is located around the cell/beam edge). The wireless device may determine the first set of SUL rules not being satisfied based on the elevation angle of the service link being larger than the third NTN-specific threshold of (or among/from) the fifth set of NTN-specific thresholds (e.g., the wireless device is located around the cell/beam center).

The wireless device may determine the second set of SUL rules being satisfied based on the RSRP of the DL-PL reference being smaller than the rsrp-ThresholdSSB-SUL. For example, the wireless device may determine the second set of SUL rules not being satisfied based on the RSRP of the DL-PL reference being larger than the rsrp-ThresholdSSB-SUL.

For example, the third set of SUL rules may be based on a probabilistic (or a randomized) procedure/method/function. For example, the probabilistic (or a randomized) procedure may comprise generating one or more random numbers. For example, the wireless device may determine the third set of SUL rules being satisfied based on a first/initial random number of the one or more random numbers being larger than a first threshold (e.g., a fourth NTN-specific threshold of (or among/from) the fifth set of NTN-specific thresholds). The wireless device may determine the first threshold based on the rsrp-ThresholdSSB-SUL value and the RSRP of the DL-PL reference (e.g., as a ratio of the RSRP of the DL-PL reference and the rsrp-ThresholdSSB-SUL).

The wireless device may determine the third set of SUL rules being satisfied based on a second random number of the one or more random numbers being smaller than a second threshold (e.g., a fifth NTN-specific threshold of (or among/from) the fifth set of NTN-specific thresholds). The wireless device may determine the second threshold based on the rsrp-ThresholdSSB-SUL and the RSRP of the DL-PL reference (e.g., as a ratio of the rsrp-ThresholdSSB-SUL and the RSRP of the DL-PL reference, for example, the inverse value of the first threshold).

The wireless device may determine the first threshold based on an NTN-specific threshold (e.g., the first/second/third NTN-specific threshold of the fifth set of NTN-specific thresholds) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like. The wireless device may determine the second threshold based on a NTN-specific threshold (e.g., the first/second/third NTN-specific threshold of the fifth set of NTN-specific thresholds) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise a seventh configuration parameter. The seventh configuration parameter may, for example, indicate whether the wireless device use/adopt the one or more NTN-specific configuration parameters to determine the at least one SUL condition being satisfied or not (e.g., for performing/determination of the carrier). For example, based on (e.g., in response to) determining the seventh configuration parameter being indicated/configured (or being enabled or not being disabled or not being absent from the one or more configuration parameters) the wireless device may determine whether the at least one SUL condition being satisfied or not based on the one or more NTN-specific configuration parameters (e.g., determining the carrier is based on the first set of SUL rules). For example, based on (e.g., in response to) determining the seventh configuration parameter not being indicated/configured (or being disabled or being absent from the one or more configuration parameters) the wireless device may determine whether the at least one SUL condition being satisfied based on whether the second set of SUL rules being satisfied (e.g., determining the carrier is based on the second set of SUL rules).

The wireless device may determine whether the at least one SUL condition being satisfied based on the one or more NTN-specific configuration parameters and the second set of SUL rules being satisfied (e.g., determining the carrier is based on the first set of SUL rules and the second set of SUL rules), for example, based on (e.g., in response to) determining the seventh configuration parameter being indicated/configured (or being enabled or not being disabled or not being absent from the one or more configuration parameters). The wireless device may determine whether the at least one SUL condition being satisfied based on whether the second set of SDT-RA rules being satisfied (e.g., determining the carrier is based on the second set of SUL rules), for example, based on (e.g., in response to) determining the seventh configuration parameter not being indicated/configured (or being disabled or being absent from the one or more configuration parameters).

The one or more configuration parameters may comprise an eighth configuration parameter. The eighth configuration parameter may, for example, indicate whether the wireless device use/adopt the probabilistic procedure (e.g., the third set of SUL rules being satisfied) to determine the at least one SUL condition being satisfied or not. The wireless device may, for example, based on (e.g., in response to) determining the eighth configuration parameter being indicated/configured (or being enabled or not being disabled or not being absent from the one or more configuration parameters), determine whether the at least one SUL condition being satisfied based on the third set of SUL rules being satisfied (e.g., determining the carrier is based on the third set of SUL rules). The wireless device may, for example, based on (e.g., in response to) determining the eighth configuration parameter not being indicated/configured (or being disabled or being absent from the one or more configuration parameters), determine whether the at least one SUL condition being satisfied based on the second set of SUL rules being satisfied (e.g., determining the carrier is based on the second set of SUL rules).

The one or more configuration parameters may comprise a RSRP threshold (e.g., rsrp-ThresholdSSB-SUL). The wireless device may, for example, based on the one or more NTN-specific values/parameters (e.g., the one or more attributes of the service link) and the RSRP threshold, determine/calculate an RSRP threshold for determining whether the at least one SUL condition being satisfied (e.g., using/based on second set of SUL rules being satisfied or not and/or the third set of SUL rules being satisfied or not). For example, the wireless device may reduce/increase the RSRP threshold by a factor to calculate the RSRP threshold. The factor may be calculated (e.g., by a formula) based on the location information of the NTN node (e.g., the one or more attributes of the service link).

The base station may configure the wireless device with a plurality of rsrp-ThresholdSSB-SUL values, for example, via the one or more configuration parameters. The one or more configuration parameters messages may indicate that the plurality of rsrp-ThresholdSSB-SUL values are configured for a particular type of the NTN payload (a GEO satellite, a MEO satellite, a LEO satellite) and/or a particular type of the cell/beam (e.g., Earth-fixed beam/cell). Each rsrp-ThresholdSSB-SUL value among/of/from the plurality of rsrp-ThresholdSSB-SUL values may correspond to a relevant location of the NTN payload to the cell/beam (or the wireless device), for example, if the NTN payload is moving. Each rsrp-ThresholdSSB-SUL value among/of/from the plurality of rsrp-ThresholdSSB-SUL values may correspond to a range of elevation angle of the service link. Each rsrp-ThresholdSSB-SUL value among/of/from the plurality of rsrp-ThresholdSSB-SUL values may correspond to a range of propagation delay of the service link. Each rsrp-ThresholdSSB-SUL value among/of/from the plurality of rsrp-ThresholdSSB-SUL values may correspond to a range of length of the service link.

For determining/selecting the carrier, the wireless device may select a rsrp-ThresholdSSB-SUL value among/of/from the plurality of rsrp-ThresholdSSB-SUL values. The wireless device may select the rsrp-ThresholdSSB-SUL value among/of/from plurality of rsrp-ThresholdSSB-SUL values, for example, based on the one or more NTN-specific configuration parameters (e.g., the one or more NTN-specific parameters/values). The wireless device may use the (selected) rsrp-ThresholdSSB-SUL value for determining whether the first set of SUL rules being satisfied or not. The wireless device may use the (selected) rsrp-ThresholdSSB-SUL value for determining whether the third set of SUL rules being satisfied or not.

The wireless device may select the rsrp-ThresholdSSB-SUL value (e.g., a first/initial or a last/final or an n-th rsrp-ThresholdSSB-SUL value) among/of/from the plurality of rsrp-ThresholdSSB-SUL values based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the rsrp-ThresholdSSB-SUL value among/of/from the set of rsrp-ThresholdSSB-SUL values is applicable for the RA procedure. The wireless device may select the n-th rsrp-ThresholdSSB-SUL value among/of/from plurality of rsrp-ThresholdSSB-SUL values, for example, based on the attribute of the service link (e.g., the propagation delay, the length, or the elevation angle) being in the n-th (n=0, 1, . . . , N) range/interval of the one or more ranges/intervals of an attribute of the service link.

As shown in FIG. 30, the wireless device may perform the SDT procedure (e.g., based on the above discussion corresponding to FIGS. 26-29), for example, based on (e.g., in response to) determining the carrier (e.g., based on the at least one SUL condition). The example of FIG. 30 may be usable/applicable for carrier selection procedure for a normal random access procedure (e.g., an RA procedure not being associated with small data transmission).

Examples may allow the wireless device to properly select/determine the carrier (e.g., the NUL or the SUL) for performing the SDT based on characteristics of the NTN. The wireless device may determine the carrier (e.g., the NUL or the SUL) for performing the SDT based on the location information of the NTN node (e.g., the one or more attributes of the service link), for example, based on the cell being part of the NTN. Some examples may reduce the signaling overhead and/or the consumed power of the wireless device, for example, if the NTN payload is moving. Examples may balance load of SDT (e.g., the number of wireless devices sending (e.g., transmitting) SDT) between the SUL carrier and NUL carrier.

In at least some wireless communications, for a triggered/initiated RA procedure (e.g., the RA-SDT procedure), the wireless device may determine type of the RA procedure, for example, whether the RA procedure is a two-step/2-step RA procedure (e.g., if the RA_TYPE of the RA procedure is set to 2-stepRA) or a four-step/4-step RA procedure or a four-step RA procedure (e.g., if the RA_TYPE of the RA procedure is set to 4-stepRA). For example, for a selected BWP for performing the RA procedure, the base station may configure both of two-step RA configuration parameters (e.g., the second RACH configuration parameters) or four-step RA configuration parameters (e.g., the first RACH configuration parameters). The wireless device may, based on a RSRP of the DL-PL reference being smaller than an RSRP threshold (e.g., msgA-RSRP-Threshold), determine the type of the RA procedure being 4-step RA. The wireless device may, based on the RSRP of the DL-PL reference being larger (not being smaller) than an RSRP threshold (e.g., msgA-RSRP-Threshold), determine the type of the RA procedure being 2-step RA. For example, the one or more RACH configuration parameters may indicate/configure the RSRP threshold.

In at least some wireless communications, in an NTN example with moving NTN payload (e.g., a LEO satellite a pseudo satellite or HAPS) and/or an Earth-fixed cell/beam, by movement of the NTN payload there may be a continuous (and/or substantial) change/fluctuation in a number of wireless devices that choose the 2-step RA type (e.g., load of 2-step RA procedure in the cell/beam). For example, by movement of the NTN payload the load of 2-step RA procedure in the cell/beam may change/fluctuate from 20 to 2 (e.g., if the NTN payload moves toward the cell/beam) and/or from 2 to 20 (e.g., if the NTN payload moves away from the cell/beam). The continuous (and/or substantial) change/fluctuation in the of 2-step RA procedure in the cell/beam may reduce the performance/efficiency of the 2-step RA procedure in the cell/beam, for example, due to excessive interference on MsgA PUSCH/PRACH resources if the number of the wireless devices is large (e.g., 20). Based on at least some wireless communications, in an NTN example with moving NTN payload, the base station may encounter difficulty for determining the RSRP threshold for a robust/consistent performance/efficiency of the 2-step RA procedure. For example, some wireless devices may unnecessarily select the 2-step RA procedure for performing initial access or handover or the like, increasing the consumed power for sending (e.g., transmitting) small amount of data and/or increasing signaling overhead (e.g., for establishing connection, for example, switching/transiting from the RRC inactive/idle state/mode to the RRC connected state/mode).

Based on at least some wireless communications, in an NTN example with the large cell/beam size, performance/efficiency of the 2-step RA procedure may deteriorate, for example, due to a large interference on 2-step RA resources (e.g., MsgA PUSCH/PRACH resources/occasions). The large interference may be a result of insignificant/unclear near-far effect of the RSRP of the DL-PL reference across/through the cell/beam in the NTN example. For example, the first wireless device (e.g., located around the edge of the cell/beam) and the second wireless device (e.g., located around the cell/beam center) may have similar (or close) RSRP of the DL-PL reference. For example, both the first wireless device and second wireless device may select the 2-step RA procedure, resulting in possibility of unsuccessful detection of preambles and/or MsgA PUSCHs at the base station. For example, the first and second wireless devices may attempt sending (e.g., transmitting) MsgAs several times before successfully gaining access to network, which may increase their consumed power (or delay) for establishing connection to the network (e.g., by switching/transiting from the RRC inactive/idle state/mode to the RRC connected state/mode).

Improvements to the RA procedure in an NTN example may increase robust/consistent performance of the 2-step RA procedure and/or reduce a number of wireless devices that may switch/transit from the RRC inactive/idle state/mode to the RRC connected state/mode. Improvements to the SDT procedure in an NTN example may reduce interference on the RA-SDT resources, for example, reducing the delay for switching/transiting from the RRC inactive/idle state/mode to the RRC connected state/mode.

The wireless device may use the one or more NTN-specific values/parameters (e.g., the one or more attributes of the service link and/or the location information of the NTN node) to determine/select type of a triggered/initiated RA procedure. For performing an RA type selection corresponding to the RA procedure (e.g., determining the type of the RA procedure), the wireless device may determine whether at least one 4stepRA-type condition being satisfied or not, for example, based on the one or more NTN-specific values/parameters (e.g., the one or more attributed of the service link). The wireless device may perform the RA procedure based on the 4-step RA procedure (e.g., RA_TYPE is set to 4-stepRA), for example, based on (e.g., in response to) at least one 4stepRA-type condition being satisfied. The wireless device may perform the RA procedure based on the 2-step RA procedure (e.g., RA_TYPE is set to 2-stepRA), for example, based on (e.g., in response to) at least one 4stepRA-type condition not being satisfied.

The at least one 4stepRA-type condition may be satisfied based on at least one of the following: a first set of 4stepRA-type rules being satisfied; and/or a second set of 4stepRA-type rules being satisfied; and/or a third set of 4stepRA-type rules being satisfied. For example, the wireless device may determine the first set of 4stepRA-type rules being satisfied based on the propagation delay (or the length) of the service link being larger than a threshold (e.g., a first NTN-specific threshold of (or among/from) a sixth set of NTN-specific thresholds; for example, the wireless device is located around the cell/beam edge). The wireless device may determine the first set of 4stepRA-type rules being satisfied based on the elevation angle of the service link being smaller than a threshold (e.g., a third NTN-specific threshold of (or among/from) the sixth set of NTN-specific thresholds; for example, the wireless device is located around the cell/beam edge).

The wireless device may determine the second set of 4stepRA-type rules being satisfied based on the RSRP of the DL-PL reference being smaller than a msgA-RSRP-Threshold. For example, the wireless device may determine the second set of 4stepRA-type rules not being satisfied based on the RSRP of the DL-PL reference being larger than the msgA-RSRP-Threshold.

The third set of 4stepRA-type rules may be based on a probabilistic (or a randomized) procedure/method/function. For example, the probabilistic (or a randomized) procedure may comprise generating one or more random numbers. For example, the wireless device may determine the third set of 4stepRA-type rules being satisfied based on a first/initial random number of the one or more random numbers being larger than a first threshold (e.g., a fourth NTN-specific threshold of (or among/from) the sixth set of NTN-specific thresholds). The wireless device may determine the first threshold based on the msgA-RSRP-Threshold value and the RSRP of the DL-PL reference (e.g., as a ratio of the RSRP of the DL-PL reference and the msgA-RSRP-Threshold). The wireless device may determine the third set of 4stepRA-type rules being satisfied based on a second random number of the one or more random numbers being smaller than a second threshold (e.g., a fifth NTN-specific threshold of (or among/from) the sixth set of NTN-specific thresholds). The wireless device may determine the second threshold based on the msgA-RSRP-Threshold and the RSRP of the DL-PL reference (e.g., as a ratio of the msgA-RSRP-Threshold and the RSRP of the DL-PL reference, for example, the inverse value of the first threshold).

The one or more configuration parameters may comprise a RSRP threshold (e.g., msgA-RSRP-Threshold). For example, the wireless device may, based on the one or more NTN-specific values/parameters (e.g., the one or more attributes of the service link) and the RSRP threshold, determine/calculate a second RSRP threshold for determining whether the at least one 4stepRA-type condition being satisfied (e.g., using/based on second set of 4stepRA-type rules being satisfied or not and/or the third set of 4stepRA-type rules being satisfied or not). For example, the wireless device may reduce/increase the RSRP threshold by a factor to calculate the RSRP threshold. The factor may be calculated (e.g., by a formula) based on the location information of the NTN node (e.g., the one or more attributes of the service link).

The base station may configure the wireless device with a plurality of msgA-RSRP thresholds, for example, via the one or more configuration parameters (e.g., a plurality of msgA-RSRP-Threshold values). For determining the RA type of the RA procedure, the wireless device may select a msgA-RSRP threshold (e.g., the msgA-RSRP-Threshold) among/of/from the plurality of msgA-RSRP thresholds. For example, based on the one or more NTN-specific configuration parameters (e.g., the one or more NTN-specific parameters/values), the wireless device may select the RSRP threshold among/of/from plurality of RSRP thresholds. The wireless device may use the (selected) msgA-RSRP threshold for determining whether the first set of 4stepRA-type rules being satisfied or not. The wireless device may use the (selected) msgA-RSRP threshold for determining whether the third set of 4stepRA-type rules being satisfied or not. The wireless device may select the msgA-RSRP threshold (e.g., a first/initial or a last/final or an n-th msgA-RSRP threshold) among/of/from the plurality of msgA-RSRP thresholds (e.g., from the set of plurality of msgA-RSRP thresholds) based on the location information of the NTN node (e.g., the one or more attributes of the service link).

Some examples may improve the RA type selection to incorporate the movement of the satellite and/or characteristics of the NTN (e.g., long propagation delay and/or flat RSRP across the cell/beam), for example, if the wireless device is operating in an NTN. Examples may allow a robust performance of the two-step RA procedure or 4-step RA procedure despite the movement of the NTN node and/or the wireless device.

In at least some wireless communications, for an initiated 2-step RA procedure (e.g., based on performing an RA type selection), the wireless device may, if performing the 2-step RA procedure, determine whether to switch from the 2-step RA procedure to a 4-step RA procedure (e.g., an RA-type switching procedure). For example, the one or more RACH configuration parameters may configure msgA-TransMax. The wireless device may switch from the 2-step RA procedure to the 4-step RA procedure (e.g., set the RA_TYPE to 4-stepRA), for example, based on a preamble transmission counter not being smaller (or equal) the msgA-TransMax. For example, the wireless device may perform the 4-step RA procedure. In an NTN with a large cell/beam size and/or movement of the satellite, the at least some wireless communications for determining whether to switch from the 2-step RA procedure to the 4-step RA procedure may not be efficient and/or or reduce performance of the 2-step RA procedure. For example, in an NTN with a large cell/beam size and/or movement of the satellite, the base station may encounter difficulties to determine a proper value for the msgA-TransMax. The present techniques improve RA-type switching procedure in an NTN example.

The wireless device may determine whether to switch from the 2-step RA procedure to the 4-step RA procedure based on the one or more NTN-specific parameters/values (e.g., the location information of the NTN and/or the one or more attributes of the service link) and/or a preamble transmission counter. For example, the base station may configure the wireless device with a plurality of msgA-TransMax thresholds/values, for example, via the one or more configuration parameters (e.g., a plurality of msgA-TransMax values). The wireless device may determine whether to switch from the 2-step RA procedure to the 4-step RA procedure based on the one or more NTN-specific parameters/values (e.g., the location information of the NTN and/or the one or more attributes of the service link) and/or the preamble transmission counter and/or the plurality of MsgA-TransMax thresholds. For example, the base station by configuring plurality of msgA-TransMax thresholds/values may allow different switching behavior across the cell/beam, for example, based on the location of the wireless device (e.g., around the cell/beam center versus around the cell/beam edge) and/or movement of the NTN payload. A larger value of msgA-TransMax may allow the wireless device to not fallback to the 4-step RA procedure despite failure of the RA procedure (e.g., if the preamble transmission counter is smaller than the msgA-TransMax), for example, if the wireless device is located around the cell/beam center. A smaller value of msgA-TransMax may allow the wireless device to fallback to the 4-step RA procedure after one or more preamble transmissions (e.g., if the preamble transmission counter is larger than the msgA-TransMax), for example, if the wireless device is located around the cell/beam edge.

For determining whether to switch from the 2-step RA procedure to the 4-step RA procedure, the wireless device may select a msgA-TransMax threshold among/of/from the plurality of msgA-TransMax thresholds. The wireless device may select the msgA-TransMax threshold among/of/from plurality of msgA-TransMax thresholds, for example, based on the one or more NTN-specific configuration parameters (e.g., the one or more NTN-specific parameters/values).

The one or more configuration parameters may comprise the msgA-TransMax threshold. For example, the wireless device may, based on the one or more NTN-specific values/parameters (e.g., the one or more attributes of the service link) and the msgA-TransMax threshold, determine/calculate a second msgA-TransMax threshold for determining whether to switch to the 4-step RA procedure or not (e.g., the preamble transmission counter being larger than the second msgA-TransMax threshold or not). For example, the wireless device may reduce/increase the msgA-TransMax threshold by a factor to calculate the second msgA-TransMax threshold. The factor may be calculated (e.g., by a formula) based on the location information of the NTN node (e.g., the one or more attributes of the service link). The wireless device may increase the msgA-TransMax threshold by the factor to calculate the second msgA-TransMax threshold (e.g., the wireless device is moving toward the cell/beam center), for example, if the propagation delay/length of the service link is reduced or the elevation angle of the service link is increased. Inversely, the wireless device may decrease the msgA-TransMax threshold by the factor to calculate the second msgA-TransMax threshold, for example, if the propagation delay/length of the service link is increased or the elevation angle of the service link is decreased. Examples may allow an adaptive RA-type switching procedure in the NTN, for example, based on the movement of the satellite.

Figure 31:
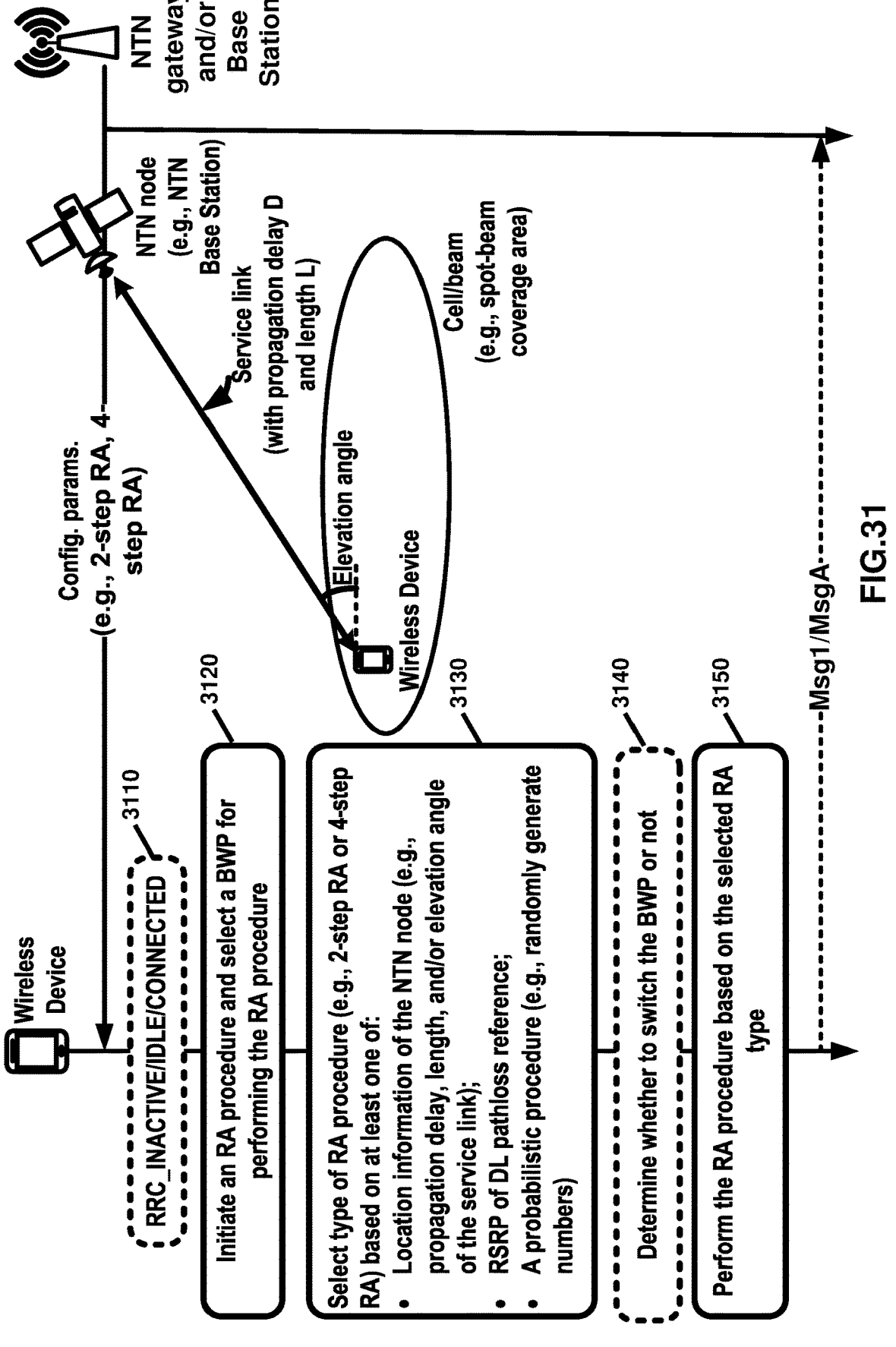
FIG. 31 shows an example of an RA procedure in wireless communications systems.

FIG. 31 shows an example of an RA procedure in wireless communications systems. FIG. 31 may, for example, show an implementation of a method (or a process) for the RA procedure at a base station and/or a wireless device. The base station may communicate with the wireless device. For example, as shown in step 3110, the wireless device may be in an RRC_IDLE (or an RRC idle) state/mode, an RRC_INACTIVE (or an RRC inactive) state/mode, or an RRC_CONNECTED (or an RRC connected) state/mode. FIG. 31 may show an implementation of a method (or a process) for an SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state). FIG. 31 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

In step 3120, the wireless device may trigger/initiate the RA procedure, for example, based on (e.g., in response to) (or for): an initial access procedure (e.g., to transit from the RRC_IDLE state/mode to the RRC_CONNECTED state/mode), a positioning procedure, an uplink coverage recovery procedure, initiating a beam failure recovery, receiving from the base station an RRC reconfiguration message, for example, during a handover procedure, receiving from the base station a PDCCH order, re-synchronizing if new data arrives and the wireless device status is out-of-sync for UL communication/transmission, new data arrives at the buffer of the wireless device if there is no scheduling request (SR) resources (e.g., PUCCH) for sending (e.g., transmitting) the SR are configured, and/or pending data exists in the buffer of the wireless device and the wireless device has reached a maximum allowable times for (re)sending (e.g., (re)transmitting) an SR (e.g., a SR failure). The wireless device may perform the RA procedure after performing the initial access, for example, for beam failure recovery, reporting a TA information (e.g., a UE-specific TA and/or a GNSS-acquired location information) of the wireless device, other SI request, and/or SCell addition. The wireless device may trigger the RA procedure due to an SDT procedure (e.g., as discussed above corresponding to FIG. 28). For example, the RA procedure is the RA-SDT procedure.

The RA procedure may, for example, be a four-step RA procedure (e.g., according to above discussions of FIG. 13A). For example, RA_TYPE is set to 4-stepRA, or a two-step RA procedure (e.g., according to above discussions of FIG. 13C). For example, RA_TYPE is set to 4-stepRA. The one or more configuration parameters may comprise one or more RACH configuration parameters. The one or more RACH configuration parameters may comprise a first RACH configuration parameters (e.g., RA-ConfigCommon IE), corresponding to a four-step RA type (e.g., the RA_TYPE is the 4-stepRA), for example, for performing the four-step RA procedure. The one or more RACH configuration parameters may, for example, comprise a second RACH configuration parameters (e.g., RA-ConfigCommon-TwoStepRA-r16 IE and/or MsgA-PUSCH-Config IE), corresponding to a two-step RA type (e.g., the RA_TYPE is the 2-stepRA), for example, for performing the two-step RA procedure. For example, the one or more RACH configuration parameters may comprise a msgA-RSRP threshold (e.g., msgA-RSRP-Threshold).

The RA procedure may be a contention-based RA procedure, for example, triggered by higher layers of the wireless device (e.g., the RRC sublayer or the MAC layer indicates triggering/initiating the RA procedure). The wireless device may, for example, trigger/initiate the RA procedure based on the higher layers indicating triggering/initiating the RA procedure.

The wireless device may, for example, based on (e.g., in response to) triggering/initiating the RA procedure, determine a carrier (SUL or NUL) for performing the RA procedure, for example, based on a measured RSRP or by following the example of FIG. 30. For example, the wireless device may perform the one or more BWP operations on the selected carrier for the RA procedure. By performing the one or more BWP operations, the wireless device may select a BWP for performing the RA procedure. The (selected) BWP for performing the RA procedure may be configured with both the first RACH configuration parameters and the second RACH configuration parameters (e.g., the RA procedure may be performed via a 2-step RA procedure or a 4-step RA procedure).

Performing the RA procedure may comprise determining an RA type. In step 3130, the wireless device may determine the RA type for performing the RA procedure, for example, based on the (selected) BWP for performing the RA procedure being configured with both the first RACH configuration parameters and the second RACH configuration parameters (e.g., the RA procedure may be performed via a 2-step RA procedure or a 4-step RA procedure).

The wireless device may, for performing the RA procedure and based on the one or more NTN-specific configuration parameters, determine whether the RA type being the two-step (or 2-step or 2-stage) RA type or the four-step (4-step or 4-stage) RA type (e.g., selecting/determining the RA type). The wireless device may initialize/set one or more RA parameters (variables) specific to the selected RA type, for example, based on (e.g., in response to) determining the RA type.

For performing an RA type selection corresponding to the RA procedure, the wireless device may determine whether at least one 4stepRA-type condition being satisfied or not. As shown in FIG. 31, the wireless device may perform the RA procedure based on the 4-step RA procedure (e.g., RA_TYPE is set to 4-stepRA), for example, based on (e.g., in response to) at least one 4stepRA-type condition being satisfied. The wireless device may perform the RA procedure based on the 2-step RA procedure (e.g., RA_TYPE is set to 2-stepRA), for example, based on (e.g., in response to) at least one 4stepRA-type condition not being satisfied.

The wireless device may determine the at least one 4stepRA-type condition being satisfied based on the one or more NTN-specific values/parameters (e.g., the one or more attributed of the service link). For example, the wireless device may further determine the at least one 4stepRA-type condition being satisfied based on a sixth set of NTN-specific thresholds of/among/from the one or more sets of NTN-specific thresholds. For example, the sixth set of NTN-specific thresholds may be different than the fifth set of NTN-specific thresholds. The sixth set of NTN-specific thresholds may be the fifth set of NTN-specific thresholds.

The at least one 4stepRA-type condition may be satisfied, for example, based on at least one of the following: a first set of 4stepRA-type rules being satisfied; and/or a second set of 4stepRA-type rules being satisfied; and/or a third set of 4stepRA-type rules being satisfied. For example, the wireless device may determine the first set of 4stepRA-type rules being satisfied based on the propagation delay of the service link being larger than a first NTN-specific threshold of (or among/from) the sixth set of NTN-specific thresholds (e.g., the wireless device is located around the cell/beam edge). The wireless device may, for example, determine the first set of 4stepRA-type rules not being satisfied based on the propagation delay of the service link being smaller than the first NTN-specific threshold of (or among/from) the sixth set of NTN-specific thresholds (e.g., the wireless device is located around the cell/beam center).

The wireless device may determine the first set of 4stepRA-type rules being satisfied based on the length of the service link being larger than a second NTN-specific threshold of (or among/from) the sixth set of NTN-specific thresholds (e.g., the wireless device is located around the cell/beam edge). The wireless device may determine the first set of 4stepRA-type rules not being satisfied based on the length of the service link being smaller than the second NTN-specific threshold of (or among/from) the sixth set of NTN-specific thresholds (e.g., the wireless device is located around the cell/beam center).

The wireless device may determine the first set of 4stepRA-type rules being satisfied based on the elevation angle of the service link being smaller than a third NTN-specific threshold of (or among/from) the sixth set of NTN-specific thresholds (e.g., the wireless device is located around the cell/beam edge). The wireless device may determine the first set of 4stepRA-type rules not being satisfied based on the elevation angle of the service link being larger than the third NTN-specific threshold of (or among/from) the sixth set of NTN-specific thresholds (e.g., the wireless device is located around the cell/beam center).

The wireless device may determine the second set of 4stepRA-type rules being satisfied based on the RSRP of the DL-PL reference being smaller than a msgA-RSRP-Threshold. For example, the wireless device may determine the second set of 4stepRA-type rules not being satisfied based on the RSRP of the DL-PL reference being larger than the msgA-RSRP-Threshold.

The third set of 4stepRA-type rules may be, for example, based on a probabilistic (or a randomized) procedure/method/function. For example, the probabilistic (or a randomized) procedure may comprise generating one or more random numbers. For example, the wireless device may determine the third set of 4stepRA-type rules being satisfied based on a first/initial random number of the one or more random numbers being larger than a first threshold (e.g., a fourth NTN-specific threshold of (or among/from) the sixth set of NTN-specific thresholds). The wireless device may determine the first threshold based on the msgA-RSRP-Threshold value and the RSRP of the DL-PL reference (e.g., as a ratio of the RSRP of the DL-PL reference and the msgA-RSRP-Threshold).

The wireless device may determine the third set of 4stepRA-type rules being satisfied based on a second random number of the one or more random numbers being smaller than a second threshold (e.g., a fifth NTN-specific threshold of (or among/from) the sixth set of NTN-specific thresholds). The wireless device may determine the second threshold based on the msgA-RSRP-Threshold and the RSRP of the DL-PL reference (e.g., as a ratio of the msgA-RSRP-Threshold and the RSRP of the DL-PL reference, for example, the inverse value of the first threshold).

The wireless device may determine the first threshold based on an NTN-specific threshold (e.g., the first/second/third NTN-specific threshold of the sixth set of NTN-specific thresholds) and an attribute of the service link (e.g., the propagation delay or the length or the elevation angle), for example, as a ratio of the propagation delay of the service link and the first threshold NTN-specific threshold or as a ratio of the length the service link and the second threshold NTN-specific threshold, or the like. The wireless device may determine the second threshold based on a NTN-specific threshold (e.g., the first/second/third NTN-specific threshold of the sixth set of NTN-specific thresholds) and an attribute of the service link (e.g., the propagation delay or the length or the elevation angle), for example, as a ratio of the first threshold NTN-specific threshold and the propagation delay of the service link or as a ratio of the second threshold NTN-specific threshold and the length the service link, or the like.

The one or more configuration parameters may comprise a ninth configuration parameter. The ninth configuration parameter may, for example, indicate whether the wireless device use/adopt the one or more NTN-specific configuration parameters to determine the at least one 4stepRA-type condition being satisfied or not (e.g., for performing/determination of the RA type). The wireless device may determine whether the at least one 4stepRA-type condition being satisfied or not based on the one or more NTN-specific configuration parameters (e.g., determining the RA type of the RA procedure is based on the first set of 4 stepRA-type rules), for example, based on (e.g., in response to) determining the ninth configuration parameter being indicated/configured (or being enabled or not being disabled or not being absent from the one or more configuration parameters). The wireless device may determine whether the at least one 4stepRA-type condition being satisfied based on whether the second set of 4stepRA-type rules being satisfied (e.g., determining the RA type of the RA procedure is based on the second set of 4stepRA-type rules), for example, based on (e.g., in response to) determining the ninth configuration parameter not being indicated/configured (or being disabled or being absent from the one or more configuration parameters).

The wireless device may, for example, based on (e.g., in response to) determining the ninth configuration parameter being indicated/configured (or being enabled or not being disabled or not being absent from the one or more configuration parameters), determine whether the at least one 4stepRA-type condition being satisfied based on the one or more NTN-specific configuration parameters and the second set of 4stepRA-type rules being satisfied (e.g., determining the RA type of the RA procedure is based on the first set of 4stepRA-type rules and the second set of 4stepRA-type rules). The wireless device may, for example, based on (e.g., in response to) determining the ninth configuration parameter not being indicated/configured (or being disabled or being absent from the one or more configuration parameters), determine whether the at least one 4stepRA-type condition being satisfied based on whether the second set of 4stepRA-type rules being satisfied (e.g., determining the RA type of the RA procedure is based on the second set of 4stepRA-type rules).

The one or more configuration parameters may comprise a tenth configuration parameter. The tenth configuration parameter may, for example, indicate whether the wireless device use/adopt the probabilistic procedure (e.g., the third set of 4stepRA-type rules being satisfied) to determine the at least one 4stepRA-type condition being satisfied or not. The wireless device may, for example, based on (e.g., in response to) determining the tenth configuration parameter being indicated/configured (or being enabled or not being disabled or not being absent from the one or more configuration parameters), determine whether the at least one 4stepRA-type condition being satisfied based on the third set of 4stepRA-type rules being satisfied (e.g., determining the RA type of the RA procedure is based on the third set of 4stepRA-type rules and/or the second set of 4stepRA-type rules). The wireless device may, for example, based on (e.g., in response to) determining the tenth configuration parameter not being indicated/configured (or being disabled or being absent from the one or more configuration parameters), determine whether the at least one 4stepRA-type condition being satisfied based on the second set of S4stepRA-type UL rules being satisfied (e.g., determining the RA type of the RA procedure is based on the second set of 4stepRA-type rules).

The one or more configuration parameters may comprise a RSRP threshold (e.g., msgA-RSRP-Threshold). For example, the wireless device may, based on the one or more NTN-specific values/parameters (e.g., the one or more attributes of the service link) and the RSRP threshold, determine/calculate a second RSRP threshold for determining whether the at least one 4stepRA-type condition being satisfied (e.g., using/based on second set of 4stepRA-type rules being satisfied or not and/or the third set of 4stepRA-type rules being satisfied or not). For example, the wireless device may reduce/increase the RSRP threshold by a factor to calculate the second RSRP threshold. The factor may be calculated (e.g., by a formula) based on the location information of the NTN node (e.g., the one or more attributes of the service link). To determine the second RSRP threshold, the wireless device may increase/decrease the RSRP threshold by the factor based of whether an attribute (e.g., the propagation delay/length/elevation angle) of the service link is increasing or decreasing by the movement of the NTN node and/or the wireless device (e.g., the factor may reflect a change in the attribute of the service link and/or the location of the NTN node).

The base station may configure the wireless device with a plurality of msgA-RSRP thresholds, for example, via the one or more configuration parameters (e.g., a plurality of msgA-RSRP-Threshold values). The one or more configuration parameters messages may indicate that the plurality of msgA-RSRP thresholds are configured for a particular type of the NTN payload (a GEO satellite, a MEO satellite, a LEO satellite) and/or a particular type of the cell/beam (e.g., Earth-fixed beam/cell). Each msgA-RSRP threshold among/of/from the plurality of msgA-RSRP thresholds may correspond to a relevant location of the NTN payload to the cell/beam (or the wireless device), for example, if the NTN payload is moving. Each msgA-RSRP threshold among/of/from the plurality of msgA-RSRP thresholds may correspond to a range of elevation angle of the service link. Each msgA-RSRP threshold among/of/from the plurality of msgA-RSRP thresholds may correspond to a range of propagation delay of the service link. Each msgA-RSRP threshold among/of/from the plurality of msgA-RSRP thresholds may correspond to a range of length of the service link.

For determining the RA type of the RA procedure, the wireless device may select a msgA-RSRP threshold (e.g., the msgA-RSRP-Threshold) among/of/from the plurality of msgA-RSRP thresholds. The wireless device may select the RSRP threshold among/of/from plurality of RSRP thresholds, for example, based on the one or more NTN-specific configuration parameters (e.g., the one or more NTN-specific parameters/values). The wireless device may use the (selected) msgA-RSRP threshold for determining whether the first set of 4stepRA-type rules being satisfied or not. The wireless device may use the (selected) msgA-RSRP threshold for determining whether the third set of 4stepRA-type rules being satisfied or not.

The wireless device may select the msgA-RSRP threshold (e.g., a first/initial or a last/final or an n-th msgA-RSRP threshold) among/of/from the plurality of msgA-RSRP thresholds (e.g., from the set of plurality of msgA-RSRP thresholds) based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the msgA-RSRP threshold among/of/from the set of msgA-RSRP thresholds is applicable for the RA procedure. The wireless device may select the n-th msgA-RSRP threshold among/of/from plurality of msgA-RSRP thresholds, for example, based on the attribute of the service link (e.g., the propagation delay, the length, or the elevation angle) being in the n-th (n=0, 1, . . . , N) range/interval of the one or more ranges/intervals of an attribute of the service link.

The (selected) BWP for performing the RA procedure may be configured only with the second RACH configuration parameters (e.g., the RA procedure may be performed via the 2-step RA procedure). For example, the wireless device may not determine the RA type.

As shown in FIG. 31, performing the RA procedure may comprise switching from the BWP to a second BWP, as shown in step 3140. The wireless device may switch from the BWP to a second BWP, for example, based on the one or more NTN-specific values (e.g., the one or more attributes of the service link). The wireless device may switch from the BWP to a second BWP, for example, based on the at least one 4stepRA-type rules being satisfied. The second BWP may be the initial BWP. The second BWP may be the default BWP. For example, the second BWP may not be configured with the second RACH configuration parameters (e.g., only the first RACH configuration parameters being configured for the second BWP).

As shown in FIG. 31, for performing the RA procedure based on the selected RA type (e.g., on the selected BWP or the second BWP) as shown in step 3150, the wireless device may select RA resources (e.g., based on above discussion corresponding to FIGS. 20-30). The RA resources may comprise a preamble 1311/1341/1321 with a preamble index (e.g., ra-PreambleIndex or PREAMBLE_INDEX), Random Access Preamble (RAP) group (e.g., preamble Group A or preamble Group B), a physical random access channel (PRACH) occasion (RO) comprising (time, frequency, and/or code) resources for sending (e.g., transmitting) the preamble, and/or one or more MsgA PUSCH occasions (POs) for MsgA payload/transport block 1342 transmission. For example, the wireless device may determine a valid RO (e.g., the next available RO) corresponding to a SSB or a CSI-RS, for example, randomly with equal probability amongst one or more ROs and/or based on a possible occurrence of measurement gaps. The wireless device may randomly select the preamble (from the first RAP group or the second RAP group), set PREAMBLE_INDEX based on the preamble (e.g., the index of the preamble), select the valid RO corresponding to the preamble, and/or calculate an RA-RNTI corresponding to the valid RO (if the type of the RA procedure is the 4-stepRA) or calculate a MSGB-RNTI corresponding to the valid RO (if the type of the RA procedure is the 2-stepRA).

For performing the two-step RA procedure, the wireless device may select the PUSCH occasion (PO) corresponding to the preamble and the valid RO, for example, if the preamble is selected by the MAC entity, of the wireless device, among the contention-based Random Access Preamble(s). For example, the wireless device may determine an UL grant/resource for transmission of the MsgA payload according to the PUSCH configuration associated with the selected RAP group. The wireless device may identify HARQ information (e.g., New Data Indicator (NDI), Transport Block size (TBS), Redundancy Version (RV), and a HARQ process ID/number/index) associated (or corresponding to) the MsgA payload. The wireless device may deliver the UL grant and the associated HARQ information to the HARQ entity for transmission of the first message (e.g., MsgA), for example, based on the preamble and the valid RO being mapped to a valid PUSCH occasion (PO).

The RA procedure may be a contention-free RA procedure (e.g., according to above discussions of FIG. 13B). For example, the wireless device may initiate/trigger the RA procedure based on the PDCCH order received from the base station. The PDCCH order may comprise an indication for the preamble (e.g., ra-PreambleIndex) and/or a SS/PBCH index for determining the RO for transmission of the preamble. For example, the one or more RACH configuration parameters may comprise a dedicated RACH configuration message (e.g., RACH-ConfigDedicated). The dedicated RACH configuration message may comprise, among other parameters, one or more ROs for the contention-free RA procedure, and one or more PRACH mask index for RA resource selection (e.g., ra-ssb-OccasionMaskIndex).

The wireless device may select the RA resources, for example, based on the PDCCH order. The wireless device may set/initialize parameter PREAMBLE_INDEX based on the preamble index indicated by the PDCCH order, for example, the preamble may not be selected by the higher layers (e.g., the MAC layer) of the wireless device among the contention-based (CB) Random Access Preambles (RAPs). For example, for performing the RA procedure (e.g., the two-step RA procedure or the four-step RA procedure), the wireless device may select an SSB indicated by the PDCCH order or may select the SSB based on a threshold (e.g., rsrp-ThresholdSSB). The wireless device may select the SSB randomly.

As shown in FIG. 31, the wireless device may, using (or based on) the (selected) RA resources, send (e.g., transmit) a first message (e.g., a preamble or a MsgA). For example, the wireless device may, for example, based on (e.g., in response to) the first message being sent (e.g., transmitted), monitor the PDCCH for receiving an RAR (e.g., Msg2/MsgB). The wireless device may send (e.g., transmit) a Msg3 (e.g., with repetition) based on an UL grant indicated by the RAR The wireless device may start an RAR window (e.g., ra-Response Window or msgB-Response Window), for example, after a delaying offset, for example, based on (e.g., in response to) sending (e.g., transmitting) the first message (e.g., the preamble). The delaying offset may be based on a propagation delay between the wireless device and the base station (e.g., the UE-gNB RTT or the RTD). The one or more configuration parameters (e.g., the one or more NTN configuration parameters) may indicate/configure the delaying offset. The wireless device may, for example, delay the start of the RAR window by the delaying offset. The wireless device may, for example, if the MsgA payload is not sent (e.g., transmitted) (e.g., if the PO is invalid), delay the start of the RAR window (e.g., msgB-ResponseWindow) by the delaying offset from a last/ending/final/latest symbol of the valid RO corresponding to the preamble. The wireless device may start the RAR window from a last/ending/final/latest symbol of the MsgA payload (e.g., PUSCH) occasion mapped to the valid RO plus the delaying offset, for example, if the MsgA payload is sent (e.g., transmitted).

The wireless device may start the RAR window (e.g., the ra-ResponseWindow or the msgB-ResponseWindow) at a first/earliest/starting downlink control channel occasion after the delaying offset from/after an end (e.g., a last/final/ending/latest symbol) of the transmission occasion of the first message. The wireless device may start the RAR window based on a first/initial/starting/earliest (DL) symbol of a control resource set (CORESET) for receiving PDCCH for the Type1-PDCCH CSS set. The wireless device may, for example, while the RAR window is running, monitor PDCCH (e.g., the one or more PDCCH candidates) for an RAR identified by the RA-RNTI (for the four-step RA procedure) or the MSGB-RNTI (for the two-step RA procedure) and/or a C-RNTI. The wireless device may monitor the one or more PDCCH candidates based on (or using or via) a Type1-PDCCH common search space (CSS) set (e.g., indicated by ra-searchSpace in the one or more configuration parameters, for example, PDCCH-ConfigCommon), a Type3-PDCCH CSS set (e.g., indicated by SearchSpace in the one or more configuration parameters, for example, PDCCH-Config with searchSpaceType=common), and/or an USS set (e.g., indicated by SearchSpace in the one or more configuration parameters, for example, PDCCH-Config with searchSpaceType=ue-Specific). For example, the wireless device may monitor the one or more PDCCH candidates for the first PDCCH transmission on the search space indicated by recoverySearchSpaceId of the SpCell.

The wireless device may monitor the one or more PDCCH candidates for receiving a DCI (e.g., via a PDCCH portion of the Msg2/MsgB) indicating/scheduling a downlink assignment (e.g., a PDSCH portion of the Msg2/MsgB) for receiving a transport block (TB), for example, while/during the RAR window (e.g., ra-ResponseWindow or msgB-ResponseWindow) is running. TB may comprise a MAC PDU. The MAC PDU may comprise one or more MAC subPDUs (and/or optionally padding). A MAC subPDU, of the one or more MAC subPDUs, may comprise at least one of following: a MAC subheader with Backoff Indicator (BI) only; a MAC subheader with Random Access Preamble identifier (RAPID) only (e.g., acknowledgment for an SI request); a MAC subheader with the RAPID and a MAC RAR (e.g., an RAR or a fallback RAR). The MAC PDU may comprise one or more (MAC) RARs.

An RAR (of/from/among the one or more RARs) may be fixed size and may comprise at least one of the following fields: an R field that may indicate a Reserved bit, a Timing Advance Command (TAC) MAC CE field, an UL grant (or an UL grant field), and/or an RNTI field (e.g., the TC-RNTI and/or the C-RNTI) that may indicate an identity that is used/employed during the RA procedure. For the two-step RA procedure, the MAC PDU may comprise a MAC subheader for fallbackRAR (e.g., the MAC subPDU may be a fallbackRAR MAC subPDU).

The wireless device may receive the DCI scheduling the RAR. The wireless device may determine (or indicate or identify) a reception of the RAR (e.g., for or, for example, based on (e.g., in response to) the first message or the preamble) being successful. For example, the wireless device may consider the reception of the RAR successful based on the RAR comprising the MAC PDU with the RAPID corresponding (or matching) to the preamble with the preamble index PREAMBLE_INDEX. As shown in FIG. 20, the RAR may indicate an UL grant for transmission of Msg3. The wireless device may process the UL grant and indicate it to the lower layers (e.g., the physical layer) for transmission of the Msg3 using/based on the UL grant. For example, the wireless device may send (e.g., transmit) the Msg3 (e.g., with the repetition K).

Figure 32:
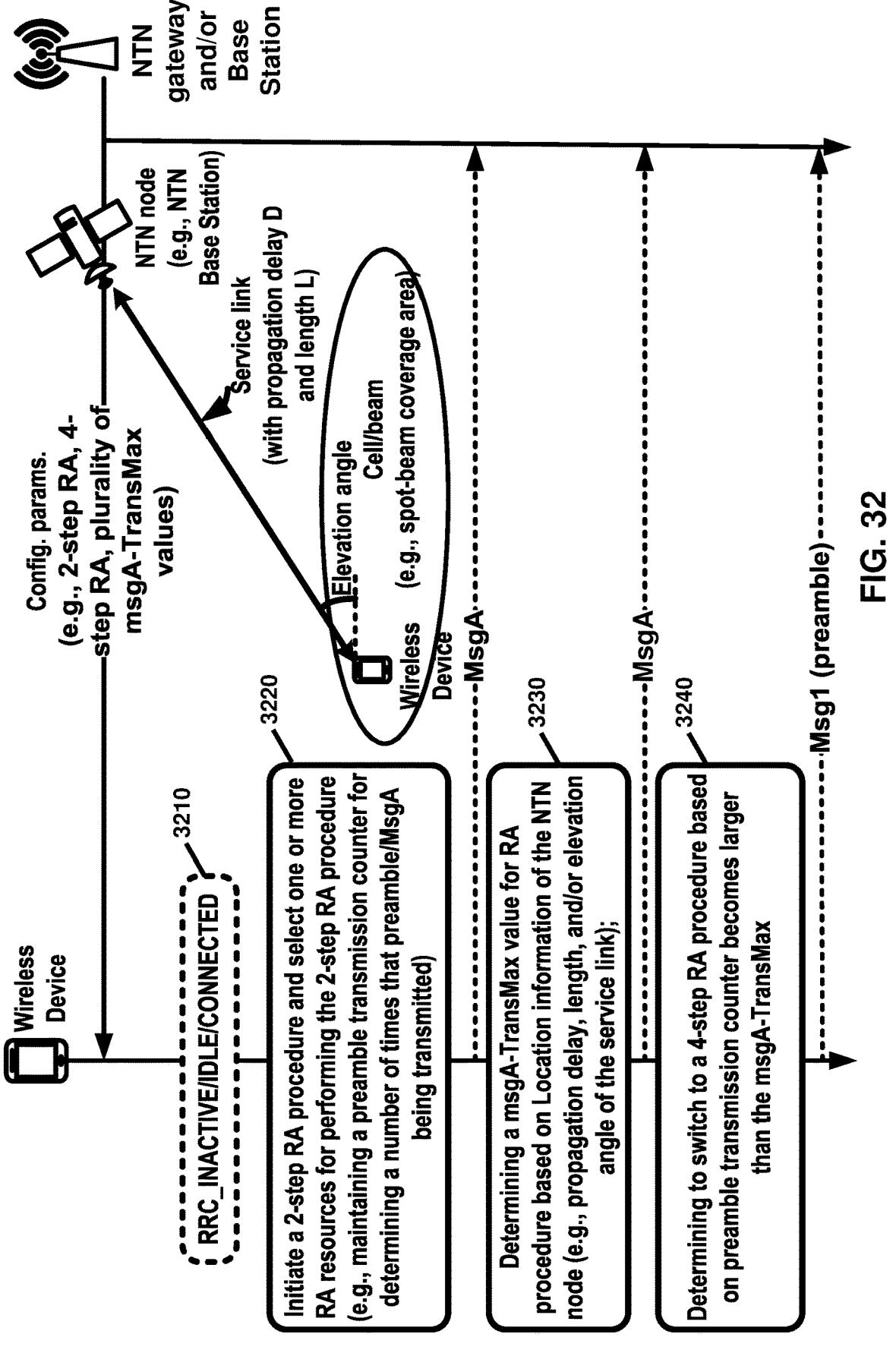
FIG. 32 shows an example of an RA procedure in wireless communications systems.

FIG. 32 shows an example of an RA procedure in wireless communications systems. FIG. 32 may, for example, show an implementation of a method (or a process) for the RA procedure at a base station and/or a wireless device. The base station may communicate with the wireless device. For example, as shown in step 3210, the wireless device may be in an RRC_IDLE (or an RRC idle) state/mode, an RRC_I-NACTIVE (or an RRC inactive) state/mode, or an RRC_CONNECTED (or an RRC connected) state/mode. FIG. 32 may show an implementation of a method (or a process) for an SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state). FIG. 32 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/ mode, or an RRC_CONNECTED (or an RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN), for example, the wireless device and the base station may operate in the NTN and/or the base station may be an NTN base station and/or the cell may be part of the NTN. For example, the cell may be the serving cell.

The wireless device may trigger/initiate the RA procedure, for example, based on (e.g., in response to) (or for): an initial access procedure (e.g., to transit from the RRC_IDLE state/mode to the RRC_CONNECTED state/mode), a positioning procedure, an uplink coverage recovery procedure, initiating a beam failure recovery, receiving from the base station an RRC reconfiguration message, for example, during a handover procedure, receiving from the base station a PDCCH order, re-synchronizing if new data arrives and the wireless device status is out-of-sync for UL communication/ transmission, new data arrives at the buffer of the wireless device if there is no scheduling request (SR) resources (e.g., PUCCH) for sending (e.g., transmitting) the SR are config-ured, and/or pending data exists in the buffer of the wireless device and the wireless device has reached a maximum allowable times for (re)sending (e.g., (re)transmitting) an SR (e.g., a SR failure). The wireless device may perform the RA procedure, for example, after performing the initial access, for example, for beam failure recovery, reporting a TA information (e.g., a UE-specific TA and/or a GNSS-acquired location information) of the wireless device, other SI request, and/or SCell addition. The wireless device may trigger the RA procedure due to an SDT procedure (e.g., as discussed above corresponding to FIG. 28), for example, the RA procedure is the RA-SDT procedure.

The RA procedure may, for example, be a four-step RA procedure (e.g., according to above discussions of FIG. 13A), for example, RA_TYPE is set to 4-stepRA, or a two-step RA procedure (e.g., according to above discussions of FIG. 13C), for example, RA_TYPE is set to 4-stepRA. The one or more configuration parameters may comprise one or more RACH configuration parameters. The one or more RACH configuration parameters may comprise a first RACH configuration parameters (e.g., RA-ConfigCommon IE), corresponding to a four-step RA type (e.g., the RA_TYPE is the 4-stepRA), for example, for performing the four-step RA procedure. The one or more RACH configu-ration parameters may, for example, comprise a second RACH configuration parameters (e.g., RA-ConfigCommon-TwoStepRA-r16 IE and/or MsgA-PUSCH-Config IE), cor-responding to a two-step RA type (e.g., the RA_TYPE is the 2-stepRA), for example, for performing the two-step RA procedure.

The RA procedure may be a contention-based RA proce-dure, for example, triggered by higher layers of the wireless device (e.g., the RRC sublayer or the MAC layer indicates triggering/initiating the RA procedure). The wireless device may, for example, trigger/initiate the RA procedure based on the higher layers indicating triggering/initiating the RA procedure.

The wireless device may, for example, based on (e.g., in response to) triggering/initiating the RA procedure, deter-mine a carrier (SUL or NUL) for performing the RA procedure, for example, based on a measured RSRP or by following the example of FIG. 30. For example, the wireless device may perform the one or more BWP operations on the selected carrier for the RA procedure. The wireless device may select a BWP for performing the RA procedure, for example, by performing the one or more BWP operations. The (selected) BWP for performing the RA procedure may be configured with both the first RACH configuration parameters and the second RACH configuration parameters (e.g., the RA procedure may be performed via a 2-step RA procedure or a 4-step RA procedure).

Performing the RA procedure may comprise determining an RA type. The wireless device may determine the RA type for performing the RA procedure (e.g., based on the example of FIG. 31), for example, based on the (selected) BWP for performing the RA procedure being configured with both the first RACH configuration parameters and the second RACH configuration parameters (e.g., the RA procedure may be performed via a 2-step RA procedure or a 4-step RA procedure). As shown in FIG. 32, the wireless device may determine the type of the RA procedure being the 2-step RA. The wireless device may perform the 2-step RA procedure, as shown in step 3220. For example, the wireless device may select one or more RA procedures (e.g., based on the discussion of FIG. 31) and send (e.g., transmit) a first message (e.g., the MsgA). For example, the wireless device may send (e.g., transmit) the MsgA (comprising the pre-amble and/or the MsgA payload/PUSCH) one or more times. For example, the wireless device may maintain a preamble transmission counter during the ongoing RA pro-cedure. The wireless device may increment the preamble transmission counter, for example, based on (e.g., in response to) each transmission of the MsgA.

The wireless device may determine whether to switch from the 2-step RA procedure to the 4-step RA procedure based on the one or more NTN-specific parameters/values and/or the preamble transmission counter. For example, as shown in FIG. 32, the base station may configure the wireless device with a plurality of msgA-TransMax thresh-olds/values, for example, via the one or more configuration parameters (e.g., a plurality of msgA-TransMax values). In step 3240, the wireless device may determine whether to switch from the 2-step RA procedure to the 4-step RA procedure based on the one or more NTN-specific parameters/values (e.g., the location information of the NTN node and/or the one or more attributes of the service link) and/or the preamble transmission counter and/or the plurality of MsgA-TransMax thresholds.

The one or more configuration parameters messages may indicate that the plurality of msgA-TransMax thresholds are configured for a particular type of the NTN payload (a GEO satellite, a MEO satellite, a LEO satellite) and/or a particular type of the cell/beam (e.g., Earth-fixed beam/cell). Each msgA-TransMax threshold among/of/from the plurality of msgA-TransMax thresholds may correspond to a relevant location of the NTN payload to the cell/beam (or the wireless device), for example, if the NTN payload is moving. Each msgA-TransMax threshold among/of/from the plurality of msgA-TransMax thresholds may correspond to a range of elevation angle of the service link. Each msgA-TransMax threshold among/of/from the plurality of msgA-TransMax thresholds may correspond to a range of propagation delay of the service link. Each msgA-TransMax threshold among/of/from the plurality of msgA-TransMax thresholds may correspond to a range of length of the service link.

The base station by configuring plurality of msgA-TransMax thresholds/values may allow different switching behavior across the cell/beam, for example, based on the location of the wireless device (e.g., around the cell/beam center versus around the cell/beam edge) and/or movement of the NTN payload. A larger value of msgA-TransMax may allow the wireless device to not fallback to the 4-step RA procedure despite failure of the RA procedure (e.g., if the preamble transmission counter is smaller than the msgA-TransMax), for example, if the wireless device is located around the cell/beam center. A smaller value of msgA-TransMax may allow the wireless device to fallback to the 4-step RA procedure after one or more preamble transmissions (e.g., if the preamble transmission counter is larger than the msgA-TransMax), for example, if the wireless device is located around the cell/beam center.

For determining whether to switch from the 2-step RA procedure to the 4-step RA procedure, the wireless device may select a msgA-TransMax threshold among/of/from the plurality of msgA-TransMax thresholds. As shown in step 3230, the wireless device may select the msgA-TransMax threshold among/of/from plurality of msgA-TransMax thresholds, for example, based on the one or more NTN-specific configuration parameters (e.g., the one or more NTN-specific parameters/values).

The wireless device may select the msgA-TransMax threshold (e.g., a first/initial or a last/final or an n-th msgA-TransMax threshold) among/of/from the plurality of msgA-TransMax thresholds (e.g., from the set of plurality of msgA-TransMax thresholds) based on the location information of the NTN node (e.g., the one or more attributes of the service link). For example, the one or more configuration parameters may configure one or more ranges/intervals of an attribute of the service link (e.g., the propagation delay, the length, or the elevation angle) for determining which value of the msgA-TransMax threshold among/of/from the set of msgA-TransMax thresholds is applicable for the RA procedure. The wireless device may select the n-msgA-TransMax threshold among/of/from plurality of msgA-TransMax thresholds, for example, based on the attribute of the service link (e.g., the propagation delay, the length, or the elevation angle) being in the n-th (n=0, 1, . . . , N) range/interval of the one or more ranges/intervals of an attribute of the service link.

Values of the plurality of msgA-TransMax thresholds may be arranged in a descending or an ascending order/fashion. For example, a first wireless device closer to the cell/beam edge may select a larger value for a msgA-TransMax threshold among/of/from plurality of msgA-TransMax thresholds to perform the RA procedure. A second wireless device closer to the cell/beam center may select a smaller value for a msgA-TransMax threshold among/of/from plurality of msgA-TransMax thresholds to perform the RA procedure.

One or more msgA-TransMax thresholds of the plurality of msgA-TransMax thresholds may be configured/indicated as "non-value" or "not-configured" or "not-applicable" or the like. The wireless device may ignore/skip switching from the 2-step RA procedure to the 4-step RA procedure regardless of the value of the preamble transmission counter, for example, based on (e.g., in response to) determining the msgA-TransMax threshold being one or the one or more msgA-TransMax thresholds. The wireless device may not switch from the 2-step RA procedure to the 4-step RA procedure, for example, if the wireless device is located around the cell/beam center.

The one or more configuration parameters may comprise the msgA-TransMax threshold. The wireless device may, for example, based on the one or more NTN-specific values/parameters (e.g., the one or more attributes of the service link) and the msgA-TransMax threshold, determine/calculate a second msgA-TransMax threshold for determining whether to switch to the 4-step RA procedure or not (e.g., the preamble transmission counter being larger than the second msgA-TransMax threshold or not). For example, the wireless device may reduce/increase the msgA-TransMax threshold by a factor to calculate the second msgA-TransMax threshold. The factor may be calculated (e.g., by a formula) based on the location information of the NTN node (e.g., the one or more attributes of the service link). The wireless device may increase the msgA-TransMax threshold by the factor to calculate the second msgA-TransMax threshold (e.g., the wireless device is moving toward the cell/beam center), for example, if the propagation delay/length of the service link is decreased or the elevation angle of the service link is increased. Inversely, the wireless device may decrease the msgA-TransMax threshold by the factor to calculate the second msgA-TransMax threshold, for example, if the propagation delay/length of the service link is increased or the elevation angle of the service link is decreased.

As shown in FIG. 32, the wireless device may fallback to the 4-step RA procedure and perform the 4-step RA procedure (e.g., by sending (e.g., transmitting) a preamble), for example, based on (e.g., in response to) switching from the 2-step RA procedure to the 4-step RA procedure (e.g., the preamble transmission counter being larger than the msgA-TransMax threshold). The wireless device may monitor the PDCCH, for example, based on (e.g., in response to) sending (e.g., transmitting) the preamble to receive an RAR. For example, the RAR may indicate a transmission of the Msg3 (e.g., with the repetitions K).

Figure 33:
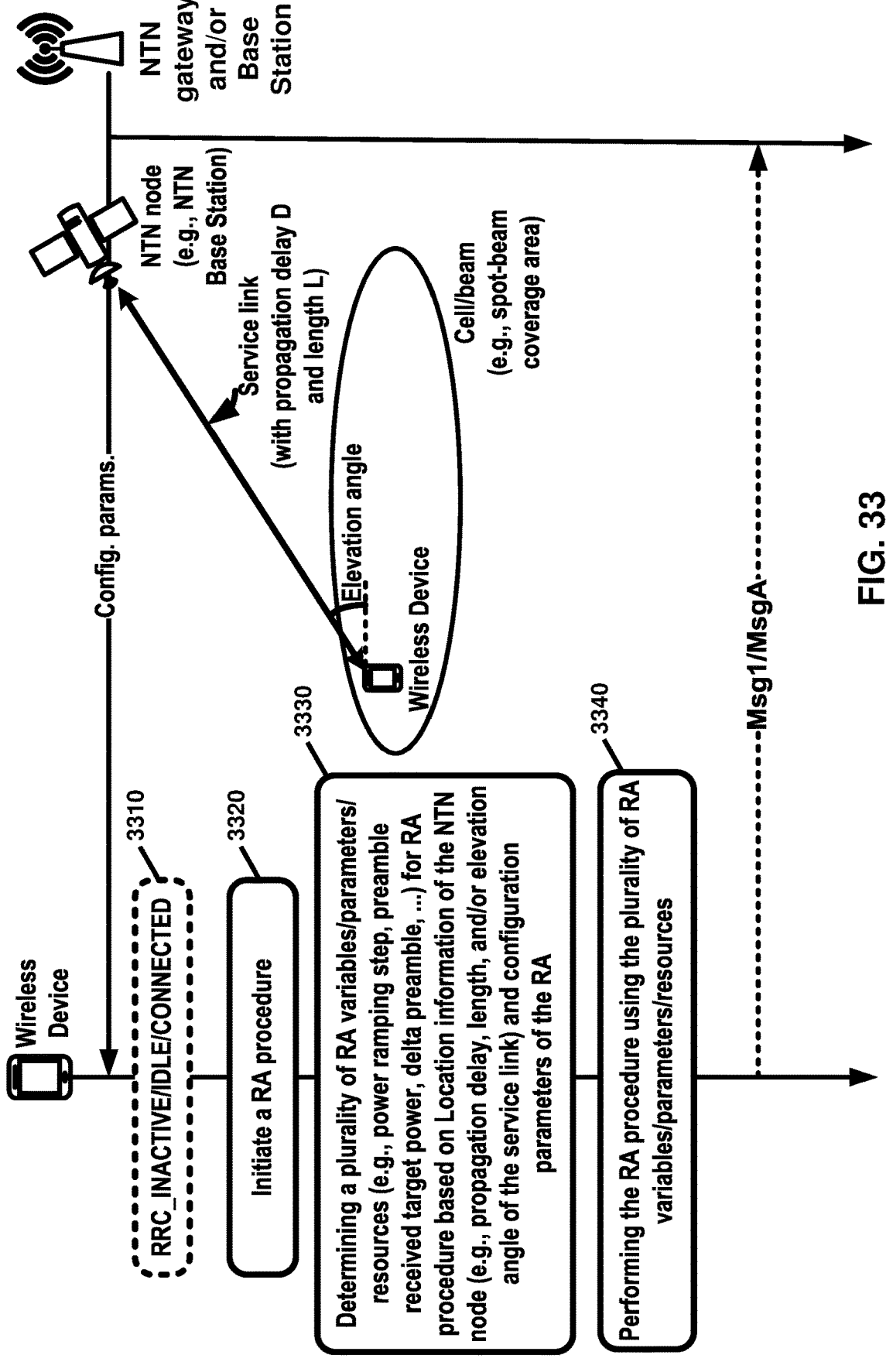
FIG. 33 shows an example of an RA procedure in wireless communications systems.

FIG. 33 shows an example of an RA procedure in wireless communications systems. FIG. 33 may, for example, show an implementation of a method (or a process) for the RA procedure at a base station and/or a wireless device. The base station may communicate with the wireless device. For example, as shown in step 3310, the wireless device may be in an RRC_IDLE (or an RRC idle) state/mode, an RRC_I-NACTIVE (or an RRC inactive) state/mode, or an RRC_CONNECTED (or an RRC connected) state/mode. FIG. 33 may show an implementation of a method (or a process) for an SDT procedure at a base station and/or a wireless device. For example, the SDT procedure may be used by the wireless device for transmission of data and/or signaling over one or more allowed radio bearers in an RRC_INACTIVE state (i.e., without the wireless device transitioning/switching to an RRC_CONNECTED state). FIG. 33 may show the SDT procedure comprising an SDT and one or more subsequent transmissions of an SDT.

The base station may communicate with the wireless device via/using a cell (e.g., a serving cell). For example, the wireless device may be in an RRC_IDLE (or an RRC idle) state/mode, an RRC_INACTIVE (or an RRC inactive) state/mode, or an RRC_CONNECTED (or an RRC connected) state/mode. For example, the wireless device may be in a RRC non-connected state/mode (e.g., the RRC inactive state/mode or the RRC idle state/mode or Non-RRC_CO-NNECTED state/mode). The wireless device may, for example, communicate with the base station via a non-terrestrial network (NTN). For example, the wireless device and the base station may operate in the NTN and/or the base station may be an NTN base station and/or the cell may be part of the NTN. For example, the cell may be the serving cell.

In step 3320, the wireless device may trigger/initiate the RA procedure, for example, based on (e.g., in response to) (or for): an initial access procedure (e.g., to transit from the RRC_IDLE state/mode to the RRC_CONNECTED state/mode), a positioning procedure, an uplink coverage recovery procedure, initiating a beam failure recovery, receiving from the base station an RRC reconfiguration message, for example, during a handover procedure, receiving from the base station a PDCCH order, re-synchronizing if new data arrives and the wireless device status is out-of-sync for UL communication/transmission, new data arrives at the buffer of the wireless device if there is no scheduling request (SR) resources (e.g., PUCCH) for sending (e.g., transmitting) the SR are configured, and/or pending data exists in the buffer of the wireless device and the wireless device has reached a maximum allowable times for (re)sending (e.g., (re)trans-mitting) an SR (e.g., a SR failure). The wireless device may perform the RA procedure, for example, after performing the initial access, for example, for beam failure recovery, report-ing a TA information (e.g., a UE-specific TA and/or a GNSS-acquired location information) of the wireless device, other SI request, and/or SCell addition. The wireless device may trigger the RA procedure due to an SDT procedure (e.g., as discussed above corresponding to FIG. 28), for example, the RA procedure is the RA-SDT procedure.

The RA procedure may, for example, be a four-step RA procedure (e.g., according to above discussions of FIG. 13A), for example, RA_TYPE is set to 4-stepRA, or a two-step RA procedure (e.g., according to above discussions of FIG. 13C), for example, RA_TYPE is set to 4-stepRA. The one or more configuration parameters may comprise one or more RACH configuration parameters. The one or more RACH configuration parameters may comprise a first RACH configuration parameters (e.g., RA-ConfigCommon IE), corresponding to a four-step RA type (e.g., the RA_TYPE is the 4-stepRA), for example, for performing the four-step RA procedure. The one or more RACH configu-ration parameters may, for example, comprise a second RACH configuration parameters (e.g., RA-ConfigCommon-TwoStepRA-r16 IE and/or MsgA-PUSCH-Config IE), corresponding to a two-step RA type (e.g., the RA_TYPE is the 2-stepRA), for example, for performing the two-step RA procedure. For example, the one or more RACH configu-ration parameters may comprise a msgA-RSRP threshold (e.g., msgA-RSRP-Threshold).

The RA procedure may be a contention-based RA proce-dure, for example, triggered by higher layers of the wireless device (e.g., the RRC sublayer or the MAC layer indicates triggering/initiating the RA procedure). The wireless device may, for example, trigger/initiate the RA procedure based on the higher layers indicating triggering/initiating the RA procedure.

The wireless device may, for example, based on (e.g., in response to) triggering/initiating the RA procedure, deter-mine a carrier (SUL or NUL) for performing the RA procedure, for example, based on a measured RSRP or by following the example of FIG. 30. For example, the wireless device may perform the one or more BWP operations on the selected carrier for the RA procedure. The wireless device may select a BWP for performing the RA procedure, for example, by performing the one or more BWP operations. The (selected) BWP for performing the RA procedure may be configured (e.g., via the one or more configuration parameters) with both the first RACH configuration param-eters and the second RACH configuration parameters (e.g., the RA procedure may be performed via a 2-step RA procedure or a 4-step RA procedure). For example, follow-ing the discussion of FIG. 31, the wireless device may determine the RA type. The selected BWP for performing the RA procedure may be configured (e.g., via the one or more configuration parameters) with either the first RACH configuration parameters (e.g., the RA type may be 4-step RA) and/or the second RACH configuration parameters (e.g., the RA type may be 2-step RA and/or the wireless device may switch the BWP to the second BWP, as dis-cussed in FIG. 32).

As shown in FIG. 33, in step 3330, the wireless device may determine a plurality of RA resources/variables/param-eters for performing the RA procedure, for example, based on the NTN-specific parameters/values (e.g., the one or more attributes of the service link and/or the location of the NTN node). For example, the wireless device may, based on the NTN-specific parameters/values (e.g., the one or more attributes of the service link) and using the one or more RACH configuration parameters, select/determine values of one or more RA variables/parameters for performing the RA procedure.

The one or more RA variables/parameters may comprise at least one of the following: prach-ConfigurationIndex indicating available set of PRACH occasions (ROs) for a transmission of a preamble/Msg1 (e.g., MSGA PRACH/preamble if the ROs are shared between 2-step and 4-step RA types); and/or msgA-PRACH-ConfigurationIndex indi-cating available set of PRACH occasions for the transmis-sion of MSGA preamble in 2-step RA type; and/or a pre-amble received target power (e.g., preambleReceivedTargetPower and/or msgA-PreambleRe-ceivedTargetPower); and/or msgA-TransMax; a power ramping step/factor (e.g., powerRampingStep and/or msgA-PreamblePowerRampingStep and/or powerRampingSte-pHighPriority); and/or scalingFactorBI; and/or preamble-TransMax; msgA-PUSCH-ResourceGroupA indicating/configuring MSGA PUSCH resources that the wireless device may use when performing MSGA transmission using Random Access Preambles group A; and/or msgA-PUSCH-ResourceGroupB indicating/configuring MSGA PUSCH resources that the wireless device may use when performing MSGA transmission using Random Access Preambles group B; and/or ra-Msg3SizeGroupA indicating a threshold to determine the groups of Random Access Preambles for 4-step RA type; and/or msg3-DeltaPreamble/msgA-DeltaPreamble; and/or messagePowerOffsetGroupB; and/or numberOfRA-PreamblesGroupA; and/or ra-MsgA-Size-GroupA.

The one or more RACH configuration parameters may comprise a first set of parameters/variables. The first set of parameters/variables may, for example, comprise at least one of the following: prach-ConfigurationIndex indicating available set of PRACH occasions (ROs) for a transmission of a preamble/Msg 1 (e.g., MSGA PRACH/preamble if the ROs are shared between 2-step and 4-step RA types); and/or msgA-PRACH-ConfigurationIndex; and/or a preamble received target power (e.g., preambleReceivedTargetPower and/or msgA-PreambleReceivedTargetPower); and/or msgA-TransMax; a power ramping step/factor (e.g., powerRampingStep and/or msgA-PreamblePowerRampingStep and/or powerRampingStepHighPriority); and/or scalingFactorBI; and/or preambleTransMax; msgA-PUSCH-ResourceGroupA; and/or msgA-PUSCH-ResourceGroupB; and/or ra-Msg3SizeGroupA; and/or msg3-DeltaPreamble/msgA-DeltaPreamble; and/or messagePowerOffsetGroupB; and/or numberOfRA-PreamblesGroupA; and/or ra-MsgA-Size-GroupA.

Each field of the first set of parameters/variables may comprise a plurality of (corresponding) values. For example, the msg3-DeltaPreamble filed may comprise a plurality of msg3-DeltaPreamble values. The numberOfRA-PreamblesGroupA filed may comprise a plurality of numberOfRA-PreamblesGroupA values. The powerRampingStep filed may comprise a plurality of powerRampingStep values.

The wireless device may, for selecting/determining the values of one or more RA variables/parameters for performing the RA procedure and for each filed of the one or more RA variables/parameters, select a value from a corresponding field from the first set of parameters/variables. For example, to determine the value of the msg3-DeltaPreamble of the one or more RA variables/parameters, the wireless device may, for example, based on the NTN-specific parameters/values (e.g., the one or more attributes of the service link), select a value from the msg3-DeltaPreamble filed of the first set of parameters/variables (e.g., comprising the plurality of msg3-DeltaPreamble values). To determine the value of the numberOfRA-PreamblesGroupA of the one or more RA variables/parameters, the wireless device may select a value from the numberOfRA-PreamblesGroupA filed of the first set of parameters/variables (e.g., comprising the plurality of numberOfRA-PreamblesGroupA values). To determine the value of the powerRampingStep of the one or more RA variables/parameters, the wireless device may select a value from the powerRampingStep filed of the first set of parameters/variables (e.g., comprising the plurality of powerRampingStep values).

The wireless device may, for each filed of the one or more RA variables/parameters, select a value from a corresponding field from the first set of parameters/variables based on the attribute of the service link (e.g., the propagation delay, the length, or the elevation angle) being in the n-th (n=0, . . . , N) range/interval of one or more ranges/intervals of an attribute of the service link. For example, the one or more configuration parameters may configure one or more ranges/intervals of an attribute of the service link (e.g., the propagation delay, the length, or the elevation angle).

As shown in FIG. 33, the wireless device may, using/via the plurality of RA resources/variables/parameters, perform the RA procedure, as shown in step 3340. For example, the wireless device may send (e.g., transmit) the first message (e.g., the preamble or the MsgA) using the plurality of RA resources/variables/parameters (e.g., the one or more RA resources).

A wireless device may perform a method comprising multiple operations. The wireless device may receive, from a base station and via a non-terrestrial network (NTN), one or more configuration parameters. The one or more configuration parameters may indicate a first set of RA resources indicating a physical uplink shared channel (PUSCH) repetition and a second set of RA resources not indicating the PUSCH repetition. The one or more configuration parameters may comprise one or more NTN configuration parameters for determining a location of an NTN node. The one or more configuration parameters may select one or more RA resources, from among the first set of RA resources and the second set of RA resources, for an RA procedure based on the location of the NTN node. The one or more configuration parameters may send (e.g., transmit), for the RA procedure, a preamble via the one or more RA resources. The wireless device may perform one or more operations. For example, the wireless device may determine whether to select the one or more RA resources from the first set of RA resources or the second set of RA resources based on the location information of the NTN node. Determination of the location information of the NTN node may be based on satellite ephemeris data. The one or more configuration parameters may indicate the satellite ephemeris data. Determination of at least one attribute of a service link may be based on the location information of the NTN node. The service link may comprise a communication link between the wireless device and the NTN node. Determination of the at least one attribute of the service link may further be based on a location information of the wireless device. The at least one attribute of the service link may be at least one of: a propagation delay of the service link; a length of the service link; or an elevation angle of the service link. The length of the service may be based on a distance between the wireless device and the NTN node. The wireless device may determine a first attribute of the service link among the at least one attribute of the service link being larger than a first NTN-specific threshold. The first NTN-specific threshold may be indicated by the one or more configuration parameters. The first attribute of the service link may be one of: the propagation delay of the service link; or the length of the service link. The wireless device may determine a second attribute of the service link among the at least one attribute of the service link being smaller than a second NTN-specific threshold. The second NTN-specific threshold may be indicated by the one or more configuration parameters. The second attribute of the service link may be the elevation angle of the service link. The selecting may be further based on whether a reference signal received power (RSRP) of a downlink pathloss reference being smaller than an RSRP threshold or not. The one or more configuration parameters may indicate the RSRP threshold. The determination of the RSRP threshold may be based on the location information of the NTN node. The determination of the RSRP threshold may be further based on at least one of: selecting the RSRP threshold from a plurality of RSRP thresholds; or calculating the RSRP threshold based on a configured RSRP threshold. The one or more configuration parameters may indicate the plurality of RSRP thresholds. The one or more configuration parameters may indicate the configured RSRP threshold. The determination may be further based on a first random number, generated by the wireless device, being larger than a first threshold. The one or more configuration parameters may indicate the first threshold. The wireless device may determines the first threshold based on at least one of: the location information of the NTN node; or a RSRP of a downlink pathloss reference and a configured RSRP threshold. The wireless device may determine at least one of the following being satisfied: a first value being larger than a configured NTN-specific threshold; and the one or more configuration parameters indicate the configured NTN-specific threshold; or the RSRP of the downlink pathloss reference being smaller than the configured RSRP threshold. The first value may be determined based on the location information of the NTN node. The determination may be further based on a second random number, generated by the wireless device, being smaller than a second threshold. The one or more configuration parameters may indicate the second threshold. The wireless device may determine the second threshold based on at least one of: the location information of the NTN node; or a RSRP of a downlink pathloss reference and a configured RSRP threshold. The wireless device may determine at least one of the following being satisfied: a first value being smaller than a configured NTN-specific threshold; and the one or more configuration parameters indicate the configured NTN-specific threshold; or the RSRP of the downlink pathloss reference being larger than the configured RSRP threshold. The first value may be determined based on the location information of the NTN node. Determination of the PUSCH repetition being applicable for the RA procedure may be based on the location information of the NTN node. The wireless device may determine whether to use the location information of the NTN node or an RSRP of the downlink pathloss reference for determining whether to initiate the PUSCH repetition. For example, based on (e.g., in response to) a first configuration parameter being enabled, the determination of whether the PUSCH repetition may be applicable or not may be based on the location information of the NTN node. For example, based on (e.g., in response to) the first configuration parameter being disabled, the determination of whether the PUSCH repetition may be applicable or not may be based on the RSRP of the downlink pathloss reference. The one or more configuration parameters may indicate the first configuration parameter. The wireless device may determine whether to use a randomized procedure for determining whether the PUSCH repetition may be applicable or not based on whether a second configuration parameter being enabled or disabled. The one or more configuration parameters may indicate the second configuration parameter. For example, based on (e.g., in response to) the PUSCH repetition being applicable for the RA procedure, the wireless device may select the one or more RA resources from the first set of RA resources. For example, based on (e.g., in response to) the PUSCH repetition not being applicable for the RA procedure, the wireless device may select the one or more RA resources from the second set of RA resources. The wireless device may determine whether the preamble may be selected from a preamble group A or a preamble group B based on the location information of the NTN node. The determination may be based on determining a value for a first parameter. The first parameter may be at least one of: a delta preamble; a transport block size; or a power offset. The determination of the value for the first parameter may be based on increasing a preconfigured value by a factor, for example, based on (e.g., in response to) a change in an attribute of the service link. The attribute of the service link may be at least one of: a propagation delay of the service link; or a length of the service link. The determination of the value for the first parameter may be based on increasing a preconfigured value by a factor, for example, based on (e.g., in response to) a change of an attribute of the service link. The attribute of the service link may be an elevation angle of the service link. The wireless device may determine a repetition number for a transmission of the PUSCH based on the location information of the NTN node and a random access response (RAR). The wireless device may send (e.g., transmit) a message 3 of the RA procedure based on the repetition number for the transmission of the PUSCH. The repetition number for the transmission of the PUSCH may be selected from a plurality of repetition numbers based on the RAR. The plurality of repetition numbers may be selected from a set of plurality of repetition numbers based on the location information of the NTN node. The one or more configuration parameters may indicate the set of plurality of repetition numbers. A subset of repetition numbers may be selected from a plurality of repetition numbers based on the location information of the NTN node. The one or more configuration parameters may indicate the plurality of repetition numbers. The repetition number for a transmission of the PUSCH may be selected from the subset of repetition numbers based on the RAR. For example, based on (e.g., in response to) a first attribute of the service link among the at least one attribute of the service link being larger than a first NTN-specific threshold, the wireless device may select the one or more RA resources from the second set of RA resources. The first NTN-specific threshold may be indicated by the one or more configuration parameters. For example, based on (e.g., in response to) a second attribute of the service link among the at least one attribute of the service link being smaller than a second NTN-specific threshold, the wireless device may select the one or more RA resources from the second set of RA resources. The first NTN-specific threshold may be indicated by the one or more configuration parameters. The PUSCH repetition may be for a transport block of a message 3 of the RA procedure. The determination of the location of the NTN node may be based on at least one of: a satellite ephemeris data that may be indicated by the one or more NTN configuration parameters; a relative location of the NTN node to a location information of the wireless device; at least one timestamp; or a round trip propagation delay between the wireless device and the base station. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate a first set of RA resources indicating a message 3 repetition and a second set of RA resources not indicating the message 3 repetition. The one or more configuration parameters may comprise one or more NTN configuration parameters used for determining a first value based on a distance between the wireless device and an NTN node. The wireless device may select one or more RA resources, from among the first set of RA resources and the second set of RA resources, for an RA procedure based on the first value being larger than a threshold. The wireless device may send (e.g., transmit), for the RA procedure, a preamble via the one or more RA resources. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate a first set of RA resources indicating a message 3 repetition and a second set of RA resources not indicating the message 3 repetition. The one or more configuration parameters may comprise one or more NTN configuration parameters for determining a location of an NTN node. The wireless device may determine, for a RA procedure, a message 3 repetition being applicable based on the location of the NTN node. The wireless device may send (e.g., transmit), for example, based on (e.g., in response to) the message 3 repetition being applicable for the RA procedure, a preamble via the first set of RA resources. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more sets of random access (RA) resources. The one or more sets of RA resources may comprise a first set of RA resources with an indication for a message 3 repetition corresponding to a first bandwidth part (BWP) of at least two BWPs and a second set of RA resources corresponding to a second BWP of the at least two BWPs. The one or more configuration parameters may comprise one or more NTN-specific configuration parameters for determining a location information of an NTN node. The wireless device may initiate a random access (RA) procedure if operating in the first BWP. The wireless device may send (e.g., transmit), for the initiating the RA procedure and by switching from the first BWP to the second BWP, a preamble using the second set of RA resources. The switching from the first BWP to the second BWP may be based on the location information of the NTN node. The determination to switch from the first BWP to the second BWP may be based on determining the message 3 repetition not being applicable for the RA procedure. The wireless device may determine a first configuration parameter being enabled. The one or more configuration parameters may indicate the first configuration parameter. The wireless device may send (e.g., transmit), for the initiating the RA procedure, a second preamble using the first set of RA resources, for example, based on (e.g., in response to) determining the first configuration parameter being disabled. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining location information of an NTN node. The wireless device may receive, in a radio resource control (RRC) connected state, an RRC release message indicating at least one uplink resource for use in an RRC inactive state. The wireless device may transition, for example, based on (e.g., in response to) the RRC release message, from the RRC connected state to the RRC inactive state. The wireless device may send (e.g., transmit), based on the at location information of the NTN node, a transport block via the at least one uplink resource. The wireless device may determine, based on the at least one attribute of the service link, that the at least one uplink resource may be valid for use in the RRC inactive state. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining at least one attribute of a service link between the wireless device and an NTN payload. The one or more configuration parameters may indicate one or more small data transmission (SDT) configuration parameters configuring a SDT procedure. The wireless device may determine, in a radio resource control (RRC) inactive state and, for example, based on (e.g., in response to) arrival of uplink data corresponding to at least one SDT logical channel, whether to initiate the SDT procedure based on the at least one attribute of a service link. The wireless device may send (e.g., transmit) the uplink data based on the determining. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining at least one attribute of a service link between the wireless device and an NTN payload. The one or more configuration parameters may indicate one or more small data transmission (SDT) configuration parameters configuring a SDT procedure. The wireless device may receive, in a radio resource control (RRC) inactive state, at a medium access control (MAC) layer of the wireless device from a RRC layer of the wireless device, a first indication for initiating a SDT procedure. The wireless device may determine one or more conditions for initiating a small data transmission (SDT) procedure being satisfied, for example, based on the at least one attribute of the service link and the first indication. The wireless device may initiate the SDT procedure based on the one or more conditions for initiating the SDT procedure being satisfied. The wireless device may send, from the MAC layer of the wireless device to the RRC layer of the wireless device, a second indication for initiating the SDT procedure based on the one or more conditions for initiating the SDT procedure being satisfied. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining at least one attribute of a service link between the wireless device and an NTN payload. The one or more configuration parameters may indicate one or more small data transmission (SDT) configuration parameters. The one or more SDT configuration parameters may comprise one or more configured grant (CG) configuration parameters configuring a CG-SDT procedure and one or more random access (RA) configuration parameters configuring a RA-SDT procedure. The wireless device may determine, in a radio resource control (RRC) inactive state and, for example, based on (e.g., in response to) arrival of uplink data corresponding to at least one SDT logical channel, whether to initiate the CG-SDT procedure or RA-SDT procedure based on the at least one attribute of a service link. The wireless device may send (e.g., transmit) the uplink data based on the determining. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining at least one attribute of a service link between the wireless device and an NTN payload. The one or more configuration parameters may indicate one or more small data transmission (SDT) configuration parameters. The one or more SDT configuration parameters may comprise a first set of configuration parameters corresponding to a normal uplink (NUL) carrier and a second set of configuration parameters corresponding to a supplementary uplink (SUL) carrier. The wireless device may select, in a radio resource control (RRC) inactive state and, for example, based on (e.g., in response to) arrival of uplink data corresponding to at least one SDT logical channel, a carrier among the NUL carrier and the SUL carrier for initiating an SDT procedure based on the at least one attribute of a service link. The wireless device may send (e.g., transmit) the uplink data using the selected carrier. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station and via a non-terrestrial network (NTN), one or more configuration parameters. The one or more configuration parameters may indicate one or more NTN-specific parameters for determining a location information of the NTN node. The one or more configuration parameters may indicate one or more random access (RA) configuration parameters. The one or more RA configuration parameters may comprise a first set of RA configuration parameters corresponding to a two-step RA type and a second set of RA configuration parameters corresponding to a four-step RA type. The wireless device may initiate an RA procedure. The wireless device may select one or more RA resources from the first set of RA configuration parameters based on the location information of the NTN node. The wireless device may send (e.g., transmit) a first message via the one or more RA resources. The wireless device may determine whether the one or more RA resources may be selected form the first set of RA configuration parameters or the second set of RA configuration parameters based on the location information of the NTN node. The wireless device may determine whether to switch from the two-step RA procedure to the four-step RA procedure based on a preamble transmission counter being larger than a threshold. The wireless device may determine the threshold based on the location information of the NTN node. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station via a non-terrestrial network (NTN), one or more configuration parameters. The one or more configuration parameters may indicate a first set of random access (RA) resources configured for repetition of a message and a second set of RA resources configured without repetition of a message. The wireless device may transmit a random access preamble via one or more RA resources selected, from the first set of RA resources or the second set of RA resources, based on at least one characteristic of a service link. The one or more configuration parameters may further indicate a third set of RA resources configured for small data transmission (SDT). The wireless device may transmit, via the third set of RA resources, a message associated with an SDT procedure. The first set of RA resources may be further configured for SDT. The second set of RA resources may be further configured to exclude SDT operation. The one or more configuration parameters may further indicate a fourth set of RA resources configured to exclude SDT operation. The at least one characteristic of the service link may comprise at least one of: a propagation delay of the service link between the wireless device and a node of the NTN; an elevation angle of the service link; or a length of the service link. The wireless device may select, based on the at least one characteristic of the service link, the one or more RA resources for the transmitting of the random access preamble. The transmitting of the random access preamble via the selected one or more RA resources may indicate whether repetition of a message may be initiated. The transmitting of the random access preamble via the selected one or more RA resources may comprise one of: transmitting the random access preamble via the first set of RA resources to indicate repetition of a message may be initiated; or transmitting the random access preamble via the second set of RA resources to indicate repetition of a message may be not initiated. The repetition of the message may comprise a message 3 (Msg3) repetition of a four-step random access procedure. The one or more configuration parameters may further indicate one or more reference signal received power (RSRP) thresholds, of a RA procedure, for a bandwidth part (BWP). Each RSRP threshold of the one or more RSRP thresholds may correspond to a repetition number of a message of the RA procedure. The wireless device may determine, based on a first RSRP threshold of the one or more RSRP thresholds, a first repetition number of the message. The wireless device may transmit, for the RA procedure, repetitions of the message of the RA procedure, based on the first repetition number. The one or more configuration parameters may further indicate one or more reference signal received power (RSRP) thresholds of a RA procedure. The one or more configuration parameters may further indicate a plurality of repetition numbers of a message of the RA procedure. Each RSRP threshold of the one or more RSRP thresholds may correspond to a repetition number of the plurality of repetition numbers. The wireless device may select, based on a first RSRP threshold of the one or more RSRP thresholds, a first repetition number from the plurality of repetition numbers. The wireless device may transmit, for the RA procedure, repetitions of the message of the RA procedure, based on the first repetition number. The one or more configuration parameters may further indicate one or more configured grant (CG) configuration parameters of a CG small data transmission (CG-SDT) procedure. In a radio resource control (RRC) inactive state of the wireless device, a CG-SDT procedure may be initiated. The first set of RA resources may be further configured for small data transmission (SDT). The second set of RA resources may be further configured to exclude SDT operation. The wireless device may transmit a random access preamble, via one or more RA resources selected from the first set of RA resources or the second set of RA resources, based on whether the preamble may be for an SDT procedure. The transmitting the random access preamble via the selected one or more RA resources may indicate whether an SDT procedure may be initiated. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, one or more configuration parameters. The one or more configuration parameters may indicate a first set of random access (RA) resources configured for small data transmission (SDT) and a second set of RA resources configured to exclude SDT operation. The wireless device may transmit a random access preamble via one or more RA resources selected from the first set of RA resources or the second set of RA resources, based on whether the preamble may be for an SDT procedure. The one or more configuration parameters may further indicate a third set of RA resources configured with message 3 (Msg3) repetition. The wireless device may transmit, via the third set of RA resources, a random access preamble. The first set of RA resources may be further configured for repetition of a message. The second set of RA resources may be further configured to exclude repetition of a message. The one or more configuration parameters may further indicate a fourth set of RA resources configured to exclude repetition of a message. The one or more configuration parameters may further comprise one or more non-terrestrial network (NTN) configuration parameters for determining at least one characteristic of a service link. The at least one characteristic of a service link may comprise at least one of: a propagation delay of the service link between the wireless device and a node of the NTN; an elevation angle of the service link; or a length of the service link. The one or more configuration parameters may further indicate one or more configured grant (CG) configuration parameters of a CG small data transmission (CG-SDT) procedure. In a radio resource control (RRC) inactive state of the wireless device, a CG-SDT procedure may be initiated. The wireless device may select, based on at least one characteristic of a service link, the one or more RA resources for the transmitting of the random access preamble. The transmitting the random access preamble via the selected one or more RA resources may indicate whether an SDT procedure may be initiated. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A base station may perform a method comprising multiple operations. The base station may send, to a wireless device via a non-terrestrial network (NTN), one or more configuration parameters. The one or more configuration parameters may indicate a first set of random access (RA) resources configured for repetition of a message and a second set of RA resources configured without repetition of a message. The base station may receive a random access preamble via one or more RA resources selected from the first set of RA resources or the second set of RA resources, based on at least one characteristic of a service link. The at least one characteristic of the service link may comprise at least one of: a propagation delay of the service link between the wireless device and a node of the NTN; an elevation angle of the service link; or a length of the service link. The receiving the random access preamble via the selected one or more RA resources may indicate whether repetition of a message may be initiated. The receiving the random access preamble via the selected one or more RA resources may comprise one of: receiving the random access preamble via the first set of RA resources to indicate repetition of a message may be initiated; or receiving the random access preamble via the second set of RA resources to indicate repetition of a message may be not initiated. The repetition of the message may comprise a message 3 (Msg3) repetition of a four-step random access procedure. The one or more configuration parameters may further indicate one or more reference signal received power (RSRP) thresholds, of a RA procedure, for a bandwidth part (BWP). Each RSRP threshold of the one or more RSRP thresholds may correspond to a repetition number of a message of the RA procedure. The base station may receive, for the RA procedure, repetitions of the message of the RA procedure based on a first repetition number of the message. The first repetition number may be determined based on a first RSRP threshold of the one or more RSRP thresholds. The one or more configuration parameters may further indicate one or more reference signal received power (RSRP) thresholds of a RA procedure. The one or more configuration parameters may further indicate a plurality of repetition numbers of a message of the RA procedure. Each RSRP threshold of the one or more RSRP thresholds may correspond to a repetition number of the plurality of repetition numbers. The base station may receive, for the RA procedure, repetitions of the message of the RA procedure, based on a first repetition number of the message. The first repetition number may be selected from the plurality of repetition numbers, based on a first RSRP threshold of the one or more RSRP thresholds. The first set of RA resources may be further configured for small data transmission (SDT). The second set of RA resources may be further configured to exclude SDT operation. The base station may receive a random access preamble via one or more RA resources selected from the first set of RA resources or the second set of RA resources, based on whether the preamble may be for an SDT procedure. The receiving the random access preamble via the selected one or more RA resources may indicate whether an SDT procedure may be initiated. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to communicate with the base station. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate one or more reference signal received power (RSRP) thresholds, of a random access (RA) procedure, for a bandwidth part (BWP). Each RSRP threshold of the one or more RSRP thresholds may correspond to a repetition number of a message of the RA procedure. The wireless device may determine, based on a first RSRP threshold of the one or more RSRP thresholds, a first repetition number of the message. The wireless device may transmit, for the RA procedure, repetitions of the message of the RA procedure, based on the first repetition number. The first repetition number may be selected from a plurality of repetition numbers based on the one or more RSRP thresholds. The one or more configuration parameters may indicate the plurality of the repetition numbers. The wireless device may determine an RSRP of a downlink reference signal satisfying the first RSRP threshold of the one or more RSRP thresholds. The wireless device may select the first RSRP threshold of the one or more RSRP thresholds. The selecting the first RSRP threshold may be based on at least one parameter of a service link between the wireless device and non-terrestrial network (NTN) node of the NTN. The message of the RA procedure may be at least one of: a preamble; or a message 3 (Msg3). The RA procedure may be for a contention-free RA procedure. The wireless device may receive a downlink control information (DCI) indicating the transmission of the message of the RA procedure. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station via a non-terrestrial network (NTN), one or more configuration parameters. The one or more configuration parameters may indicate a first set of random access (RA) resources configured with message 3 (Msg3) repetition and a second set of RA resources configured without Msg3 repetition. The wireless device may transmit a random access preamble via one or more RA resources, from the first set of RA resources or the second set of RA resources, based on at least one of: a propagation delay of a service link between the wireless device and an NTN node of the NTN; an elevation angle of the service link; or a length of the service link. The wireless device may determine whether to select the one or more RA resources from the first set of RA resources or the second set of RA resources based on a location information of the NTN node. The determining the location of the NTN node may be based on at least one of: a satellite ephemeris data that may be indicated by the one or more configuration parameters; a relative location of the NTN node to a location information of the wireless device; at least one timestamp; or a round trip propagation delay between the wireless device and the base station. The wireless device may determine at least one parameter of the service link based on the location information of the NTN node. The at least one parameter of the service link may be at least one of: the propagation delay of the service link; the elevation angle of the service link; or the length of the service link. The determining the at least one parameter of the service link may be further based on a location information of the wireless device. The wireless device may determine a first parameter of the service link among the at least one parameter of the service link being larger than a first NTN-specific threshold. The first NTN-specific threshold may be indicated by the one or more configuration parameters. The first parameter of the service link may be one of: the propagation delay of the service link; or the length of the service link. The wireless device may determine a second parameter of the service link among the at least one parameter of the service link being smaller than a second NTN-specific threshold. The second NTN-specific threshold may be indicated by the one or more configuration parameters. The second parameter of the service link may be the elevation angle of the service link. The selecting may be further based on whether a reference signal received power (RSRP) of a downlink pathloss reference being smaller than an RSRP threshold or not. The one or more configuration parameters may indicate the RSRP threshold. The wireless device may determine the RSRP threshold based on the location information of the NTN node. The determining the RSRP threshold may be further based on at least one of: selecting the RSRP threshold from a plurality of RSRP thresholds; or calculating the RSRP threshold based on a configured RSRP threshold. The one or more configuration parameters may indicate the plurality of RSRP thresholds and the configured RSRP threshold. The determining may be further based on a first random number, generated by the wireless device, being larger than a first threshold. The one or more configuration parameters may indicate the first threshold. The wireless device may determine the first threshold based on at least one of: the location information of the NTN node; or a RSRP of a downlink pathloss reference and a configured RSRP threshold. The wireless device may determine at least one of the following being satisfied: a first value being larger than a configured NTN-specific threshold. The first value may be determined based on the location information of the NTN node. The one or more configuration parameters may indicate the configured NTN-specific threshold. The RSRP of the downlink pathloss reference is smaller than the configured RSRP threshold. The determining may be further based on a second random number, generated by the wireless device, being smaller than a second threshold. The one or more configuration parameters may indicate the second threshold. The wireless device may determine the second threshold based on at least one of:

the location information of the NTN node; or a RSRP of a downlink pathloss reference and a configured RSRP threshold. The wireless device may determine at least one of the following being satisfied: a first value being smaller than a configured NTN-specific threshold. The first value may be determined based on the location information of the NTN node. The one or more configuration parameters may indicate the configured NTN-specific threshold. The RSRP of the downlink pathloss reference being larger than the configured RSRP threshold. The wireless device may determine the Msg3 repetition being applicable for the RA procedure based on the location information of the NTN node. The wireless device may determine whether to use the location information of the NTN node or an RSRP of the downlink pathloss reference for determining whether the Msg3 repetition may be applicable or not. The determining whether the Msg3 repetition may be applicable or not may be based on the location information of the NTN node, for example, based on (e.g., in response to) a first configuration parameter being enabled. The determining whether the Msg3 repetition may be applicable or not may be based on the RSRP of the downlink pathloss reference, for example, based on (e.g., in response to) the first configuration parameter being disabled. The one or more configuration parameters may indicate the first configuration parameter. The wireless device may determine whether to use a randomized procedure for determining whether the Msg3 repetition may be applicable or not based on whether a second configuration parameter is enabled or disabled. The one or more configuration parameters may indicate the second configuration parameter. The wireless device may select the one or more RA resources from the first set of RA resources, for example, based on (e.g., in response to) the Msg3 repetition being applicable for the RA procedure. The wireless device may select the one or more RA resources from the second set of RA resources, for example, based on (e.g., in response to) the Msg3 repetition not being applicable for the RA procedure. The wireless device may determine whether the preamble may be selected from a preamble group A or a preamble group B based on the location information of the NTN node. The determining may be based on determining a value for a first parameter. The first parameter may be at least one of: a delta preamble; a transport block size; or a power offset. The determining the value for the first parameter may be based on increasing a preconfigured value by a factor in response to a change in a parameter of the service link. The parameter of the service link may be at least one of: the propagation delay of the service link; or the length of the service link. The determining the value for the first parameter may be based on increasing a preconfigured value by a factor in response to a change of a parameter of the service link. The parameter of the service link may be the elevation angle of the service link. The wireless device may determine a repetition number for a transmission of the Msg3 based on the location information of the NTN node and a random access response (RAR) and may transmit the Msg3 of the RA procedure based on the repetition number for the transmission of the Msg3. The repetition number for the transmission of the Msg3 may be selected from a plurality of repetition numbers based on the RAR. The plurality of repetition numbers may be selected from a set of plurality of repetition numbers based on the location information of the NTN node. The one or more configuration parameters may indicate the set of plurality of repetition numbers. A subset of repetition numbers may be selected from a plurality of repetition numbers based on the location information of the NTN node. The one or more configuration parameters may indicate the plurality of repetition numbers. The repetition number for a transmission of the Msg3 may be selected from the subset of repetition numbers based on the RAR. The wireless device may select the one or more RA resources from the second set of RA resources, for example, based on (e.g., in response to) a first parameter of the service link being larger than a first NTN-specific threshold. The first NTN-specific threshold may be indicated by the one or more configuration parameters. The wireless device may select the one or more RA resources from the second set of RA resources, for example, based on (e.g., in response to) a parameter of the service link being smaller than a second NTN-specific threshold. The first NTN-specific threshold may be indicated by the one or more configuration parameters. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate a first set of RA resources indicating a physical uplink shared channel (PUSCH) repetition and a second set of RA resources not indicating the PUSCH repetition. The wireless device may select one or more RA resources, from the first set of RA resources, for an RA procedure and may transmit, for the RA procedure and via the one or more RA resources, a preamble with at least one repetition, based on the PUSCH repetition being applicable. The wireless device may determine a number of repetitions of the PUSCH based on the at least one repetition of the preamble. The number of repetitions of the PUSCH may be equal to the at least one repetition of the preamble. The number of repetitions of the PUSCH may be different than the at least one repetition of the preamble. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate one or more reference signal received power (RSRP) thresholds for determining repetition of at least one message of a random access (RA) procedure. The at least one message of the RA procedure may be at least one of: a preamble; or a Msg3. The wireless device may determine, based on the one or more RSRP thresholds, a first number of repetitions of the at least one message of the RA procedure, and may transmit, for the RA procedure, the at least one message of the RA procedure with the first number of repetitions. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station via a non-terrestrial network (NTN), one or more configuration parameters. The one or more configuration parameters may indicate a first set of RA resources indicating a physical uplink shared channel (PUSCH) repetition and a second set of RA resources not indicating the PUSCH repetition. The one or more configuration parameters may comprise one or more NTN configuration parameters indicating an ephemeris information of an NTN node. The wireless device may receive a physical downlink control channel (PDCCH) ordering an RA procedure. The wireless device may select one or more RA resources from the first set of RA resources or the second set of RA resources, and may transmit, for the RA procedure, a preamble via the one or more RA resources, for example, based on (e.g., in response to) the PDCCH and based on the ephemeris information of the NTN node. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station, one or more configuration parameters. The one or more configuration parameters may indicate a first set of RA resources indicating a physical uplink shared channel (PUSCH) repetition and a second set of RA resources not indicating the PUSCH repetition. The wireless device may receive a physical downlink control channel (PDCCH) ordering an RA procedure. The wireless device may select one or more RA resources from the first set of RA resources or the second set of RA resources, and may transmit, for the RA procedure, a preamble via the one or more RA resources, for example, based on (e.g., in response to) receiving PDCCH via a non-terrestrial network (NTN). The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate a first set of random access (RA) resources with a small data indication and a second set of RA resources without the small data indication. The one or more configuration parameters may indicate one or more configured grant (CG) configuration parameters of a CG small data transmission (SDT) procedure. The wireless device may initiate, in a radio resource control (RRC) inactive state of the wireless device, a CG-SDT procedure. For an initiated RA procedure during the CG-SDT procedure, the wireless device may select one or more RA resources among the second set of RA resources. The wireless device may transmit, for the RA procedure, a preamble via the one or more RA resources. The initiating the CG-SDT procedure may be in response to receiving one or more RRC messages indicating the one or more configuration parameters. The one or more RRC messages may comprise an RRC resume message. An RRC connected state may be transitioned to the RRC inactive state, based on the receiving the one or more RRC messages comprising the RRC resume message. The one or more configuration parameters may comprise one or more non-terrestrial network (NTN) configuration parameters for determining at least one parameter of a service link between the wireless device and an NTN node of the NTN. The at least one parameter of the service link may be at least one of: a propagation delay of the service link; an elevation angle of the service link; or a length of the service link. The initiating the CG-SDT procedure may be based on the at least one parameter of the service link. The initiating the CG-SDT procedure may comprise selecting the CG-SDT procedure over an RA-SDT procedure. The selecting the CG-SDT procedure over the RA-SDT procedure may be based on the parameter of the service link. The first set of RA resources may correspond to the RA-SDT procedure. The wireless device may determine whether to select the one or more RA resources from the first set of RA resources or the second set of RA resources based on the at least one parameter of the service link. The initiating the RA procedure may be in response to selecting an RA-SDT procedure over the CG-SDT procedure. The first set of RA resources may correspond to the RA-SDT procedure. The wireless device may select an RA-SDT procedure over the CG-SDT procedure based on the at least one parameter of the service link. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate a first set of random access (RA) resources with a small data indication. The wireless device may initiate, in an RRC inactive state, the SDT procedure for transmitting uplink data, for example, in response to receiving an indication for initiation of a small data transmission (SDT) procedure and the one or more configuration parameters comprising the first set of RA resources. The wireless device may transmit, for the initiated SDT procedure and in the RRC inactive state, the uplink data. The initiating the SDT procedure may be further in response to receiving one or more RRC messages indicating the one or more configuration parameters. The one or more RRC messages may comprise an RRC resume message. The wireless device may transition from an RRC connected state to the RRC inactive state based on the receiving the one or more RRC messages comprising the RRC resume message. The receiving the indication may be in response to the receiving the one or more RRC messages comprising the RRC resume message. The one or more configuration parameters may comprise one or more non-terrestrial network (NTN) configuration parameters for determining at least one parameter of a service link between the wireless device and an NTN node of the NTN. The at least one parameter of the service link may be at least one of: a propagation delay of the service link; an elevation angle of the service link; or a length of the service link. The initiating the SDT procedure may be further based on the at least one parameter of the service link. The initiating the SDT procedure may be further based on selecting between a configured grant (CG)-based SDT (CG-SDT) procedure and an RA-based SDT (RA-SDT) procedure. The selecting between the CG-SDT procedure and the RA-SDT procedure may be based on the at least one parameter of the service link. The SDT procedure may be the RA-SDT procedure. The transmitting the uplink data may be based on the first set of RA resources. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive one or more configuration parameters. The one or more configuration parameters may indicate one or more reference signal received power (RSRP) thresholds for determining a repetition number a message of a random access (RA) procedure. The wireless device may determine, based on the one or more RSRP thresholds, the repetition number of the message of the RA procedure. The wireless device may transmit, for the RA procedure, the message of the RA procedure with the determined repetition number. The message of the RA procedure may be at least one of: a random access preamble; or a message 3 (Msg3). The RA procedure may be for a contention-free RA procedure. The wireless device may receive a downlink control information (DCI) indicating the transmission of the message of the RA procedure. Each RSRP threshold of the one or more RSRP thresholds may correspond to a repetition number. The wireless device may determine an RSRP of a downlink reference signal satisfying an RSRP threshold of the one or more RSRP thresholds. The wireless device may select the RSRP threshold of the one or more RSRP thresholds. The selecting the RSRP threshold of the one or more RSRP thresholds may be based on at least one parameter of a service link between the wireless device and non-terrestrial network (NTN) node of the NTN. The one or more configuration parameters may comprise one or more non-terrestrial network (NTN) configuration parameters. The one or more NTN configuration parameters may be used for determining the at least one parameter of the service link. The determining the repetition number may be further based on at least one parameter of a service link. The determining the repetition number may comprise selecting a first repetition number from a plurality of repetition numbers based on the one or more RSRP thresholds. The one or more configuration parameters may indicate the plurality of the repetition number. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station via a non-terrestrial network (NTN), one or more configuration parameters. The one or more configuration parameters may indicate a first set of random access (RA) resources configured with message 3 (Msg3) repetition and a second set of RA resources configured without Msg3 repetition. The wireless device may transmit a random access preamble via one or more RA resources, from the first set of RA resources or the second set of RA resources, based on at least one of: a propagation delay of a service link between the wireless device and an NTN node of the NTN; an elevation angle of the service link; or a length of the service link. The wireless device may determine at least one parameter of the service link based on a location information of the NTN node. The at least one parameter of the service link may be at least one of: the propagation delay of the service link; the elevation angle of the service link; and the length of the service link. The one or more configuration parameters comprise one or more NTN configuration parameters. The one or more NTN configuration parameters may indicate the location information of the NTN node. The wireless device may determine whether to select the one or more RA resources from the first set of RA resources or the second set of RA resources based on the at least one parameter of the service link. The wireless device may determine a first parameter of the at least one parameter of the service link being larger than a first NTN-specific threshold. The first NTN-specific threshold may be indicated by the one or more configuration parameters. The first parameter of the service link may be one of: the propagation delay of the service link; the length of the service link. The wireless device may determine a second parameter of the at least one parameter of the service link being smaller than a second NTN-specific threshold. The second NTN-specific threshold may be indicated by the one or more configuration parameters. The second parameter of the service link may be the elevation angle of the service link. The selecting may be further based on whether a reference signal received power (RSRP) of a downlink pathloss reference being smaller than an RSRP threshold or not. The wireless device may determine the RSRP threshold based on the at least one parameter of the service link. The determining the RSRP threshold may be further based on at least one of: selecting the RSRP threshold from a plurality of RSRP thresholds, the one or more configuration parameters indicating the plurality of RSRP thresholds; or calculating the RSRP threshold based on a configured RSRP threshold, the one or more configuration parameters indicating the configured RSRP threshold. The selecting may be further based on a first random number, generated by the wireless device, being larger than a first threshold. The one or more configuration parameters may indicate the first threshold. The wireless device may determine the first threshold based on at least one of: the at least one parameter of the service link; or a RSRP of a downlink pathloss reference and a configured RSRP threshold. The wireless device may determine a Msg3 repetition being applicable for the RA procedure based on the at least one parameter of the service link. The wireless device may determine the at least one parameter of the service link or an RSRP of the downlink pathloss reference for determining whether the Msg3 repetition may be applicable. The determining whether the Msg3 repetition is applicable may be based on the at least one parameter of the service link, for example, based on (e.g., in response to) a first configuration parameter being enabled. The determining whether the Msg3 repetition is applicable may be based on the RSRP of the downlink pathloss reference, for example, based on (e.g., in response to) the first configuration parameter being disabled. The one or more configuration parameters may indicate the first configuration parameter. The wireless device may determine whether to use a randomized procedure for determining whether the Msg3 repetition is applicable based on whether a second configuration parameter is enabled or disabled. The one or more configuration parameters may indicate the second configuration parameter. The wireless device may select the one or more RA resources from the first set of RA resources, for example, based on (e.g., in response to) the Msg3 repetition being applicable for the RA procedure. The wireless device may select the one or more RA resources from the second set of RA resources, for example, based on (e.g., in response to) the Msg3 repetition not being applicable for the RA procedure. The wireless device may determine whether the preamble may be selected from a preamble group A or a preamble group B based on the at least one parameter of the service link. The wireless device may determine a repetition number for a transmission of the Msg3 and may transmit the Msg3 of the RA procedure using the repetition number for the transmission of the Msg3. The determining the repetition numbers for a transmission of the Msg3 may be based on the at least one parameter of the service link. The determining the repetition numbers for a transmission of the Msg3 may comprise selecting the repetition numbers for a transmission of the Msg3 from a plurality of repetition numbers based on the at least one parameter of the service link. The one or more configuration parameters may indicate the plurality of repetition numbers for a transmission of the Msg3. The transmitting the random access preamble may comprise transmitting the random access preamble with a first number of repetitions. The repetition numbers for a transmission of the Msg3 may be based on the first number of repetitions. The repetition numbers for a transmission of the Msg3 may be equal to the first number of repetitions. The repetition numbers for a transmission of the Msg3 may be different than the first number of repetitions. The first number of repetitions may be based on a plurality of RSRP thresholds. The one or more configuration parameters may indicate the plurality of RSRP thresholds. The wireless device may select the one or more RA resources from the second set of RA resources, for example, based on (e.g., in response to) a first parameter of the service link being larger than a first NTN-specific threshold. The first NTN-specific threshold may be indicated by the one or more configuration parameters. The wireless device may select the one or more RA resources from the second set of RA resources, for example, based on (e.g., in response to) a parameter of the service link being smaller than a second NTN-specific threshold. The first NTN-specific threshold may be indicated by the one or more configuration parameters. The transmitting the random access preamble may be for a contention-free random access procedure. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

A wireless device may perform a method comprising multiple operations. The wireless device may receive, from a base station via a non-terrestrial network (NTN), one or more configuration parameters. The one or more configuration parameters may indicate a first set of RA resources with an indication for a message 3 repetition corresponding to a first bandwidth part (BWP) of at least two BWPs and a second set of RA resources corresponding to a second BWP of the at least two BWPs. The wireless device may initiate a random access (RA) procedure when operating in the first BWP. The wireless device may transmit, for the initiating the RA procedure and by switching from the first BWP to the second BWP, a preamble using the second set of RA resources. The switching from the first BWP to the second BWP may be at least one of: a propagation delay of a service link between the wireless device and an NTN node of the NTN; an elevation angle of the service link; or a length of the service link. The wireless device may determine to switch from the first BWP to the second BWP based on determining a message 3 repetition not being applicable for the RA procedure. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to communicate with the wireless device. A computer-readable medium may store instructions that, when executed, cause performance of the described method, additional operations, and/or include the additional elements.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device from a base station via a non-terrestrial network (NTN), one or more configuration parameters indicating:
    a first set of random access (RA) resources configured for repetition of a message;
    a second set of RA resources configured without repetition of a message; and
    a plurality of reference signal received power (RSRP) thresholds, each corresponding to a repetition number of a message of a RA procedure;
determining, based on a first RSRP threshold of the plurality of RSRP thresholds, a first repetition number; and
transmitting repetitions of the message of the RA procedure based on the first repetition number and via the first set of RA resources.

2. The method of claim 1, wherein the one or more configuration parameters further indicate a third set of RA resources configured for small data transmission (SDT), and wherein the method further comprises:
    transmitting, via the third set of RA resources, a message associated with an SDT procedure.

3. The method of claim 2, wherein at least one of:
    the first set of RA resources are further configured for SDT;
    the second set of RA resources are further configured to exclude SDT operation; or
    the one or more configuration parameters further indicate a fourth set of RA resources configured to exclude SDT operation.

4. The method of claim 1, further comprising selecting the first set of RA resources based on:
    a propagation delay of a service link between the wireless device and a node of the NTN;
    an elevation angle of a service link between the wireless device and a node of the NTN; or a length of a service link between the wireless device and a node of the NTN.

5. The method of claim 1, further comprising:
selecting, by the wireless device and based on at least one characteristic of a service link between the wireless device and a node of the NTN, one or more RA resources for transmitting a random access preamble.

6. The method of claim 1, further comprising transmitting a random access preamble, via selected one or more RA resources, indicating whether repetition of a message is initiated.

7. The method of claim 6, wherein the transmitting the random access preamble via the selected one or more RA resources comprises one of:
    transmitting the random access preamble via the first set of RA resources to indicate repetition of a message is initiated; or
    transmitting the random access preamble via the second set of RA resources to indicate repetition of a message is not initiated.

8. The method of claim 1, wherein the repetition of the message comprises a message 3 (Msg3) repetition of a four-step random access procedure.

9. A method comprising:
receiving, by a wireless device, one or more configuration parameters indicating:
    a first set of random access (RA) resources configured for small data transmission (SDT); and
    a second set of RA resources configured to exclude SDT operation; and
transmitting a random access preamble via one or more RA resources selected, from the first set of RA resources or the second set of RA resources, based on whether the preamble is for an SDT procedure.

10. The method of claim 9, wherein the one or more configuration parameters further indicate a third set of RA resources configured with message 3 (Msg3) repetition, and wherein the method further comprises:
    transmitting, via the third set of RA resources, a random access preamble.

11. The method of claim 9, wherein at least one of:
    the first set of RA resources are further configured for repetition of a message;
    the second set of RA resources are further configured to exclude repetition of a message; or
    the one or more configuration parameters further indicate a fourth set of RA resources configured to exclude repetition of a message.

12. The method of claim 9, wherein the one or more configuration parameters further comprise one or more non-terrestrial network (NTN) configuration parameters for determining at least one of:
    a propagation delay of a service link between the wireless device and a node of the NTN;
    an elevation angle of a service link between the wireless device and a node of the NTN; or
    a length of a service link between the wireless device and a node of the NTN.

13. The method of claim 9, wherein the one or more configuration parameters further indicate one or more configured grant (CG) configuration parameters of a CG small data transmission (CG-SDT) procedure, and the method further comprises:
    initiating, in a radio resource control (RRC) inactive state of the wireless device, a CG-SDT procedure.

14. The method of claim 9, further comprising:

selecting, by the wireless device and based on at least one characteristic of a service link, the one or more RA resources for the transmitting of the random access preamble.

15. The method of claim 9, wherein the transmitting the random access preamble via the selected one or more RA resources indicates whether an SDT procedure is initiated.

16. A method comprising:

sending, by a base station to a wireless device via a non-terrestrial network (NTN), one or more configuration parameters indicating:

a first set of random access (RA) resources configured for repetition of a message; and a second set of RA resources configured without repetition of a message; and a plurality of reference signal received power (RSRP) thresholds, each corresponding to a repetition number of a message of a RA procedure;

and receiving a repetition of the message of the RA procedure via one or more RA resources selected, from the first set of RA resources.

17. The method of claim 16, further comprising receiving a random access preamble via one or more RA resources selected, from the first set of RA resources or the second set of RA resources, based on:

a propagation delay of a service link between the wireless device and a node of the NTN;

an elevation angle of a service link between the wireless device and a node of the NTN; or a length of a service link between the wireless device and a node of the NTN.

18. The method of claim 17, wherein the receiving the random access preamble indicates whether repetition of a message is initiated.

19. The method of claim 17, wherein the receiving the random access preamble comprises one of:

receiving the random access preamble via the first set of RA resources to indicate repetition of a message is initiated; or receiving the random access preamble via the second set of RA resources to indicate repetition of a message is not initiated.

20. The method of claim 16, wherein the repetition of the message comprises a message 3 (Msg3) repetition of a four-step random access procedure.

\* \* \* \* \*